(12) United States Patent
Daniel et al.

(10) Patent No.: US 8,117,372 B2
(45) Date of Patent: Feb. 14, 2012

(54) VIRTUALIZATION OF A HOST COMPUTER'S NATIVE I/O SYSTEM ARCHITECTURE VIA INTERNET AND LANS

(75) Inventors: David A. Daniel, Scottsdale, AZ (US); Joseph Hui, Fountain Hills, AZ (US)

(73) Assignee: Nuon, Inc., Scottsdale, AZ (US)

( * ) Notice: Subject to any disclaimer, the term of this patent is extended or adjusted under 35 U.S.C. 154(b) by 0 days.

(21) Appl. No.: 12/802,350

(22) Filed: Jun. 4, 2010

(65) Prior Publication Data

US 2010/0281195 A1    Nov. 4, 2010

Related U.S. Application Data

(63) Continuation of application No. 12/148,712, filed on Apr. 21, 2008, now Pat. No. 7,734,859.

(60) Provisional application No. 60/925,430, filed on Apr. 20, 2007.

(51) Int. Cl.
*G06F 13/00* (2006.01)

(52) U.S. Cl. .......... 710/315; 710/305; 709/250
(58) Field of Classification Search .......... 710/100, 710/305, 316, 306, 315; 709/250; 370/464–469
See application file for complete search history.

(56) References Cited

U.S. PATENT DOCUMENTS

| | | | | |
|---|---|---|---|---|
| 6,931,002 | B1* | 8/2005 | Simpkins et al. | 370/354 |
| 7,860,930 | B2* | 12/2010 | Freimuth et al. | 709/205 |
| 2003/0149773 | A1* | 8/2003 | Harbin et al. | 709/227 |
| 2007/0198763 | A1* | 8/2007 | Suzuki et al. | 710/316 |
| 2008/0052386 | A1* | 2/2008 | Johnson et al. | 709/223 |

* cited by examiner

*Primary Examiner* — Glenn A Auve
(74) *Attorney, Agent, or Firm* — Robert C. Klinger

(57) ABSTRACT

A hardware/software system and method that collectively enables virtualization of the host computer's native I/O system architecture via the Internet and LANs. The invention includes a solution to the problems of the relatively narrow focus of iSCSI, the direct connect limitation of PCI Express, and the inaccessibility of PCI Express for expansion in blade architectures.

36 Claims, 83 Drawing Sheets

IO PORT SUMMARY

I /O Ports Usage Summary :
  [00000000 - 00000CF7] PCI bus
    [00000000 - 0000001F] Direct memory access controller
    [00000020 - 0000003F] Programmable interrupt controller
    [00000040 - 0000005F] System timer
    [00000060 - 00000060] System board
    [00000061 - 00000061] System speaker
    [00000062 - 00000063] System board
    [00000064 - 00000064] System board
    [00000065 - 0000006F] System board
    [00000070 - 0000007F] System CMOS/real time clock
    [00000080 - 0000009F] Direct memory access controller
    [000000A0 - 000000BF] Programmable interrupt controller
    [000000C0 - 000000DF] Direct memory access controller
    [000000E0 - 000000EF] System board
    [000000F0 - 000000FF] Numeric data processor
    [00000100 - 000001FB] Motherboard resources
       [000001F0 - 000001F7] Primary IDE Channel
    [00000200 - 00000277] Motherboard resources
       [00000274 - 00000277] ISAPNP Read Data Port
    [00000279 - 00000279] ISAPNP Pead Data Port
    [00000280 - 000002E7] Motherboard resources
    [000002F0 - 000002F7] Motherboard resources
    [00000300 - 00000377] Motherboard resources
    [00000378 - 0000037F] ECP Printer Port (LPT1)
    [00000380 - 000003BB] Motherboard resources
       [000003B0 - 000003BB] Intel (R) 82945G Express Chipset Family
    [000003C0 - 000003E7] Motherboard resources
       [000003C0 - 000003DF] Intel (R) 82945G Express Chipset Family
    [000003F0 - 000003FS] Standard floppy disk controller
    [000003F6 - 000003F7] Motherboard resources
       [000003F6 - 000003F6] Primary IDE Channel
       [000003F7 - 000003F7] Standard floppy disk controller
    [000003F8 - 000003FF] Communications Port (COM1 )
    [00000400 - 000004CF] Motherboard resources

FROM FIG. 26A

| | |
|---|---|
| [000004D0 - 000004D1] | Programmable interrupt controller |
| [000004D2 - 0000057F] | Motherboard resources |
| [00000580 - 00000677] | Motherboard resources |
| [00000680 - 00000777] | Motherboard resources |
| [00000778 - 0000077F] | ECP Printer Port (LPT1) |
| [00000780 - 000007BB] | Motherboard resources |
| [000007C0 - 000007FF] | Motherboard resources |
| [00000800 - 0000085F] | System board |
| [00000860 - 000008FF] | System board |
|    [000008E0 - 000008FF] | Motherboard resources |
| [00000900 - 000009FE] | Motherboard resources |
| [00000A00 - 00000AFE] | Motherboard resources |
|    [00000A79 - 00000A79] | ISAPNP Read Data Port |
| [00000B00 - 00000BFE] | Motherboard resources |
| [00000C00 - 00000C7F] | System board |
| [00000C80 - 00000CAF] | Motherboard resources |
| [00000CB0 - 00000CBF] | Motherboard resources |
| [00000CC0 - 00000CF7] | Motherboard resources |
| [00000D00 - 0000FFFF] | PCI bus |
|   [00000D00 - 00000DFE] | Motherboard resources |
|   [00000E00 - 00000EFE] | Motherboard resources |
|   [00000F00 - 00000FFE] | Motherboard resources |
|   [00002000 - 000020FE] | Motherboard resources |
|   [00002100 - 000021FE] | Motherboard resources |
|   [00002200 - 000022FE] | Motherboard resources |
|   [00002300 - 000023FE] | Motherboard resources |
|   [00002400 - 000024FE] | Motherboard resources |
|   [00002500 - 000025FE] | Motherboard resources |
|   [00002600 - 000026FE] | Motherboard resources |
|   [00002700 - 000027FE] | Motherboard resources |
|   [00002800 - 000028FE] | Motherboard resources |
|   [00002900 - 000029FE] | Motherboard resources |
|   [00002A00 - 00002AFE] | Motherboard resources |
|   [00002B00 - 00002BFE] | Motherboard resources |
|   [00002C00 - 00002CFE] | Motherboard resources |

FROM FIG. 26B

| Range | Description |
|---|---|
| [00002D00 - 00002DFE] | Motherboard resources |
| [00002E00 - 00002EFE] | Motherboard resources |
| [00002F00 - 00002FFE] | Motherboard resources |
| [00005000 - 000050FE] | Motherboard resources |
| [00005100 - 000051FE] | Motherboard resources |
| [00005200 - 000052FE] | Motherboard resources |
| [00005300 - 000053FE] | Motherboard resources |
| [00005400 - 000054FE] | Motherboard resources |
| [00005500 - 000055FE] | Motherboard resources |
| [00005600 - 000056FE] | Motherboard resources |
| [00005700 - 000057FE] | Motherboard resources |
| [00005800 - 000058FE] | Motherboard resources |
| [00005900 - 000059FE] | Motherboard resources |
| [00005A00 - 00005AFE] | Motherboard resources |
| [00005B00 - 00005BFE] | Motherboard resources |
| [00005C00 - 00005CFE] | Motherboard resources |
| [00005D00 - 00005DFE] | Motherboard resources |
| [00005E00 - 00005EFE] | Motherboard resources |
| [00005F00 - 00005FFE] | Motherboard resources |
| [00006000 - 000060FE] | Motherboard resources |
| [00006100 - 000061FE] | Motherboard resources |
| [00006200 - 000062FE] | Motherboard resources |
| [00006300 - 000063FE] | Motherboard resources |
| [00006400 - 000064FE] | Motherboard resources |
| [00006500 - 000065FE] | Motherboard resources |
| [00006600 - 000066FE] | Motherboard resources |
| [00006700 - 000067FE] | Motherboard resources |
| [00006800 - 000068FE] | Motherboard resources |
| [00006900 - 000069FE] | Motherboard resources |
| [00006A00 - 00006AFE] | Motherboard resources |
| [00006B00 - 00006BFE] | Motherboard resources |
| [00006C00 - 00006CFE] | Motherboard resources |
| [00006D00 - 00006DFE] | Motherboard resources |
| [00006E00 - 00006EFE] | Motherboard resources |
| [00006F00 - 00006FFE] | Motherboard resources |
| [0000A000 - 0000A0FE] | Motherboard resources |

TO FIG. 26D

FROM FIG. 26C

MEMORY SUMMARY

Memory Usage Summary:
    [00000000 - 0009FFFF] System board
    [000A0000 - 000BFFFF] PCI bus
        [000A0000 - 000BFFFF] Intel (R) 82945G Express Chipset Family
    [000C0000 - 000EFFFF] PCI bus
        [000C0000 - 000CFFFF] System board
    [000F0000 - 000FFFFF] PCI bus
        [000F0000 - 000FFFFF] System board
    [00100000 - 00FFFFFF] System board
    [01000000 - 7F686BFF] System board
    [80000000 - EFFFFFFF] PCI bus
        [E0000000 - EFFFFFFF] Intel (R) 82945G Express Chipset Family
    [F0000000 - F3FFFFFF] Motherboard resources
    [F4000000 - FEBFFFFF] PCI bus
        [FE700000 - FE7FFFFF] Intel (R) 82801GB PCI Express Root Port - 27D2
        [FE800000 - FB8FFFFF] Intel (R) 82801GB PCI Express Root Port - 27D0
            [FE8F0000 - FE8FFFFF] Broadcom NetXtreme 57xx. Gigabit Controller
        [FE900000 - FE9FFFFF] Intel (R) 945G/P PCI Express Root Port - 2771
        [FEABF900 - FEABF9FF] SoundMAX Integrated Digital Audio
        [FEABFA00 - FEABFBFF] SoundMAX Integrated Digital Audio
        [FEAC0000 - FEAFFFFF] Intel (R) 82945G Express Chipset Family
        [FEB00000 - FEB7FFFF] Intel (R) 82945G ExPress Chipset Family
        [FEB80000 - FEBFFFFF] Intel (R) 82945G Express Chipset Family
    [FEC00000 - FECFFFFF] System board
    [FED20000 - FED9FFFP] System board
    [FEDA0000 - FEDACFFF] Motherboard resources
    [FEE00000 - FEEFFFFF] System board
    [FFA80800 - FFA80BFF] PCI bus
        [FFA80800 - FFA80BFF] Intel (R) 82801GB USB2 Enhanced Host Controller - 27CC
    [FFB00000 - FFBFFFFF] System board
    [FFC00000 - FFFFFFFF] System board

FIG. 26D

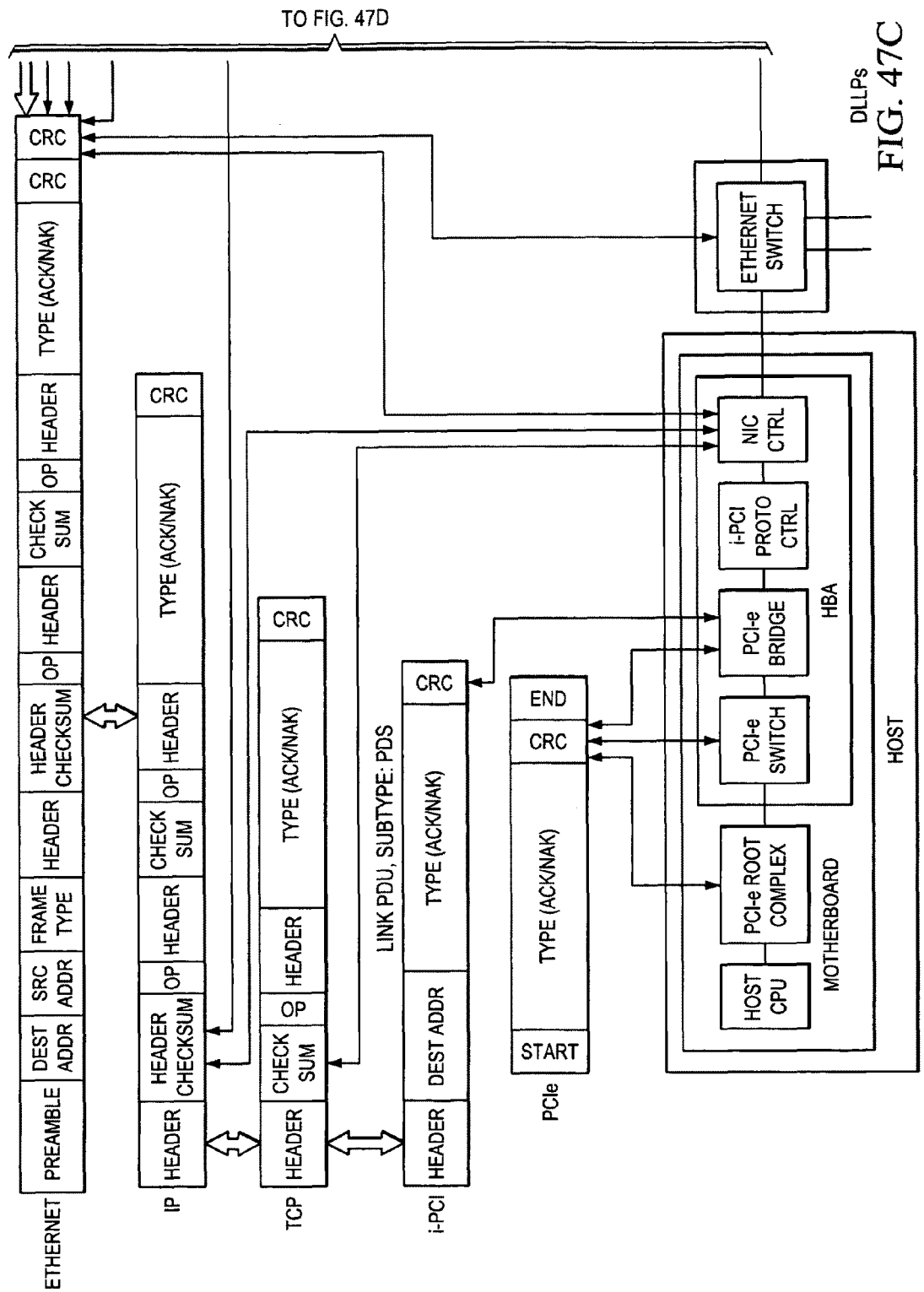

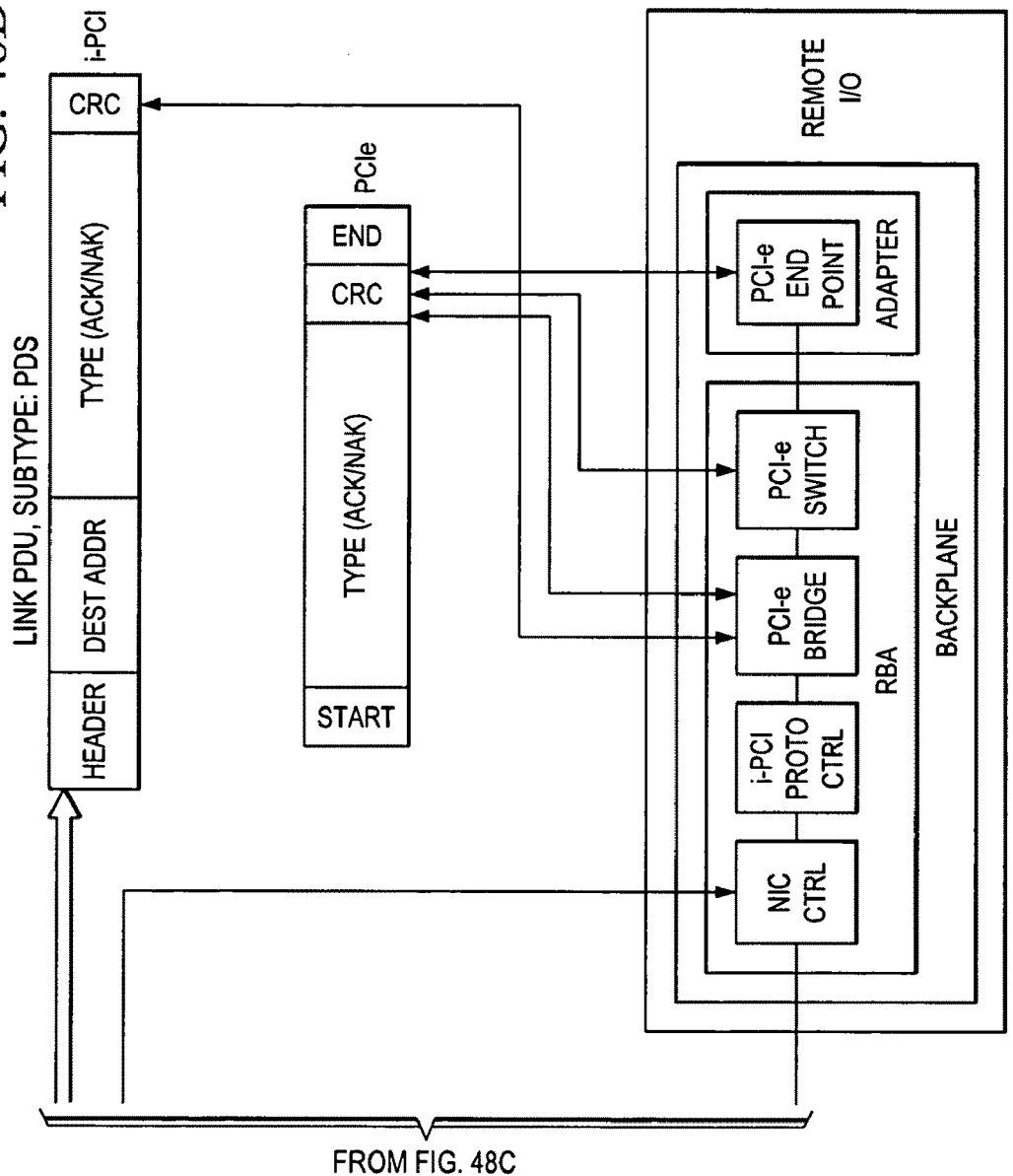

FIG. 53D

FROM FIG. 53C

| Band | Allocation | Freq |
|---|---|---|
| | MARITIME RADIONAVIGATION \| RADIOLOCATION | 5.47 |
| | MARITIME RADIONAVIGATION \| METEOROLOGICAL AIDS \| RADIOLOCATION | 5.6 |
| | | 5.65 |
| | RADIOLOCATION \| AMATEUR | |
| | | 5.83 |
| | RADIOLOCATION \| AMATEUR-SAT (S-E) \| AMATEUR | |
| | | 5.85 |
| | MOBILE \| FIXED SATELLITE (E-S) \| AMATEUR | |
| | | 5.925 |
| | FIXED \| FIXED SATELLITE (E-S) | |
| | | 6.425 |
| | FIXED SATELLITE (E-S) \| MOBILE | |
| | | 6.525 |
| | FIXED SATELLITE (E-S) \| FIXED | |
| | | 6.70 |
| | FIXED SATELLITE (S-E) (E-S) \| FIXED | |
| | | 6.875 |
| | MOBILE \| FIXED SATELLITE (E-S) \| FIXED | |
| | | 7.025 |
| | MOBILE \| FIXED SATELLITE (E-S) \| FIXED | |
| | | 7.075 |
| | MOBILE \| FIXED | |
| | | 7.125 |
| | FIXED | |

FROM FIG. 53D

| | | | |
|---|---|---|---|
| FIXED | | | |
| FIXED | | SPACE RESEARCH (E-S) | 7.19 |
| FIXED | | | 7.235 |
| | | | 7.25 |
| FIXED SATELLITE (S-E) | MOBILE SATELLITE (S-E) | FIXED | |
| FIXED SATELLITE (S-E) | FIXED | MOBILE SATELLITE (S-E) | 7.30 |
| FIXED SATELLITE (S-E) | MET. SATELLITE (S-E) | FIXED | MOBILE SATELLITE (S-E) | 7.45 |
| FIXED SATELLITE (S-E) | FIXED | MOBILE SATELLITE (S-E) | 7.55 |
| FIXED | | | 7.75 |
| FIXED SATELLITE (E-S) | MOBILE SATELLITE (E-S) | FIXED | 7.90 |
| FIXED SATELLITE (E-S) | EARTH EXPL. SATELLITE (S-E) | FIXED | MOBILE SATELLITE (E-S) | 8.025 |
| EARTH EXPL. SATELLITE (S-E) | FIXED SATELLITE (E-S) | FIXED | MET. SATELLITE (E-S) | MOBILE SATELLITE (E-S) (NO AIRBORNE) | 8.175 |
| EARTH EXPL. SATELLITE (S-E) | FIXED SATELLITE (E-S) | FIXED | MOBILE SATELLITE (E-S) (NO AIRBORNE) | 8.215 |
| | | | 8.4 |

| | | |
|---|---|---|
| PCIe Max Payload (DW) | | 1024 |
| PCIe Max Payload (bits) | | 32768 |
| PCIe Express OH: | SEQ Number (bits) | 16 |
| | PCIe Header (bits) | 96 |
| | ERC (optional) (bits) | 32 |
| | LCRC (bits) | 32 |
| i-PCI OH: | Header (bits) | 16 |
| Max i-PCI PDU (bits) | | 32960 |
| | | |
| MAC FCS(bits) | | 32 |
| | | |
| Reed Solomon FEC Rate: | | 0.9372549 |
| Max i-PCI PDU + FCS + FEC (bits) | | 35200 |
| | | |
| MAC OH: | MAC Header(bits) | 80 |
| Max MAC Frame (bits) | | 35280 |
| | | |
| PHY OH: | PHY Header (bits) | 80 |
| | HCS (bits) | 16 |
| | RS (bits) | 128 |
| Max PHY Frame (bits) | | 35504 |
| | | |
| Modulation = 16 QAM (bits/symbol): | | 4 |
| Symbols Req for Max PHY Frame | | 8876 |
| | | |
| Max Data Burst (bits) | | 256 |
| Numer of Data Bursts(bits) | | 34 |
| PCES size | | 768 |
| PCES insertions | | 1 |
| | | |
| Preamble symbols (long) | | 5632 |
| | | |
| Symbols Req for Superframe CTA: | | 15276 |
| | | |
| Symbol Rate (symbols/sec): | | 1.728E+09 |
| Symbol Period (secs) | | 5.787E-10 |
| CTA Duration (secs): | | 8.84E-06 |
| | | |
| Preamble (medium)(secs) | | 2.07E-06 |
| Beacon Frame (secs) | | 3.200E-05 |
| SIFS Period (secs) | | 2.500E-06 |
| | | |
| Super frame duration (secs): | | 5.425E-05 |
| Frequency of Super frame(frames/secs): | | 1.843E+04 |
| | | |
| Net PCIe Payload Throughput (bps): | | 6.040E+08 |

FIG.60

VIRTUALIZATION OF A HOST COMPUTER'S NATIVE I/O SYSTEM ARCHITECTURE VIA INTERNET AND LANS

CLAIM OF PRIORITY

This application is a continuation of U.S. patent application Ser. No. 12/148,712 filed Apr. 21, 2008 now U.S. Pat. No. 7,734,859 entitled Virtualization of a host computer's native I/O system architecture via the Internet and LANs, which claims priority of U.S. Provisional Ser. No. 60/925,430 entitled "VIRTUALIZATION OF A HOST COMPUTER'S NATIVE I/O SYSTEM ARCHITECTURE VIA THE INTERNET AND LANS" filed Apr. 20, 2007 and the teachings of which are incorporated herein by reference.

FIELD OF THE INVENTION

The present invention relates to computer system date transport.

BACKGROUND OF THE INVENTION

There is growing acceptance of techniques that leverage networked connectivity for extending and centralizing the resources of host computer systems. In particular, networked connectivity is being widely utilized for specialized applications such as attaching storage to computers. iSCSI makes use of TCP/IP as a transport for the SCSI parallel bus to enable low cost remote centralization of storage. The problem with iSCSI is it has a relatively narrow (storage) focus and capabiltiy.

Another trend is the move towards definition and virtualization of multiple computing machines within one host system. Virtualization is particularly well suited for blade server installations where the architecture is optimized for high density compute resources and pooled storage. The virtualization of CPU cycles, memory resources, storage, and network bandwidth allows for unprecedented mobility, flexibility, and adaptability of computing tasks.

PCI Express, as the successor to PCI bus, has moved to the forefront as the predominant local host bus for computer system motherboard architectures. A cabled version of PCI Express allows for high performance directly attached bus expansion via docks or expansion chassis. These docks and expansion chassis may be populated with any of the myriad of widely available PCI Express or PCI/PCI-X bus adapter cards. The adapter cards may be storage oriented (i.e. Fibre Channel, SCSI), video processing, audio processing, or any number of application specific I/O functions. A limitation of PCI Express is that it is limited to direct attach expansion. A problem with certain blade server architectures is PCI Express is not easily accessible, thus expansion is awkward, difficult, or costly.

Gbps Ethernet is beginning to give way to 10 Gbps Ethernet. This significant increase in bandwidth enables unprecedented high performance applications via IP.

SUMMARY OF INVENTION

The invention achieves technical advantages as a hardware/software system and method that collectively enables virtualization of the host computer's native I/O system architecture via the Internet and LANs. The invention includes a solution to the problems of the relatively narrow focus of iSCSI, the direct connect limitation of PCI Express, and the inaccessibility of PCI Express for expansion in blade architectures.

This invention allows devices native to the host computer native I/O system architecture—including bridges, I/O controllers, and a large variety of general purpose and specialty I/O cards—to be located remotely from the host computer, yet appear to the host system and host system software as native system memory or I/O address mapped resources. The end result is a host computer system with unprecedented reach and flexibility through utilization of LANs and the Internet.

BRIEF DESCRIPTION OF THE DRAWINGS

FIG. 26 depicts Corresponding Memory Resource Window.

FIG. 58 depicts i-PCI (WPAN) Protocol Suite;
FIG. 60 depicts i-PCI(WPAN) Backbone Installation.

BRIEF DESCRIPTION OF TABLES

Figure 1:
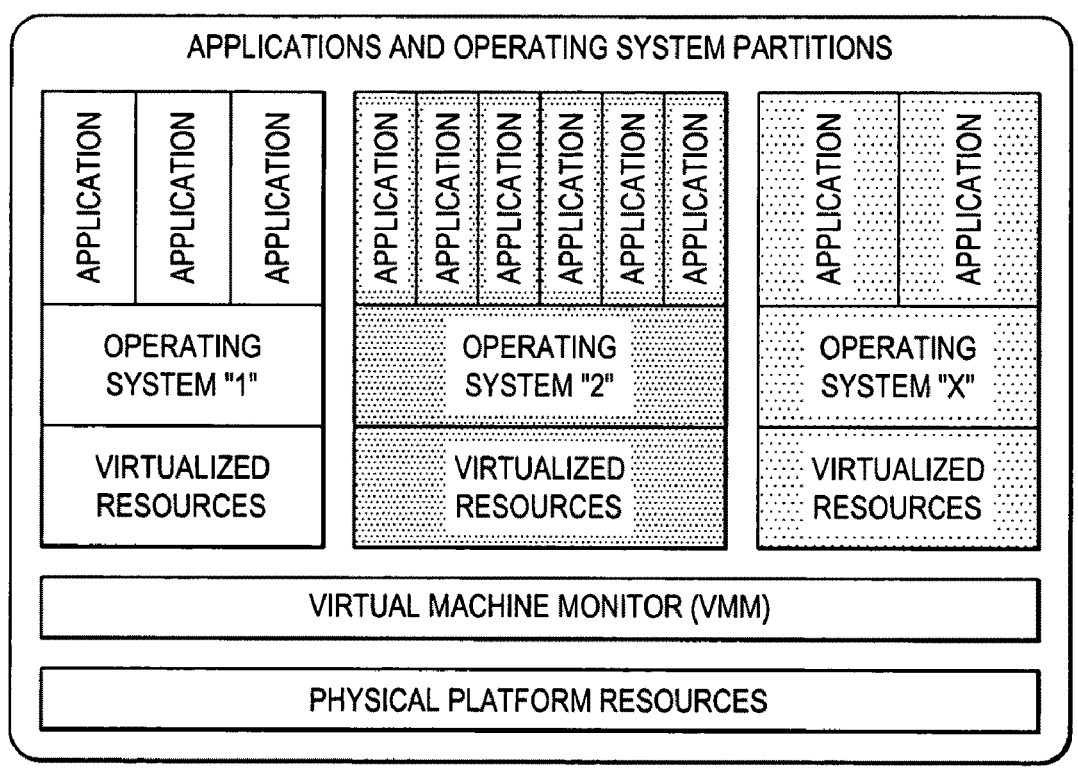
FIG. 1 depicts The Computing Machine Virtualization Concept.

Table 1 depicts Header Field: "Type"
Table 2 depicts Header Field: "Implementation"
Table 3 depicts Header Field: "Option"
Table 4 depicts HK Header Field: "Status/Command"
Table 5 depicts HK Header Field: "CRC"
Table 6 depicts PCI Express DLLPs and PDU Mapping for i-PCI.
Table 7 depicts PCI Express DLLPs and PDU Mapping for i(e)-PCI
Table 8 depicts PCI Express DLLPs and PDU Mapping for i(dc)-PCI
Table 9 depicts Link PDU Header Field: "SubType"
Table 10 depicts Link PDU Header Field: "Buff Util"
Table 11 depicts Link (PDS-specific) PDU Header Field: "Function"
Table 12 depicts Link (PDS-specific) PDU Header Field: "CRC"
Table 13 depicts Link PDU CSS Header Field: "CMD/RSP".
Table 14 depicts Link PDU CSS Header Field: "Byte Enable"
Table 15 depicts Example PCI □ □ IP Address Mapping
Table 16 depicts Example PCI □ □ MAC Address Mapping
Table 17 depicts Example PCIe TC/VC/TCP Code Fields Mapping
Table 18 depicts Example PCIe TC/VC Multiple Connection Mapping
Table 19 depicts i-PCI Host Session Management State Descriptions
Table 20 depicts i-PCI Remote I/O Session Management State Descriptions
Table 21 depicts i(e)-PCI Host Session Management State Descriptions
Table 22 depicts i(e)-PCI Remote I/O Session Management State Descriptions
Table 23 depicts i(dc)-PCI Host Session Management State Descriptions
Table 24 depicts i(dc)-PCI Remote I/O Session Management State Descriptions
Table 25 depicts PCI Express Flow Control Initialization State Descriptions
Table 26 depicts PCI Express Transmitter Flow Control State Descriptions.
Table 27 depicts PCI Express Receiver Flow Control State Descriptions
Table 28 depicts i-PCI TCP Transmitter Flow Control State Descriptions
Table 29 depicts i-PCI TCP Receiver Flow Control State Descriptions
Table 30 depicts i(e)-PCI Transmitter Flow Control State Descriptions
Table 31 depicts i(e)-PCI Receiver Flow Control State Descriptions
Table 32 depicts i(dc)-PCI Transmitter Flow Control State Descriptions
Table 33 depicts i(dc)-PCI Receiver Flow Control State Descriptions
Table 34 depicts PCI and PCI Express Data Transfer Rates.
Table 35 depicts i-PCI Data Transfer Rates
Table 36 depicts PCI and PCI Express Overhead
Table 37 depicts i-PCI Overhead
Table 38 depicts Typical PCI and PCI Express Latency
Table 39 depicts i-PCI Latency
Table 40 depicts mmWave Bands
Table 41 depicts UWB Bands
Table 42 depicts i-PCI (WPAN) Tradeoffs
Table 43 depicts mmWave Channel Plan
Table 44 depicts OFDM Sub-mode (>2 Gbps) Comparison
Table 45 depicts SC Sub-mode (>2 Gbps) Comparison
Table 46 depicts AV Sub-mode (>2 Gbps)

DETAILED DESCRIPTION OF THE PRESENT INVENTION

This section of the specification summarizes the goals and intent of i-PCI, provides some perspective on i-PCI as a virtualization solution and presents the value proposition for i-PCI.

Goals of i-PCI

The major goals of i-PCI are:
Enable networked high-performance memory-mapped computer I/O expansion.
Leverage intranets and the Internet as a network transports.
Host operating system transparency.
Application software transparency
I/O driver transparency.
PCI System transparency.
User configurable topology and performance tradeoff options.
Data throughput performance that approaches that of 4-lane 2.5 Gbps PCIExpress.

Feature List
Encapsulation of the PCI Express Protocol for transport over an Internet via TCP/IP.
Encapsulation of the PCI Express Protocol for transport over a local intranet via Ethernet (IEEE 802.3):

High End Direct Connection to an I/O chassis via 10 Gbps Ethernet (IEEE 802.3an) for mapping to 4-lane 2.5 Gbps PCI Express or 2-Lane 5 Gbps PCI Express.

Connection to a network of I/O chassis via 10 Gbps Ethernet and Ethernet switches.

Direction Connection to an an I/O chassis via 10 Gbps Ethernet

Low End Direct Connection to an I/O chassis:
☐ Triple link aggregation 1 Gbps Ethernet (802.3ab) for mapping to 1-Lane 2.5 Gbps PCI Express.
☐ Single link 1 Gbps Ethernet for mapping 1-Lane 2.5 Gbps PCI Express to a conventional 32-bit/33 MHz PCI bus.

Validation with Microsoft Windows Host operating system.

Architecture designed to be operating system agnostic.

Application Software transparency. Applications running on the host system are essentially unaffected by the fact that the I/O is not located at the host.

Most applications will not need to be modified to accommodate i-PCI.

I/O Driver transparency. Off-the-Shelf drivers implemented on the host system are unaware that the I/O is not located locally.

Special drivers are not required for most I/O cards. Drivers that ship with most PCI or PCI Express based I/O cards will work in a system that implements i-PCI.

PCI System transparency. The host system is unaware that the I/O is not located locally.

PCI System enumeration fully supported.

Plug-and-Play features of MS Windows OS fully supported.

User Configurable Protocol:

Extensive configuration options to tradeoff performance for features.

Deterministic behavior options to optimize predictability.

Latency tradeoff options allow user to minimize latency in time-sensitive applications.

User Configurable Topology:

Multiple IEE 802.3 interconnect options for a given application.

256 busses/links (maximum) are possible, enabling a very large distributed computer system.
☐ PCI and PCI-X links allow up to 32 devices per bus/link, enabling a large number of add-in cards at each remote I/O location.

Each device can have 8 internal functions.
☐ PCI Express links are point-to-point so allow one endpoint device per link.

Each endpoint device can have 8 internal functions

User-Enabled Two-Level System Optimization Algorithms

System analysis algorithm executes as part of resource discovery and enumeration.

HBA i-PCI data transfer learning algorithm adjusts data transfers based on past performance data.

I-PCI, PCI Express, And PCI System Architecture Compliance i-PCI is designed to appear to the host system as PCI compliant. However, i-PCI is not designed to be compliant with the PCI-SIG PCI or PCI Express Specification. This is an important concept. The stated goals of application software, operating system, and I/O driver transparency does not mean that the quality of service (QOS) is expected to be or has to be identical to the default native PCI bus or PCI Express implementation. This is the case with iSCSI storage QOS when comparing to Parallel SCSI QOS. Thus expectations for i-PCI should be similar. In the majority of applications, it is expected there will be some notable QOS difference when comparing the i-PCI implementation to the default native PCI bus or PCI Express implementation.

There is some precedence for extending the PCI architecture where the extension is not fully compliant with the PCI specification. So, i-PCI would not be the first in this respect. CardBus is prominent example where the extension standard is based on PCI and appears to the host system as part of the PCI resources, yet differences in performance and functionality exist.

When trying to understand the positioning of i-PCI within the PCI System architecture, it is useful to keep in mind, as a frame of reference, the relationships between SCSI and iSCI and PCI Bus and Card Bus.

I-PCI in Perspective to other Virtualization Solutions

In order to understand the value proposition for i-PCI, it is helpful to do a quick review of virtualization and the existing virtualization solutions.

In the computing realm, virtualization refers to techniques for concealing the physical characteristics, location, and distribution of computing resources from the computer systems and applications that have access to them.

There are two main categories of virtualization:
1. Computing Machine Virtualization
2. Resource Virtualization Computing machine virtualization involves definition and virtualization of multiple operating system (OS) instances and application stacks into partitions within a host system. A thin layer of system software, referred to as the Virtual Machine Monitor (VMM) executes at the hardware level. The OS instances and stacks run on top of the VMM. Computer hardware resources are virtualized by the VMM and assigned to the partitions. See FIG. 1, The Computing Machine Virtualization Concept.

Virtualization is particularly well suited for blade server installations where the architecture is optimized for high density computer resources and pooled storage. The virtualization of an application and operating system along with the allocated CPU cycles, memory, and network bandwidth allows for unprecedented mobility, flexibility, and adaptability of computing tasks. With platform virtualization:

Multiple virtual machines may be created and operating resident on a single host (blade).

Virtual machines can be optimally allocated to multiple hosts and then dynamically moved Computing machine virtualization software for the blade environment is available from VMware®. Virtual PC is Microsoft's offering for x86 PC applications.

Intel has recently developed hardware support for computing machine virtualization at the processor level. It is referred to as "Intel Vanderpool technology" or "Intel Virtualization Technology". It involves an architectural extension to Intel's Xeon® and Itanium® processors that reduces the complexity of the VMM, reduces the potential for software conflicts, and improves the reliability of virtualization. The extension provides a new high-privilege level "ring" for the VMM to run in that allows special access to hardware resources to better enable virtualization. The extension also implements features to allow hardware-based handoffs between the VMM and each OS instance. Hardware-based memory protection resulting in better process integrity is the third major enhancement.

Resource virtualization refers to the abstraction of computer peripheral functions. There are two main types of Resource virtualization:

1. Storage Virtualization
2. Memory-Mapped I/O Virtualization

Of the two categories of virtualization, storage virtualization is currently the most prevalent. Storage virtualization involves the abstraction and aggregation of multiple physical storage components into logical storage pools that can then be allocated as needed to computing machines. Storage virtualization falls into two categories 1. File-level Virtualization
2. Block-level Virtualization In file-level virtualization, high-level file-based access is implemented. Network-attached Storage (NAS) using file-based protocols such as SMB and NFS is the prominent example.

In block-level virtualization, low-level data block access is implemented. In block-level virtualization, the storage devices appear to the computing machine as if it were locally attached. Storage Attached Network (SAN) is an example of this technical approach. SAN solutions that use block-based protocols include:

Fiber Channel Protocol (FCP) or "SCSI over Fiber Channel".
ATA-over-Ethernet (AoE).
HyperSCSI (SCSI over Ethernet)
iSCSI (SCSI over TCP/IP).

In contrast to relatively mature storage virtualization, I/O virtualization is an emerging area in the field of virtualization. PCI Express I/O virtualization is currently under development by the PCI-SIG. The scope of the effort is to enable local I/O resource (i.e. PCI Express Endpoints) sharing among virtual machine instances on the same host.

Figure 2A:
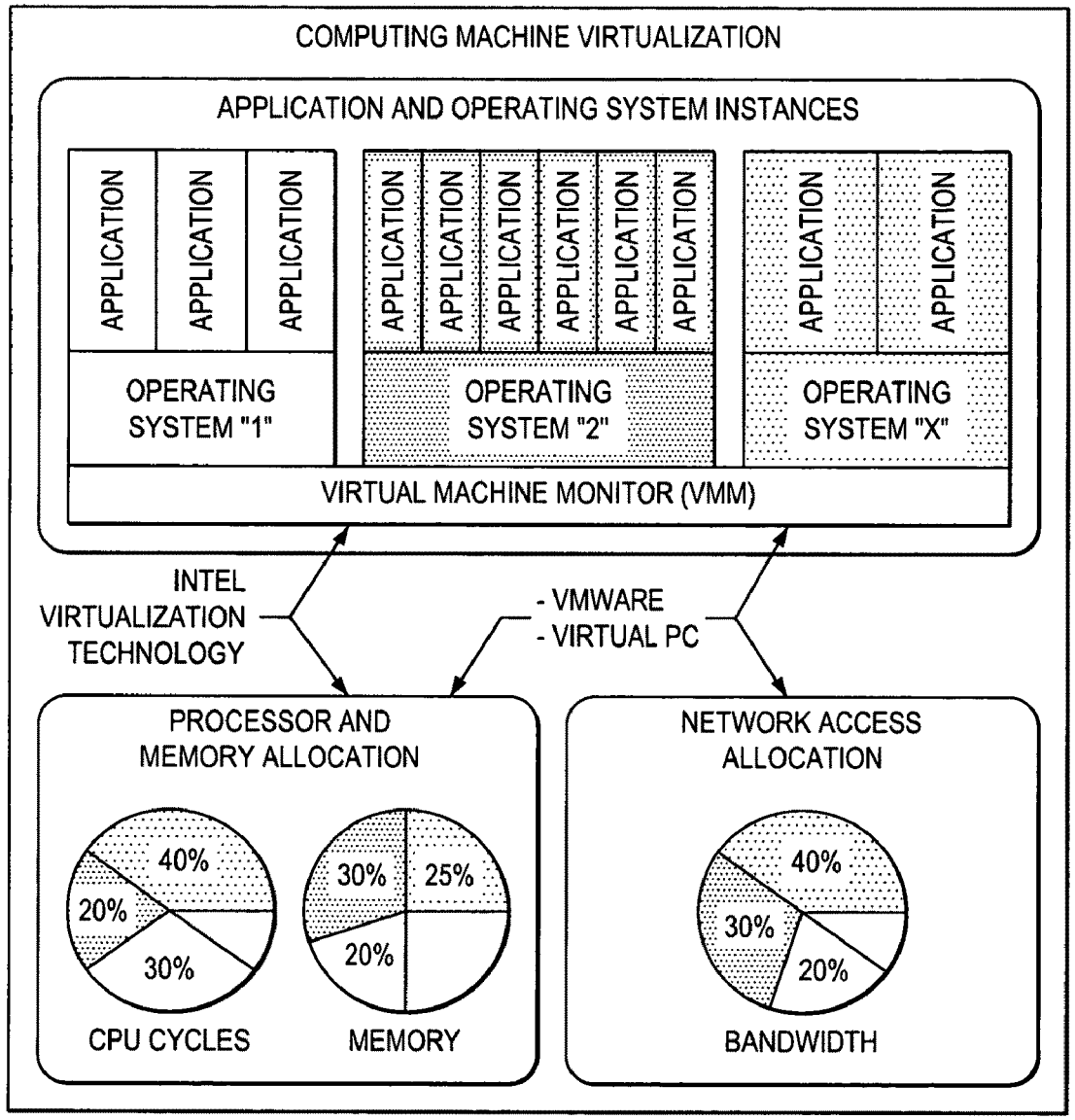
FIG. 2 depicts Virtualization Solutions.
Figure 2B:
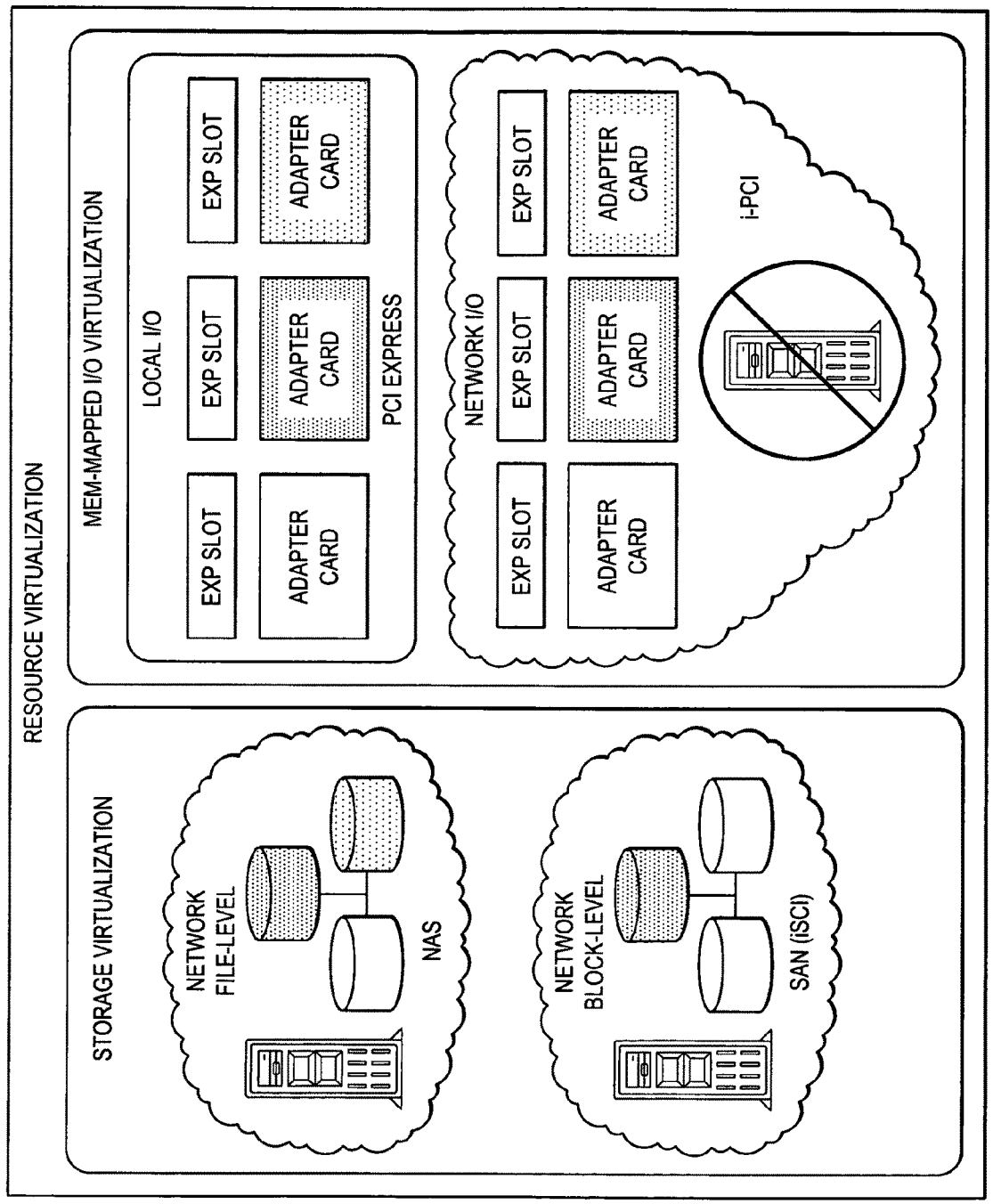

With this virtualization background in mind, the value proposition for i-PCI becomes clear. i-PCI is positioned in the resource virtualization category as a memory-mapped I/O virtualization solution. Whereas PCI Express I/O virtualization is focused on local virtualization of the I/O, i-PCI is focused on networked virtualization of I/O. Whereas i-SCSI is focused on networked block level storage virtualization, i-PCI is focused on networked memory-mapped I/O virtualization. Whereas VMware and MS Virtual PC are focused on computing machine virtualization, i-PCI is focused on resource virtualization. Thus i-PCI fits into the virtualization as complimentary technology to existing solutions. FIG. 2, Virtualization Solutions, shows how i-PCI fits into the virtualization landscape.

i-PCI can be thought of as a universal resource virtualization solution for local I/O technologies. If an adapter is designed for the PCI System, i-PCI can serve as the virtualization protocol for that adapter function. It is within the scope of i-PCI to serve as the virtualization foundation for everything from consumer-oriented I/O protocols such as USB and Firewire to niche protocols, embedded functions, and industrial PCI implementations such as cPCI and PCIMG 1.3. Thus with i-PCI, it becomes possible for computing machine to be reconfigured and assigned memory-mapped I/O for what ever I/O resources are available via networked virtualized expansion. New functions are typically introduced on adapter cards before they are migrated onto the motherboard. Any new PCI system adapter function that comes out can potentially be set up as a virtualized resource under i-PCI right when it is introduced. No new software development would be required and no new virtualization protocol would have to be developed.

Note that simultaneous sharing of I/O functions by multiple hosts or computing machines are not presently within the scope of i-PCI. See the Future Development section.

I-PCI as an I/O Solution for Blades

Figure 3A:
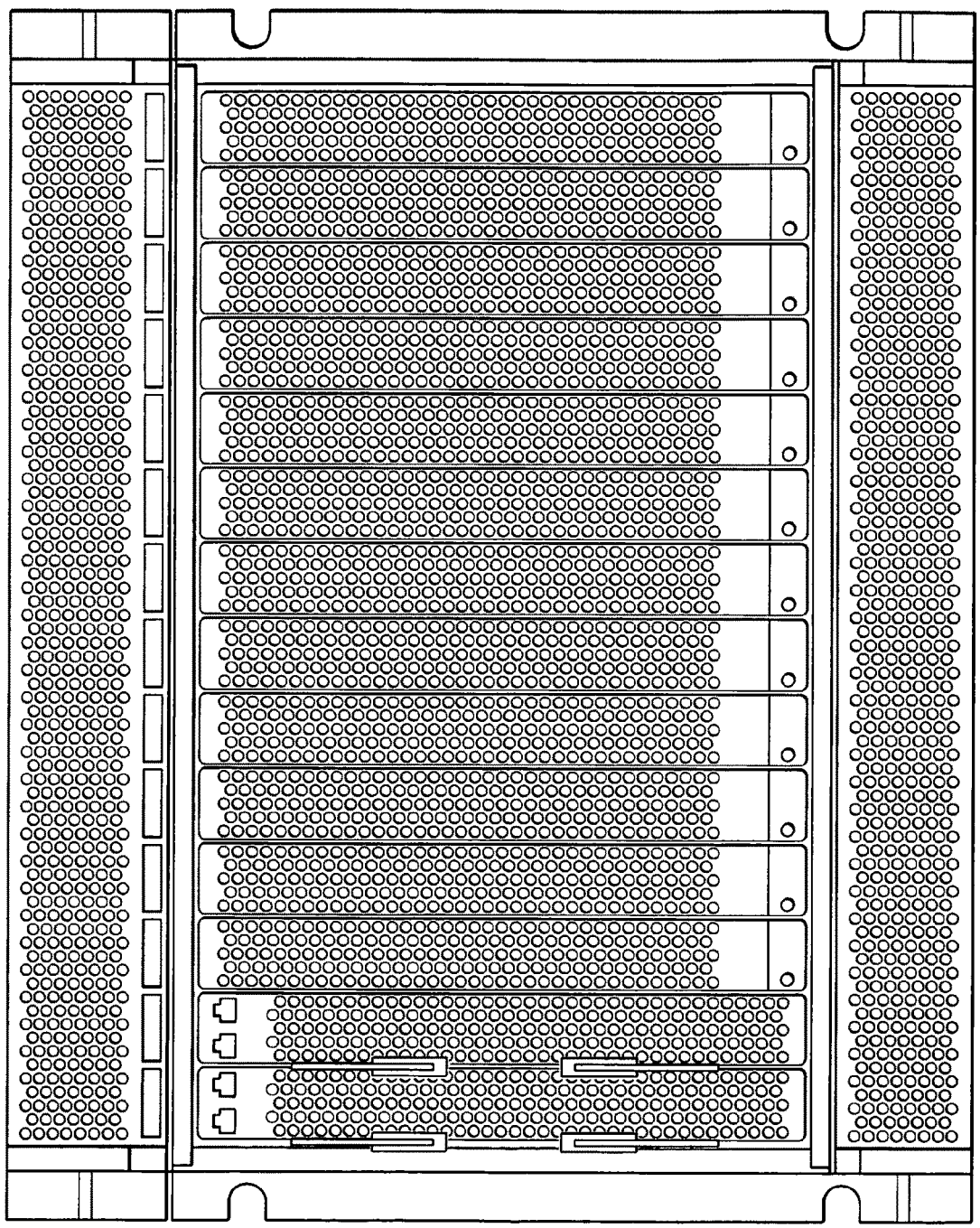
FIG. 3 depicts IBM Blade Center (Model H—Front and Rear View)
Figure 3B:
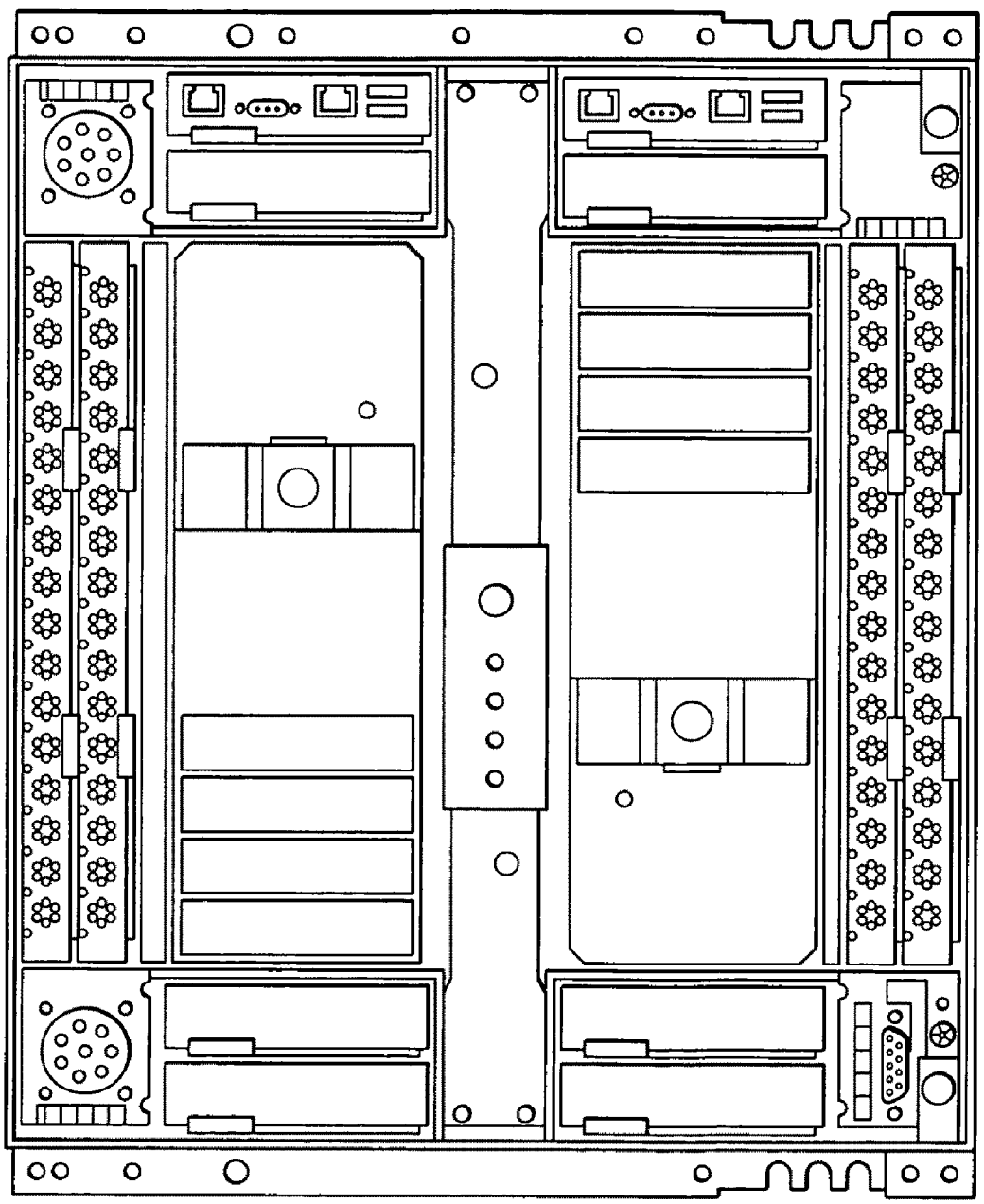
Figure 3C:
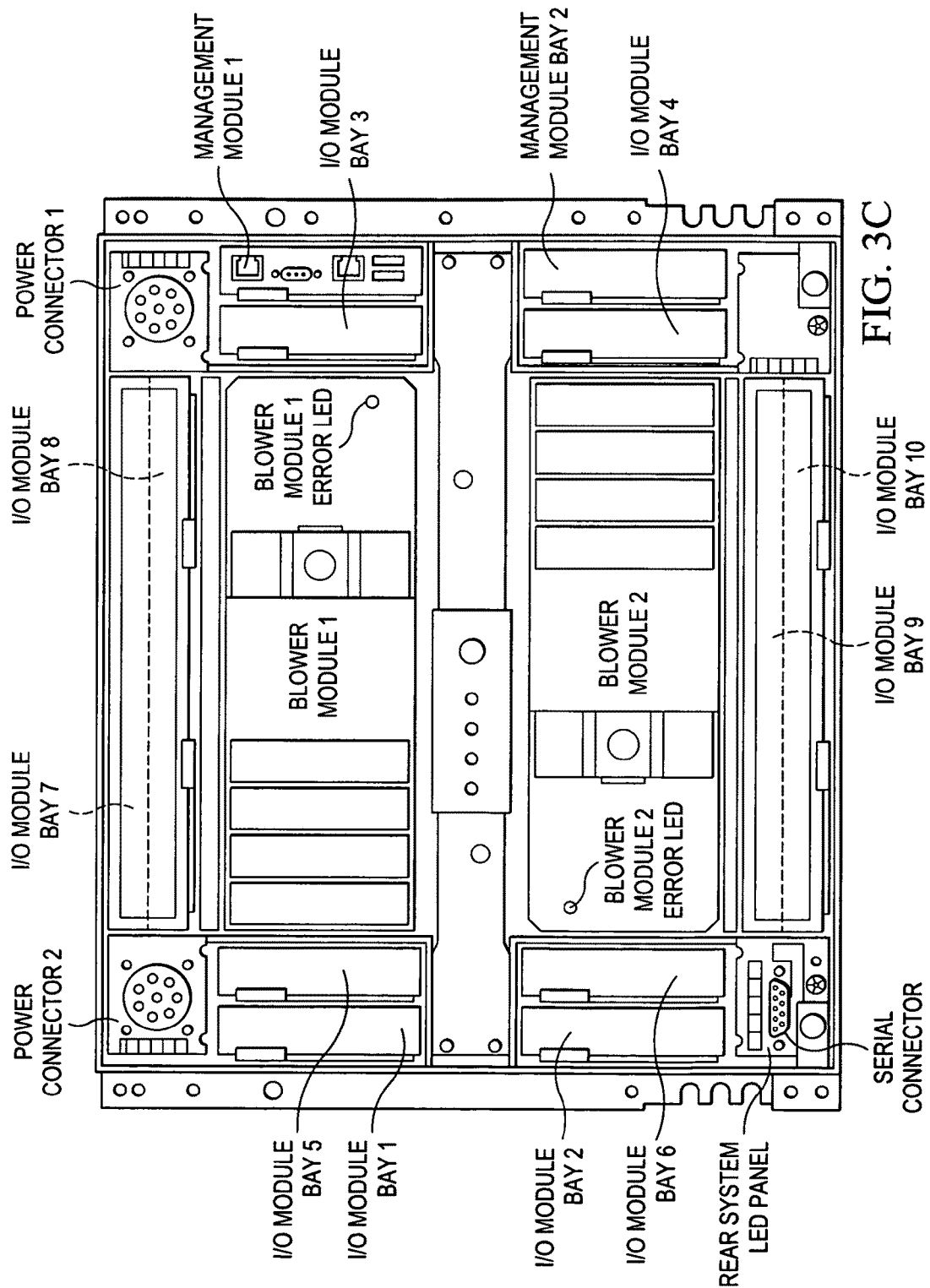

The architecture of blade servers, naturally lends itself to virtualization solutions, so is of interest for i-PCI. FIG. 3, shows an IBM Blade Center Model H standard chassis with multiple blades installed. Each blade is plugged into a backplane that routes 1 Gbps Ethernet across a standard fabric and optionally Fiber Channel and Infiniband across a high-speed fabric. A primary advantage with blades over traditional rack mount servers is they allow very high-density installations. They are also optimized for networking and SAN interfacing. However, there is a drawback with the blade architecture. Even though the blades themselves are PCI-based architectures, the chassis do not support PCI-X or PCI Express adapter cards. The chassis back plane does not route PCI or PCI Express to the I/O module bays. The only way to add standard PCI-X adapter card functions is via an expansion unit that takes up a precious blade slot. It only adds two slots and there is no provision for standard PCI Express adapters. It would be convenient for the user to have the option of using PCI Express or PCI-X adapter card functions as resources that could be memory-mapped via i-PCI to selected blade servers installed in the blade center.

Figure 4A:
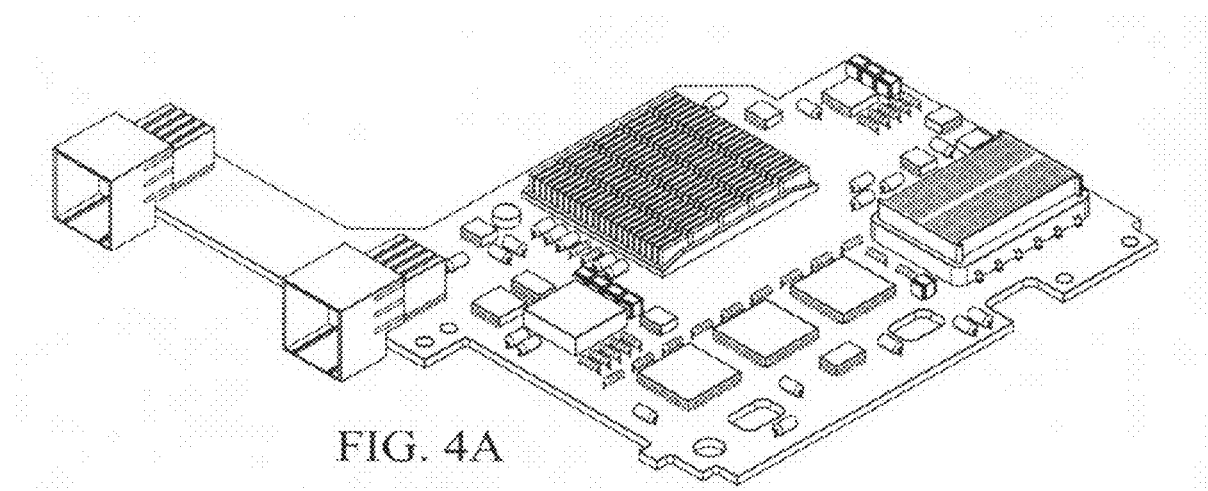
FIG. 4 depicts NetXen 10 Gb Ethernet Card (left) and Nortel 10 Gb Ethernet Switch Module (right)
Figure 4B:
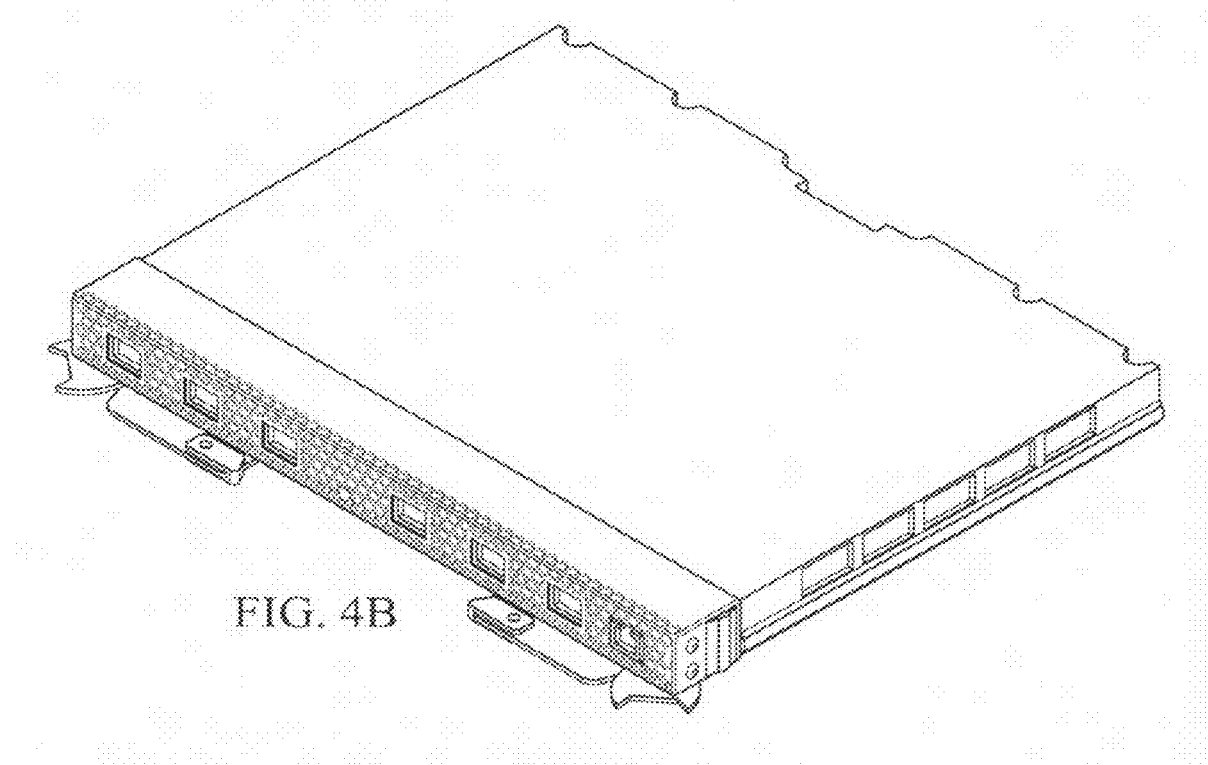

In the first quarter of 2007 a 10 Gbps Ethernet capability across the back plane high-speed fabric was introduced along with a 10 Gbps expansion card and switch module. See FIG. 4, NetXen 10 Gb Ethernet Card and Nortel 10 Gb Ethernet Switch Module. This 10 Gbps capability opens the door for i-PCI virtualization solutions in blade servers. i-PCI would allow blades access to standard PCI Express adapter functions via memory mapped I/O virtualization. The adapter functions could include PCI Express fiber channel SAN cards that were intended for use with traditional servers. For the first time, it would make convenient to blades, any of the many functions that are available in the standard PCI-X or PCI Express adapter card form. Even specialized functions such as those implemented in industrial PCI form factors become part of a solution set. This opens the possibility of utilizing the blade architecture for applications other than enterprise data centers.

There is potential in the blade architecture for the synergistic introduction of CSMA/TS as an enabling technology. A 10 Gbps CSMA/TS switch could be designed as an I/O switching module for the Blade Center, offering a performance advantage over conventional switching.

Implementation Options

There are two basic implementation options within the scope of the i-PCI Specification: 1) i-PCI HBA PCI Spoof 2). i-PCI Virtual PCI Spoof. There are some major differences in the implementations.

The i-PCI HBA PCI Spoof approach offloads the processing to a host bus adapter (HBA) designed to appear as an extension of the PCI System. The majority of the protocol processing is offloaded by the i-PCI Protocol Controller implemented in an FPGA onboard the HBA. This implementation is the focus of the initial specification.

The i-PCI Virtual PCI Spoof is a CPU-intensive virtual extension of the PCI System and topology. The CPU, utilizing the system memory, handles the majority of the processing load. This approach is targeted for use in closed or restricted systems where it is difficult or impossible to access the PCI Express bus or where there is a desire to minimize the cost of implementation. Virtual PCI is viewed as a follow-on effort once the HBA Spoof is validated. It is mentioned here so there is awareness from the start that this option is planned for. See the section on Future Capability.

I-PCI HBA PCI Spoof Implementation

The architecture of this implementation is described in the following sections.

HBA I-PCI Spoof Architecture Overview

Figure 5:
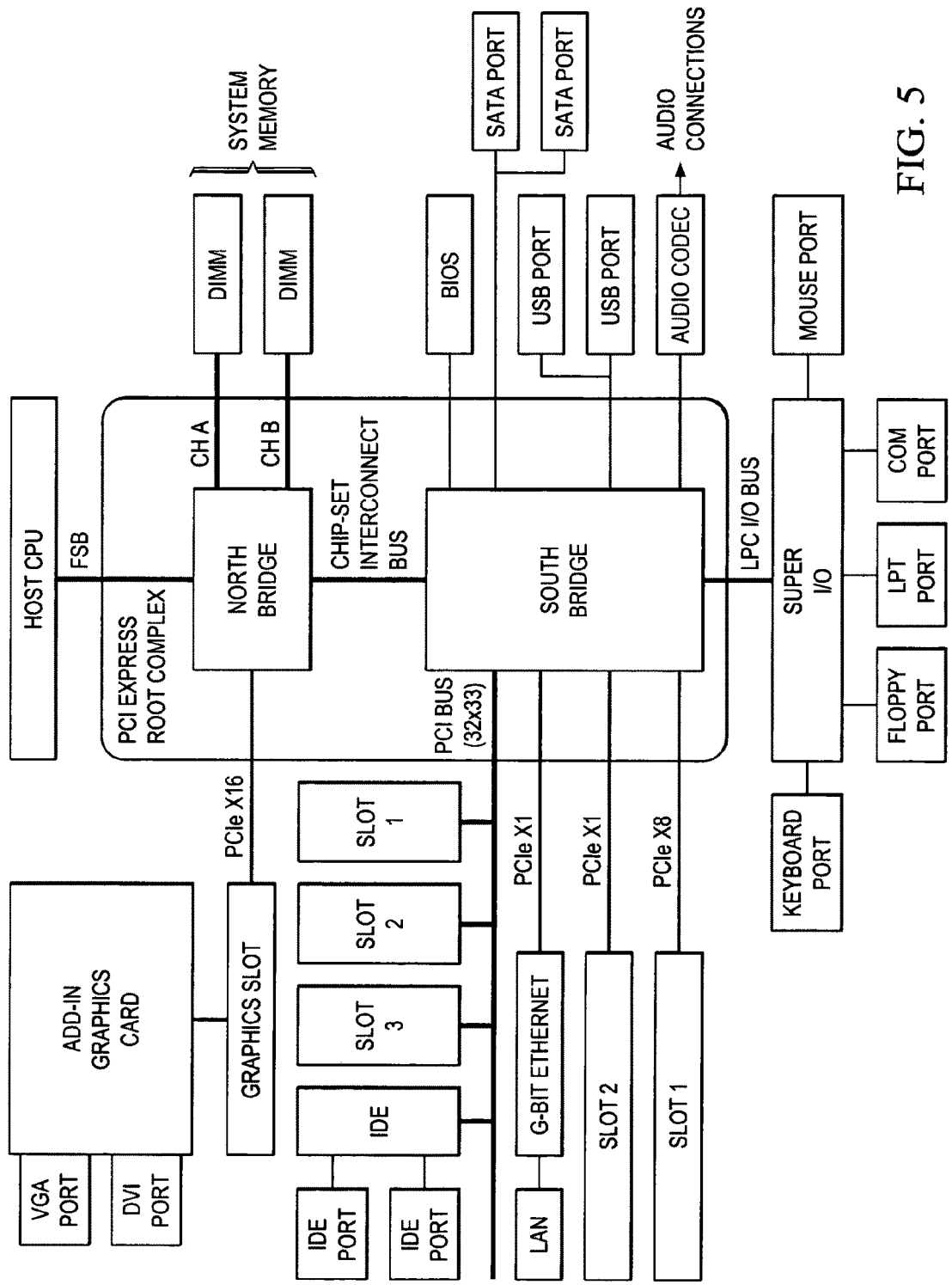
FIG. 5 depicts A Typical PCI Express-based Host System.
Figure 6:
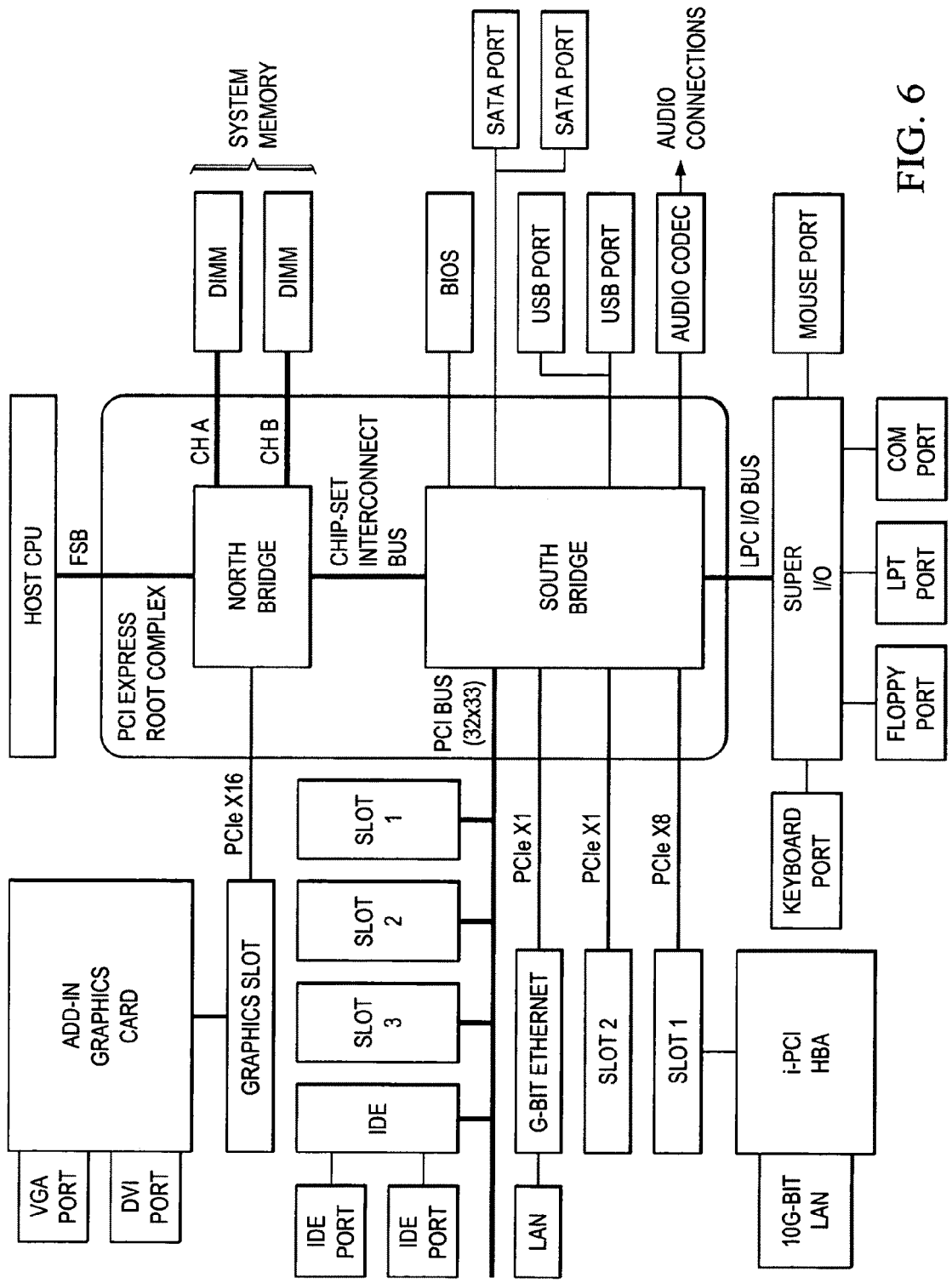
FIG. 6 depicts A Typical PCI Express-based Host System with i-PCI HBA.

FIG. 5, A Typical PCI Express-based Host System, shows the architecture of a typical system capable of implementing i-PCI. FIG. 6, A Typical PCI Express-based Host System with i-PCI HBA, shows the same system with the HBA add-in card.

Implementation Options

Figure 7:
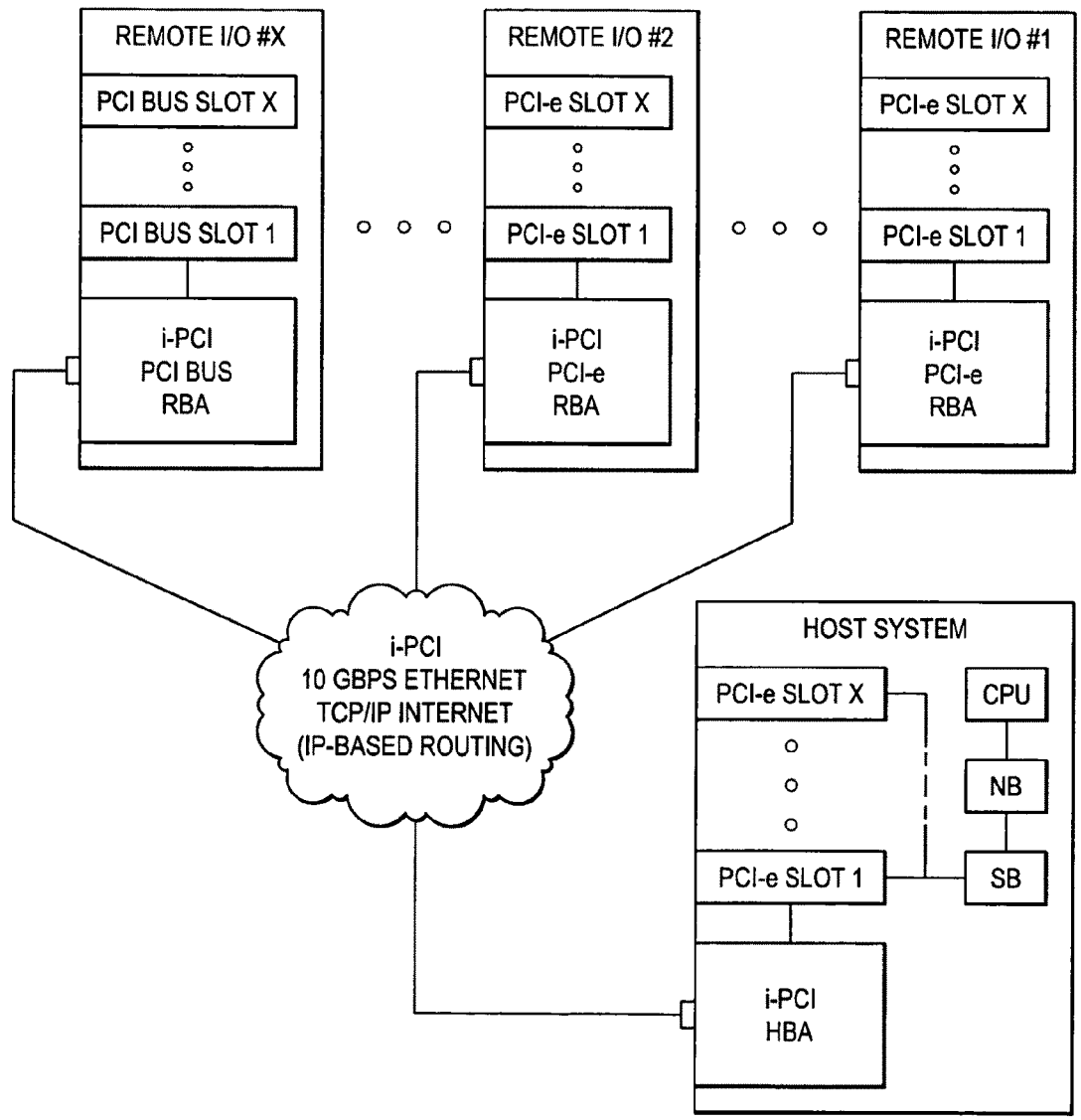
FIG. 7 depicts i-PCI IP-based Network Implementation Block Diagram.

There are three basic implementations of i-PCI Host Bus Adapter Spoof:

1. i-PCI: This is the TCP/IP implementation, utilizing IP addressing and routers. This implementation is the least efficient and results in the lowest data throughput of the three options, but it maximizes flexibility in quantity and distribution of the I/O units. Refer to FIG. 7, i-PCI IP-based Network Implementation Block Diagram.

i-PCI is defined with TCP as the Transport-level protocol for IP. There may be some question as to why choose TCP as the transport protocol instead of UDP. In addressing this question, it is useful to first take a look at the host PCI system that i-PCI serves to extend. In particular it is useful to look at some key characteristics of PCI Express:

PCI Express is a point-to-point I/O interconnect that includes definition of a physical layer, data link layer and transaction layer. The point-to-point connections are strung together and switched to provide and end-to-end route. Data integrity is ensured link by link.

The data link layer is responsible for transport between end points of a link. The data link layer ensures that the transaction layer packets (TLPs) are delivered from the transaction layer of one end point to the transaction layer of the other end point. It ensures there are no missing or out of sequence TLPs. Thus error-free, in-sequence TLPs is a requirement of PCI Express for each link.

In effect, i-PCI defines a virtual point-to-point connection across the Internet that appears to the host as just another link in the PCI Express architecture hierarchy. i-PCI must deliver the TLPs error-free and in sequence to the transaction layer of each end point, just as is required of a normal PCI Express link. This expectation suggests the need for a reliable delivery transport. The reliable delivery transport for the Internet Protocol Suite is the Transmission Control Protocol (TCP). TCP provides:

Error-free data transfer
In-sequence data
Retransmission of lost packets/detection and discard of duplicate data.
Network congestion management.

UDP in contrast to TCP is not a reliable delivery transport. Although UDP is relatively fast, efficient, and real-time oriented, it is not capable of providing error-free in-sequence TLPs across the virtual link. UDP also has no network congestion management capability. UDP is suitable for applications that are tolerant of data loss, data errors, and duplication of data such as voice-over-IP, gaming, and web-casts. PCI system extension clearly does not fit in this category.

Therefore, after evaluation of the i-PCI data requirements and reviewing the two primary IP transport protocols, TCP was selected to be the IP network transport for i-PCI.

Although TCP is the transport protocol selected for i-PCI, provision is made within the protocol for UDP as an option. See Table 3, Header Option field. If UDP is used, an application would need to be developed that would run above UDP resident on the HBA and RBA. Such an application would be capable of delivering the TLPs error-free and in sequence to the transaction layer of each end point.

Figure 8:
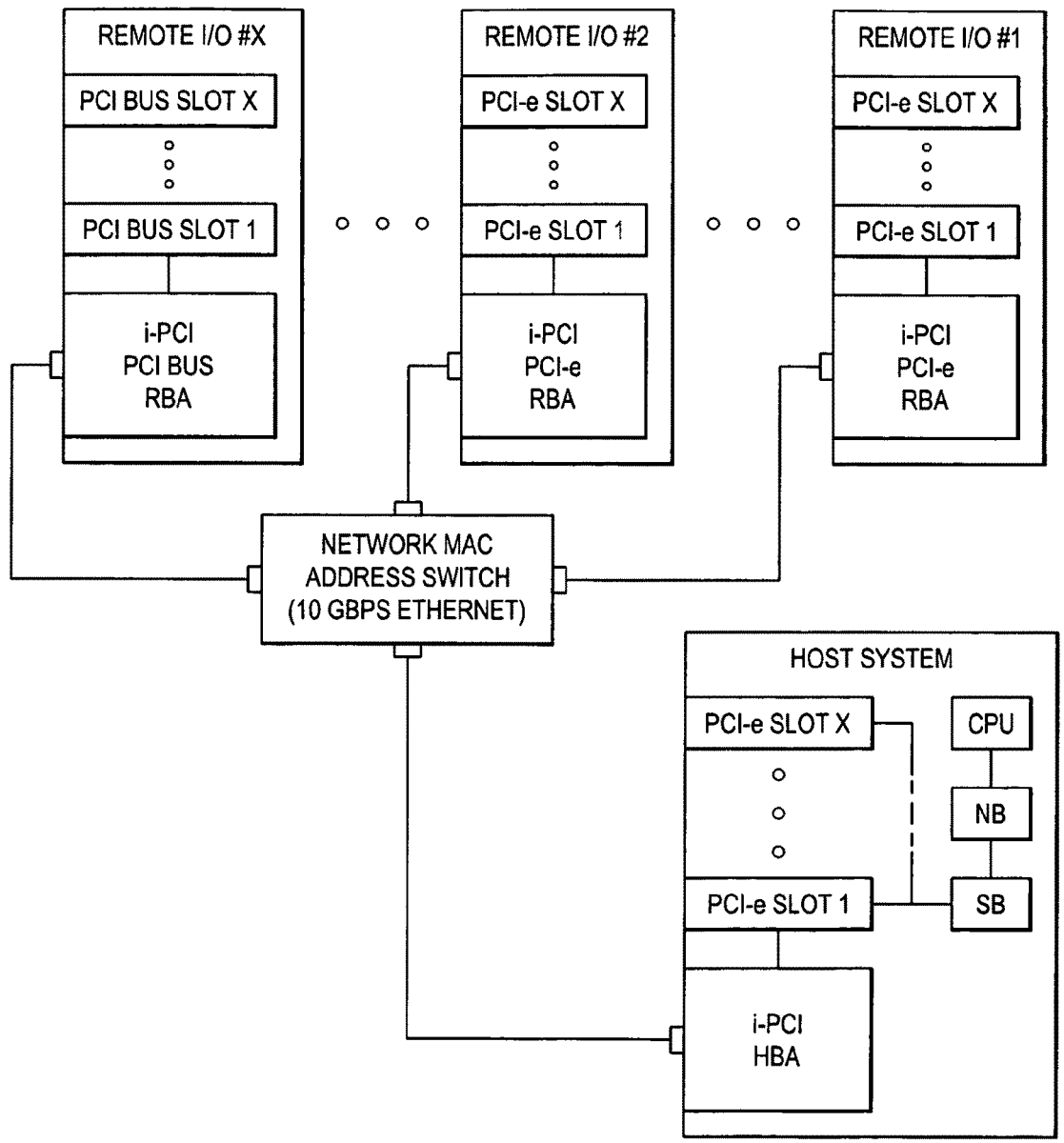
FIG. 8 depicts i(e)-PCI MAC-Address Switched LAN Implementation Block Diagram.

2. i(e)-PCI This is the LAN implementation, utilizing MAC addresses and Ethernet switches. This implementation is more efficient than the i-PCI TCP/IP implementation, but is less efficient than i(p)-PCI. It allows for a large number of locally connected I/O units. Refer to FIG. 8, i(e)-PCI MAC-Address Switched LAN Implementation Block Diagram.

The TCP/IP offload engine and associated TCP software stack is not required for the i(dc)-PCI implementation.

3. i(dc)-PCI. This is a direct physical connect (802.3an) implementation, utilizing Ethernet CAT-x cables. This implementation is the most efficient and highest data throughput option, but it is limited to a single remote I/O unit. It allows much longer separation than is possible with other direct connect solutions such as cabled PCI Express (typically a 5 m cable). The cable reach is dependent on the quality of the cable as follows:

100 m for Category 6A and Category 7.

55 m for Category 6

45 m for Category 5e

There are two variations of this implementation. They are designated the "Low End" LE(dc) or low performance variations, typically suitable for embedded or cost sensitive installations:

1. The first low end variation is LE(dc) Triple link Aggregation 1 Gbps Ethernet (802.3ab) for mapping to 1-Lane 2.5 Gbps PCI Express at the remote I/O. The i-PCI architecture allows for multiple HBAs/RBAs and/or HBA's/RBAs implementing multiple links. These solutions result in data paths that are paralleled across connecting links. The 3 links provides 3×1 Gbps=3 Gbps which is a decent match to 1-Lane 2.5 Gbps PCI Express.

Figure 9:
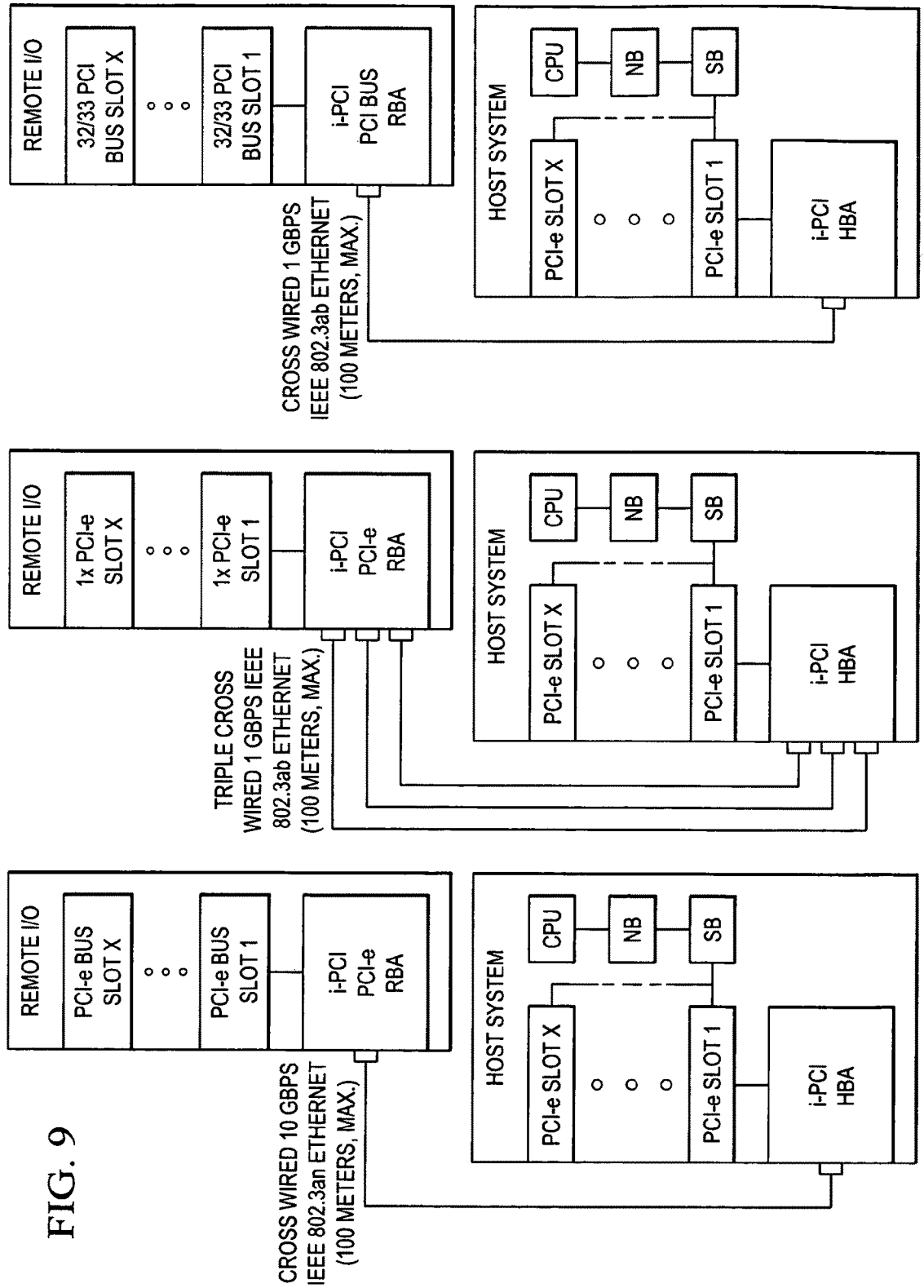
FIG. 9 depicts i(dc)-PCI Direct Connected Implementation Block Diagram.

2. A second variation is LE(dc) Single link 1 Gbps Ethernet for mapping 1-Lane 2.5 Gbps PCI Express on a host to a legacy 32-bit/33 MHz PCI bus-based remote I/O. The 1 Gbps link matches decently to the BW of the 32×33=1056 bps legacy PCI. Refer to FIG. 9, i(dc)-PCI Direct Connected Implementation Block Diagram for illustrations of all 3 I(dc)-PCI implementation variations. Other optimal localized direct connectivity solutions exist in the marketplace (i.e. cabled PCI Express), so i(dc)-PCI and the two variations discussed here are not considered as compelling as the other implementations. But they are capable of longer distance (100 m vs, 5 m for PCIe) and useful to fill out a complete i-PCI solution suite.

The TCP/IP offload engine and associated TCP software stack is not required for the i(dc)-PCI implementation.

Host Bus Adapter

Figure 10:
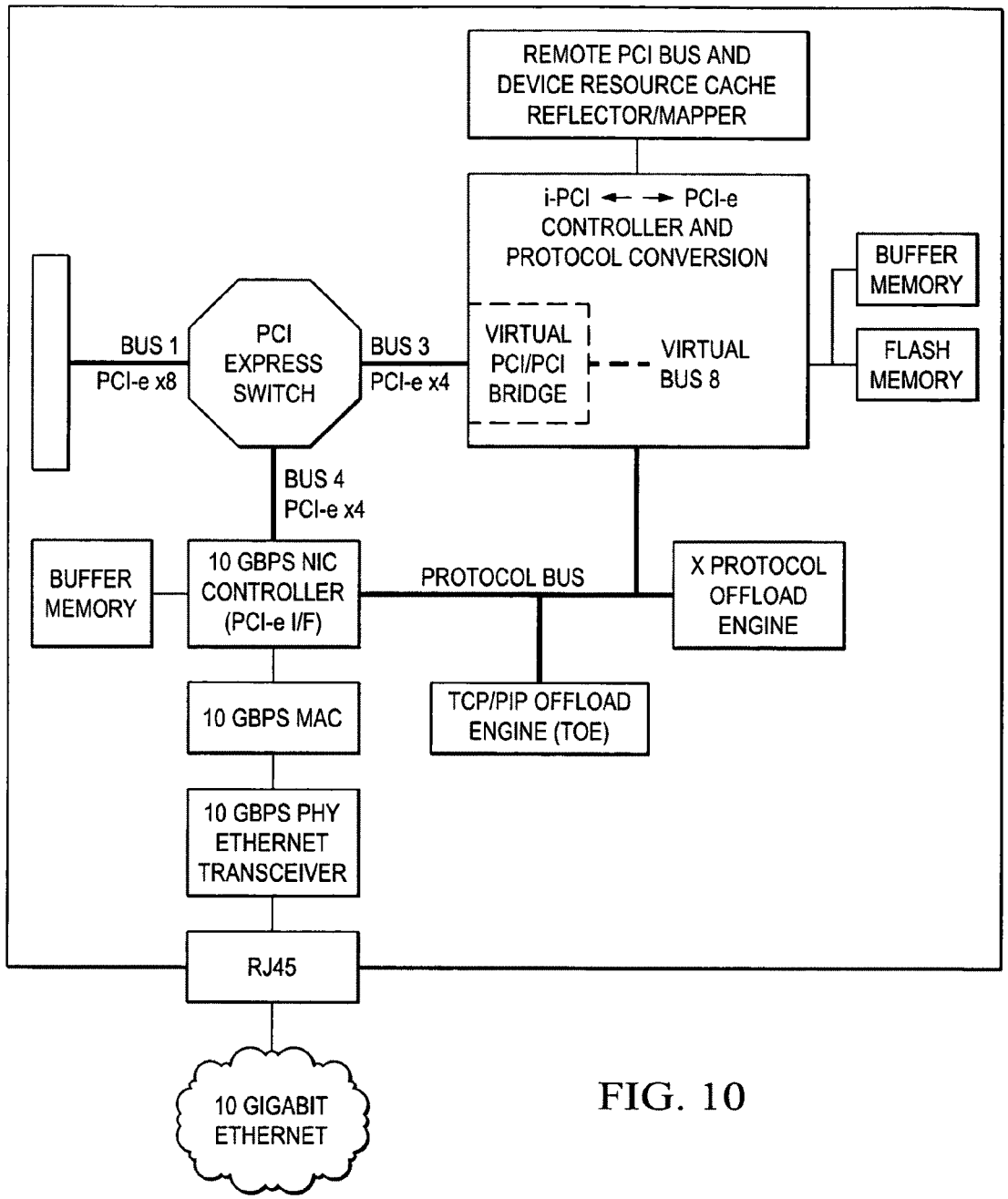
FIG. 10 depicts HBA CCA Block Diagram.

The Host Bus Adapter (HBA) circuit card assembly (CCA) contains the i-PCI/PCIe Controller and Protocol converter, memory for implementing a mirror and cache to reflect the remote I/O resources, as well as buffers, a 10 Gbps NIC Controller, MAC, PHY, and TCP/IP Offload engine. Refer to FIG. 10, HBA CCA Block Diagram.

Remote Bus Adapter

Figure 11:
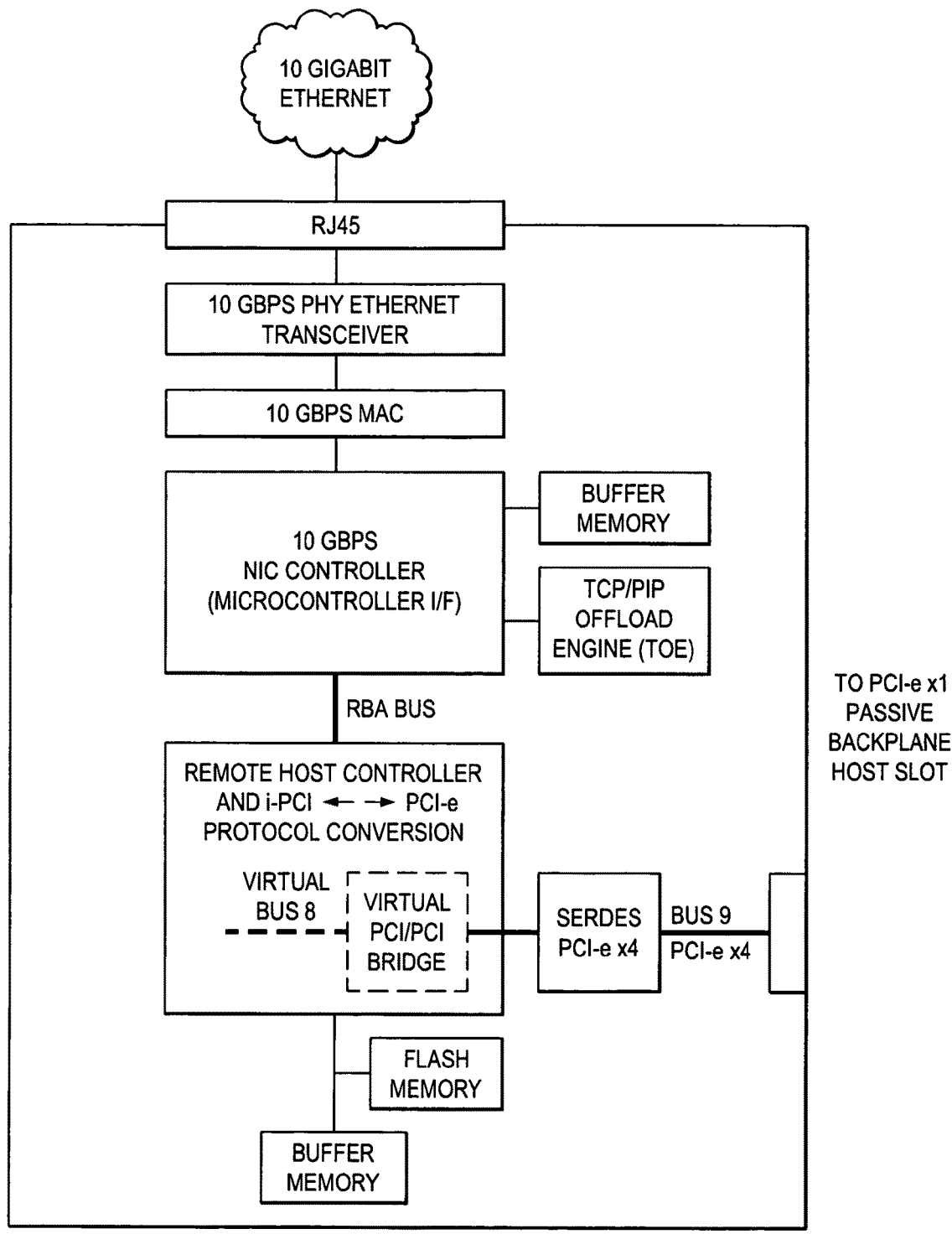
FIG. 11 depicts PCIe RBA CCA Block Diagram.
Figure 12:
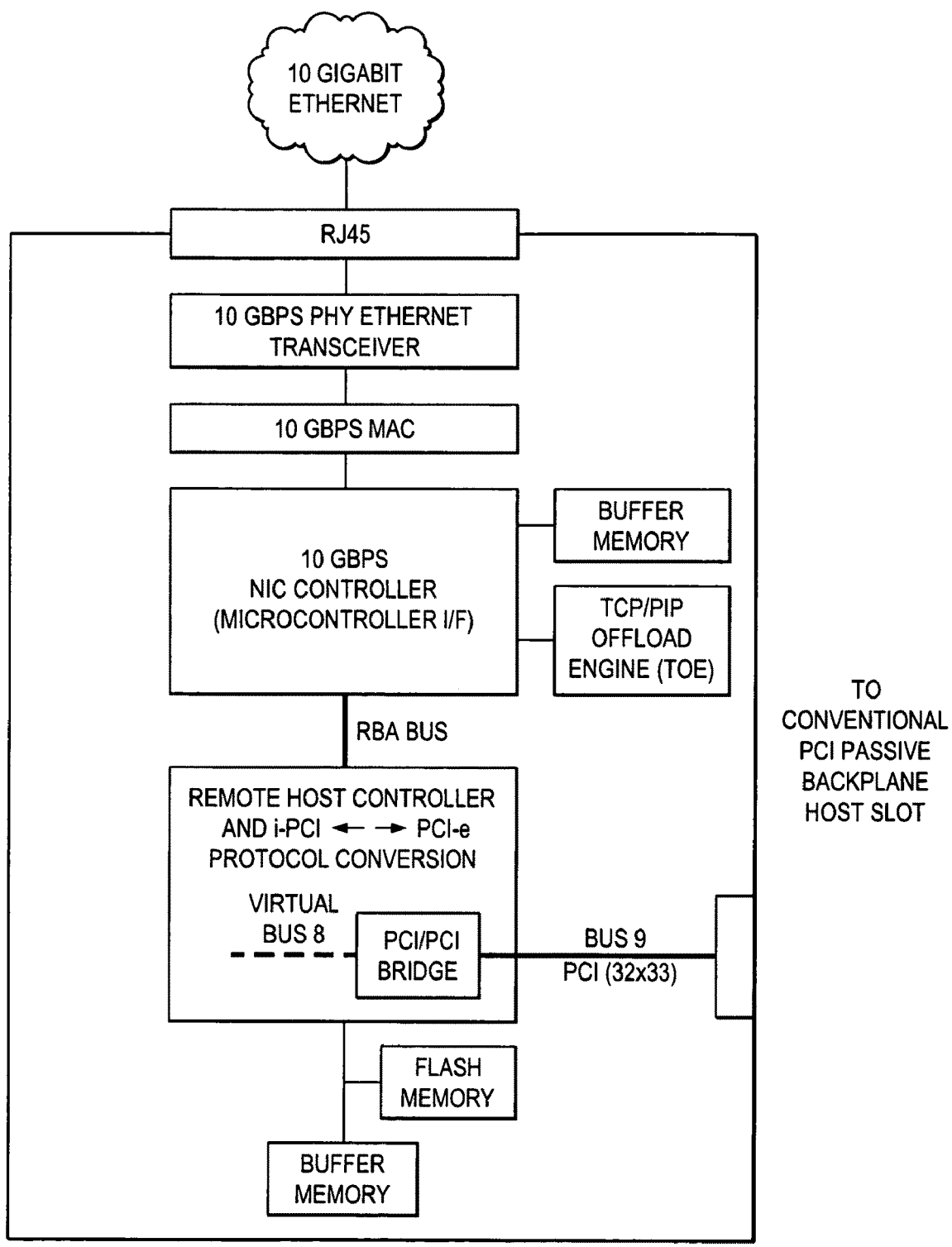
FIG. 12 depicts Conventional PCI RBA CCA Block Diagram.

The Remote Bus Adapter (RBA) circuit card assembly contains the i-PCI/PCIe Controller and Protocol converter, memory for implementing buffering, as well as a 10 Gbps NIC Controller, MAC, PHY, and TCP/IP Offload engine. There are two versions: 1) PCIe based and 2) Conventional PCI. Refer to FIG. 11, PCIe RBA CCA Block Diagram and FIG. 12, Conventional PCI RBA CCA Block Diagram.

Data Flow
Overview of Encapsulation Approach

Data flow for i-PCI involves the encapsulation of PCI Express Transaction Layer packets. The encapsulation is different depending on which of the three implementations is in use.

Figure 13:
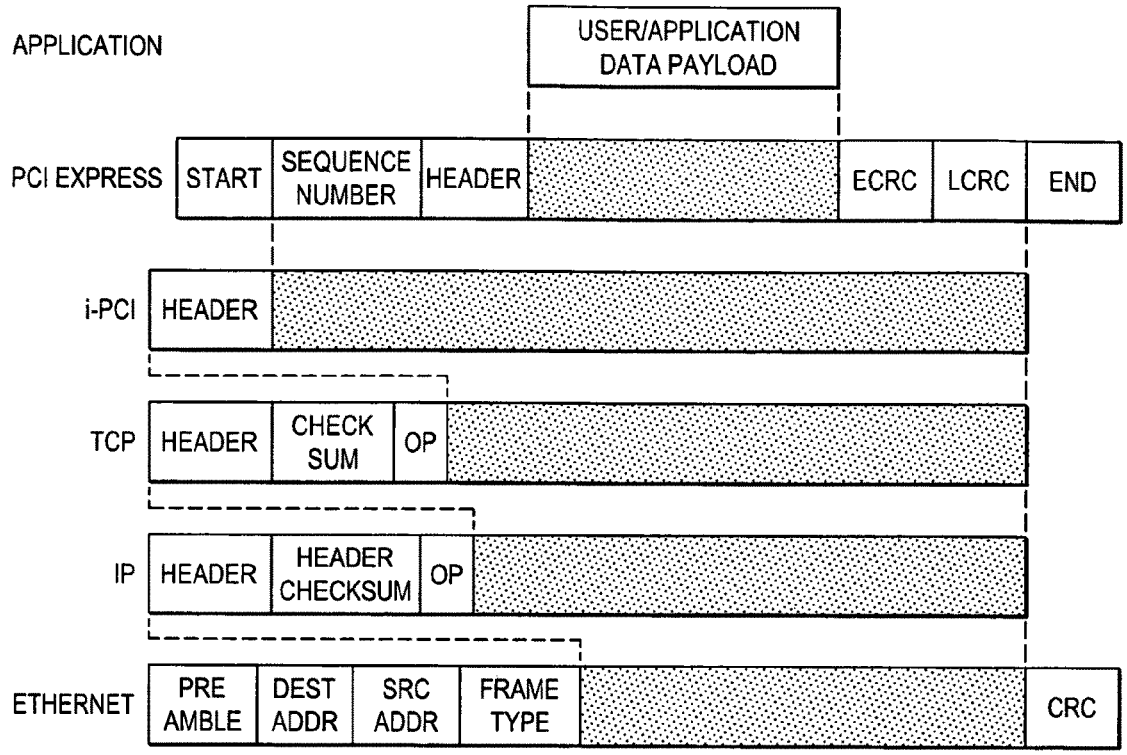
FIG. 13 depicts i-PCI Packet Mapping.

If i-PCI is implemented, the end encapsulation is within i-PCI, TCP, IP, and Ethernet headers. Refer to FIG. 13, i-PCI Packet Mapping.

Figure 14:
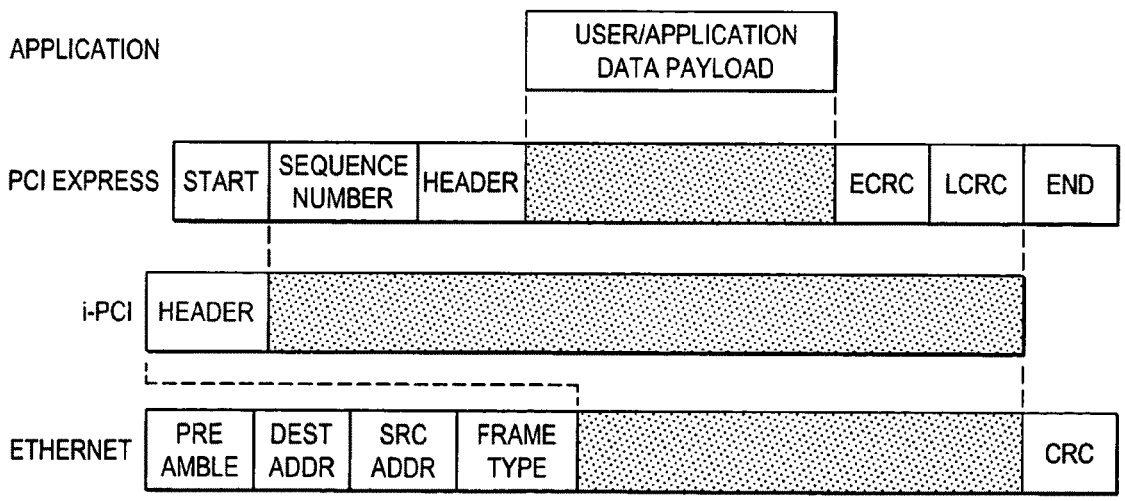
FIG. 14 depicts i(e)-PCI Packet Mapping.

If i(e)-PCI is implemented, the end encapsulation is within i-PCI and Ethernet (Data Link and Physical layer) headers only. Refer to FIG. 14, i(e)-PCI Packet Mapping.

Figure 15:
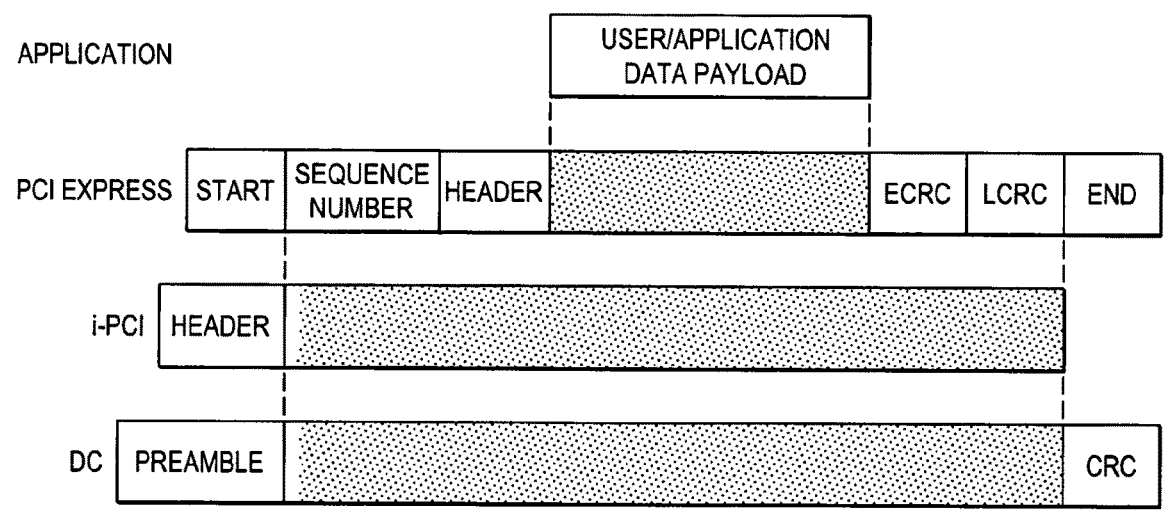
FIG. 15 depicts i(dc)-PCI Packet Mapping.

If i(dc)-PCI is implemented, the end encapsulation is within i-PCI and Ethernet (Physical layer) headers only. Refer to FIG. 15, i(dc)-PCI Packet Mapping.

PCI Express Packets

Figure 16:
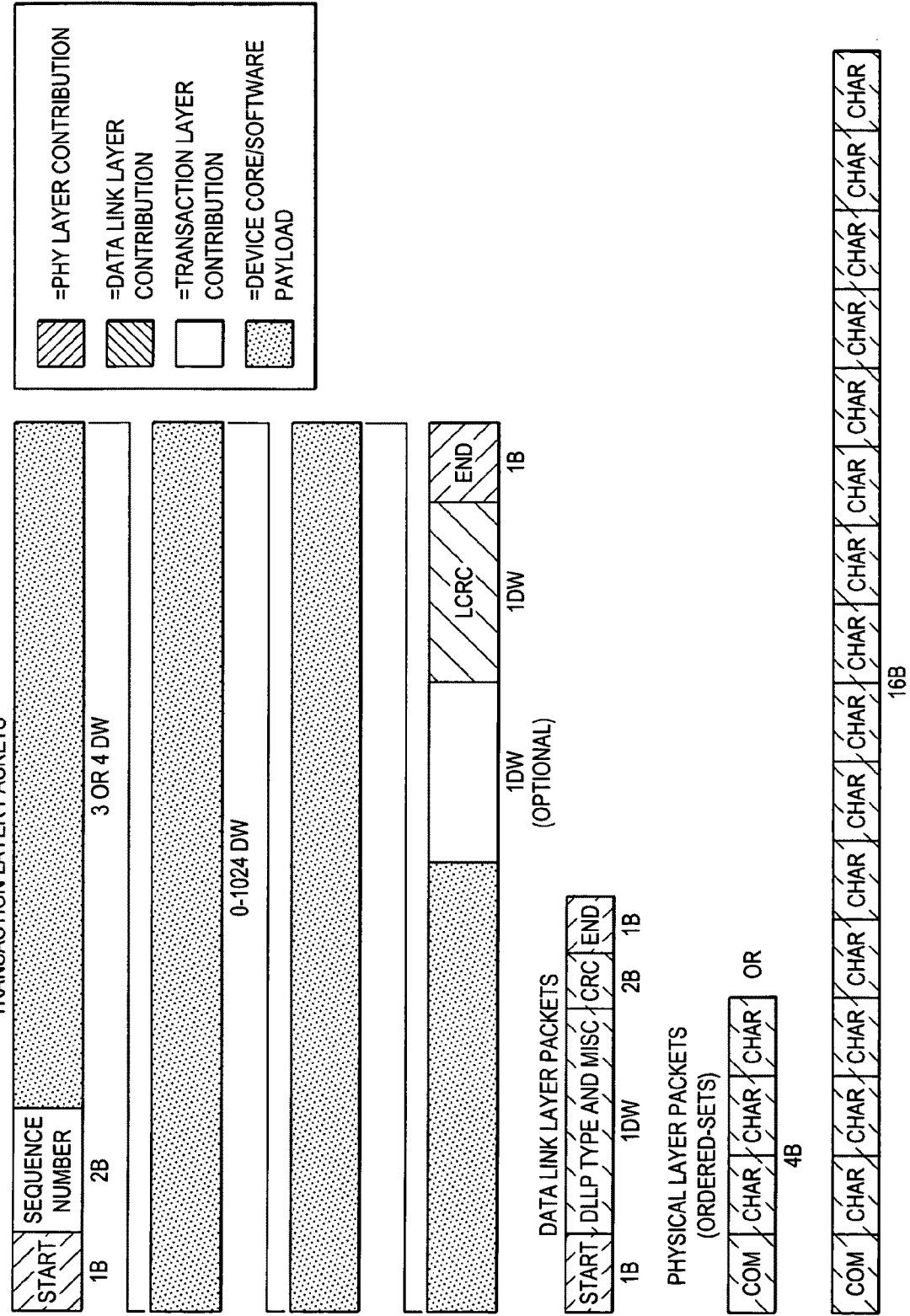
FIG. 16 depicts PCI Express Packets.

There are three types of PCI Express packets. Only one of these packet types is encapsulated within i-PCI. The packet type that must be encapsulated is the Transaction Layer packet (TLP) type. The Data Link Layer Packets (DLPs) are selectively handled with certain types translated into Link PDUs. The Physical Layer Packets (also called ordered sets) are not utilized for i-PCI. Refer to FIG. 16, PCI Express Packets.

Although the Physical Layer packets are not encapsulated within i-PCI, they still need to be supported at the PCI Express bus bridge interface on both the HBA and RBA.

Figure 17:
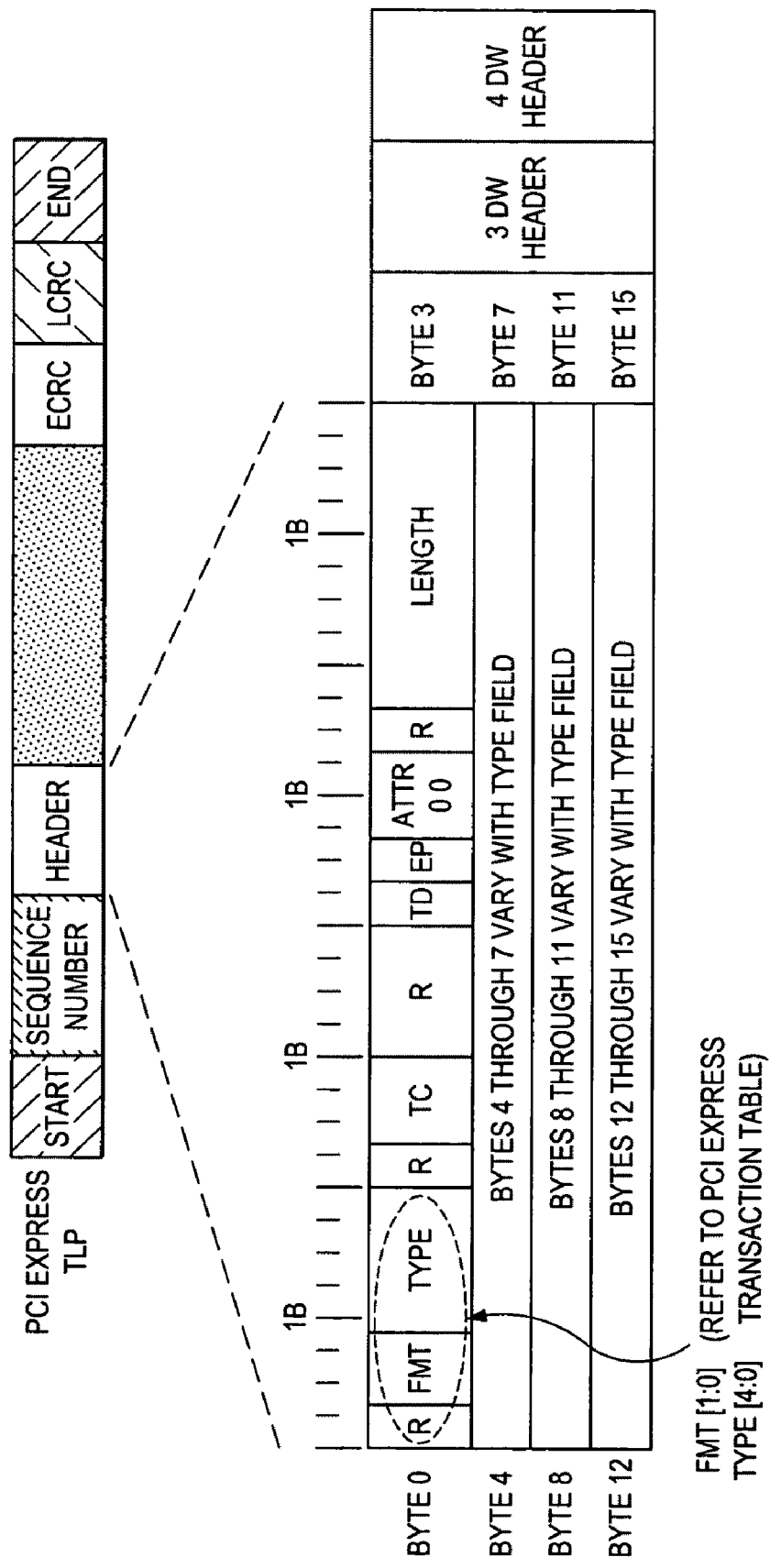
FIG. 17 depicts PCI Express TLP Header.

The detailed structure of the PCI Express TLP Header is shown in FIG. 17, PCI Express TLP Header. This information within this header is used by i-PCI in various ways such as determining priority, address mapping, etc.

i-PCI protocol decisions are made based on The PCI Express transaction type. This information is found in the FMT and Type fields within the header. A table of PCI Express Transactions appears in the Appendix.

Ethernet Packets

Figure 18:
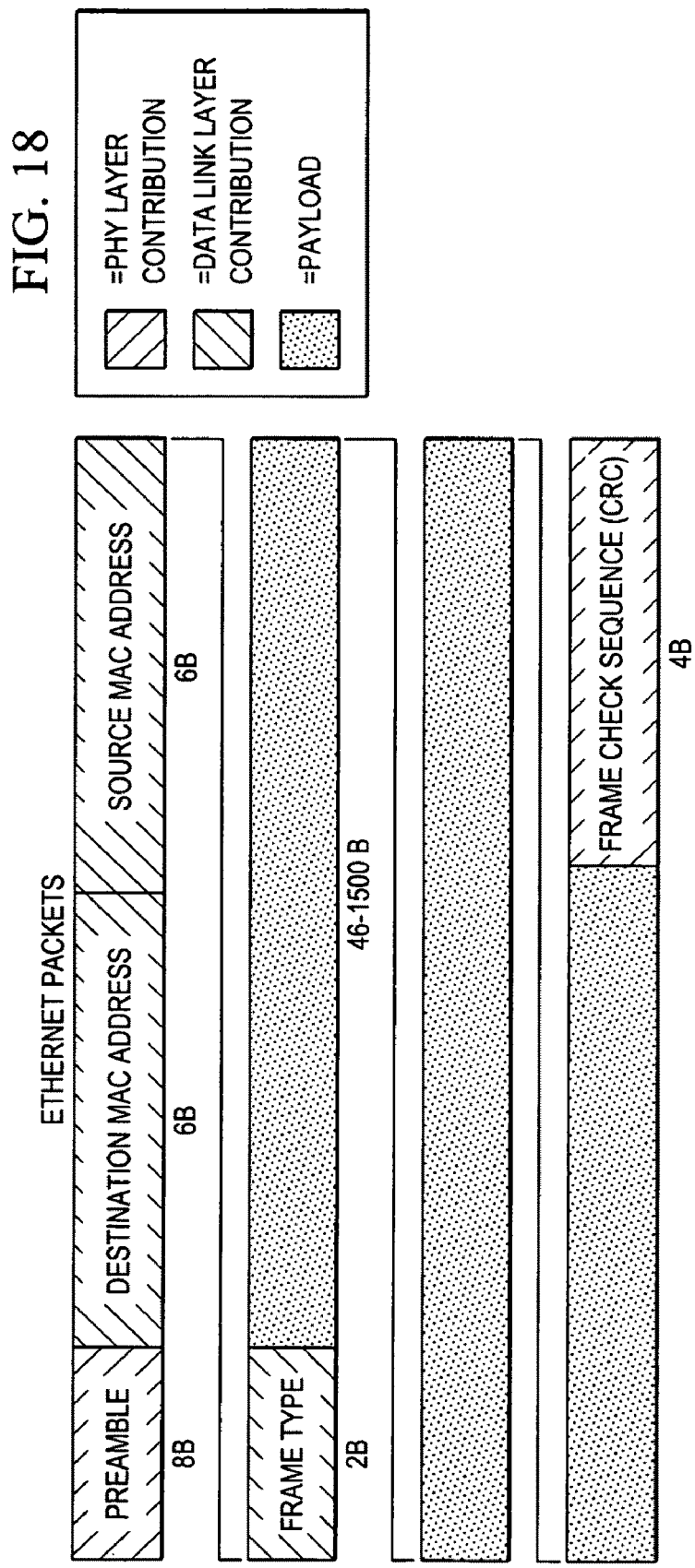
FIG. 18 depicts Ethernet Packets.

The outermost encapsulation is defined by the Ethernet Packets. The structure of these packets is shown in FIG. 18, Ethernet Packets. The full structure of the packets are utilized for i-PCI and i(e)-PCI. Only the physical layer preamble and frame check sequence (CRC) are utilized for i(dc)-PCI.

IP Packets

Figure 19:
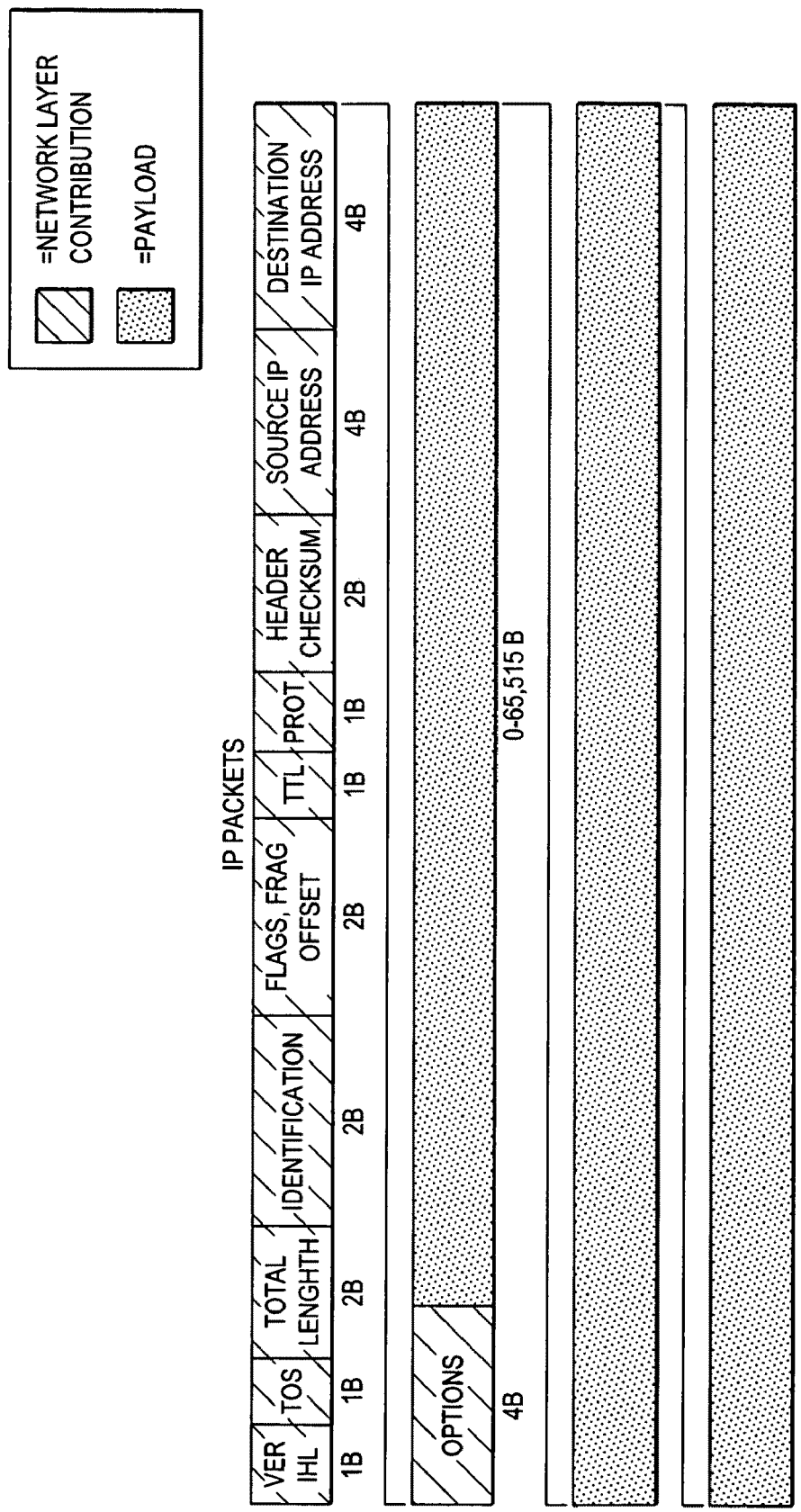
FIG. 19 depicts IP Packets.

The next layer up in the encapsulation is the IP layer. The structure of these packets is shown in FIG. 19, IP Packets. These packets are utilized for i-PCI only. IP packets are not utilized for i(e)-PCI or i(dc)-PCI.

TCP Packets

Figure 20:
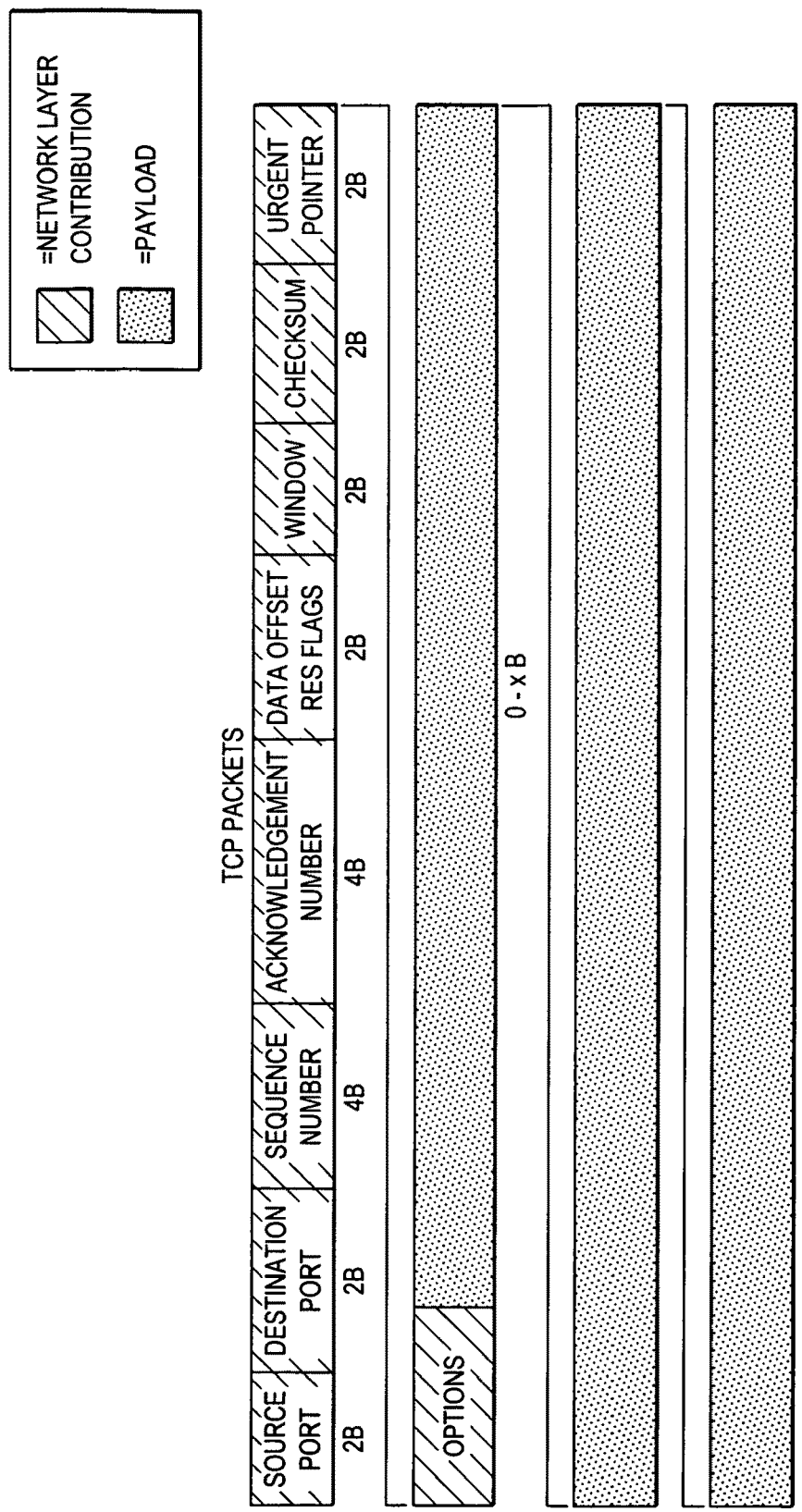
FIG. 20 depicts TCP Packets.

The next layer up in the encapsulation is the TCP layer. The structure of these packets is shown in FIG. 20, TCP Packets. These packets are utilized for i-PCI only. TCP packets are not utilized for i(e)-PCI or i(dc)-PCI.

The optimum data payload size over i-PCI is determined by matching the PCI Express transaction data size as closely as possible, avoiding fragmentation. But, the upper limit of data payload is determined by the Ethernet data field, which is limited to 1500 bytes max.

I-PCI Protocol Data Unit

The basic unit of transfer for i-PCI is referred to as a Protocol Data Unit (PDU). The flow and construction of the PDU is described in this section of the specification. There are two types of PDUs:

1) PCI Bus TLP Traffic PDU.
2) Link PDU.

The two PDUs share the same header format only for the first three fields (Type, Implen, and Option). Refer to Table 1, Header Field "Type", Table 2, Header Field "Implementation", and Table 3, Header Field "Option".

PCI Bus TLP Traffic PDU

Figure 21:
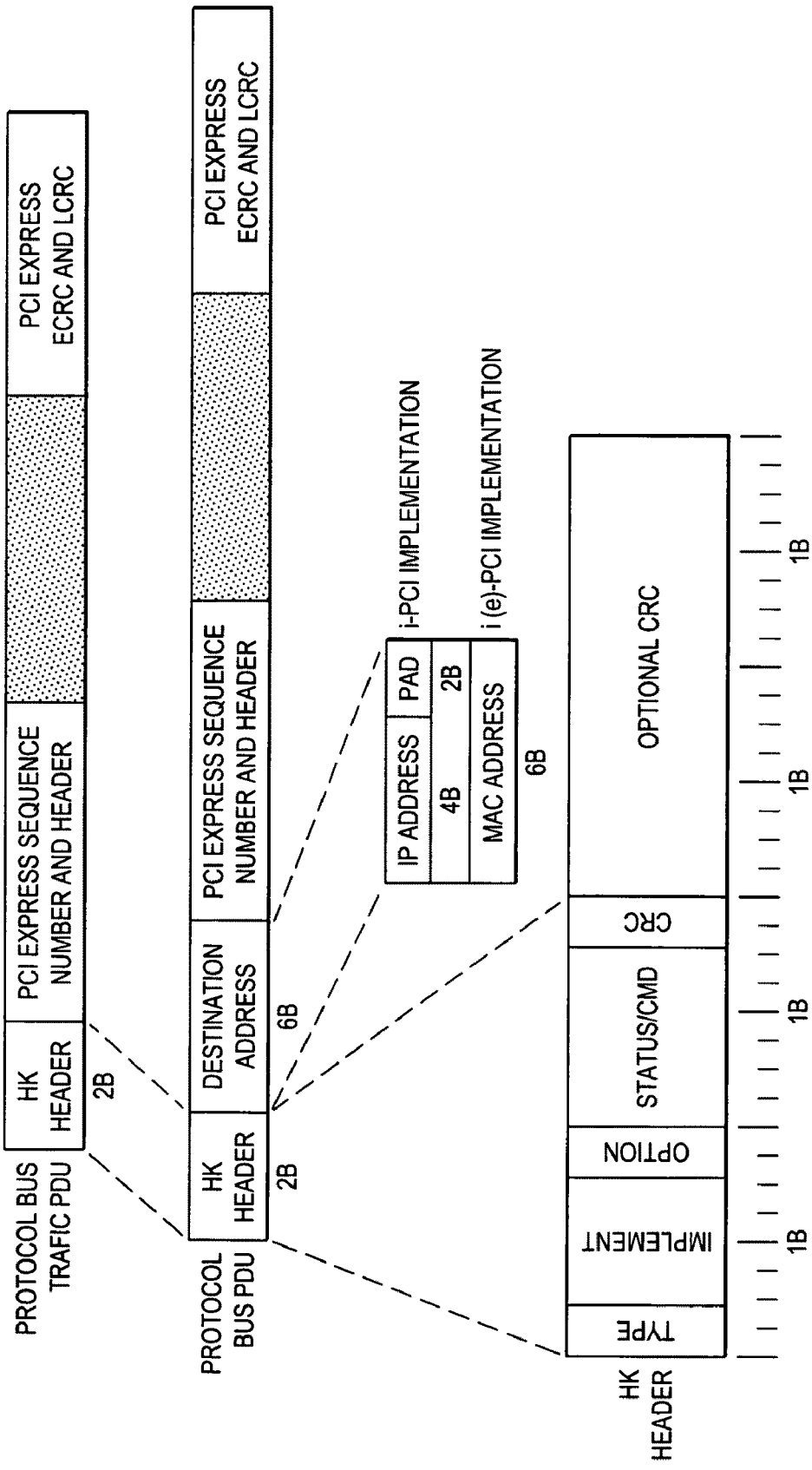
FIG. 21 depicts PCI Bus TLP Traffic PDU.

This type of PDU consists of PCI Bus TLPs intended for or received from a remote I/O. Refer to FIG. 21, PCI Bus TLP Traffic PDU.

The PCI Bus TLP Traffic HK Header fields are defined as follows:

"Type": Refer to Table 1, Header Field "Type". This field identifies which type of PDU it is.

"Implemen": Refer to Table 2, Header Field "Implementation". This field identifies which of the i-PCI implementations is being used. Up to eight implementations are accommodated to allow for future capabilities.

"Option": Refer to Table 3, Header Field "Option". For each implementation, four protocols may be specified.

"Status/CMD": Refer to Table 4, HK Header Field: "Status/CMD". This field enables basic communications between the host and remote i-PCI Protocol Controllers to help them stay in sync. The Link PDU provides additional communications capability when this field in the HK header is not sufficient.

"CRC". This field specifies optional error checking for the HK Header.

"Optional CRC": This field is added to the header if enabled by CRC field. Refer to Table 5, HK Header Field: "CRC".

The PCI Bus TLP Traffic PDU is formed and handled a bit different depending on the implementation:

For i-PCI:

Host Outgoing Traffic: The PCI-PCI Bridge on the HBA receives a packet and decodes the PCI Express TLP header (Refer to FIG. 17, PCI Express TLP Header) to confirm that it is intended for a remote device.

Unless there is a fault condition all traffic received on the link from the upstream switch should be intended for a remote I/O. The packet and extracted PCI address is then passed to the i-PCI Protocol Controller. The i-PCI Protocol Controller cross references the PCI address to an IP address for the remote I/O, using the HBA System Mirror. It then generates the IP address that corresponds to the remote I/O and fills in the IP address field on the Protocol Bus PDU. It also checks to see if any housekeeping is outstanding with the intended remote I/O. It then completes the 2-byte Housekeeping (HK) field in the header. At this time, it also sets the appropriate implementation ID in the HK field. The PDU is then passed to the 10 Gbps Network Interface Controller (NIC) TCP Offload Engine (TOE) via the protocol bus. Upon receipt, the TOE NIC controller strips off the IP address leaving the HK header in place and puts the IP address in the IP packet destination address field as it forms an IP packet. The TOE then passes the packet to the MAC, which passes it to the PHY for transmission to the remote I/O.

Host Incoming Traffic: Upon receipt of the incoming packet from the MAC, the TOE processes the packet and extracts the source IP address. The TOE has a table of the valid IP addresses of each authorized remote I/O. If the IP address matches that of an authorized remote I/O, the TOE knows it is an i-PCI PDU. It routes the packet to the i-PCI Protocol Controller via the protocol bus. The i-PCI Protocol controller then strips off the 2-byte HK header, performs any requested house keeping tasks and passes the resultant PCI Bus Traffic packet to the PCI-PCI Bridge for transmission upstream.

Remote I/O Outgoing traffic: The PCI-PCI Bridge on the RBA receives a packet from a downstream endpoint and decodes the PCI Express TLP header to confirm that it is intended for the host. Unless there is a fault condition all traffic received on the link from downstream should be intended for the host. The packet and extracted PCI address is then passed to, the i-PCI Protocol Controller. The i-PCI Protocol Controller looks for a corresponding IP address for the authorized host, using information from it's local cache of the System Mirror. It then generates the IP address that corresponds to the host and fills in the IP address field on the Protocol Bus PDU. It also checks to see if any housekeeping is outstanding with the particular host. If so, it completes the 2-byte HK field of the Protocol Bus PDU. At this time, it also sets the appropriate implementation ID in the HK field. The PDU is then passed to the TOE via the protocol bus. Upon receipt, the TOE controller strips off the IP address, leaving the HK header in place, and puts the IP address in the IP packet destination address field as it forms an IP packet. The TOE then passes the packet to the MAC, which passes it to the PHY for transmission to the host.

Remote Incoming Traffic: Upon receipt of the incoming packet from the MAC, the TOE processes the packet and extracts the source IP address. The TOE has a table of the valid IP address of the authorized host. If the IP address matches, it passes the i-PCI packet to the i-PCI Protocol Controller via the protocol bus. The i-PCI Protocol controller then strips off the 2-byte HK header, performs any requested house keeping tasks, and passes the resultant PCI Bus Traffic packet to the PCI-PCI Bridge for transmission downstream to the intended endpoint.

For i(e)-PCI:

Host Outgoing Traffic: The PCI-PCI Bridge on the HBA receives a packet and decodes the PCI Express TLP header to confirm that it is intended for a remote device. Unless there is a fault condition all traffic received on the link from the upstream switch should be intended for a remote I/O. The packet and extracted PCI address is then passed to, the i-PCI Protocol Controller. The i-PCI Protocol Controller cross-references the PCI address to a MAC address for the remote I/O, using the HBA System Mirror. It then generates the MAC address that corresponds to the remote I/O and fills in the MAC address field on the Protocol Bus PDU. It also checks to see if any housekeeping is outstanding with the intended remote I/O. It then completes the 2-byte HK field in the header. At this time, it also sets the appropriate implementation ID in the HK field. The packet is then passed to the 10 Gbps NIC controller via the protocol bus. Upon receipt, the NIC controller strips off the MAC address, leaving the HK header in place, and puts the MAC address in the Ethernet packet destination address field as it forms an Ethernet packet. The Network Interface Controller (NIC) then passes the packet to the MAC, which passes it to the PHY for transmission to the remote I/O.

Host Incoming Traffic: Upon receipt of the incoming packet from the MAC, the NIC processes the packet and extracts the source MAC address. The NIC has a table of the valid MAC addresses of each authorized remote I/O. If the MAC address matches that of a remote I/O, the NIC knows it is an i-PCI PDU. It routes the packet to the i-PCI Protocol Controller via the protocol bus. The i-PCI Protocol controller then strips off the 2-byte housekeeping field/header, performs any requested house keeping tasks and passes the resultant PCI Bus Traffic packet to the PCI-PCI Bridge for transmission upstream.

Remote I/O Outgoing traffic: The PCI-PCI Bridge on the RBA receives a packet from a downstream endpoint and decodes the PCI Express TLP header to confirm that it is intended for the host. Unless there is a fault condition all traffic received on the link from downstream should be intended for the host. The packet and extracted PCI address is then passed to, the i-PCI Protocol Controller. The i-PCI Protocol Controller looks for a corresponding MAC address for the authorized host, using information from it's local cache of the System Mirror. It then generates the MAC address that corresponds to the host and fills in the MAC address field on the Protocol Bus PDU. It also checks to see if any housekeeping is outstanding with the particular host. If so, it completes the 2-byte HK field in the header. At this time, it also sets the appropriate implementation ID in the HK field. The packet is then passed to the 10 Gbps NIC controller via the protocol bus. Upon receipt, the NIC controller strips off the MAC address, leaving the HK header in place, and puts the MAC address in the Ethernet packet destination address field as it forms an IP packet. The Network Interface Controller (NIC) then passes the packet to the MAC, which passes it to the PHY for transmission to the host.

Remote Incoming Traffic: Upon receipt of the incoming packet from the MAC, the NIC processes the packet and extracts the source MAC address. The NIC has a table of the valid MAC address of the authorized host. If the MAC address matches, it passes the i-PCI packet to the i-PCI Protocol Controller via the protocol bus. The i-PCI Protocol controller then strips off the 2-byte HK header, performs any requested house keeping tasks, and passes the resultant PCI Bus Traffic packet to the PCI-PCI Bridge for transmission downstream to the intended endpoint.

For i(dc)-PCI:

Host Outgoing Traffic: The PCI-PCI Bridge on the HBA receives a packet and decodes the PCI Express TLP header to confirm that it is intended for a remote device. Unless there is a fault condition all traffic received on the link from the upstream switch should be intended for the remote I/O. The packet and extracted PCI address is then passed to, the i-PCI Protocol Controller. The i-PCI Protocol Controller checks to see if any housekeeping is outstanding with the intended remote I/O. It then completes the 2-byte HK header. At this time, it also sets the appropriate implementation ID in the HK header. The packet is then passed to the 10 Gbps NIC controller via the protocol bus. Upon receipt, the NIC controller passes the packet to the MAC, which passes it to the PHY for transmission to the remote I/O.

Host Incoming Traffic: Upon receipt of the incoming packet from the MAC, the NIC processes the packet and routes the packet to the i-PCI Protocol Controller via the protocol bus. The i-PCI Protocol controller then strips off the 2-byte HK header, performs any requested house keeping tasks and passes the resultant PCI Bus Traffic packet to the PCI-PCI Bridge for transmission upstream.

Remote I/O Outgoing traffic: The PCI-PCI Bridge on the RBA receives a packet from a downstream endpoint and decodes the PCI Express TLP header to confirm that it is intended for the host. Unless there is a fault condition all traffic received on the link from downstream should be intended for the host. The packet and extracted PCI address is then passed to the i-PCI Protocol Controller. The i-PCI Protocol Controller checks to see if any housekeeping is outstanding with the host. If so, it completes the 2-byte HK header. At this time, it also sets the appropriate implementation ID in the HK header. The packet is then passed to the 10 Gbps NIC controller via the protocol bus. Upon receipt, the NIC controller passes the packet to the MAC, which passes it to the PHY for transmission to the host.

Remote Incoming Traffic: Upon receipt of the incoming packet from the MAC, the NIC processes the packet and passes the i-PCI packet to the i-PCI Protocol Controller via the protocol bus. The i-PCI Protocol controller then strips off the 2-byte HK header, performs any requested house keeping tasks, and passes the resultant PCI Bus Traffic packet to the PCI-PCI Bridge for transmission downstream to the intended endpoint.

TABLE 1

Header Field: "Type".

| TYPE | | Description |
| --- | --- | --- |
| 0 | 00 | Indicates a PCI Bus Traffic PDU |
| 1 | 01 | Indicates a Link PDU |
| 2 | 10 | reserved |
| 3 | 11 | reserved |

TABLE 2

Header Field: "Implementation".

| IMPLEMEN | | Description |
| --- | --- | --- |
| 0 | 0000 | Indicates an i-PCI Implementation |
| 1 | 0001 | Indicates an i(e)-PCI Implementation |
| 2 | 0010 | Indicates an i(dc)-PCI Implementation |
| 3 | 0011 | reserved |
| 4 | 0100 | reserved |
| 5 | 0101 | reserved |
| 6 | 0110 | reserved |
| 7 | 0111 | reserved |
| 8 | 1000 | reserved |
| 9 | 1001 | reserved |
| A | 1010 | reserved |
| B | 1011 | reserved |
| C | 1100 | reserved |
| D | 1101 | reserved |
| E | 1110 | reserved |
| F | 1111 | reserved |

TABLE 3

Header Field: "Option".

| IMPLEMEN | OPTION | | Description |
| --- | --- | --- | --- |
| 0 | 0 | 00 | TCP Protocol Option |
| | 1 | 01 | UDP Protocol Option |
| | 2 | 10 | reserved |
| | 3 | 11 | reserved |
| 1 | 0 | 00 | reserved |
| | 1 | 01 | reserved |
| | 2 | 10 | reserved |
| | 3 | 11 | reserved |
| 2 | 0 | 00 | reserved |
| | 1 | 01 | reserved |
| | 2 | 10 | reserved |
| | 3 | 11 | reserved |
| 3 | 0 | 00 | reserved |
| | 1 | 01 | reserved |
| | 2 | 10 | reserved |
| | 3 | 11 | reserved |
| 4 | 0 | 00 | reserved |
| | 1 | 01 | reserved |
| | 2 | 10 | reserved |
| | 3 | 11 | reserved |
| 5 | 0 | 00 | reserved |
| | 1 | 01 | reserved |

TABLE 3-continued

Header Field: "Option".

| IMPLEMEN | OPTION | | Description |
| --- | --- | --- | --- |
| | 2 | 10 | reserved |
| | 3 | 11 | reserved |
| 6 | 0 | 00 | reserved |
| | 1 | 01 | reserved |
| | 2 | 10 | reserved |
| | 3 | 11 | reserved |
| 7 | 0 | 00 | reserved |
| | 1 | 01 | reserved |
| | 2 | 10 | reserved |
| | 3 | 11 | reserved |
| 8 | 0 | 00 | reserved |
| | 1 | 01 | reserved |
| | 2 | 10 | reserved |
| | 3 | 11 | reserved |
| 9 | 0 | 00 | reserved |
| | 1 | 01 | reserved |
| | 2 | 10 | reserved |
| | 3 | 11 | reserved |
| A | 0 | 00 | reserved |
| | 1 | 01 | reserved |
| | 2 | 10 | reserved |
| | 3 | 11 | reserved |
| B | 0 | 00 | reserved |
| | 1 | 01 | reserved |
| | 2 | 10 | reserved |
| | 3 | 11 | reserved |
| C | 0 | 00 | reserved |
| | 1 | 01 | reserved |
| | 2 | 10 | reserved |
| | 3 | 11 | reserved |
| D | 0 | 00 | reserved |
| | 1 | 01 | reserved |
| | 2 | 10 | reserved |
| | 3 | 11 | reserved |
| E | 0 | 00 | reserved |
| | 1 | 01 | reserved |
| | 2 | 10 | reserved |
| | 3 | 11 | reserved |
| F | 0 | 00 | reserved |
| | 1 | 01 | reserved |
| | 2 | 10 | reserved |
| | 3 | 11 | reserved |

TABLE 4

HK Header Field: "Status/Command".

| STATUS/CMD | | Status Description | Command Description |
| --- | --- | --- | --- |
| 00 | 000000 | OK | Reset |
| 01 | 000001 | reserved | TCP CODE PSH bit set |
| 02 | 000010 | reserved | TCP CODE URG bit set |
| 03 | 000011 | reserved | reserved |
| 04 | 000100 | reserved | reserved |
| 05 | 000101 | reserved | reserved |
| 06 | 000110 | reserved | reserved |
| 07 | 000111 | reserved | reserved |
| 08 | 001000 | reserved | reserved |
| 09 | 001001 | reserved | reserved |
| 0A | 001010 | reserved | reserved |
| 0B | 001011 | reserved | reserved |
| 0C | 001100 | reserved | reserved |
| 0D | 001101 | reserved | reserved |
| 0E | 001110 | reserved | reserved |
| 0F | 001111 | reserved | reserved |
| 10 | 010000 | reserved | reserved |
| 11 | 010001 | reserved | reserved |
| 12 | 010010 | reserved | reserved |
| 13 | 010011 | reserved | reserved |
| 14 | 010100 | reserved | reserved |

TABLE 4-continued

HK Header Field: "Status/Command".

| | STATUS/CMD | Status Description | Command Description |
|---|---|---|---|
| 15 | 010101 | reserved | reserved |
| 16 | 010110 | reserved | reserved |
| 17 | 010111 | reserved | reserved |
| 18 | 011000 | reserved | reserved |
| 19 | 011001 | reserved | reserved |
| 1A | 011010 | reserved | reserved |
| 1B | 011011 | reserved | reserved |
| 1C | 011100 | reserved | reserved |
| 1D | 011101 | reserved | reserved |
| 1E | 011110 | reserved | reserved |
| 1F | 011111 | reserved | reserved |
| 20 | 100000 | reserved | reserved |
| 21 | 100001 | reserved | reserved |
| 22 | 100010 | reserved | reserved |
| 23 | 100011 | reserved | reserved |
| 24 | 100100 | reserved | reserved |
| 25 | 100101 | reserved | reserved |
| 26 | 100110 | reserved | reserved |
| 27 | 100111 | reserved | reserved |
| 28 | 101000 | reserved | reserved |
| 29 | 101001 | reserved | reserved |
| 2A | 101010 | reserved | reserved |
| 2B | 101011 | reserved | reserved |
| 2C | 101100 | reserved | reserved |
| 2D | 101101 | reserved | reserved |
| 2E | 101110 | reserved | reserved |
| 2F | 101111 | reserved | reserved |
| 30 | 110000 | reserved | reserved |
| 31 | 110001 | reserved | reserved |
| 32 | 110010 | reserved | reserved |
| 33 | 110011 | reserved | reserved |
| 34 | 110100 | reserved | reserved |
| 35 | 110101 | reserved | reserved |
| 36 | 110110 | reserved | reserved |
| 37 | 110111 | reserved | reserved |
| 38 | 111000 | reserved | reserved |
| 39 | 111001 | reserved | reserved |
| 3A | 111010 | reserved | reserved |
| 3B | 111011 | reserved | reserved |
| 3C | 111100 | reserved | reserved |
| 3D | 111101 | reserved | reserved |
| 3E | 111110 | reserved | reserved |
| 3F | 111111 | HELP | reserved |

TABLE 5

HK Header Field: "CRC".

| | CRC | Description |
|---|---|---|
| 0 | 00 | No HK Header Error Checking |
| 1 | 01 | 16-Bit CRC Appended to Header |
| 2 | 10 | reserved |
| 3 | 11 | reserved |

Link PDU

The Link PDU has two main purposes:
1. PCI Express DLLP Support
   Includes Flow Control capability for i(e)-PCI and i(dc)-PCI implementations.
2. Command & Control/Synchronization Two versions or "subtype" PDUs are defined to support these respective purposes:
1. PCI Express DLLP Support (PDS) PDU
2. Command & Control/Synchronization (CSS) PDU
3.2.6.2.1 PCI Express DLLP Support (PDS) PDU Certain PCI Express Data Link Layer packet functions—not all—are supported across the link between the Host and the remote I/O. The Link PDU "subtype" that provides this capability is referred to as the PCI Express DLLP Support (PDS) PDU.

Figure 22:
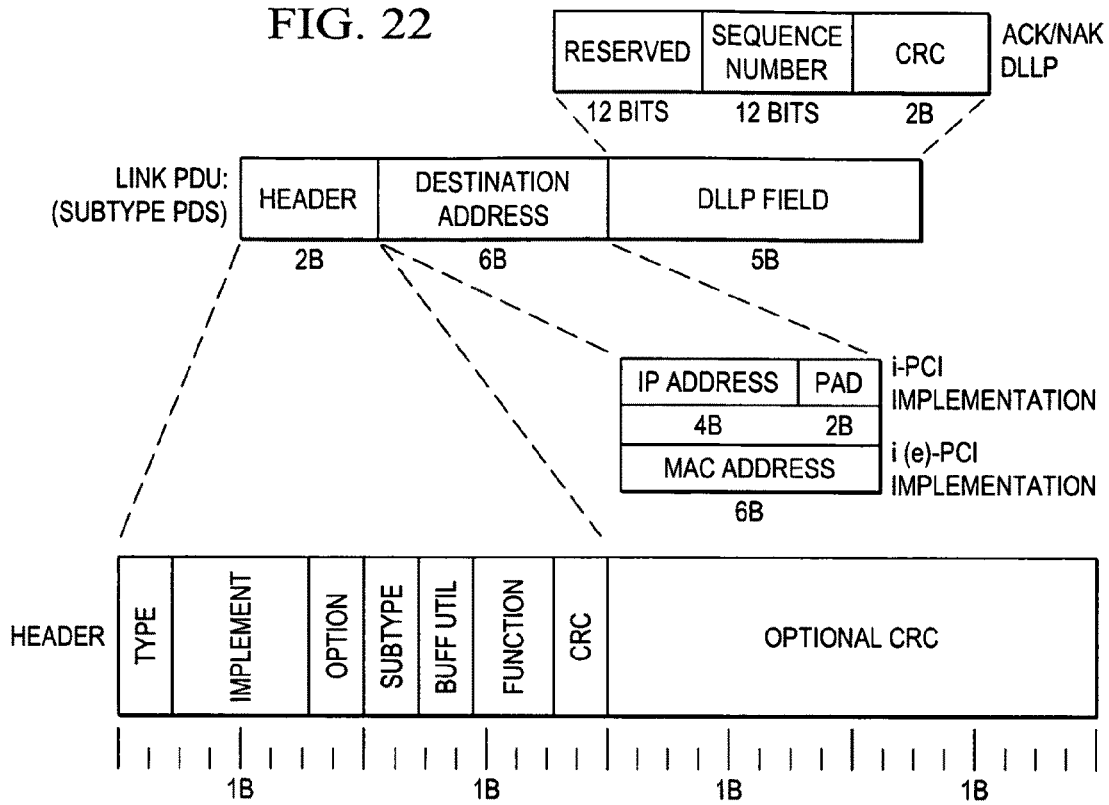
FIG. 22 depicts PCI Express DLLP Support (PDS) PDU.

In stating that certain PCI Express functions are supported, it does not imply that PCI Express DLLPs are simply encapsulated for i-PCI in the way that PCI Express TLPs are. Instead, a given DLLP is handled, interpreted, and translated into a Link PDS PDU. The PCIe DLLP Handler forms the Link PDS PDUs for the supported PCI Express DLLP functions. Tables 6,7,8, show the PCI Express DLLPs supported by the various implementations of i-PCI. The handling, supported functions, interpretation, and translation varies depending on the implementation: For the detailed structure of the PDS PDU, Refer to FIG. 22, PCI Express DLLP Support (PDS) PDU.

The PDS PDU Header fields are defined as follows:
"Type", "Implemen", "Option": Same definitions as for the PCI Bus TLP Traffic PDU. Refer to Table 1, Header Field "Type", Table 2, Header Field "Implementation", Table 3, Header Field "Option".
"Subtype": See Table 9, Link PDU Header Field: "Sub-Type"
"Buff Util": See Table 10, Link PDU Header Field: "Buff Util". This field provides the flow control capability for the i(e)-PCI and i(dc) implementations. Buff Util provides a running update of the receive buffer condition in the NIC.
"Function": See Table 11, Link (PDS-specific) PDU Header Field: "Function"
"CRC": This field specifies optional error checking for the HK Header. See Table 12, Link (PDS-specific) PDU Header Field: "CRC".
"Optional CRC": This field is added to the header if enabled by CRC field.

All PDUs originate with the i-PCI Protocol Controller. The PDS PDU is a fixed length of either 15 bytes, or 17 bytes if the 16-bit Header CRC is specified.

PCI Express ACK and NAK protocol support is one of the primary functions handled by the PDS PDU. The PDS DLLP Field directly maps to the PCI Express DLLP ACK or NAK "Reserved", "AckNak_Seq_Num", and "16-bit CRC" fields. In the case of the ACK/NAK DLLP, the last 12 bits of the field contain the Sequence number for the last received good TLP. The sending and receiving bridges calculate the PCI Express 16-bit CRC field as part of the PCI Express Protocol.

TABLE 6

PCI Express DLLPs and PDU Mapping for i-PCI.

| PCIe DLLP Group | Packet Type | Link PDU Mapping | Comments |
|---|---|---|---|
| TLP Acknowledgement | ACK | PCIe ACK Local | PDU terminates at local NIC controller |
| | NAK | PCIe NAK Local | PDU terminates at local NIC controller |

TABLE 6-continued

PCI Express DLLPs and PDU Mapping for i-PCI.

| PCIe DLLP Group | Packet Type | Link PDU Mapping | Comments |
| --- | --- | --- | --- |
| Power Management | PM_Enter_L1 | No Mapping | PCIe DLLP Handler logic i-PCI link components remain powered |
| | PM_Enter_L2 | No Mapping | PCIe DLLP Handler logic i-PCI link components remain powered |
| | PM_Active_State_Request_L1 | No Mapping | PCIe DLLP Handler logic i-PCI link components remain powered |
| | PM_Request_Ack | No Mapping | PCIe DLLP Handler logic i-PCI link components remain powered |
| TLP Flow Control | InitFC1-P | No Mapping | PCIe DLLP Handler logic |
| | InitFC1-NP | No Mapping | PCIe DLLP Handler logic |
| | InitFC1-Cpl | No Mapping | PCIe DLLP Handler logic |
| | InitFC2-P | No Mapping | PCIe DLLP Handler logic |
| | InitFC2-NP | No Mapping | PCIe DLLP Handler logic |
| | InitFC2-Cpl | No Mapping | PCIe DLLP Handler logic |
| | UpdateFC-P | No Mapping | Initialization infinite credit option: inactive |
| | UpdateFC-NP | No Mapping | Initialization infinite credit option: inactive |
| | UpdateFC-Cpl | No Mapping | Initialization infinite credit option: inactive |
| Vendor Specific | Not used in normal operation | No Mapping | PCIe DLLP Handler logic (if necessary) |
| Reserved | All others | No Mapping | PCIe DLLP Handler logic (if necessary) |

TABLE 7

PCI Express DLLPs and PDU Mapping for i(e)-PCI.

| PCIe DLLP Group | Packet Type | Link PDU Mapping | Comments |
| --- | --- | --- | --- |
| TLP Acknowledgement | ACK | PCIe ACK | PDU routes across link |
| | NAK | PCIe NAK | PDU routes across link |
| Power Management | PM_Enter_L1 | No Mapping | PCIe DLLP Handler logic i-PCI link components remain powered |
| | PM_Enter_L2 | No Mapping | PCIe DLLP Handler logic i-PCI link components remain powered |
| | PM_Active_State_Request_L1 | No Mapping | PCIe DLLP Handler logic i-PCI link components remain powered |
| | PM_Request_Ack | No Mapping | PCIe DLLP Handler logic i-PCI link components remain powered |
| TLP Flow Control | InitFC1-P | No Mapping | PCIe DLLP Handler logic |
| | InitFC1-NP | No Mapping | PCIe DLLP Handler logic |
| | InitFC1-Cpl | No Mapping | PCIe DLLP Handler logic |
| | InitFC2-P | No Mapping | PCIe DLLP Handler logic |
| | InitFC2-NP | No Mapping | PCIe DLLP Handler logic |
| | InitFC2-Cpl | No Mapping | PCIe DLLP Handler logic |
| | UpdateFC-P | No Mapping | Initialization infinite credit option: inactive |
| | UpdateFC-NP | No Mapping | Initialization infinite credit option: inactive |
| | UpdateFC-Cpl | No Mapping | Initialization infinite credit option: inactive |
| Vendor Specific | Not used in normal operation | No Mapping | PCIe DLLP Handler logic (if necessary) |
| Reserved | All others | No Mapping | PCIe DLLP Handler logic (if necessary) |

TABLE 8

PCI Express DLLPs and PDU Mapping for i(dc)-PCI.

| PCIe DLLP Group | Packet Type | Link PDU Mapping | Comments |
| --- | --- | --- | --- |
| TLP Acknowledgement | ACK | PCIe ACK | PDU routes across link |
| | NAK | PCIe NAK | PDU routes across link |
| Power Management | PM_Enter_L1 | No Mapping | PCIe DLLP Handler logic i-PCI link components remain powered |
| | PM_Enter_L2 | No Mapping | PCIe DLLP Handler logic i-PCI link components remain powered |
| | PM_Active_State_Request_L1 | No Mapping | PCIe DLLP Handler logic i-PCI link components remain powered |
| | PM_Request_Ack | No Mapping | PCIe DLLP Handler logic i-PCI link components remain powered |
| TLP Flow Control | InitFC1-P | No Mapping | PCIe DLLP Handler logic |
| | InitFC1-NP | No Mapping | PCIe DLLP Handler logic |
| | InitFC1-Cpl | No Mapping | PCIe DLLP Handler logic |
| | InitFC2-P | No Mapping | PCIe DLLP Handler logic |
| | InitFC2-NP | No Mapping | PCIe DLLP Handler logic |
| | InitFC2-Cpl | No Mapping | PCIe DLLP Handler logic |
| | UpdateFC-P | No Mapping | Initialization infinite credit option: inactive |
| | UpdateFC-NP | No Mapping | Initialization infinite credit option: inactive |
| | UpdateFC-Cpl | No Mapping | Initialization infinite credit option: inactive |
| Vendor Specific | Not used in normal operation | No Mapping | PCIe DLLP Handler logic (if necessary) |
| Reserved | All others | No Mapping | PCIe DLLP Handler logic (if necessary) |

TABLE 9

Link PDU Header Field: "SubType".

| SUBTYPE | | Description |
| --- | --- | --- |
| 0 | 00 | Indicates a PCI Express DLLP Support (PDS) PDU |
| 1 | 01 | Indicates a Command & Control/Synchronization (CCS) PDU |
| 2 | 10 | reserved |
| 3 | 11 | reserved |

TABLE 10

Link PDU Header Field: "Buff Util"

| BUFF UTIL | | Description |
| --- | --- | --- |
| 0 | 00 | Receive Buffer = 75 to 100% space available |
| 1 | 01 | Receive Buffer = 50 to 75% space available |
| 2 | 10 | Receive Buffer = 25 to 50% space available |
| 3 | 111 | $$ 25% space available |

TABLE 11

Link (PDS-specific) PDU Header Field: "Function"

| | FUNCTION | Description |
| --- | --- | --- |
| 0 | 000 | ACK |
| 1 | 001 | NAK |
| 2 | 010 | Buffer Status |
| 3 | 011 | Keep Alive |
| 4 | 100 | reserved |

TABLE 11-continued

Link (PDS-specific) PDU Header Field: "Function"

| | FUNCTION | Description |
| --- | --- | --- |
| 5 | 101 | reserved |
| 6 | 110 | reserved |
| 7 | 111 | reserved |

TABLE 12

Link (PDS-specific) PDU Header Field: "CRC".

| CRC | Description |
| --- | --- |
| 0 | No PDU Header Error Check |
| 1 | 16-Bit CRC Appended to Header |

Command & Control/Synchronization (CSS PDU)

Figure 23:
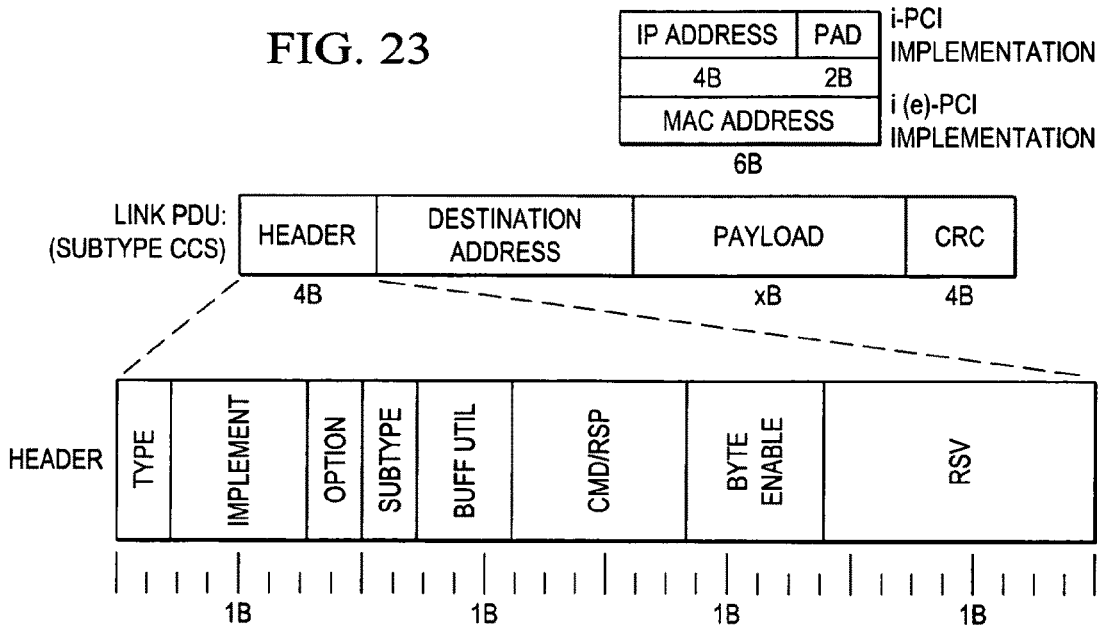
FIG. 23 depicts Command & Control/Synchronization (CCS) PDU.

The i-PCI protocol requires the i-PCI Protocol Controller in the HBA to be able to contact the i-PCI Protocol Controller in each RBA for command & control and synchronization. The RSYNC application running on the i-PCI Protocol Controller accomplishes these tasks utilizing the Link PDU. The Link PDU "subtype" that provides this capability is referred to as the Command & Control/Synchronization (CCS) PDU. A simple command and response capability is implemented. The detailed structure of the Subtype CCS is shown in FIG. 23, Command & Control/Synchronization (CCS) PDU.

The CCS PDU Header fields are defined as follows:

"Type", "Implemen", "Option": Same definitions as for the PCI Bus TLP Traffic PDU. Refer to Table 1, Header Field "Type", Table 2, Header Field "Implementation", and Table 3, Header Field "Option".

"Subtype": See Table 9, Link PDU Header Field: "Sub-Type"

"Buff Util": See Table 10, Link PDU Header Field: "Buff Util".

"CMD/RSP": See Table 13, Link PDU CSS Header Field: "CMD/RSP".

"Byte Enable". See Table 14, Link PDU CSS Header Field: "Byte Enable". The Byte Enable field specifies how many bytes (0-4) and which byte position(s) are to be transferred. Byte enables are used for single DW Config Read Offset, Config Write offset, Controller Mem Write and Controller Mem Read operations.

"Reserved". This field is reserved for future needs.

All PDUs originate with the i-PCI Protocol Controller. In contrast to the PDS PDU, the CCS PDU has a payload field varies in length, depending on the CMD/RSP field. There is no length field as the length is defined specific to the Command or Response. A 32-bit CRC is calculated and added to the end of the CCS Link PDU to cover the entire PDU. There is no destination address field in the i(dc)-PCI implementation.

TABLE 13

Link PDU CSS Header Field: "CMD/RSP".

| CMD/RSP | Command | | Response | |
|---|---|---|---|---|
| | Task | Payload Size | Result Returned | Payload Size |
| 00 | Config Read Offset | 12 bits | Corresponding registers | 0-4 B |
| 01 | Config Read PCI Header | 0 B | Config PCI Header | 64 B |
| 02 | Config Read PCI Dev Sp | 0 B | Config PCI Dev Sp | 192 B |
| 03 | Config Read PCI Comp | 0 B | Config PCI Comp | 256 B |
| 04 | Config Read PCIe Ext | 0 B | Config PCIe Ext | 3840 B |
| 05 | Config Read All | 0 B | Entire Config Sp | 4096 B |
| 06 | reserved | | reserved | |
| 07 | reserved | | reserved | |
| 08 | reserved | | reserved | |
| 09 | reserved | | reserved | |
| 0A | reserved | | reserved | |
| 0B | reserved | | reserved | |
| 0C | reserved | | reserved | |
| 0D | reserved | | reserved | |
| 0E | reserved | | reserved | |
| 0F | reserved | | reserved | |
| 10 | Config Write Offset | 12 bits + 0-4 B | ACK Config Write | 0 B |
| 11 | Config Write PCI Header | 64 B | reserved | |
| 12 | Config Write PCI Dev Sp | 192 B | reserved | |
| 13 | Config Write PCI Comp | 256 B | reserved | |
| 14 | Config Write PCIe Ext | 3840 B | reserved | |
| 15 | Config Write All | 4096 B | reserved | |
| 16 | reserved | | reserved | |
| 17 | reserved | | reserved | |
| 18 | reserved | | reserved | |
| 19 | reserved | | reserved | |
| 1A | reserved | | reserved | |
| 1B | reserved | | reserved | |
| 1C | reserved | | reserved | |
| 1D | reserved | | reserved | |
| 1E | reserved | | reserved | |
| 1F | reserved | | reserved | |
| 20 | Controller Mem Write | 4-8 B[1] | ACK Mem Write | 0 B |
| 21 | Controller Mem Read | 0-4 B[2] | Mem Read | 0-4 B[3] |
| 22 | reserved | | reserved | |
| 23 | reserved | | reserved | |
| 24 | reserved | | reserved | |
| 25 | reserved | | reserved | |
| 26 | reserved | | reserved | |
| 27 | reserved | | reserved | |
| 28 | reserved | | reserved | |
| 29 | reserved | | reserved | |
| 2A | reserved | | reserved | |
| 2B | reserved | | reserved | |
| 2C | reserved | | reserved | |
| 2D | reserved | | reserved | |
| 2E | reserved | | reserved | |
| 2F | reserved | | reserved | |
| 30 | reserved | | reserved | |
| 31 | reserved | | reserved | |
| 32 | reserved | | reserved | |

TABLE 13-continued

Link PDU CSS Header Field: "CMD/RSP".

| | Command | | Response | |
|---|---|---|---|---|
| CMD/ RSP | Task | Payload Size | Result Returned | Payload Size |
| 33 | reserved | | reserved | |
| 34 | reserved | | reserved | |
| 35 | reserved | | reserved | |
| 36 | reserved | | reserved | |
| 37 | reserved | | reserved | |
| 38 | reserved | | reserved | |
| 39 | reserved | | reserved | |
| 3A | reserved | | reserved | |
| 3B | reserved | | reserved | |
| 3C | reserved | | reserved | |
| 3D | reserved | | reserved | |
| 3E | Reset | 0 B | Reset Complete | 0 B |
| 3F | Ready? | 0 B | Ready | 0 B |

Notes:
1.4 B address + 4 B data
2.4 B address
3.4 B data

TABLE 14

Link PDU CSS Header Field: "Byte Enable"

| Byte Enable | | Payload |
|---|---|---|
| 00 | 0000 | 4 data bytes |
| 01 | 0001 | upper 3 bytes |
| 02 | 0010 | upper 2 bytes and first byte |
| 03 | 0011 | upper two bytes |
| 04 | 0100 | upper byte and lower 2 bytes |
| 05 | 0101 | second and fourth bytes |
| 06 | 0110 | first and last bytes |
| 07 | 0111 | last byte |
| 08 | 1000 | 3 lower bytes |
| 09 | 1001 | 2 middle bytes |
| A | 1010 | first and third bytes |
| B | 1011 | third byte |
| C | 1100 | first two bytes |
| D | 1101 | second byte |
| E | 1110 | first byte |
| F | 1111 | no bytes |

PCI←→i-PCI←→TCP/IP/ Protocol Process Overview

To establish basic understanding of how i-PCI works, it is illustrative to run through at a high level a scenario from computer startup through a first application transaction involving the i-PCI protocol process. Note: i-PCI specific steps are italicized.

System Configuration, Initialization, and Resource Assignment

When a host computer system is turned on, the BIOS begins execution and initializes the host. The BIOS is responsible for starting up the PCI System, including:

Initial discovery and detection of all PCI bus devices, including PCI bridges.

Configuration of all PCI bridge registers.

Assignment of I/O and memory resource windows to each bridge based on the requirements of the PCI devices behind that bridge.

The HBA includes a complete PCI System mirror (resource cache reflector/mapper or "RCR/M") of all remote PCI bridges and PCI device configuration registers. The PCI System mirror must implement the PCI Express Bridge-Specific version of the type 01h Configuration Header Format (see Appendix). The BIOS "discovers" these devices and assigns the proper resources to the mirror.

The mirror was setup during a prior boot-up by the System Data Transfer Optimization Utility.

After the BIOS completes and hands off to the Operating System, the PCI Bus Driver (pci.sys in MS Windows) re-scans the PCI system:

It confirms that all bridges have been configured by the BIOS and configures any bridges that were not configured by the BIOS for some reason.

It starts up each bridge and scans behind the bridge for any PCI device.

If devices are present, the driver assigns resources to the each device from the bridge resource allocation (the memory and I/O resource windows).

The PCI Bus Driver confirms all bridges and devices appearing in the HBA mirror.

Following the mirror configuration response, the HBA will re-sync with the affected RBA device configuration register.

Figure 24:
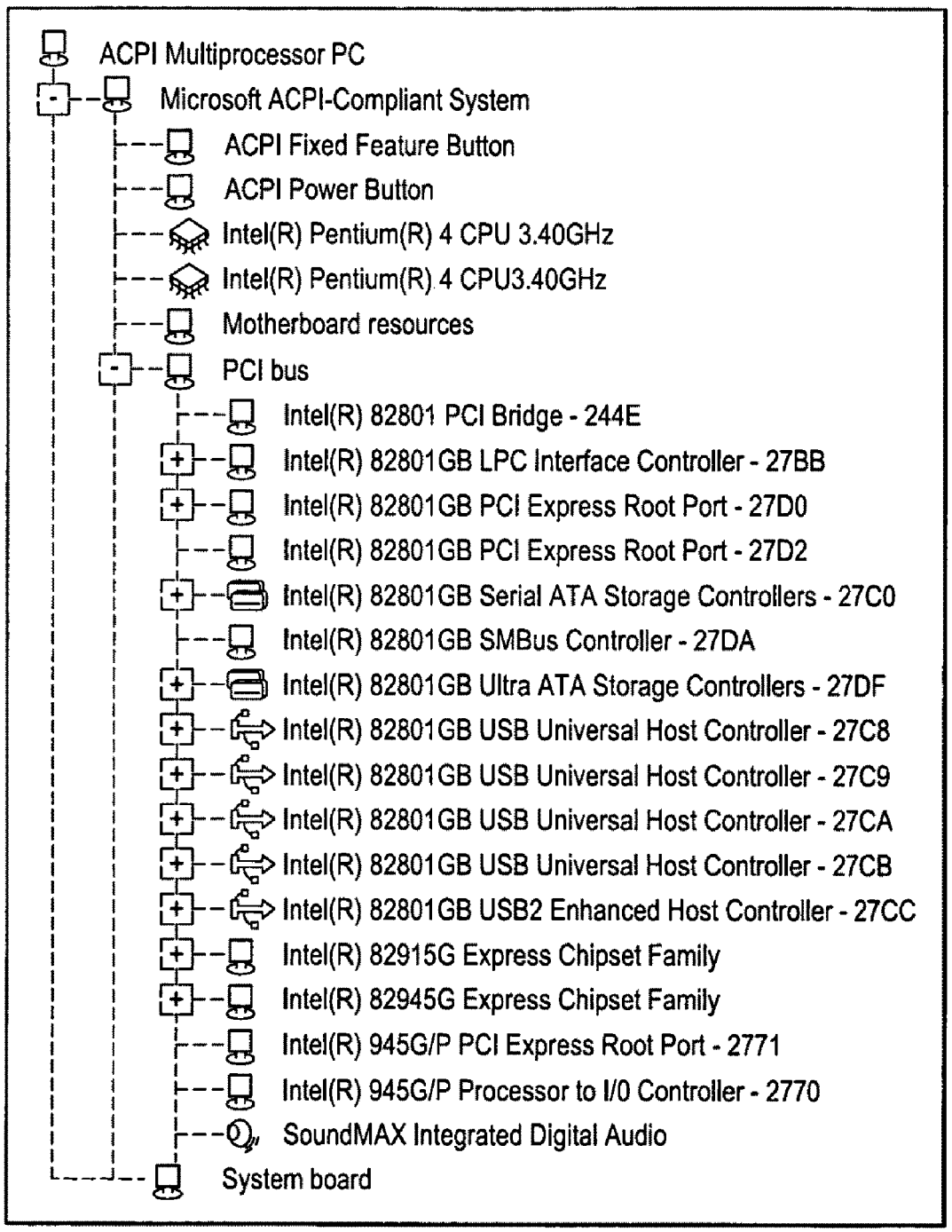
FIG. 24 depicts Typical PCI System Tree.
Figure 25A:
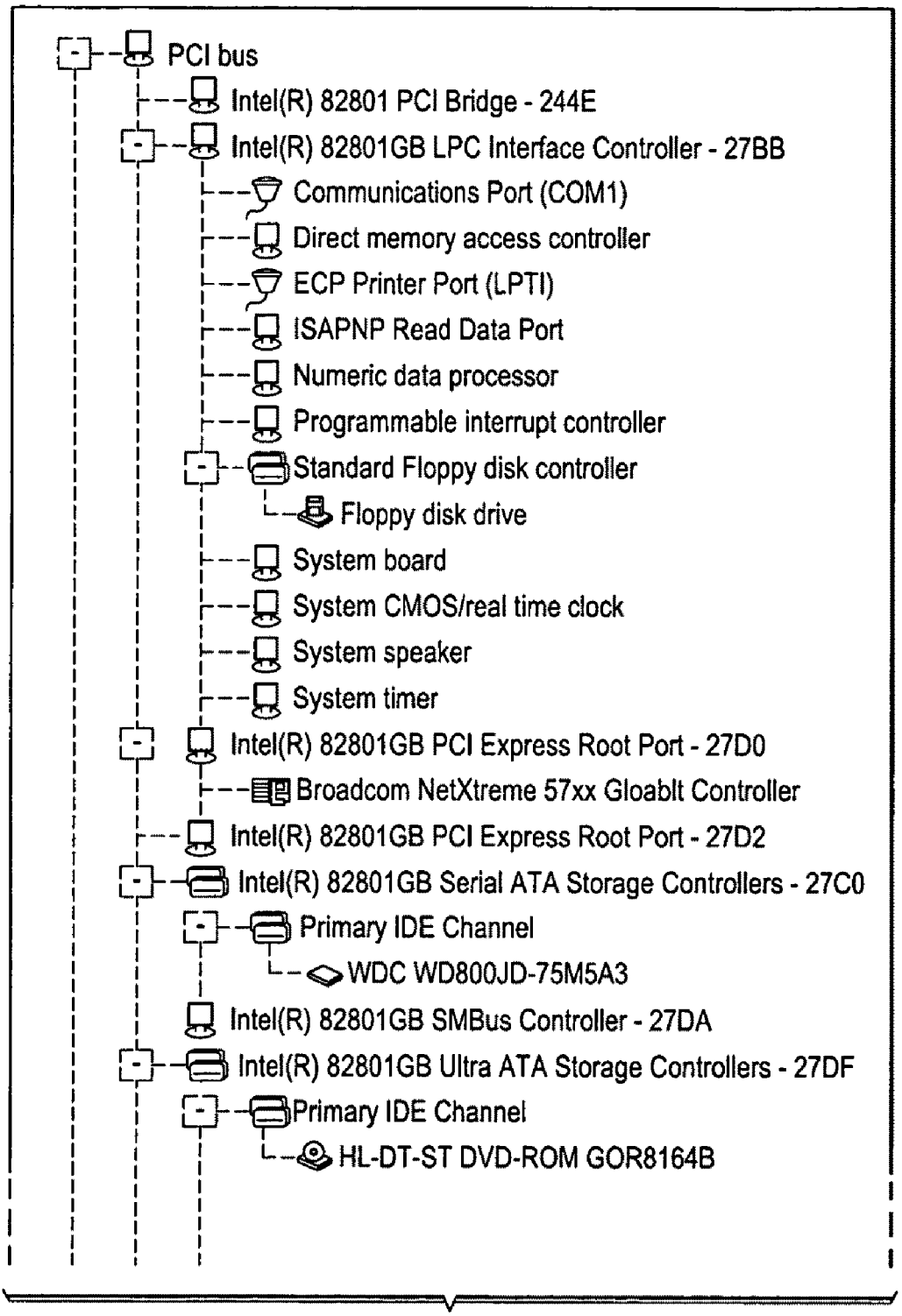
FIG. 25 depicts Typical PCI System Tree—Expanded.
Figure 25B:
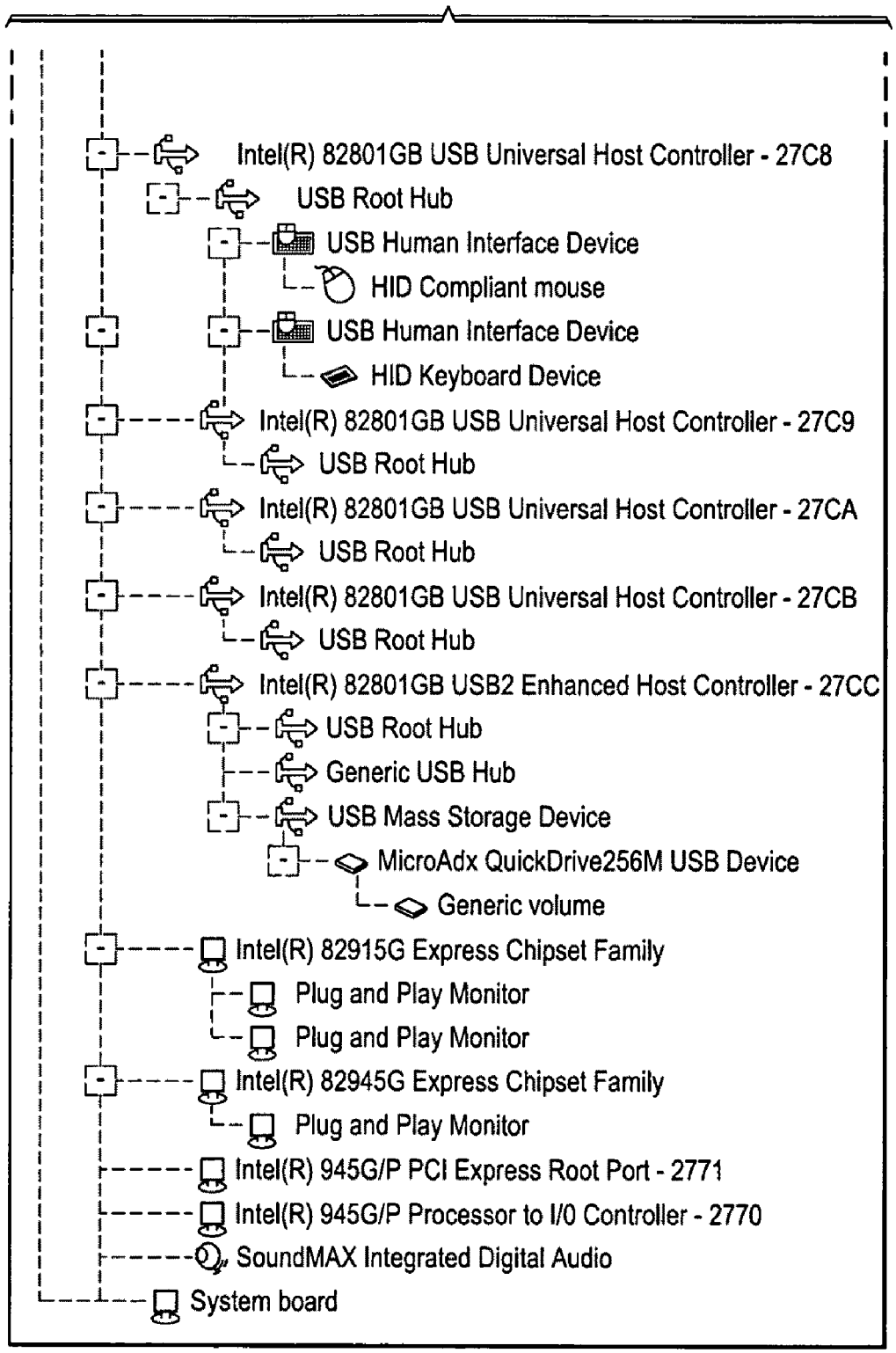
Figure 27A:
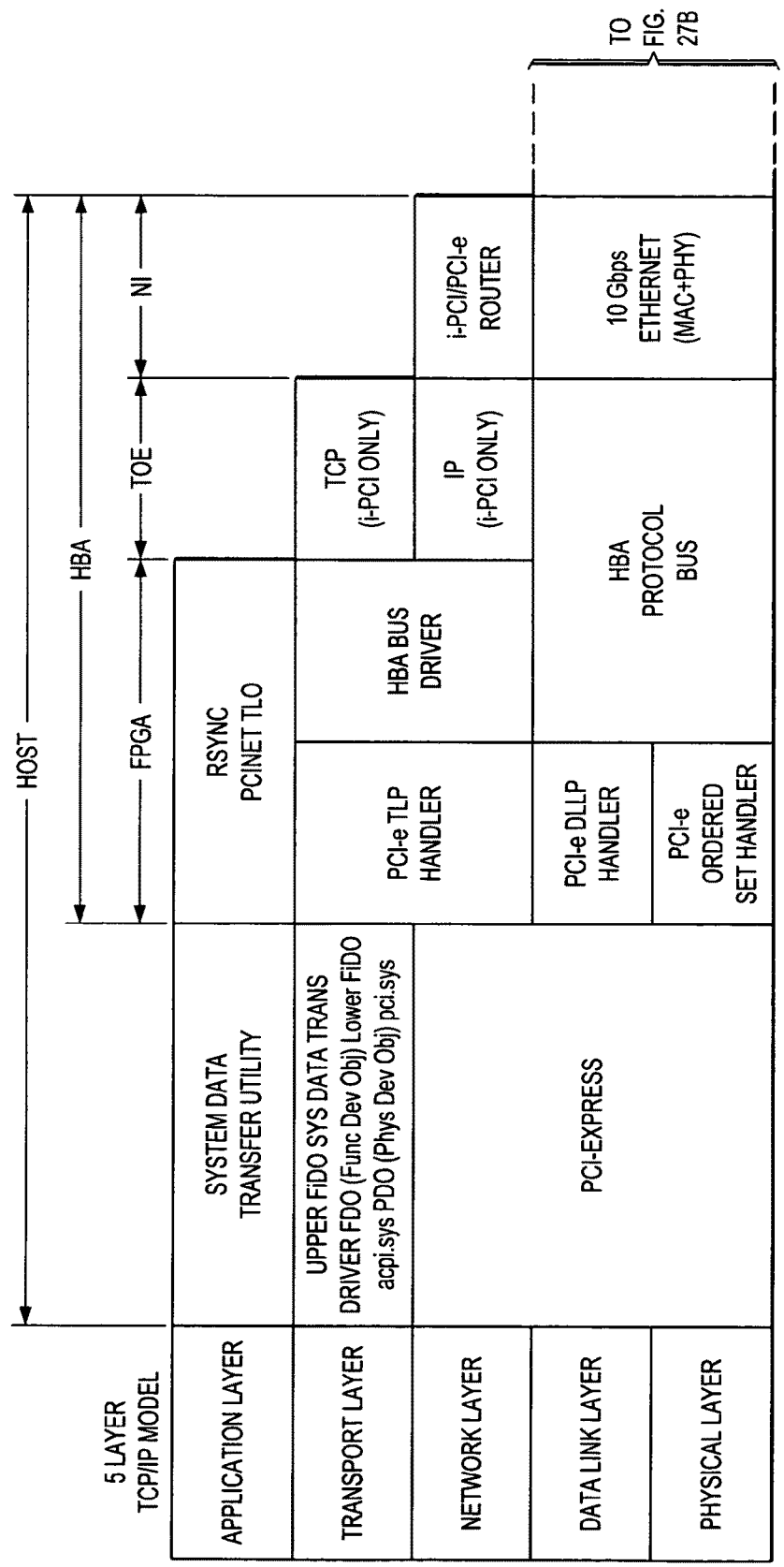
FIG. 27 depicts Corresponding I/O Resource Window.
Figure 27B:
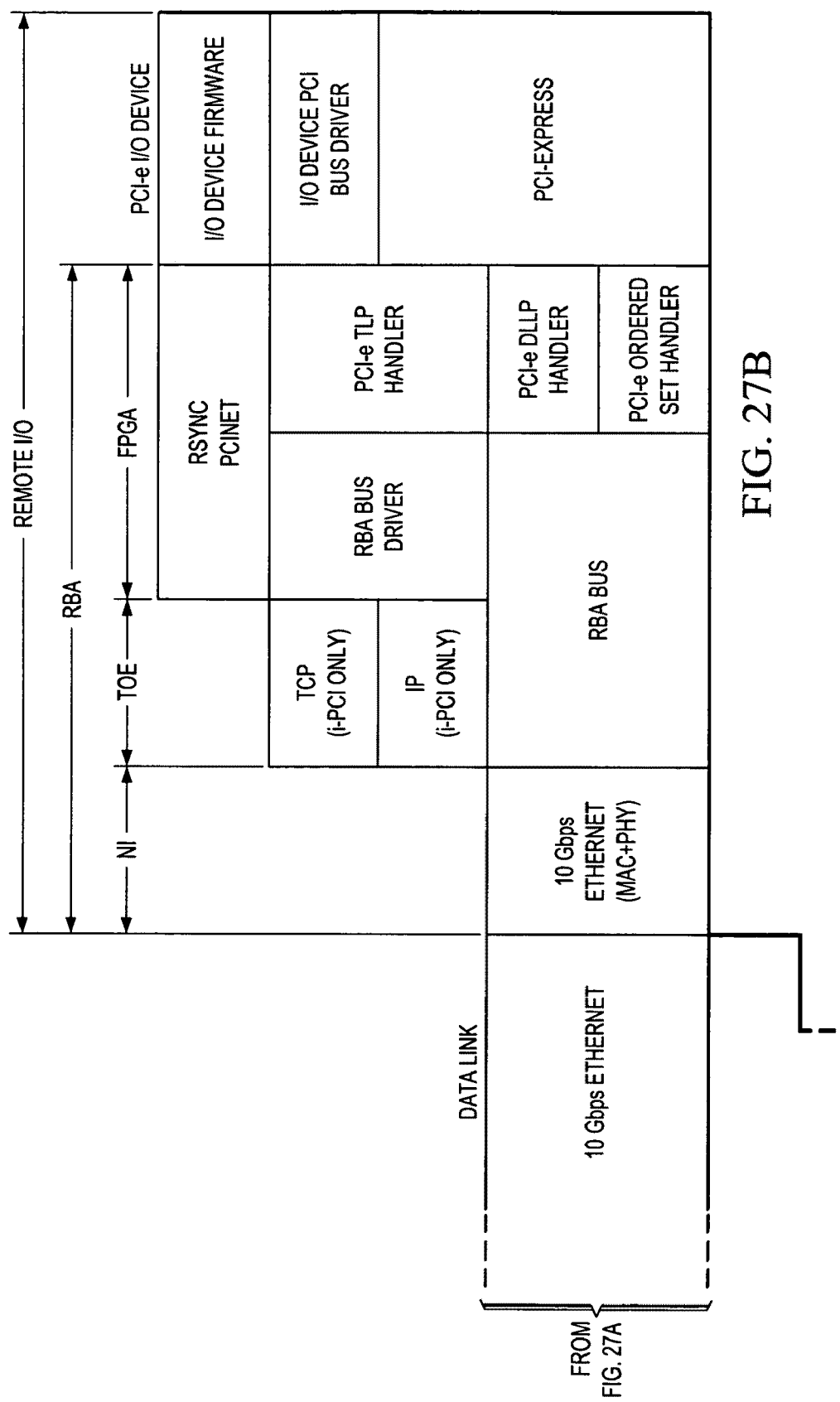
Figure 27C:
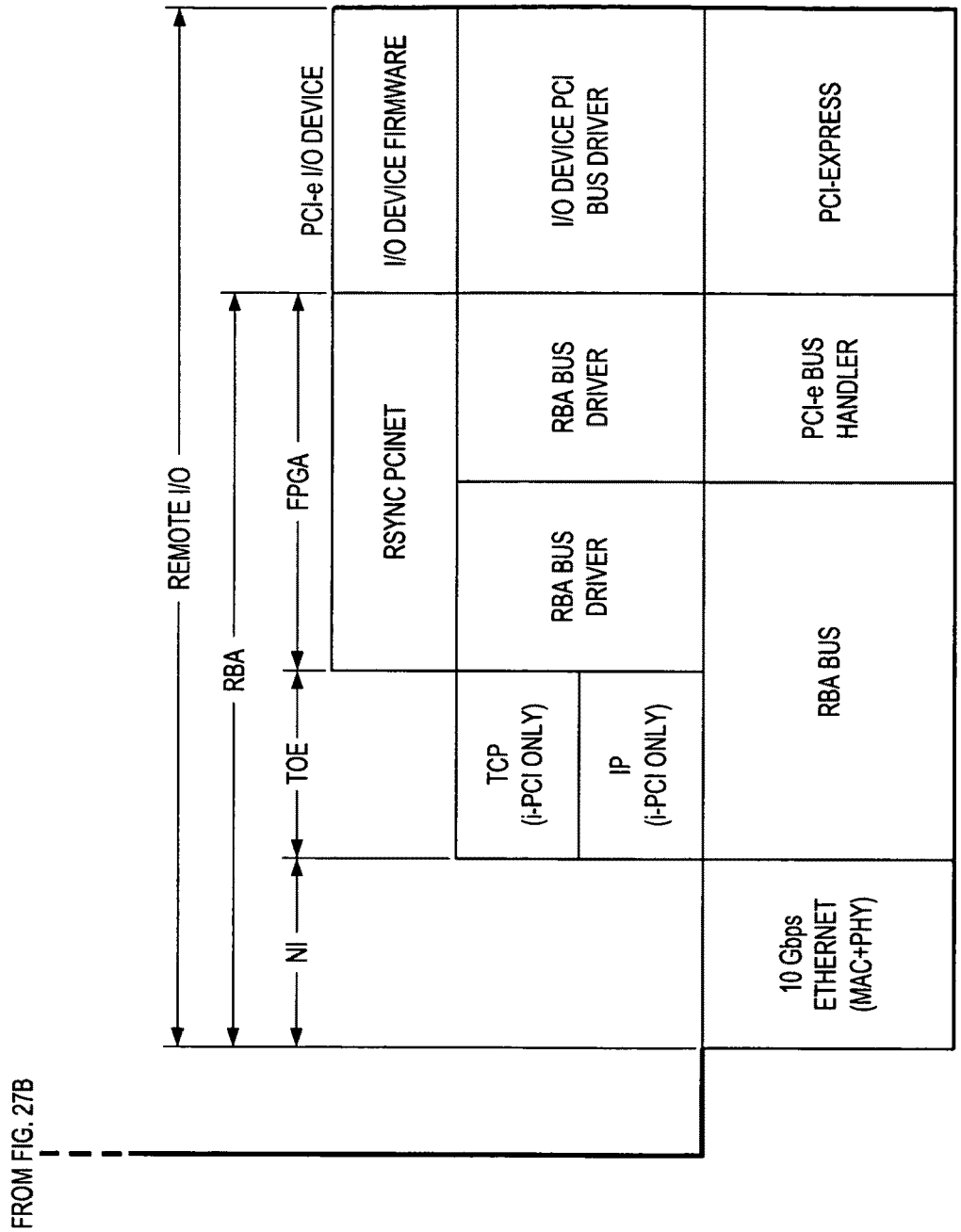

Following the PCI Bus Driver re-scan process, the Operating system Device Manager associates each I/O device with a valid PCI driver. FIG. 24 shows a typical PCI system tree resulting from the configuration, initialization and resource assignment at system startup. FIG. 25 shows the same tree expanded out to show end devices. FIG. 26 shows the corresponding memory resource window. FIG. 27 shows the corresponding I/O resource window. The i-PCI HBA System Mirror must interact properly with this system startup process to ensure remote resources are reflected locally and memory and I/O windows assigned accurately. From these figures it is readily apparent that the PCI system is wholly integrated into the host and forms the backbone of the computer's I/O architecture. i-PCI, by enabling a virtual extension of this core backbone, provides for an intimate expansion of the host architecture.

Application Access

After the Operating System completes enumeration and loads a Device PCI Driver an application running on the host system can include the device driver to perform tasks. The application is unaware of any additional protocol steps associated with i-PCI. All it is aware of is the expected interface to the device driver.

Address Mapping

This section describes how address mapping is handled for the three different implementations.

PCI←→IP Address Mapping for I-PCI

The System Data Transfer Optimization Utility (refer to section on System Operation) initializes the PCI ☐ ☐ IP Address Mapping Table. This table is essentially a cross reference for use by the i-PCI implementation option. A copy of the PCI ☐ ☐ IP Address Mapping Table is stored on all HBAs and RBAs. This table provides the IP address that corresponds to a given PCI Bus (or segment) on the PCI System Tree. See Table 15, Example PCI ☐ ☐ IP Address Mapping.

- The HBA or RBA reads the incoming PCI TLP and determines the required PCI System routing and associated egress port to reach the intended device or memory location. The determination of the egress port is per the PCI Express Specification, as established during system initialization.
- An example location might be "PCI bus 11, device 31, function 6". The HBA or RBA cross-references this PCI System location to identify the IP address associated with the location.
- The HBA or RBA uses this information to form a PCI Bus traffic packet and passes the packet along with the associated IP address to the TOE for transmission across the network link.

TABLE 15

Example PCI ←→ IP Address Mapping

| PCI Device | PCI LOCATION | RBA or HBA IP ADDRESS | PHYSICAL LOCATION |
| --- | --- | --- | --- |
| PCI Express Switch: PCI Bridge #1 | PCI bus 1 Device 12 Function 0 | HBA: 00-0A-E6-4D-52-C7 | Host |
| PCI Express Switch: PCI Bridge #2 | PCI bus 2 Device 1 Function 0 | HBA: 00-0A-E6-4D-52-C7 | Host |
| PCI Bridge | PCI bus 3 Device 1 Function 0 | HBA: 00-0A-E6-4D-52-C7 | Host |
| PCI Bridge | PCI bus 8 Device 1 Function 0 | RBA: 00-1A-92-DF-BF-F3 | Remote I/O, #1 |
| PCI Express Switch: PCI Bridge #1 | PCI bus 9 Device 1 Function 0 | RBA: 00-1A-92-DF-BF-F3 | Remote I/O, #1 |
| PCI Express Switch: PCI Bridge #2 | PCI bus 10 Device 1 Function 0 | RBA: 00-1A-92-DF-BF-F3 | Remote I/O, #1 |
| I/O Circuit Card PCI Device X | PCI bus 11 Device 1 Function 0 | RBA: 00-1A-92-DF-BF-F3 | Remote I/O, #1 |
| PCI Bridge | PCI bus 16 Device 1 Function 0 | RBA: 00-4A-F2-54-86-D6 | Remote I/O, #2 |
| PCI Express Switch: PCI Bridge #1 | PCI bus 17 Device 1 Function 0 | RBA: 00-4A-F2-54-86-D6 | Remote I/O, #2 |
| PCI Express Switch: PCI Bridge #2 | PCI bus 18 Device 1 Function 0 | RBA: 00-4A-F2-54-86-D6 | Remote I/O, #2 |
| I/O Circuit Card PCI Device Y | PCI bus 19 Device 1 Function 0 | RBA: 00-4A-F2-54-86-D6 | Remote I/O, #2 |

PCI←→MAC Address Mapping for I(E)-PCI

The System Data Transfer Optimization Utility (refer to section on System Operation) initializes the PCI ☐ ☐ MAC Address Mapping Table. It is analogous to the PCI ☐ ☐ IP Address Mapping Table, only this cross reference is utilized for the i(e)-PCI implementation. A copy of the PCI ☐ ☐ MAC Address Mapping Table is stored on all HBAs and RBAs. This table provides the MAC address that corresponds to a given PCI Bus (or segment) on the PCI System Tree. See Table 16, Example PCI ☐ ☐ MAC Address Mapping.

- The HBA or RBA reads the incoming PCI TLP and determines the required PCI System routing and associated egress port to reach the intended device or memory location. The determination of the egress port is per the PCI Express Specification, as established during system initialization.
- An example location might be "PCI bus 11, device 31, function 6". The HBA or RBA cross references this PCI System location to identify the MAC address associated with the location.
- The HBA or RBA uses this information to form a PCI Bus traffic packet and passes the packet along with the associated MAC address to the TOE for transmission across the network link.

TABLE 16

Example PCI ☐ ☐ MAC Address Mapping

| PCI Device | PCI LOCATION | RBA or HBA MAC ADDRESS | PHYSICAL LOCATION |
| --- | --- | --- | --- |
| PCI Express Switch: PCI Bridge #1 | PCI bus 1 Device 12 Function 0 | HBA: 192.168.0.1 | Host |
| PCI Express Switch: PCI Bridge #2 | PCI bus 2 Device 1 Function 0 | HBA: 192.168.0.1 | Host |
| PCI Bridge | PCI bus 3 Device 1 Function 0 | HBA: 192.168.0.1 | Host |
| PCI Bridge | PCI bus 8 Device 1 Function 0 | RBA: 192.168.0.2 | Remote I/O, #1 |
| PCI Express Switch: PCI Bridge #1 | PCI bus 9 Device 1 Function 0 | RBA: 192.168.0.2 | Remote I/O, #1 |
| PCI Express Switch: PCI Bridge #2 | PCI bus 10 Device 1 Function 0 | RBA: 192.168.0.2 | Remote I/O, #1 |
| I/O Circuit Card PCI Device X | PCI bus 11 Device 1 Function 0 | RBA: 192.168.0.2 | Remote I/O, #1 |
| PCI Bridge | PCI bus 16 Device 1 Function 0 | RBA: 192.168.0.3 | Remote I/O, #2 |
| PCI Express Switch: PCI Bridge #1 | PCI bus 17 Device 1 Function 0 | RBA: 192.168.0.3 | Remote I/O, #2 |
| PCI Express Switch: PCI Bridge #2 | PCI bus 18 Device 1 Function 0 | RBA: 192.168.0.3 | Remote I/O, #2 |
| I/O Circuit Card PCI Device Y | PCI bus 19 Device 1 Function 0 | RBA: 192.168.0.3 | Remote I/O, #2 |

Address Mapping for I(DC)-PCI

Address mapping for I(dc)-PCI is very simple. In that a direct connection is made and there is no network switching involved so no mapping is necessary. The PCI Express address of a device located in the remote I/O translates directly as a PCI bus/device/function location.

I-PCI Software Protocol Suite and Model

Figure 28:
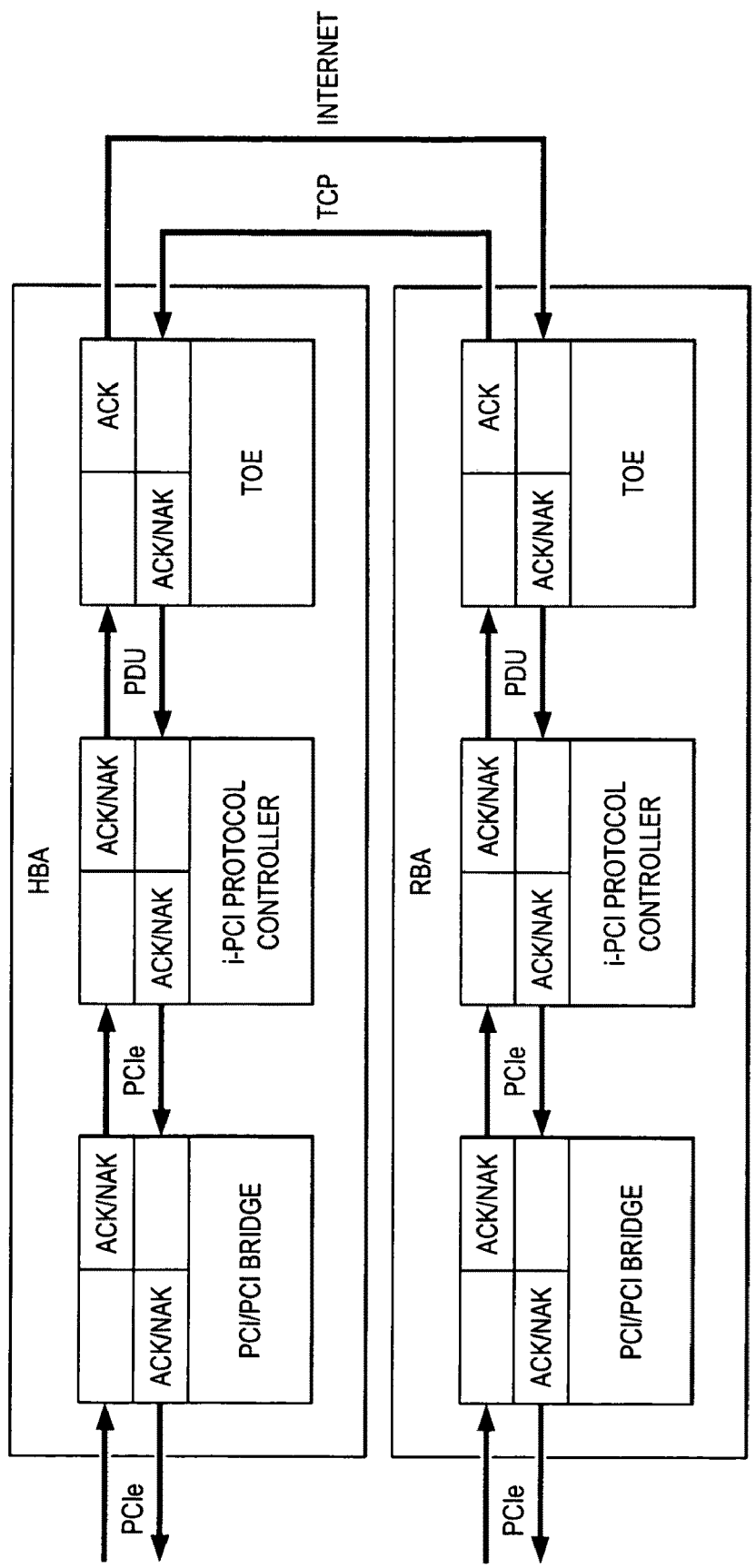
FIG. 28 depicts i-PCI Protocol Model.

The i-PCI protocol software is not a simple monolithic solution. It is a suite consisting of several software and firmware components working together at various networking layers. Refer to FIG. 28, i-PCI Protocol Model for a diagram of the relationship between components in the suite. The protocol consists of the following components:

Application Layer

System Data Transfer Utility: The System Data Transfer Optimization Utility is a boot-disk user-launched program that runs following the BIOS scan and configuration of the PCI System. The utility takes user input information regarding the system configuration and optimization goals, scans the system, initializes the HBA Remote Device Resource Cache Reflector/Mapper (RCR/M), tunes the data pipeline according to a desired performance emphasis, and displays the configuration results.

RSYNC: This is an application that runs in HBA PCIe ☐ ☐ i-PCI Protocol Controller and in the RBA Remote Host PCIe i-PCI Protocol Controller. The HBA includes a complete PCI System mirror (resource cache reflector/mapper or "RCR/M") of all remote PCI bridges and PCI device configuration registers. RSYNC accomplishes resource configuration, maintenance, and synchronization between the HBA RCR/M and the remote resources. It is the source and receptor of the data contained in i-PCI traffic packets.

PCINET: This is an application that runs in both the HBA PCIe ☐ ☐ i-PCI Protocol Controller and in the RBA Remote Host PCIe ☐ ☐ i-PCI Protocol Controller. PCI-NET is responsible for sending/receiving PCI Express TLPs on an interface to the PCIe TLP Handler, and sending/receiving link data from the HBA bus driver or RBA bus driver. PCINET determines the appropriate connection for data transfer (TCP in the case of i-PCI, or 10 Gbps Ethernet in the case of i(e)-PCI or i(dc)-PCI) PCINET establishes and manages multiple connections and performs data striping to maximize data transfer performance.

TLO: This is an application that runs in HBA PCIe ☐ ☐ i-PCI Protocol Controller. The TLO optimizes I/O performance over time by monitoring data transfers and making dynamic adjustment to the transfer pipeline configuration to tailor the pipeline to the prevalent data transfer type.

Transport/Network Layers

System Data Transfer Driver: This is an upper filter driver object that can be loaded to run automatically during the host operating system enumeration of the PCI System. During OS initialization, it automatically verifies and adjusts settings according to a referenced table previously defined by the System Data Transfer Optimization Utility. It also runs resident during normal operation intercepting/modifying data intended for the PCI system as necessary to facilitate the particular i-PCI implementation.

PCIe TLP Handler: This is logic implemented in both the HBA PCIe ☐ ☐ i-PCI Protocol Controller and in the RBA Remote Host PCIe ☐ ☐ i-PCI Protocol Controller. The PCIe TLP Handler accepts the PCI Express packets that originate and terminate at the transaction layer. Packets are passed up to PCINET for transfer across the network or accepted from PCINET for transfer across the local PCI Express bus.

HBA Bus Driver: This firmware is implemented in the HBA PCIe ☐ ☐ i-PCI Protocol Controller. The driver interfaces PCINET and RSYNC to the HBA Bus for transfer to/from the TOE (i-PCI, i(e)-PCI) or directly to the 10 Gbps MAC+PHY (i(dc)-PCI).

i-PCI/PCIe Router: This simple switch function is implemented in the HBA network interface controller. It inspects incoming packets coming across the data link and determines whether they are i-PCI packets or standard network traffic packets. If they are i-PCI packets they are routed to the HBA PCIe i-PCI Protocol Controller; if they are standard network traffic packets, they are routed to the HBA PCI Express Switch.

RBA Bus Driver: This firmware is implemented in the RBA PCIe ☐ ☐ i-PCI Protocol Controller. The driver interfaces PCINET and RSYNC to the RBA Bus for transfer to/from the TOE (i-PCI, i(e)-PCI) or directly to the 10 Gbps MAC+PHY (i(dc)-PCI).

Data Link/Physical Layer

PCIe DLLP Handler: This is logic implemented in both the HBA PCIe ☐ ☐ i-PCI Protocol Controller and in the RBA Remote Host PCIe ☐ ☐ i-PCI Protocol Controller. The PCIe DLLP Handler accepts the local PCI Express packets that originate and terminate at the data link layer and performs the appropriate actions as defined by the PCI Express Specification. It also contributes to the TLP assembly and disassembly as defined by the PCI Express Specification. The PCIe DLLP Handler forms the Link PDUs for the supported PCI Express DLLP functions. Data buffering and queuing necessary to bridge between local PCI Express links and TCP is implemented in the PCIe DLLP Handler.

PCIe Physical Layer Packet (Ordered Sets) Handler: This is logic implemented in both the HBA PCIe ☐ ☐ i-PCI Protocol Controller and in the RBA Remote Host PCIe ☐ ☐ i-PCI Protocol Controller. The PCIe TLP Handler accepts the local PCI Express packets that originate and terminate at the physical layer and performs the appropriate actions as defined by the PCI Express Specification. It also processes the TLPs and DLPs—including 8B/10B encoding/decoding and byte striping—per the PCI Express Specification.

I-PCI ACK/NAK Protocol: Reliable Network Transport

The purpose of i-PCI ACK/NAK Protocol is to ensure the reliable transport of PCI Express Transaction Layer packets (TLPs) across the network for the various implementations. The i-PCI ACK/NAK protocol bridges the PCI Express ACK/NAK protocol and the TCP ACK protocol in the case of the i-PCI implementation. The i-PCI ACK/NAK protocol supports the PCI Express ACK/NAK protocol across the switched Ethernet and direct connect cable in the case of i(e)-PCI and I-(dc)-PCI respectfully. The goal is to ensure that the TLPs received at the transaction layer of the destination are presented error-free in the same order that the source sent them. PCI Express requires the preservation of the sending order within each virtual channel, regardless of any errors across the network link requiring a resend.

The i-PCI ACK/NAK protocol utilizes the Link PDU, subtype PDS. PCI Express ACK and NAK protocol support is a key function handled by this subtype. Refer back to FIG. 22, PCI Express DLLP Support (PDS) PDU and the associated PDU Header field tables.

Figure 29:
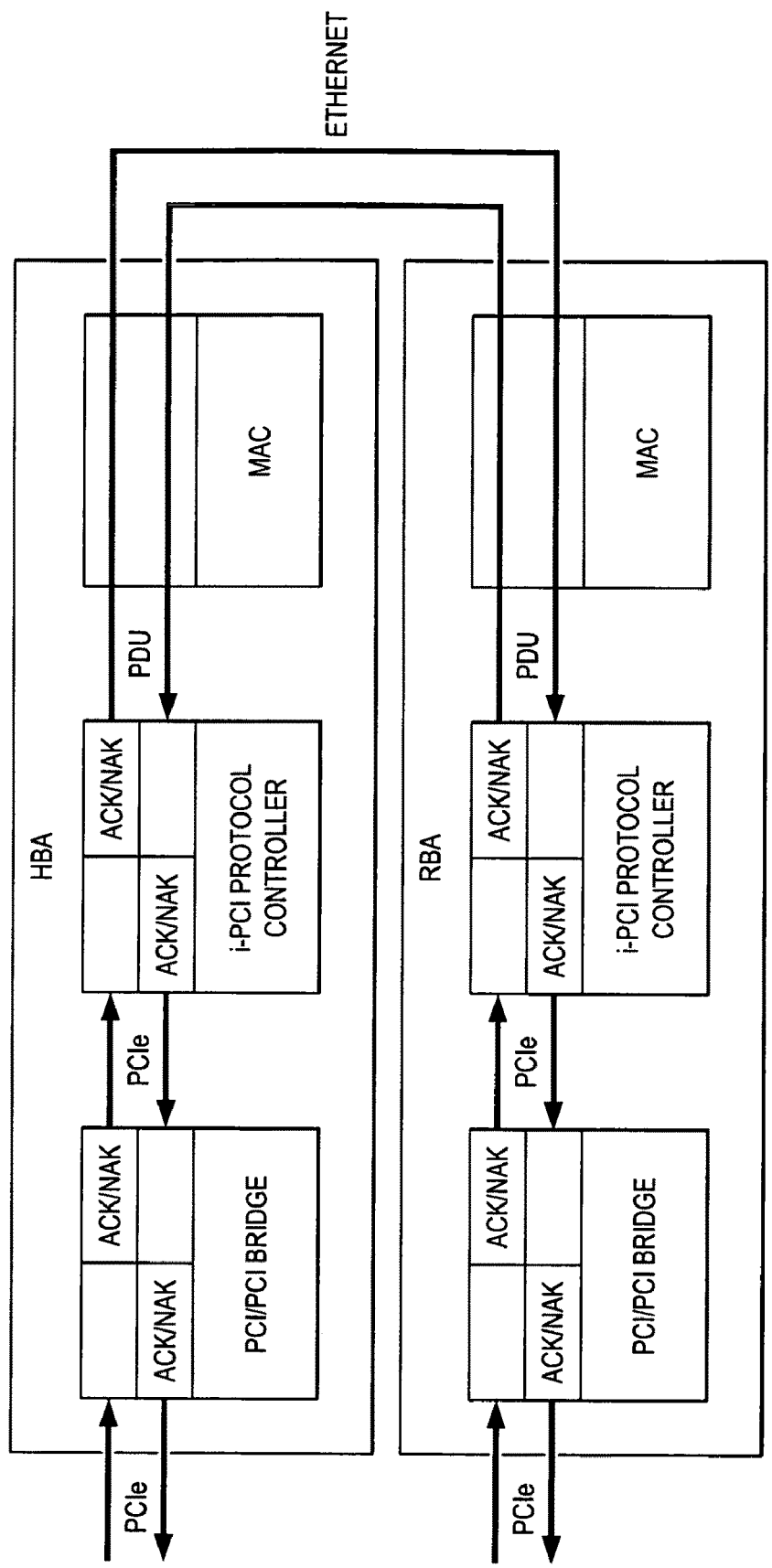
FIG. 29 depicts i-PCI ACK/NAK Overview.

ACK/NAK Protocol:

i-PCI implementation: See FIG. 29, i-PCI ACK/NAK Overview. TCP is leveraged for flow control and ensures proper sequencing of transactions across the IP-based network. However, ACK and NAK of PCI Express TLPs according to the TLP sequence number is still required for error checking, as the TCP checksum is too weak to be relied upon for PCI transactions. So, the LCRC field in the PCI Express TLP is utilized. However, the PCI Express ACK/NAKs do not travel across the network link in the i-PCI implementation. Received TLPs are checked for data integrity by the data link layer logic on the i-PCI side of the receiving bridge. Meanwhile, the TOE holds up the corresponding TCP ACK until the receiving bridge confirms the data integrity of the PCI Express TLP. The receiving bridge responds with a PCI Express DLLP ACK or NAK as appropriate. The PCIe DLLP Handler receives the PCI Express ACK or NAK and uses it to form a Link PDU ACK or NAK. The i-PCI Protocol Controller cross-references the ACK or NAK to the IP address for the source. It then generates the IP address that corresponds to the source and fills in the IP address field on the Link PDU. This Link PDU is sent to the TOE.

In the case of an ACK: The TOE responds by sending out a TCP ACK that specifies the next octet it needs to receive (the next octet after the PDU that was received successfully). Both TCP and PCI Express allow collective acknowledgement or "ACK coalescing". When the TOE at the other end receives the TCP ACK, it forms a Link PDU ACK and inserts the corresponding last received good PCI Express sequence number (the TOE must keep a running cross reference of TCP ACKed segments vs. PCI Express ACKed and NAKed TLPs). The PCIe DLLP Handler receives the Link PDU ACK from the TOE and translates it into a properly formatted PCI Express ACK and passes it to the original sending bridge. The bridge processes the ACK and purges the associated TLP(s) from its replay buffer as a result of the successful transmission.

In the case of a NAK: A NAK should be a fairly rare occurrence, as the TCP checksum will provide the first line of defense/error detection. If the TOE receives a Link PDU NAK, the corresponding TCP segment is discarded. The original sending TOE will resend the segment when its corresponding TCP timer expires. When the timer expires, the original TOE forms a Link PDU NAK and inserts the last received good PCI Express sequence number (the TOE must keep a running cross reference of TCP ACKed segments vs. PCI Express ACKed and NAKed TLPs). The PCIe DLLP Handler receives the Link PDU NAK from the TOE and translates it into a properly formatted PCI Express NAK and passes it to the original sending bridge. The bridge processes the NAK and resends the outstanding TLP(s) in its replay buffer beginning with the last received good sequence number +1.

Figure 30:
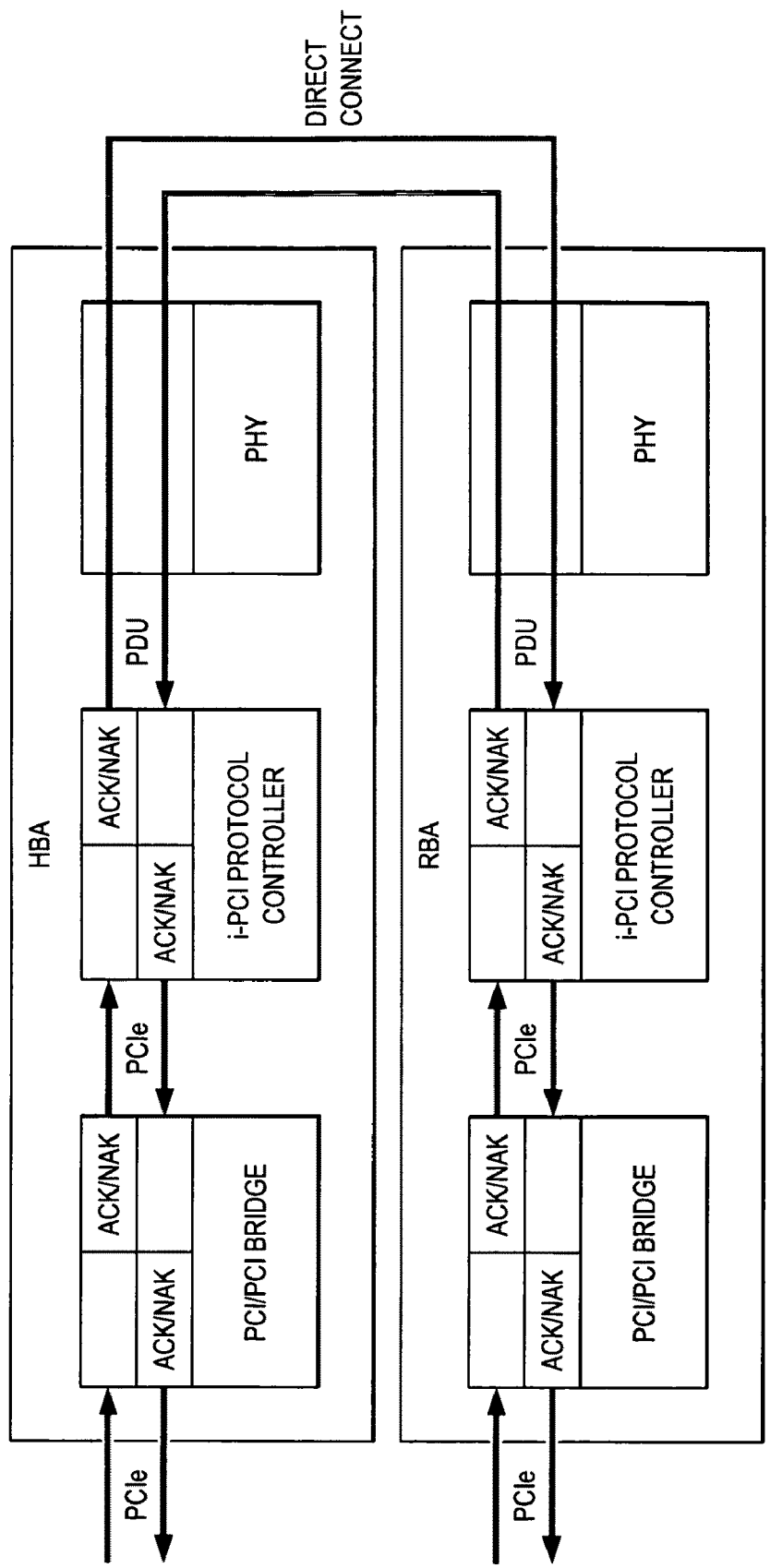
FIG. 30 depicts i(e)-PCI ACK/NAK Overview.

The PCI Express Replay Timer in the original sending bridge will typically expire as a result of the extra time it will take to receive back an ACK via TCP. Upon expiration of the Replay Timer, the sending bridge blocks acceptance of new TLPs from the transaction layer and resends the outstanding TLPs in its replay buffer. The PCI Express DLLP Handler is aware of the timer expiration and "understands" that the resend is the result of the extra time needed to return a TCP ACK across the network. It intercepts the resends and does not pass them on to the TOE. The PCI Express protocol allows up to 4 expirations of the timer before going into a link retraining state. In event that the replay timer expires 4 times and goes into a link retrain state, the PCI Express DLLP Handler spoofs the link retrain sequence to reset the replay count. The "Replay Timeout" and "Replay Number Rollover" errors that result are both classified as a "Correctable Error" by PCI Express. The reporting of these errors is optional and for i-PCI they will be disabled by clearing the "Correctable Error Reporting Enable" bit in the Device Control Register. Thus, the extra time necessary to return an ACK/NAK is managed locally and transparent to the host.

i(e)-PCI implementation: See FIG. 30, i(e)-PCI ACK/NAK Overview. Since TCP is not used in this implementation, it cannot be leveraged for flow control and ensuring proper sequencing of transactions across the switched Ethernet network. Therefore with i(e)-PCI, the link PDU supports the PCI Express ACK and NAK protocol across the network link. Received TLPs are checked for data integrity by the data link layer logic on the i-PCI side of the receiving bridge. The receiving bridge responds with a PCI Express DLLP ACK or NAK as appropriate. The PCIe DLLP Handler receives the PCI Express ACK or NAK and uses it to form a Link PDU ACK or NAK and sets the i(e)-PCI ID in the header to ensure the packet is sent over the network by the NIC. The i-PCI Protocol Controller cross-references the ACK or NAK to the MAC address for the source. It then generates the MAC address that corresponds to the source and fills in the MAC address field on the Link PDU. The link PDU is passed on to the 10 Gbps MAC since the i(e)-PCI ID is set.

In the case of an ACK: The MAC sends out the Link PDU ACK that specifies the next octet the receiving bridge is looking for (the next octet after the last PDU that was received successfully). When the MAC at the other end receives the Link PDU ACK, it passes it on for transport across the Protocol bus to the PCIe DLLP Handler. The PCIe DLLP Handler receives the Link PDU ACK from NIC and translates it into a properly formatted PCI Express ACK and passes it to the original sending bridge. The bridge processes the ACK and purges the associated TLP(s) from its replay buffer as a result of the successful transmission.

In the case of a NAK: The MAC sends out the Link PDU NAK that specifies the last octet the receiving bridge received successfully. When the MAC at the other end receives the Link PDU NAK, it passes it on for transport across the Protocol bus to the PCIe DLLP Handler. The PCIe DLLP Handler receives the Link PDU NAK from the NIC and translates it into a properly formatted PCI Express NAK and passes it to the original sending bridge. The bridge processes the NAK and resends the outstanding TLP(s) in its replay buffer beginning with the last received good sequence number +1.

Figure 31:
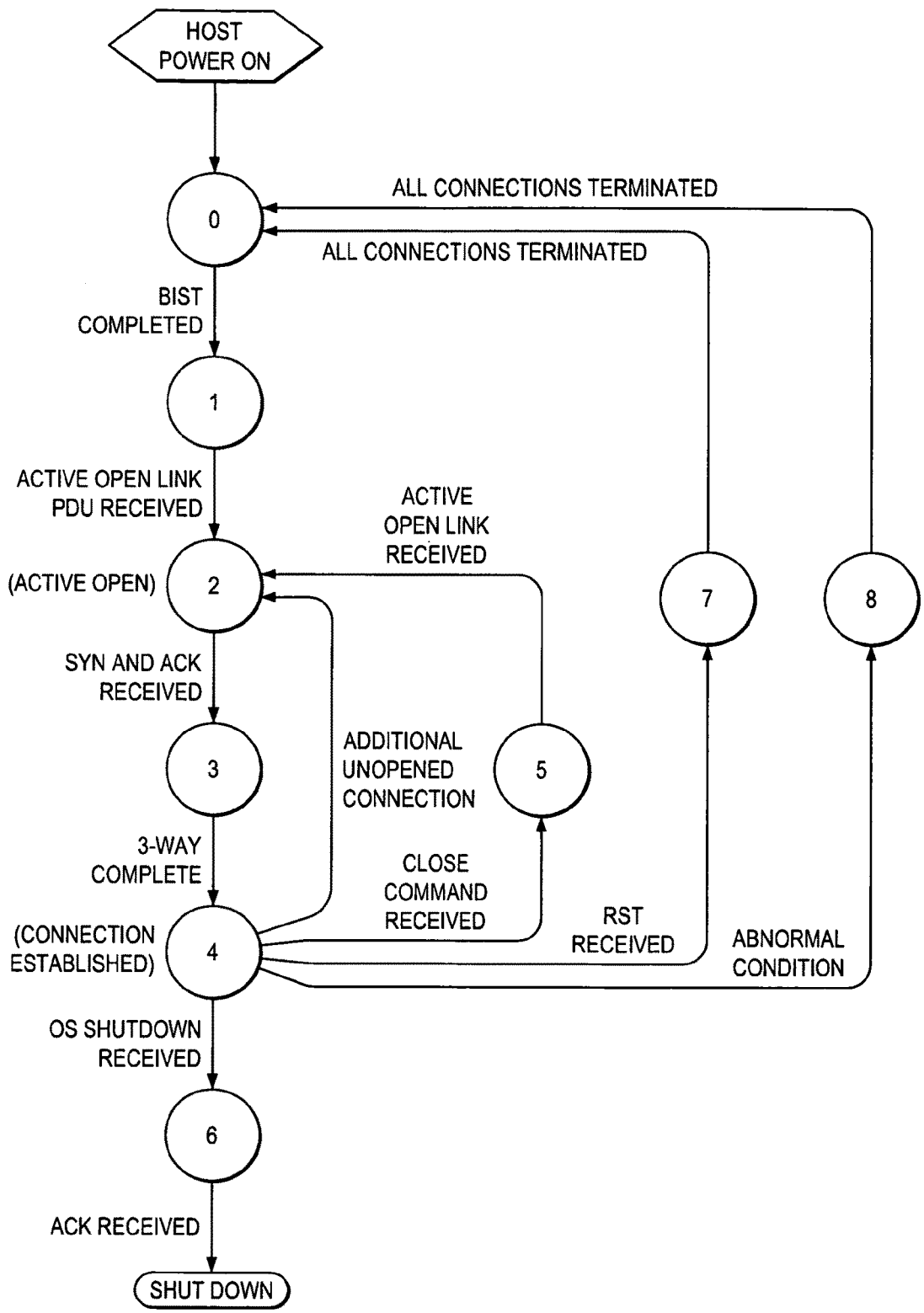
FIG. 31 depicts i(dc)-PCI ACK/NAK Overview.

The PCI Express Replay Timer in the original sending bridge will typically expire even in the case of the i(e)-PCI implementation as a result of the extra time it will take to receive back an ACK via switched Ethernet. Upon expiration of the Replay Timer, the sending bridge blocks acceptance of new TLPs from the transaction layer and resends the outstanding TLPs in its replay buffer. The PCI Express DLLP Handler is aware of the timer expiration and "understands" that the resend is the result of the extra time needed to return an ACK across the network. It intercepts the resends and does not pass them on. The PCI Express protocol allows up to 4 expirations of the timer before going into a link retraining state. In event that the replay timer expires 4 times and goes into a link retrain state, the PCI Express DLLP Handler spoofs the link retrain sequence to reset the replay count. The "Replay Timeout" and "Replay Number Rollover" errors that result are both classified as a "Correctable Error" by PCI Express. The reporting of these errors is optional and for i(e)-PCI they will be disabled by clearing the "Correctable Error Reporting Enable" bit in the Device Control Register. Thus, the extra time necessary to return an ACK/NAK is managed locally and transparent to the host.

i(dc)-PCI implementation: See FIG. 31, i(dc)-PCI ACK/ NAK Overview. Since TCP is not used in this implementation either, it cannot be leveraged for flow control and ensuring proper sequencing of transactions across the external link. Therefore with i(dc)-PCI, the link PDU supports the PCI Express ACK and NAK protocol across the direct CATx cable connection. Received TLPs are checked for data integrity by the data link layer logic on the i-PCI side of the receiving bridge. The receiving bridge responds with a PCI Express DLLP ACK or NAK as appropriate. The PCIe DLLP Handler receives the PCI Express ACK or NAK and uses it to form a Link PDU ACK or NAK and sets the i(dc)-PCI ID in the header to ensure the packet is sent over the direct connection by the NIC. There is no address field to fill out with the i(dc)-PCI Implementation. The link PDU is passed on to the 10 Gbps MAC, which passes it through to the PHY, unmodified.

In the case of an ACK: The PHY sends out the Link PDU ACK that specifies the next octet the receiving bridge is looking for (the next octet after the last PDU that was received successfully). When the PHY at the other end receives the Link PDU ACK, it passes it on through the MAC for transport across the Protocol bus to the PCIe DLLP Handler. The PCIe DLLP Handler receives the Link PDU ACK from the NIC and translates it into a properly formatted PCI Express ACK and passes it to the original sending bridge. The bridge processes the ACK and purges the associated TLP(s) from its replay buffer as a result of the successful transmission.

In the case of a NAK: The PHY sends out the Link PDU NAK that specifies the last octet the receiving bridge received successfully. When the PHY at the other end receives the Link PDU NAK, it passes it on through the MAC for transport across the Protocol bus to the PCIe DLLP Handler. The PCIe DLLP Handler receives the Link PDU NAK from the NIC and translates it into a properly formatted PCI Express NAK and passes it to the original sending bridge. The bridge processes the NAK and resends the outstanding TLP(s) in its replay buffer beginning with the last received good sequence number +1.

The PCI Express Replay Timer in the original sending bridge may expire even in the case of the i(dc)-PCI implementation as a result of the extra time for relaying the ACK back via the direct CATx connection. Upon expiration of the Replay Timer, the sending bridge blocks acceptance of new TLPs from the transaction layer and resends the outstanding TLPs in its replay buffer. The PCI Express DLLP Handler is aware of the timer expiration and "understands" that the resend is the result of the extra time needed to return an ACK across the direct CATx connection. It intercepts the resends and does not pass them on. The PCI Express protocol allows up to 4 expirations of the timer before going into a link retraining state. This is not expected to happen in the case of the i(dc) implementation as the delay is significantly less than with the i-PCI and i(e)-PCI implementations. As with the other implementations, the extra time necessary to return an ACK/NAK is managed locally to the HBA and is transparent to the host.

Quality of Service and I-PCI Expediting

In PCI Express, Quality of Service (QoS) is implemented via traffic classes (TC) and virtual channels (VC). Up to seven traffic classes (TC0-TC7) and seven virtual channels are allowed. However, only one VC is required (VC0). During host system boot up and initialization, PCI system configuration software determines the capability of the device at each end of a given link to support VCs. The number of VCs the configuration software enables for a given link is the greatest number of VCs the two ends can support in common.

PCI Express device drivers use traffic class (TC0-TC7) as a way to prioritize a transaction for transport. During initialization, the device driver reports the QoS levels it requires for its transactions. The operating system responds with TC assignments for each QoS level it requested. Armed with this association, when the device driver executes a transaction, it includes the TC assignment with the transaction. The TC is inserted in the TLP TC header field.

During initialization the configuration software associates a given TC with a given VC supported by a link. If only one virtual channel (VC0) is supported by a link, all TCs are mapped to the one virtual channel. Configuration software assigns the mapping of TCs to VCs during initialization by setting the appropriate mapping bits in the device VC resource control register (config space offset 114h) for each link. The priority and arbitration scheme assigned to the VCs on a link are also set up during initialization. PCINET has access to the VC and TC configuration. The configuration can vary from one boot up to the next, depending on system updates and changes.

The number of virtual channels supported by i-PCI across the network link depends on the capability and available buffer resources of a given HBA and RBA design. The number of virtual channels supported will range from 1 for a minimal design to 7 for the most capable/high performance design. The capability for a given HBA and RBA design is programmed into the configuration registers of the PCI Bridges at each end of the link and the HBA RCR/M.

Single Channel Support:
  i-PCI implementation: PCINET uses the current VC table to map PCI Express VCs to the limited TCP segment expediting capability for a single connection. The TCP expediting capability allows for three levels of expediting, via the TCP header CODE field. This capability can be utilized for i-PCI.
  Forcing Data Delivery: PCINET can invoke a push operation (TCP header CODE PSH bit set=1) to force TCP to deliver data as small as a byte without waiting for the current TCP data buffer to fill.
  Out of band Data: PCINET can invoke an urgent operation (TCP header CODE URG bit set=1) to instruct TCP to indicate to PCINET on the other end to handle data specified by the urgent pointer as a priority—disregarding the order it is received.
  Urgent Push: PCINET can invoke an urgent push operation (TCP header CODE URG bit set=1 & CODE PSH bit set=1) to force TCP to deliver data as small as a byte without waiting for the current TCP data buffer to fill and to instruct TCP to indicate to PCINET on the other end to handle data specified by the urgent pointer as a priority—disregarding the order it is received.
  Table 17 shows an example mapping between PCIe Traffic Classes and PCIe Virtual Channels and TCP Code Fields.
  i(e)-PCI implementation: PCINET uses the current VC table to establish matching virtual channel buffers and associated traffic classes for the HBA and each RBA. PCI Express QOS strategy is followed. In the case where configuration software sets up only one virtual channel, there is no QOS or expediting capability across the network link.
  i(dc)-PCI implementation: PCINET uses the current VC table to establish matching virtual channel buffers and associated traffic classes for the HBA and each RBA. PCI Express QOS strategy is followed. In the case where configuration software sets up only one virtual channel, there is no QOS or expediting capability across the network link.

TABLE 17

Example PCIe TC/VC/TCP Code Fields Mapping

| Priority Group | Traffic Class (TC) | Virtual Channel (VC) | TCP Header Codes URG | TCP Header Codes PSH | Comments |
|---|---|---|---|---|---|
| Low | TC0 | VC0 | 0 | 0 | No Expedite |
| High | TC1 | VC1 | 1 | 0 | Expedite level: Low |
|  | TC2-TC6 | VC2 | 0 | 1 | Expedite level: Med |
|  | TC7 | VC3 | 1 | 1 | Expedite level: High |

Optional Multiple Channel Support:

i-PCI implementation: PCINET uses the current VC table to map PCI Express VCs to multiple TCP connections. In addition, each of the channels can implement TCP expediting capability, via the TCP header CODE field to achieve further expediting granularity. Table 18 shows an example mapping between PCIe Traffic Classes and PCIe Virtual Channels and Multiple TCP Connections.

TABLE 18

Example PCIe TC/VC Multiple Connection Mapping

| TC | VC | TCP Connection | TCP Header Codes URG | TCP Header Codes PSH | Comments |
|---|---|---|---|---|---|
| TC0 | VC0 | 1 | 0 | 0 | No Expedite |
| TC1 | VC1 | 2 | 1 | 0 | Expedite level: Low |
| TC2-TC6 | VC2 | 3 | 0 | 1 | Expedite level: Med |
| TC7 | VC3 | 4 | 1 | 1 | Expedite level: High | i(e)-PCI implementation: PCINET uses the current VC table to establish matching virtual channel buffers and associated traffic classes for the HBA and each RBA. PCI Express QOS strategy is followed. In the case where configuration software sets up multiple virtual channels, the relative PCI Express QOS is extended across the switched Ethernet.

i(dc)-PCI implementation: PCINET uses the current VC table to establish matching virtual channel buffers and associated traffic classes for the HBA and each RBA. PCI Express QOS strategy is followed. In the case where configuration software sets up multiple virtual channels, the relative PCI Express QOS is extended across the direct connection.

Session Management

Session management involves connection initialization, connection establishment, connection management, and connection termination.

Prior to the first session, the system must be set up via the System Data Transfer Optimization Utility. The System Data Transfer Utility is a boot-disk user-launched program that runs following the BIOS scan and configuration of the PCI System. The utility takes user input information regarding the system configuration and optimization goals, scans the system and initializes the HBA. This initialization defines the remote resources, including bandwidth and data transfer direction requirements for the link between the host and each remote I/O in a setup table. This needs to done prior to first use of a remote I/O. Once the system has been setup the system is powered down in preparation for a reboot.

Session Management begins with host and remote power on. The scenario is fairly involved for i-PCI and very simple for i(e)-PCI and i(dc)-PCI.

I-PCI Session Management

Figure 32:
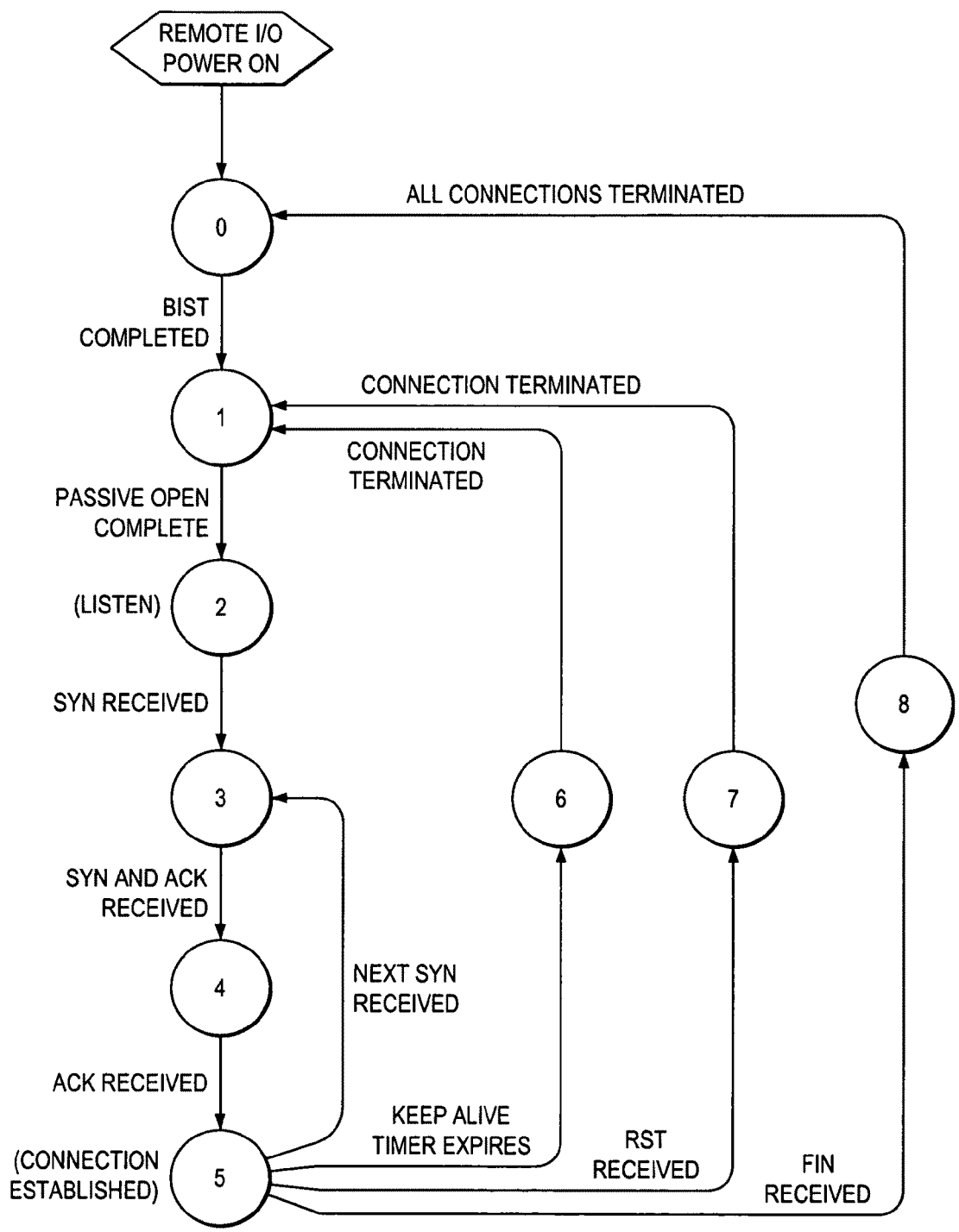
FIG. 32 depicts i-PCI Host Session Management State Diagram.

As the host operating system initializes the PCI system during boot-up and Ethernet auto-negotiation completes, PCINET, running on the HBA, performs an active open function, which is handled by the TOE located on the HBA. Refer to FIG. 32, i-PCI Host Session Management State Diagram, and Table 19, i-PCI Host Session Management State Descriptions.

Figure 33:
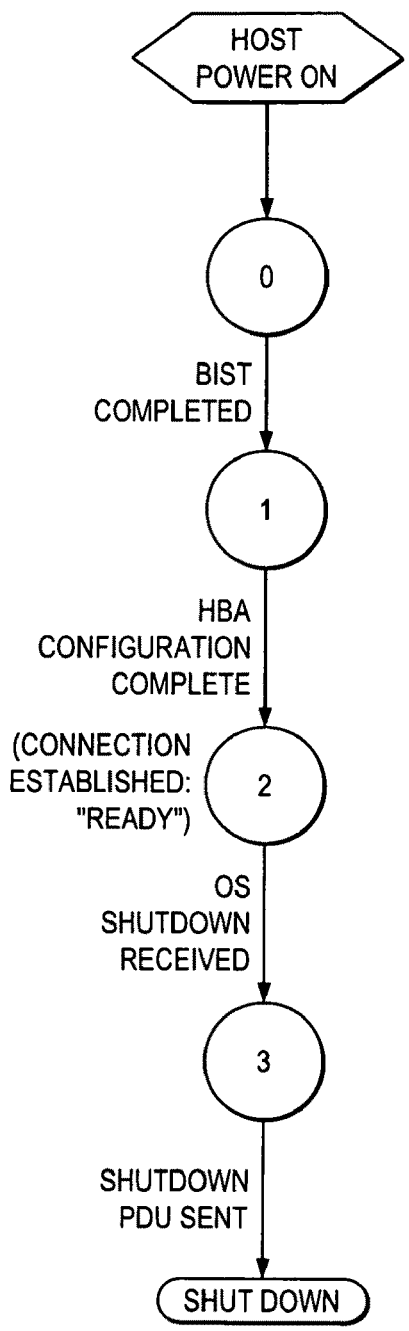
FIG. 33 depicts i-PCI Remote I/O Session Management State Diagram.

All active Remote I/O units have already initialized themselves upon their own power up. PCINET, executing in the RBA, performs a passive open function, which is handled by the TOE located on the RBA. The RBA is left in a listen state, waiting for the first segment of a three-way handshake from the host, to establish a connection. See FIG. 33, i-PCI Remote I/O Session Management State Diagram and Table 20, i-PCI Remote I/O Session Management State Descriptions.

The session that results from the successful completion of the three-way handshake is maintained by PCINET for as long as the host system and remote I/O units remain powered.

Multiple Connections:

PCINET, running on the HBA, can request multiple connections as necessary to optimize data transfer performance.

TABLE 19 i-PCI Host Session Management State Descriptions.

| State | Description |
|---|---|
| 0 | PCINET application resident in the HBA ROM boots up or resets/reboots and performs BIST and saves results for diagnostic purposes. PCINET checks the RCR/M table for the IP address and number of initial TCP connections to establish between the Host and the Remote I/O. PCINET polls the local TOE via the Protocol Bus to verify the TOE is ready to establish a connection. Ethernet auto-negotiation completes. |
| 1 | PCINET forms an active open command Link PDU that includes the number of connections to establish and sends it to the TOE. The TOE receives this PDU. |
| 2 | The TOE begins an active open via the 3-way handshake by sending a TCP segment with the SYN flag set and the proposed initial sequence number "X". It waits to receive a SYN + ACK in response. |
| 3 | The TOE saves the incoming sequence number "Y" for reference. The TOE completes the 3-way handshake by sending a segment with the ACK flag set and the ACK field set to a value of Y + 1 to acknowledge it has saved the incoming sequence number OK. |
| 4 | TCP Connection Established. Ready for i-PCI data transfer. TOE checks to see if multiple connections were specified. If more connections were specified, it maintains current connection in State 4 and initiates the next connection beginning with State 2. Normally, all connections remain established until either the host or the remote are reset or powered down. PCINET ensures keep alive ping Link PDU is sent to the Remote I/O per schedule and a corresponding Link PDU ACK received. |
| 5 | Close Connection and hold. A close command from PCINET was received locally. The TOE responds by sending a TCP segment with the FIN flag set. It waits for an ACK to close the connection. All other connections remain in State 4. Hold in this state until an active open Link PDU is received. |
| 6 | OS Shutdown. The TOE responds by sending a TCP segment with the FIN flag set for all Connections. It waits for the ACKs. |
| 7 | Remote I/O Termination. Terminate all TCP connections |
| 8 | Abort. A local abnormal condition occurred. TOE sends segment with RST flag set.. |

TABLE 20 i-PCI Remote I/O Session Management State Descriptions.

| State | Description |
|---|---|
| 0 | PCINET application resident in Remote I/O RBA ROM boots up or resets/reboots and performs BIST and saves results for diagnostic purposes. Ethernet auto-negotiation completes. |
| 1 | PCINET forms a passive open command Link PDU and sends it to the TOE. The TOE receives this PDU and establishes a TCP end point for the Remote I/O. |
| 2 | The Remote I/O is in the Listen state, waiting for an active open SYN segment from a Host. |
| 3 | After receiving the SYN segment, the TOE saves the incoming sequence number, "X" for reference. The TOE responds by sending a segment with the SYN and ACK flags set and its own proposed initial sequence number "Y" for the outgoing reverse direction segments. The ACK field is set to a value of X + 1 to acknowledge it has saved the incoming sequence number OK. |
| 4 | Wait for ACK. |
| 5 | TCP Connection Established. Ready for i-PCI data transfer. A keep alive ping Link PDU must be received from the Host and acknowledged at a minimum rate to maintain a connection. It also listens for additional active opens from the host. If the host requests more connections, it maintains current connection in State 5 and spawns the next connection beginning in State 3. |
| 6 | Keep alive maximum time exceeded. PCINET forms a RST command link PDU and sends it to the TOE. The TOE sends a TCP segment with the RST bit set in the Code field and then halts all further data transfers. The TCP connection is terminated. |
| 7 | Close Connection. Segment received with FIN flag set. The TOE responds by sending a segment with the ACK flag set. The TCP connection is terminated. |
| 8 | Abort. RST segment received. The TCP connection is terminated. |

I(E)-PCI Session Management

Figure 34:
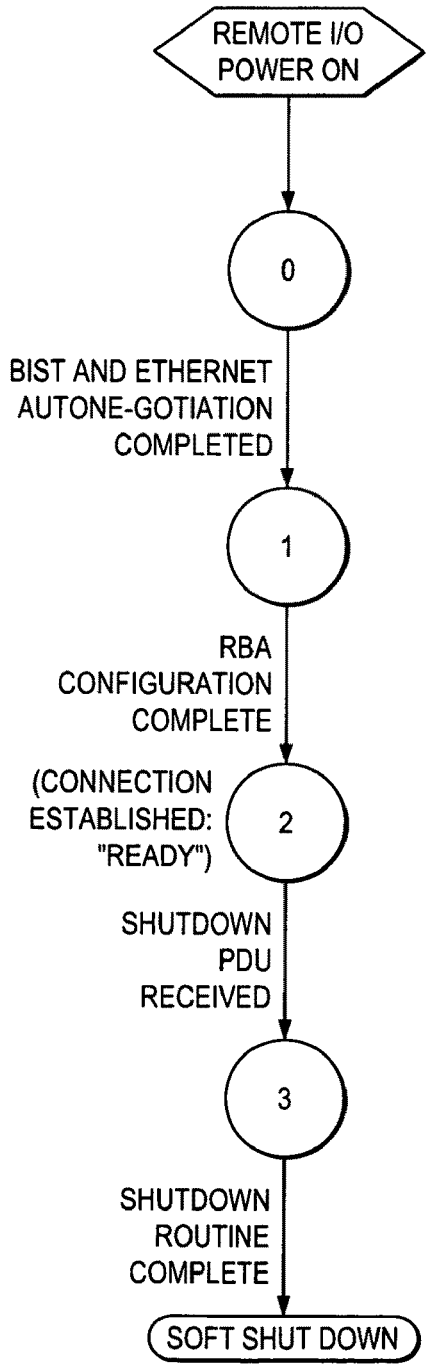
FIG. 34 depicts i(e)-PCI Host Session Management State Diagram.

There is no real formal session in the i(e)-PCI implementation. As the host operating system initializes the PCI system during boot-up, PCINET executing in the HBA, configures itself for the i(e)-PCI implementation. Since the connection between the host and the remote I/O is switched Ethernet, the necessary connection is established following boot-up as an end result of the Ethernet auto-negotiation. Refer to FIG. 34, i(e)-PCI Host Session Management State Diagram, and Table 21, i(e)-PCI Host Session Management State Descriptions.

Figure 35:
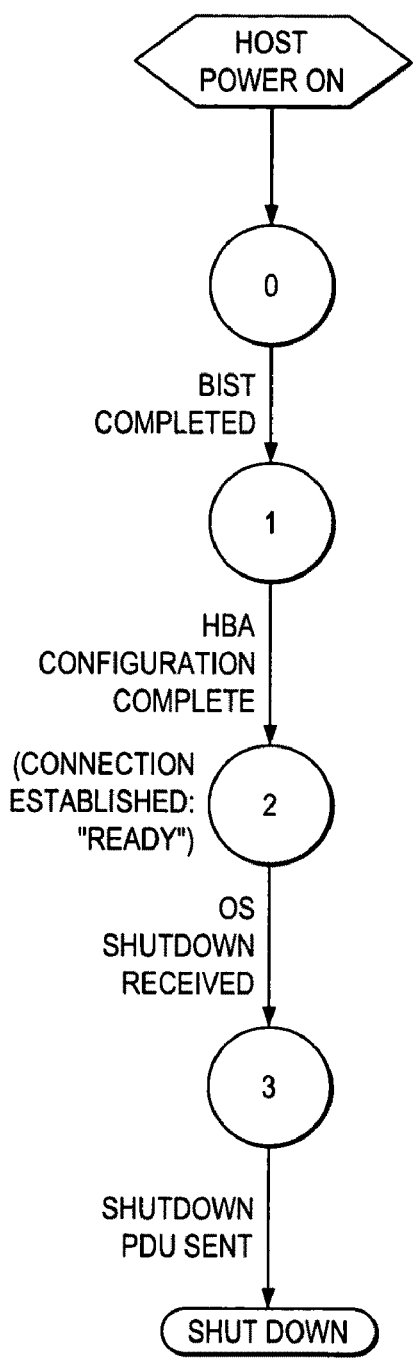
FIG. 35 depicts i(e)-PCI Remote I/O Session Management State Diagram.

All active Remote I/O units initialize themselves when they are powered up. PCINET, executing in the RBA, configures itself for the i(e)-PCI implementation. The Remote I/O is also connected via switched Ethernet, so the necessary connection is established following boot-up as an end result of the Ethernet auto-negotiation. Refer to FIG. 35, i(e)-PCI Remote I/O Session Management State Diagram, and Table 22, i-PCI Remote I/O Session Management State Descriptions.

For the HBA and RBA, the Ethernet Auto-negotiation is handled in hardware by the 10 GBASE-T PHY per IEEE 802.3an. The device at each end of the Ethernet Link advertises its capabilities to device at the other end of the link. The auto-negotiation protocol results in the selection of the highest common denominator capabilities that will result in the optimal performance across the link. Typically for i(e)-PCI the auto-negotiations will be occurring between the Host and an Ethernet switch and the Remote I/O and an Ethernet switch.

The session remains active until the system is shutdown or physically disconnected.

TABLE 21 i(e)-PCI Host Session Management State Descriptions.

| State | Description |
|---|---|
| 0 | PCINET application resident in Remote I/O RBA ROM boots up or resets/reboots and performs BIST and saves results for diagnostic purposes. Ethernet Auto-negotiation completes. |
| 1 | PCINET checks stored MAC address for the authorized host. PCINET disables the TOE for i(e)-PCI and configures the 10 Gbps NIC for the i(e)-PCI implementation via the Protocol Bus. |
| 2 | i(e)-PCI Ethernet Connection Established and Remote I/O Ready. |
| 3 | Execute soft shut down. |

TABLE 22 i(e)-PCI Remote I/O Session Management State Descriptions.

| State | Description |
|---|---|
| 0 | PCINET application resident in the HBA ROM boots up or resets/reboots and performs BIST and saves results for diagnostic purposes. |
| 1 | PCINET checks the RCR/M table for the MAC address for the remote I/O(s). PCINET configures the local TOE and 10 Gbps NIC for the i(e)-PCI implementation via the Protocol Bus. |
| 2 | i(e)-PCI Ethernet Connection Established and Remote I/O Ready. |
| 3 | OS Shutdown. PCINET sends a shutdown Link PDU to the Remote I/O. |

I(DC)-PCI Session Management

Figure 36:
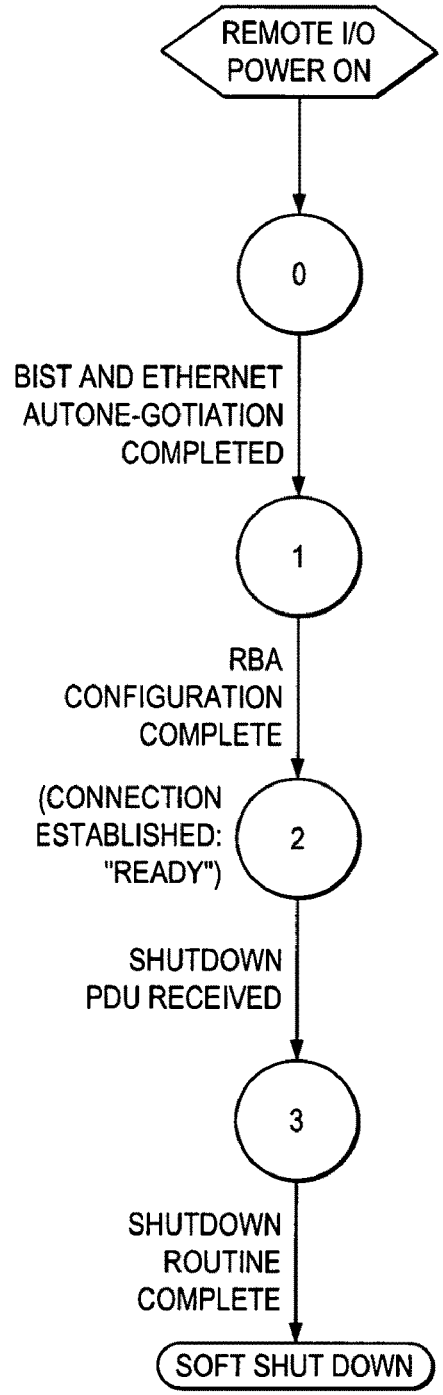
FIG. 36 depicts i(dc)-PCI Host Session Management State Diagram.

As with the i(e)-PCI implementation, there is no real formal session in the i(dc)-PCI implementation. As the host operating system initializes the PCI system during boot-up, PCINET executing in the HBA, configures itself for the i(dc)-PCI implementation. The 10 Gbps MAC transmit logic is configured to not append a source or destination address. The 10 Gbps MAC receive logic is configured to enable promiscuous mode and disable packet length check. The necessary connection is established following boot-up as an end result of the Ethernet auto-negotiation. Refer to FIG. 36, i(dc)-PCI Host Session Management State Diagram, and Table 23, i(dc)-PCI Host Session Management State Descriptions.

Figure 37:
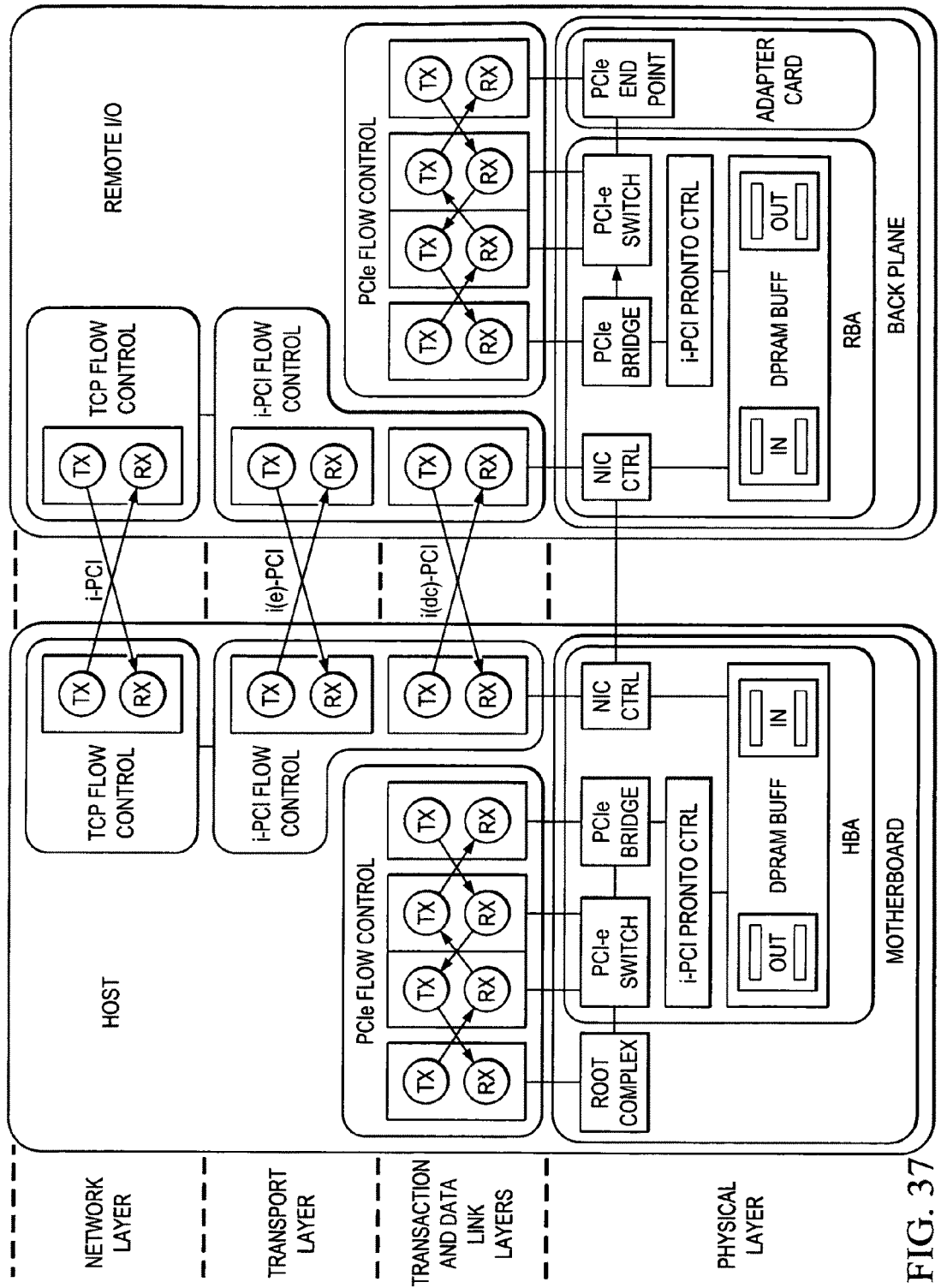
FIG. 37 depicts i(dc)-PCI Remote I/O Session Management State Diagram.

The Remote I/O unit initializes automatically when powered up. PCINET, executing in the RBA, configures itself for the i(dc)-PCI implementation. The 10 Gbps MAC transmit logic is configured to not append a source or destination address. The 10 Gbps MAC receive logic is configured to enable promiscuous mode and disable packet length check. Since the connection between the remote I/O and the host is a direct connection using Ethernet PHYs, the necessary connection is established following boot-up as an end result of the Ethernet auto-negotiation. Refer to FIG. 37, i(dc)-PCI Remote I/O Session Management State Diagram, and Table 24, i(dc)-PCI Remote I/O Session Management State Descriptions.

The Ethernet Auto-negotiation is handled in hardware by the two 10 GBASE-T PHYs per IEEE 802.3an. The HBA PHY at one end and the RBA PHY at the other end of the Ethernet Link advertise their capabilities to each other. The auto-negotiation protocol results in the selection of the highest common denominator capabilities for optimal performance. For i(dc)-PCI this should be a perfect match.

The session remains active until the system is shutdown or physically disconnected.

TABLE 23 i(dc)-PCI Host Session Management State Descriptions.

| State | Description |
|---|---|
| 0 | PCINET application resident in the HBA ROM boots up or resets/reboots and performs BIST and saves results for diagnostic purposes. |
| 1 | PCINET configures the local TOE and 10 Gbps NIC for the i(dc)-PCI implementation via the Protocol Bus. |
| 2 | i(dc)-PCI Ethernet Connection Established and Remote I/O Ready. |
| 3 | OS Shutdown. PCINET sends a shutdown Link PDU to the Remote I/O. |

TABLE 24 i(dc)-PCI Remote I/O Session Management State Descriptions.

| State | Description |
|---|---|
| 0 | PCINET application resident in Remote I/O RBA ROM boots up or resets/reboots and performs BIST and saves results for diagnostic purposes. Ethernet Auto-negotiation between the RBA PHY and HBA PHY completes. |
| 1 | PCINET disables the TOE and configures the 10 Gbps NIC for the i(dc)-PCI implementation via the Protocol Bus. |
| 2 | i(dc)-PCI Ethernet Connection Established and Remote I/O Ready. |
| 3 | Execute soft shut down. |

Initialization and Flow Control

Due to the dynamics of the PCI and PCI Express buses at the source versus the destination, it is possible for data to be transmitted at a higher rate that it can be received and drained at the other end of a link. To prevent the source from overwhelming the destination, flow control is implemented.

Flow control for i-PCI is employed at multiple protocol layers using different schemes, depending on the location within the end-to-end data stream and the particular i-PCI implementation:

Physical layer data buffering and queuing on the HBA and RBA provides a bridge between the local PCI Express flow control and implementation-specific flow control schemes.

The flow control already built into the PCI Express protocol is leveraged at the transaction and data link layers for local PCI system traffic.

The Link PDU is utilized to implement flow control at the transaction and data link level between the host HBA and the remote RBA via a direct connection for the i(dc)-PCI implementation.

The Link PDU is also utilized to implement flow control at the Network level (running just above the Ethernet MAC) between the host HBA and the remote RBA for the i(e)-PCI implementation.

The Transport layer flow control provided by TCP is leveraged for the i-PCI implementation to bridge between the host HBA and the remote I/O RBA via the Internet.

Figure 38:
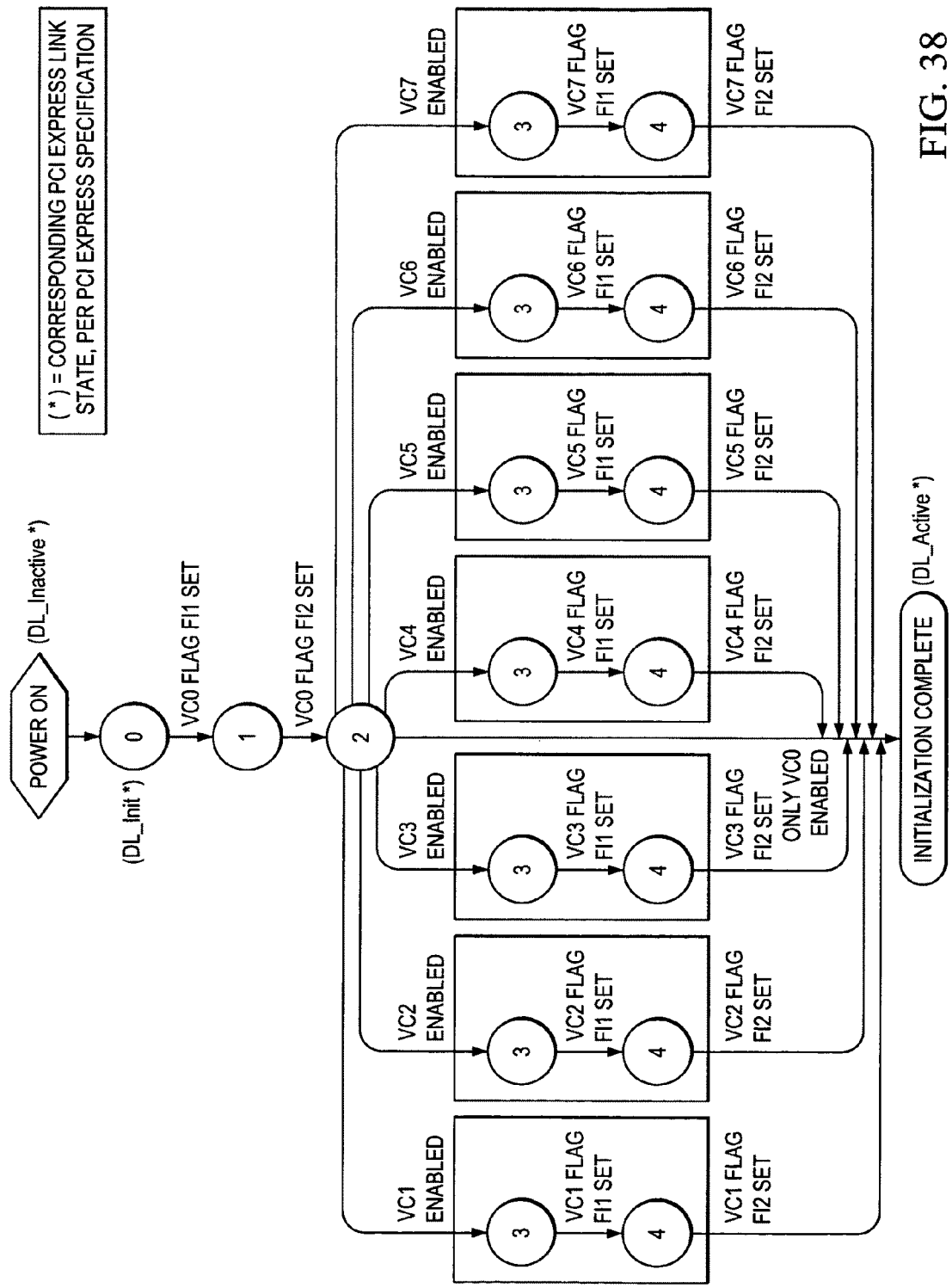
FIG. 38 depicts i-PCI Flow Control.

Refer to FIG. 38, i-PCI Flow Control for a block diagram showing the relationship between the various flow control mechanisms.

PCI Express Flow Control

PCI Express Flow Control provides link-level flow control between transmitter and receiver of each link in the local PCI System on the host and the remote I/O.

Flow control logic is located in the transaction and data link layers of each devices located at opposite ends of a given point-to-point link.

Flow control for the link is managed separately for each virtual channel and by the transaction type.

Figure 39:
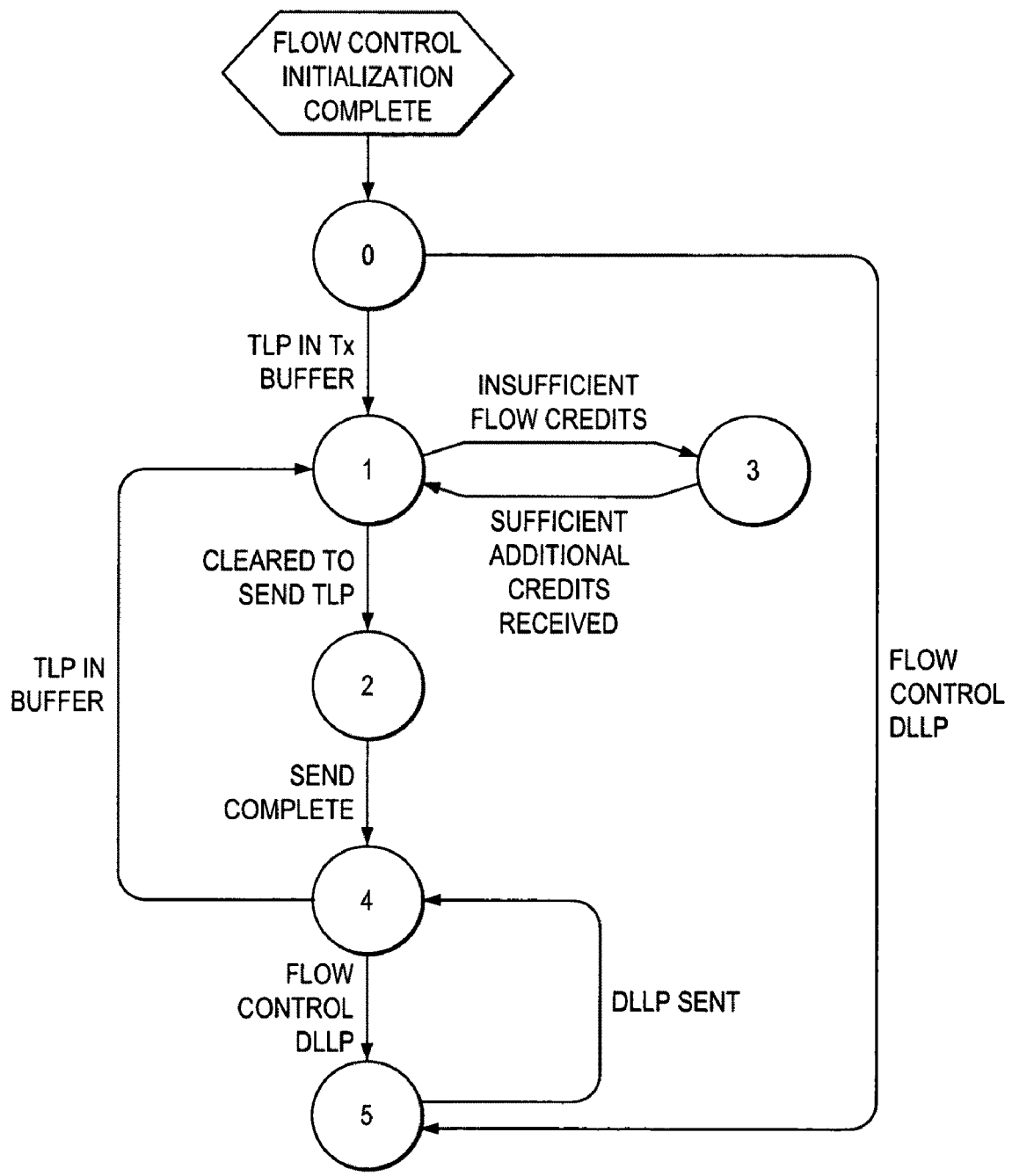
FIG. 39 depicts PCI Express Flow Control Initialization State Diagram.

During initialization, the receiver logic in each device reports the size of its buffer to the transmitter at the opposite end of the link. There is buffer size reported for each virtual channel (VC) and transaction type. There can be anywhere from a minimum of 1 to a maximum of 8 virtual channels per link. The size of a buffer associated with a VC and transaction type is expressed in terms of "flow control credits". Refer to FIG. 39, PCI Express Flow Control Initialization State Diagram and Table 25, PCI Express Flow Control Initialization State Descriptions for additional details.

Figure 40:
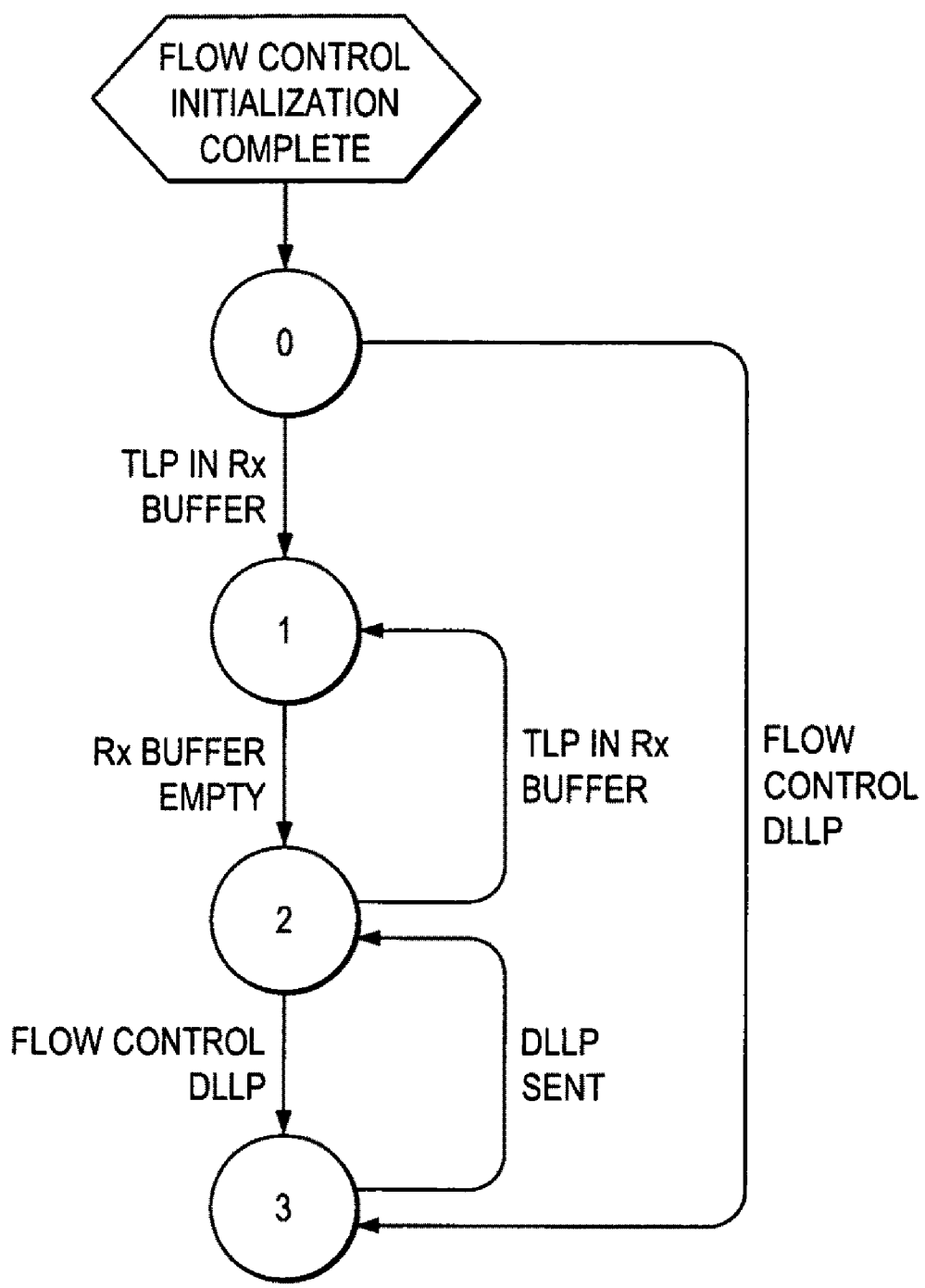
FIG. 40 depicts PCI Express Transmitter Flow Control State Diagram.

Following initialization, the link is ready for normal operation. When there is a TLP ready to send, the transmitter logic first checks to see if there is corresponding buffer space available at the receiver before it transmits. If the particular receive buffer is full, the transmitter is blocked on that VC, subject to PCI Express transaction ordering rules. As soon as buffer space becomes available, the transmitter is cleared to send. During normal operation, each device at opposite ends of the link regularly updates the flow control credits that it has available by sending out flow control DLLPs to other device. See FIG. 40, PCI Express Transmitter Flow Control State Diagram. And, refer to Table 26, PCI Express Transmitter Flow Control State Descriptions.

Figure 41:
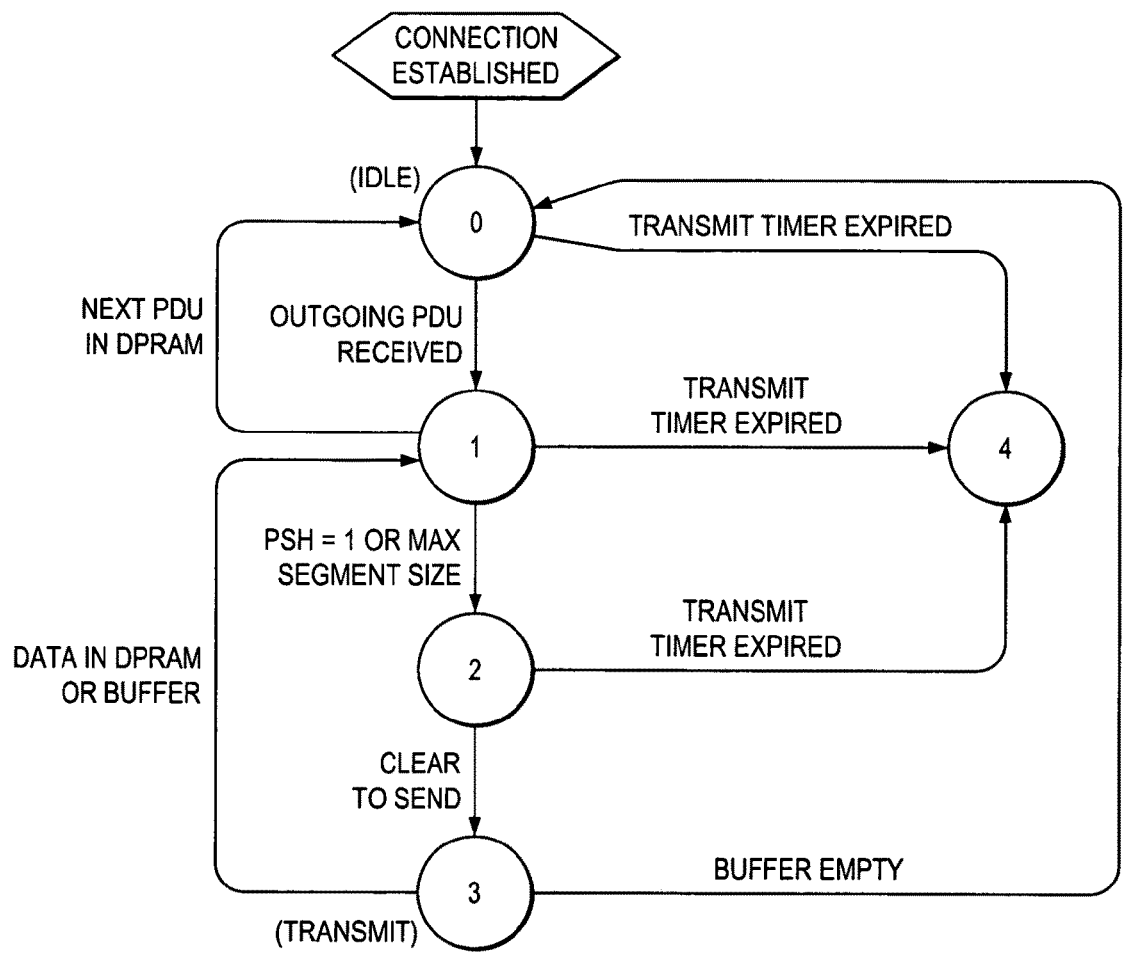
FIG. 41 depicts PCI Express Receiver Flow Control State Diagram.

Upon receipt of a TLP, the receiver logic for the device removes the transaction data and updates the number of flow control credits it has available based on the amount of data it removed. The receiver maintains a running count of the entire buffer space made available in each of the six receive buffers since initialization. The device then provides this information to the device at the other end to the link by sending out a flow control DLLP. See FIG. 41, PCI Express Receiver Flow Control State Diagram. And, refer to Table 27, PCI Express Receiver Flow Control State Descriptions.

TABLE 25

PCI Express Flow Control Initialization State Descriptions

| State | Description |
|---|---|
| 0 | VC0 Flow Control Initialization FC_INIT1: VC0 initialization is hard coded in the device logic to allow boot up of the link. All TLPs are blocked at this point. There are six receive buffers associated with VC0: 1) Posted Header buffer 2) Posted Data buffer 3) Non-posted Header buffer 4) Non-posted Data buffer 5) Completion Header buffer 6) Completion data buffer. Three flow control FC_INIT1 DLLPs are formed by each device at opposite ends of a link. The first packet contains Posted Header buffer and Posted Data buffer sizes (expressed as flow control credits), the second packet contains Non-posted Header buffer and Non-posted Data buffer sizes (expressed as flow control credits), and the third packet contains Completion Header buffer and Completion data buffer sizes (expressed as flow control credits). The transmitters at each end of a link send a continuous |

TABLE 25-continued

PCI Express Flow Control Initialization State Descriptions

| State | Description |
|---|---|
| | sequence of these three FC_INIT1 Flow Control packets to the receiver at the opposite end of the link. This continues until each device has successfully sent and received the three-packet sequence. The corresponding transmitter Credit Limit registers are then initialized with the associated flow control credit values received. An internal device Flag, FI1, is set, indicating successful completion of FC_INIT1 for VC0. |
| 1 | VC0 Flow Control Initialization Confirmation FC_INIT2: Three flow control FC_INIT2 DLLPs are formed by each device at opposite ends of a link. The first packet contains Posted Header buffer and Posted Data buffer sizes (expressed as flow control credits), the second packet contains Non-posted Header buffer and Non-posted Data buffer sizes, and the third packet contains Completion Header buffer and Completion data buffer sizes. The transmitters at each end of a link send a continuous sequence of these 3 FC_INIT2 Flow Control packets to the receiver at the opposite end of the link, similar as was done in State 0, except in this state the flow control credits are discarded. The sending of FC_INIT2 packets is the handshake signal to the other device that FC_INIT1 was completed successfully. As soon as just one FC_INIT2 packet is received, an internal device Flag 2 is set for VC0, indicating successful completion of FC_INIT2. This ends the flow control initialization for VC0. TLPs may now proceed via VC0. |
| 2 | Host PCI system configuration software employs TLPs via VC0 to check the number of additional VCs supported by the devices at each end of the link. If there are no more VCs supported, flow control initialization is complete. If there are additional supported VCs the configuration software then sets up and enables the additional virtual channels for each link. The number of virtual channels (VCs) enabled for a given link is equal to the maximum number of virtual channels the two devices at each end of the link has in common. The number of virtual channels ranges from 1 (no additional VCs - only VC0) to 8 (the maximum number of virtual channels a link can have). |
| 3 | VC1-VC7 Flow Control Initialization FC_INIT1: All TLPs are blocked on VC1-VC7. There are six receive buffers associated with a given virtual channel: 1) Posted Header buffer 2) Posted Data buffer 3) Non-posted Header buffer 4) Non-posted Data buffer 5) Completion Header buffer 6) Completion data buffer. Three flow control FC_INIT1 DLLPs are formed by each device at opposite ends of a link. The first packet contains Posted Header buffer and Posted Data buffer sizes (expressed as flow control credits), the second packet contains Non-posted Header buffer and Non-posted Data buffer sizes (expressed as flow control credits), and the third packet contains Completion Header buffer and Completion data buffer sizes (expressed as flow control credits). The transmitters at each end of a link send a continuous sequence of these three FC_INIT1 Flow Control packets to the receiver at the opposite end of the link. This continues until each device has successfully sent and received the three packet sequence. The corresponding transmitter Credit Limit registers are then initialized with the associated flow control credit values received. An internal device Flag, FI1, is set, indicating successful completion of FC_INIT1 for the corresponding VC. |
| 4 | VC1-VC7 Flow Control Initialization Confirmation FC_INIT2: Three flow control FC_INIT2 DLLPs are formed by each device at opposite ends of a link. The first packet contains Posted Header buffer and Posted Data buffer sizes (expressed as flow control credits), the second packet contains Non-posted Header buffer and Non-posted Data buffer sizes, and the third packet contains Completion Header buffer and Completion data buffer sizes. The transmitters at each end of a link send a continuous sequence of these 3 FC_INIT2 Flow Control packets to the receiver at the opposite end of the link, similar as was done in State 2, except in this state the flow control credits are discarded. The sending of FC_INIT2 packets is the handshake signal to the other device that FC_INIT1 was completed successfully. As soon as just one FC_INIT2 packet is received, an internal device Flag 2 is set for the virtual channel, indicating successful completion of FC_INIT2. This ends the flow control initialization for the particular VC. TLPs may now proceed via the particular VC. |

TABLE 26

PCI Express Transmitter Flow Control State Descriptions.

| State | Description |
|---|---|
| 0 | Initialization of the enabled Virtual Channel (VC) is complete. The Link is ready for normal operation. Link State = DL_Active, per the PCI Express Specification. The Pending Transaction Buffer is empty. The six Credit Limit (CL) registers for the virtual channel contain the initialized values in flow control credits that correspond to the sizes of the six associated receive buffers at the opposite end of the link. The Credit Consumed Counter (CC) is at zero. |
| 1 | TLP Data in Pending Transaction Buffer. Transmitter logic determines the transaction type and checks the corresponding CL register to see if sufficient flow control credits are available for the particular virtual channel. It ensures that [CC counter flow control credits] + [pending transaction required flow control credits] $\leq$ {CL counter flow control credits} If there are sufficient credits, the transmitter is cleared to send. |
| 2 | Transmit TLP. The Credit Consumed (CC) counter is updated to reflect the total number of flow control credits consumed since initialization. |
| 3 | Insufficient flow control credits for the TLP transaction type. TLP Transmit is blocked on a particular virtual channel for a particular transaction type, subject to the PCI Express transaction ordering rules. Recheck for credits until credits become available. |
| 4 | Transmit Buffer Empty. Idle. |
| 5 | Flow Control Update. Transmitter sends a flow control credit update DLLP. The credit update DLLP contains the latest count contained in the devices Credit Allocated Counter. Updates for each of the device's six receive buffers for the VC is sent at a minimum frequency and as otherwise required per the PCI Express Specification. The update is used by the device at the opposite end of the link to revise its corresponding CL registers for reference by its transmitter logic. |

TABLE 27

PCI Express Receiver Flow Control State Descriptions.

| State | Description |
|---|---|
| 0 | Initialization of the enabled Virtual Channel (VC) is complete. The Link is ready for normal operation. Link State = DL_Active, per the PCI Express Specification. The Transaction Receive Buffer is empty. The Credits Allocated counter for the virtual channel contain the initialized values in flow control credits that correspond to the sizes of the device's six associated receive buffers. |
| 1 | TLP Data in Receive Buffer. Data is transferred to the corresponding flow control receive buffer. The six receive buffers fill as data arrives and the amount of available buffer space decreases accordingly. The receiver logic removes transaction data from the buffer for processing. The number of flow control credits associated with the transaction data removed is tracked by the Credits Allocated counter. Thus, the Credits Allocated counter maintains a running count of all the buffer space made available in each of the six receive buffers since initialization. |
| 2 | Receive Buffer Empty. Idle. |
| 3 | Flow Control Update DLLP in Receive Buffer: The DLLP is removed and processed by the receiver logic. The credit update DLLP contains the latest count (in flow control credits) contained in the Credit Allocated Counter of the device at the opposite end of the link. Updates for each of the other device's six receive buffers for the VC is received at a minimum frequency and as otherwise required per the PCI Express Specification. The update is used to update the corresponding CL registers for reference by the device's transmitter logic. |

I-PCI Implementation Flow Control

TCP provides Host-to-Remote I/O flow control across the IP network utilized in the i-PCI implementation. TCP using a sliding window scheme as the primary flow control method to ensure reliable delivery. The window is the amount of data sent that has not yet been ACKed. Each ACK sent in response to received data contains a window advertisement that specifies how much data it can currently accept. Although i-PCI utilizes TCP flow control, it includes some additional specific requirements.

Figure 42:
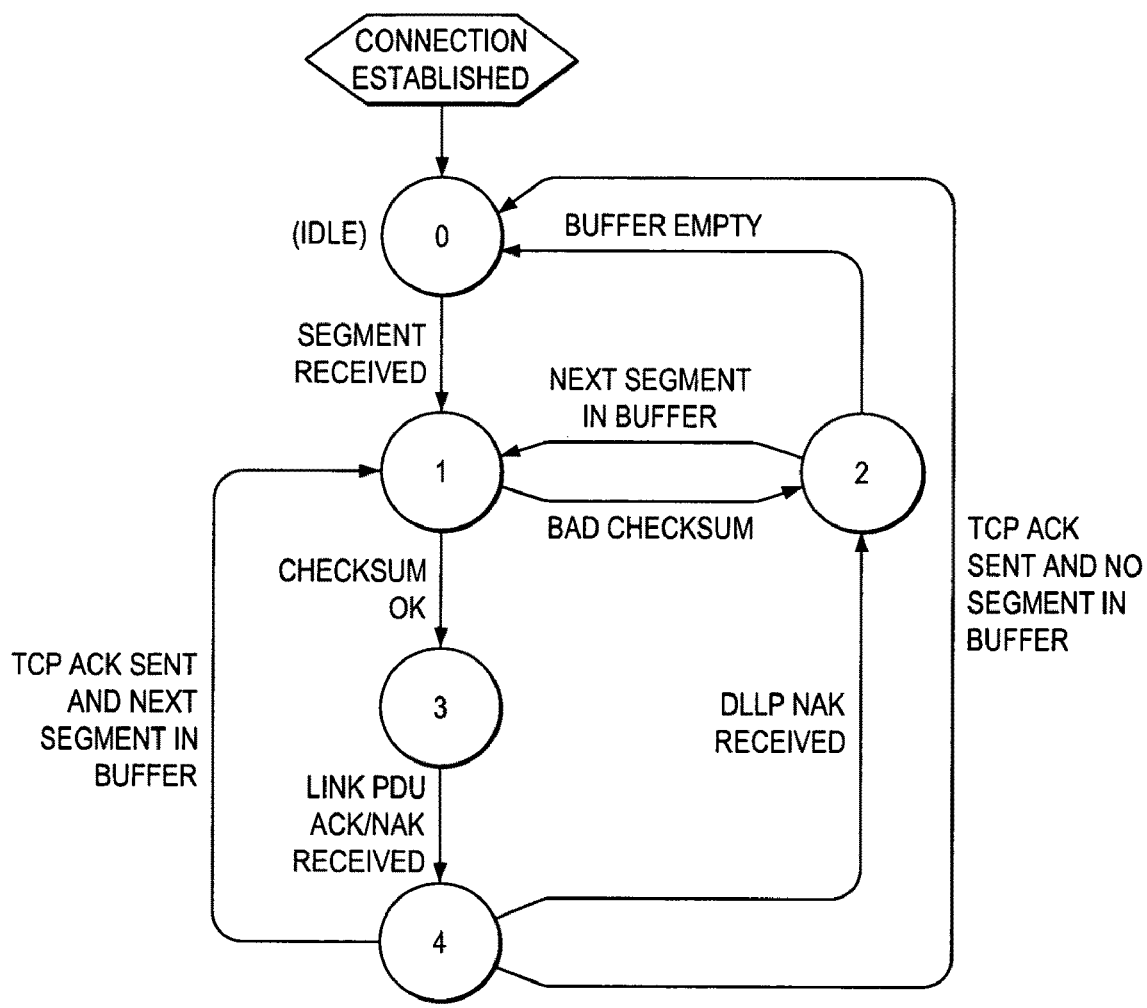
FIG. 42 depicts i-PCI TCP Transmitter Network Flow Control State Diagram.
Figure 43:
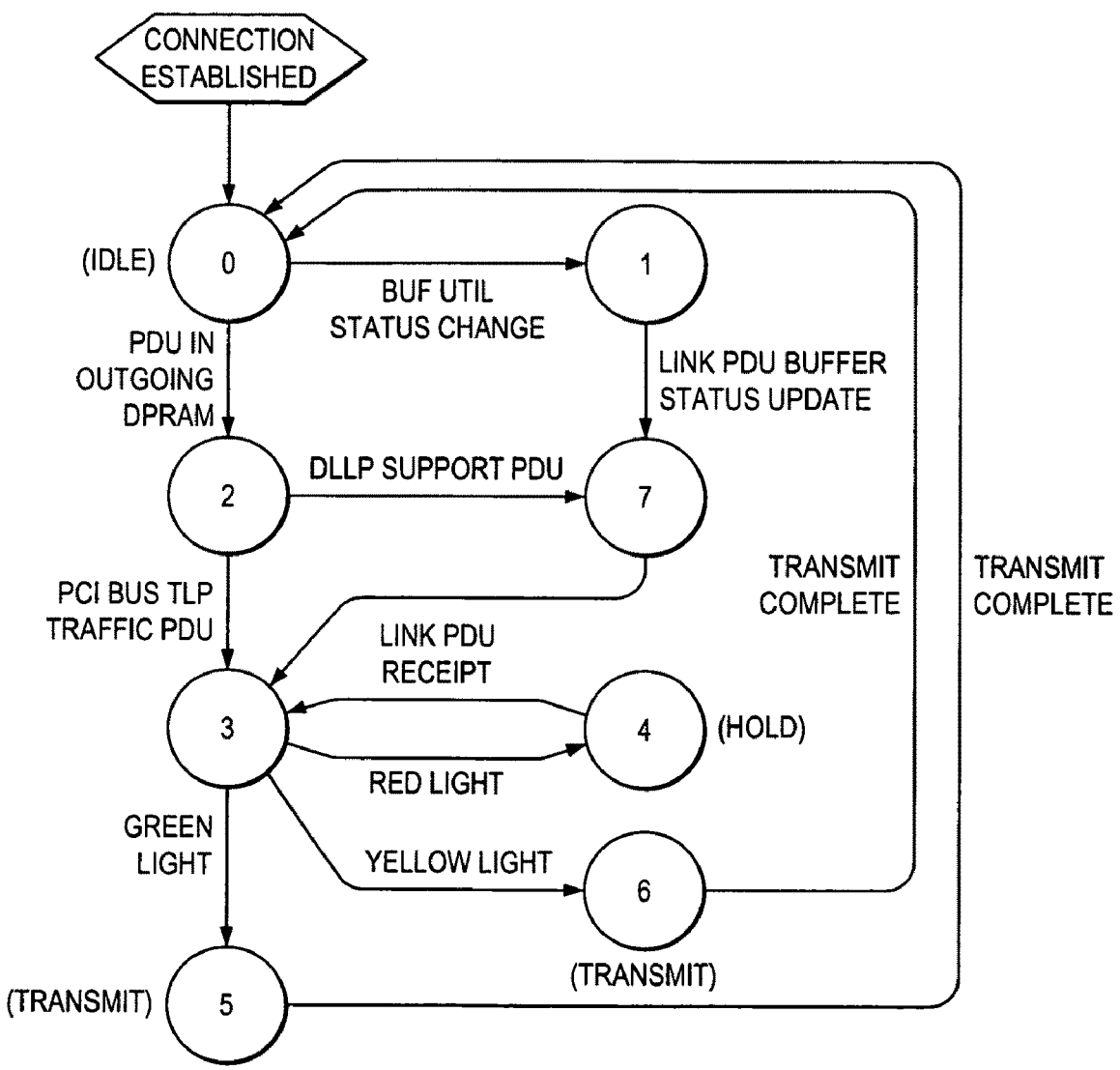
FIG. 43 depicts i-PCI TCP Receiver Flow Control State Diagram.

Flow control occurs at both the transmitter and the receiver ends of a TCP connection. Since a connection is bi-directional, each end of a connection implements transmitter and receiver flow control. For Transmitter Flow Control see FIG. 42, i-PCI TCP Transmitter Network Flow Control State Diagram and Table 28, i-PCI TCP Transmitter Flow Control State Descriptions. For Transmitter Flow Control see FIG. 43, i-PCI TCP Receiver Network Flow Control State Diagram and Table 29, i-PCI TCP Receiver Flow Control State Descriptions.

TABLE 28 i-PCI TCP Transmitter Flow Control State Descriptions.

| State | Description |
|---|---|
| 0 | TOE idle. Wait for a local outgoing PDU received in its dual port RAM (DPRAM) buffer. |
| 1 | When a PDU appears in the DPRAM, the TOE transfers the PDU into the back of its outgoing buffer queue as a sequence of octets. The octets are used to form a TCP segment up to the maximum segment size (MSS*), beginning with the last octet sequence number ACKed + 1. TOE looks at the PDU HK Header Status/Command Field to see if expediting is specified (PSH or URG). If URG = 1, the TOE sets the URG flag = 1 in the TCP Code field of the segment that contains the PDU. If PSH = 1 the TOE sets the PSH flag = 1 in the TCP Code field of the segment that contains the PDU and halts the segment build at that point. |
| 2 | Hold pending transmit. Wait to transmit, if necessary, per TCP sliding windows protocol and congestion avoidance protocols. |
| 3 | Transmit. Save segment and set timer per current timeout value per round trip estimation and back-off algorithms. Following transmission, the outgoing buffer queue is checked to see if there is more outgoing data. |
| 4 | Re-transmit segment associated with expired timer. |

*Note: The MSS- in octets - was negotiated and set during initialization, based on the network MTU, buffer sizes, and other factors.

TABLE 29 i-PCI TCP Receiver Flow Control State Descriptions.

| State | Description |
|---|---|
| 0 | TOE idle. Wait for incoming TCP data transfer segment. |
| 1 | TOE performs checksum on a segment. |
| 2 | Discard Segment.. |
| 3 | The TOE reassembles the PDU. It holds off sending any ACKs at this time. It checks the code field to see if any expediting has been specified (PSH or URG). If the push and/or urgent flags are set, it immediately transfers the reassembled PDU over the Protocol bus to the i-PCI protocol Controller's DPRAM*. If no push or urgent flags are set, it transfers the reassembled PDU over the Protocol bus to the i-PCI protocol Controller's DPRAM as per normal operation. The PCIe DLLP Handler transfers the PDU to the PCI Bridge. The bridge CRC logic confirms the data integrity and responds with a DLLP ACK or NAK as appropriate. The PCIe DLLP Handler receives the ACK or NAK and forms a Link PDU. This link PDU is sent to the TOE. The TOE holds up sending a TCP ACK until it receives a PCI Express PDU NAK or ACK. |
| 4 | If a PDU NAK was received, no ACK is sent. If a PDU ACK was received, a TCP ACK is sent that specifies the next octet it needs to receive. The ACK also includes a window advertisement for the amount of data (in octets) it is prepared to accept (based on room in it's buffer). |

*Note It is up to the i-PCI Protocol Controller to interpret the push and urgent flags and translate to the appropriate PCI Express traffic class or other specified action.

I(E)-PCI Implementation Flow Control

In the i(e)-PCI Implementation, the Link PDS PDU "Buff Util" field is utilized to implement flow control between the HBA and a RBA across the network link.

The PCI Express flow control protocol is not supported across the switched Ethernet LAN and is effectively disabled at initialization. It can be seen from Table 6, PCI Express DLLPs and PDU Mapping for i(e)-PCI that PCI Express flow control DLLPs are not mapped. During initialization, the PCIe DLLP Handler, simply returns an "infinite" flow control credit value on all 8 virtual channels. This eliminates any FC_Update packet generation and all subsequent PCI Express Flow Control related DLLP traffic on the i(e)-PCI side of the PCI bridge.

The transmitter NIC i-PCI/PCIe Router logic monitors the space available in each of its Virtual Channel (VC) TLP receive buffers. Whenever a PDU is sent across the link, the percent buffer utilization is reported back via the Buff Util field. The ACK/NAK PDS PDU is the primary feedback mechanism. Table 10, Link PDU Header Field: "Buff Util", shows that the percent utilization falls into 1 of 4 conditions and 3 "color" categories. The color categories are meant to function as a "data transfer traffic light" for the transmitter. The first two conditions are grouped into the "green light" category; meaning adequate receiver buffer space is available. The next condition is the "yellow light" warning category, meaning receiver buffer space is limited and data transmission should be throttled back. The final condition is the "red light" category, meaning receive buffer space is critical, and further transmission should be halted until a yellow or green category is indicated.

In the case of a red light, the transmitter halts transmission until it receives a PDU that indicates the buffer utilization has fallen to the yellow or green category. The Receiver NI logic generates a Link PDS PDU with the Function field set to "Buffer Status" to notify the source when it has freed up enough buffer space to fall to the yellow or green category.

Figure 44:
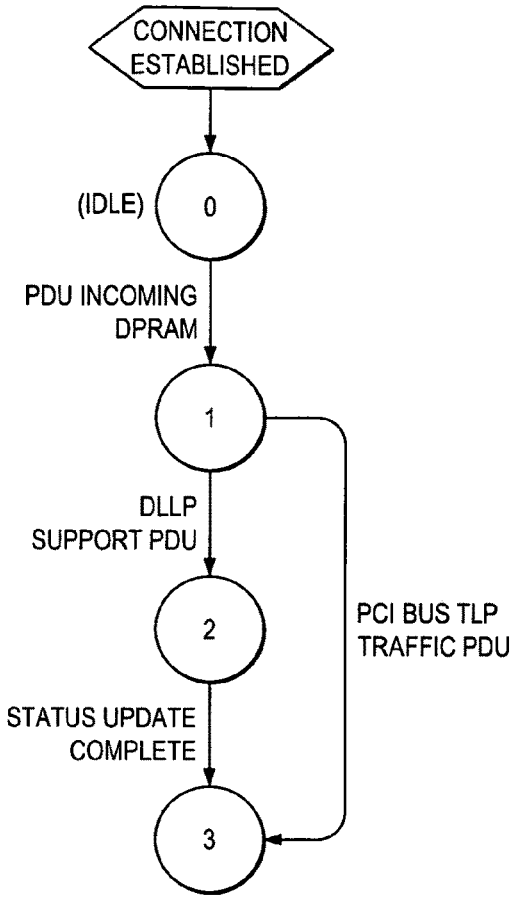
FIG. 44 depicts i(e)-PCI Transmitter Flow Control State Diagram.
Figure 45:
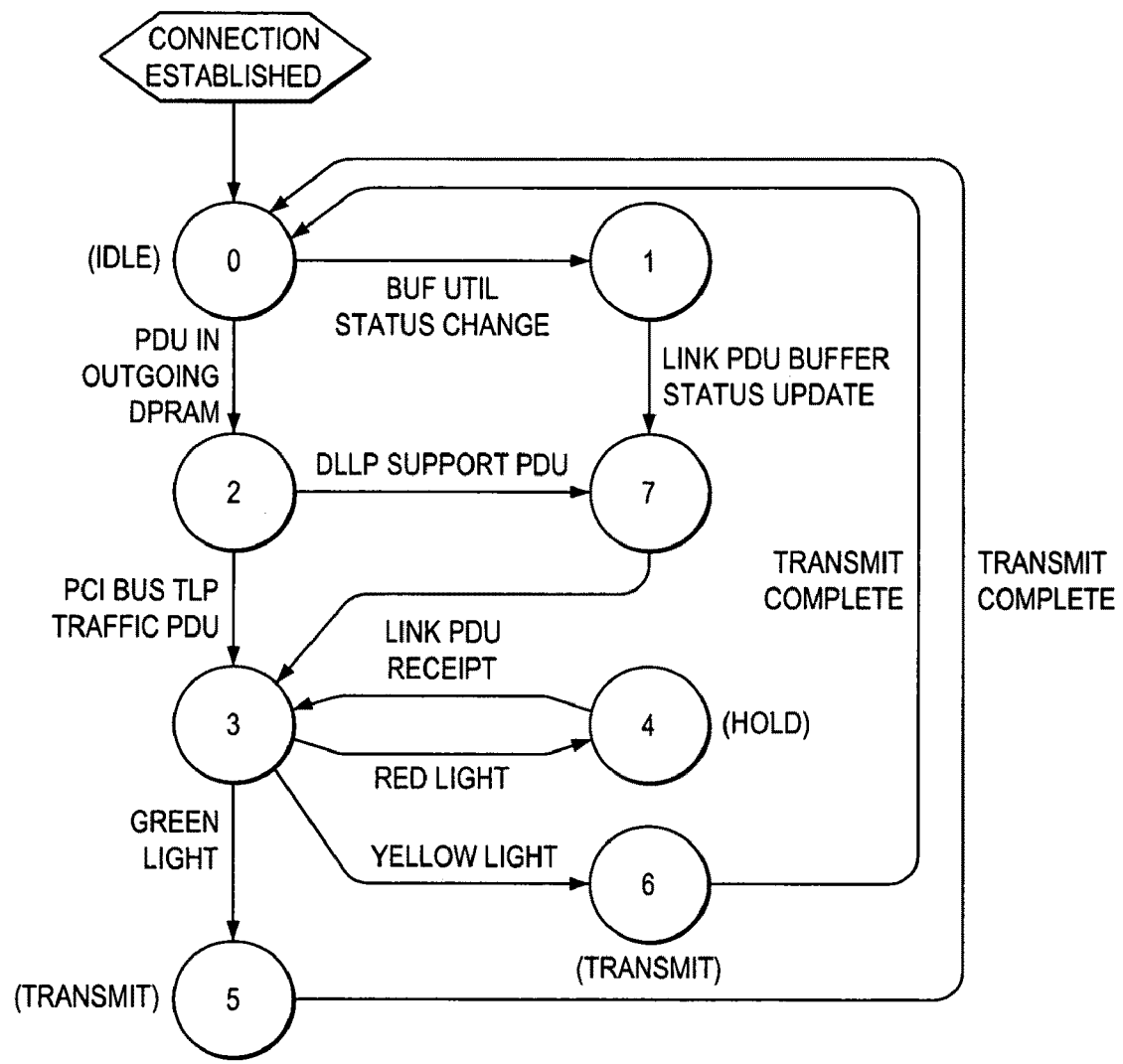
FIG. 45 depicts i(e)-PCI Receiver Flow Control State Diagram.

For Transmitter Flow Control see FIG. 44, i(e)-PCI Transmitter Flow Control State Diagram and Table 30, i(e)-PCI Transmitter Flow Control State Descriptions. For Receiver Flow Control see FIG. 45, i(e)-PCI Receiver Flow Control State Diagram and Table 31, i(e)-PCI Receiver Flow Control State Descriptions.

TABLE 30 i(e)-PCI Transmitter Flow Control State Descriptions.

| State | Description |
|---|---|
| 0 | NIC idle. Wait for a local outgoing PDU received in the applicable dual port RAM (DPRAM) buffer for a given VC or a color change in local receiver buffer utilization. |
| 1 | NIC Forms a Link PDS PDU with the function field set to "Buffer Status" to notify source. |
| 2 | NIC checks to see if it is a Link PDU or a PCI Bus TLP Traffic PDU. |
| 3 | Check the current percent utilization status of the destination receive buffer. |
| 4 | Hold transmission pending receipt of a Link PDU from the destination indicating buffer utilization has fallen to a yellow or green condition. |
| 5 | Category: Yellow light. Delay per an algorithm, then Transmit PDU. The delay algorithm can be any that optimally balances buffer utilization versus performance. |
| 6 | Category: Green light. Transmit PDU. |
| 7 | The NIC checks the current state of the local receive VC buffer that corresponds to the outgoing VC. It sets the appropriate bits in the Buff Util register to reflect the space available. |

TABLE 31 i(e)-PCI Receiver Flow Control State Descriptions.

| State | Description |
|---|---|
| 0 | NIC idle. Wait for a local incoming PDU received in the applicable dual port RAM (DPRAM) buffer for a given VC. |
| 1 | NIC checks to see if it is a Link PDU or a PCI Bus TLP Traffic PDU. |
| 2 | NIC inspects the PDU Buffer Status Field and updates the percent utilization status of the destination receive buffer. |
| 3 | NIC passes PDU on to the i-PCI Protocol Controller via the Protocol Bus. |

I(DC)-PCI Implementation Link Flow Control

The i(dc) flow control is essentially the same mechanism as described for the i(e)-PCI implementation. The Link PDS PDU "Buff Util" field is utilized to implement flow control between the HBA and a RBA across the direct connection.

The PCI Express flow control protocol is not supported across the direct connection and is effectively disabled at initialization. It can be seen from Table 7, PCI Express DLLPs and PDU Mapping for i(dc)-PCI that PCI Express flow control DLLPs are not mapped. During initialization, the PCIe DLLP Handler, simply returns an "infinite" flow control credit value on all 8 virtual channels. This eliminates any FC_Update packet generation and all subsequent PCI Express Flow Control related DLLP traffic on the i(dc)-PCI side of the PCI bridge.

The transmitter NIC i-PCI/PCIe Router logic monitors the space available in each of its Virtual Channel (VC) TLP receive buffers. Whenever a PDU is sent across the link, the percent buffer utilization is reported back via the Buff Util field. The ACK/NAK PDS PDU is the primary feedback mechanism. Table 10, Link PDU Header Field: "Buff Util", shows that the percent utilization falls into 1 of 4 conditions and 3 "color" categories. The color categories are meant to function as a "data transfer traffic light" for the transmitter. The first two conditions are grouped into the "green light" category; meaning adequate receiver buffer space is available. The next condition is the "yellow light" warning category, meaning receiver buffer space is limited and data transmission should be throttled back. The final condition is the "red light" category, meaning receive buffer space is critical, and further transmission should be halted until a yellow or green category is indicated.

In the case of a red light, the transmitter halts transmission until it receives a PDU back that indicates the buffer utilization has fallen to the yellow or green category. The Receiver NI logic generates a Link PDS PDU with the Function field set to "Buffer Status" to notify the source at the point it has freed up enough buffer space to fall to the yellow or green category.

Figure 46:
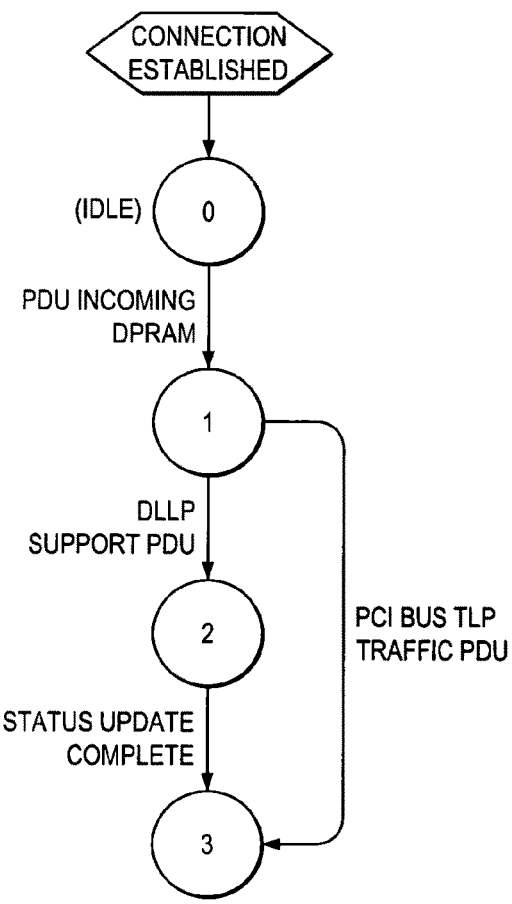
FIG. 46 depicts i(dc)-PCI Transmitter Flow Control State Diagram.
Figure 47A:
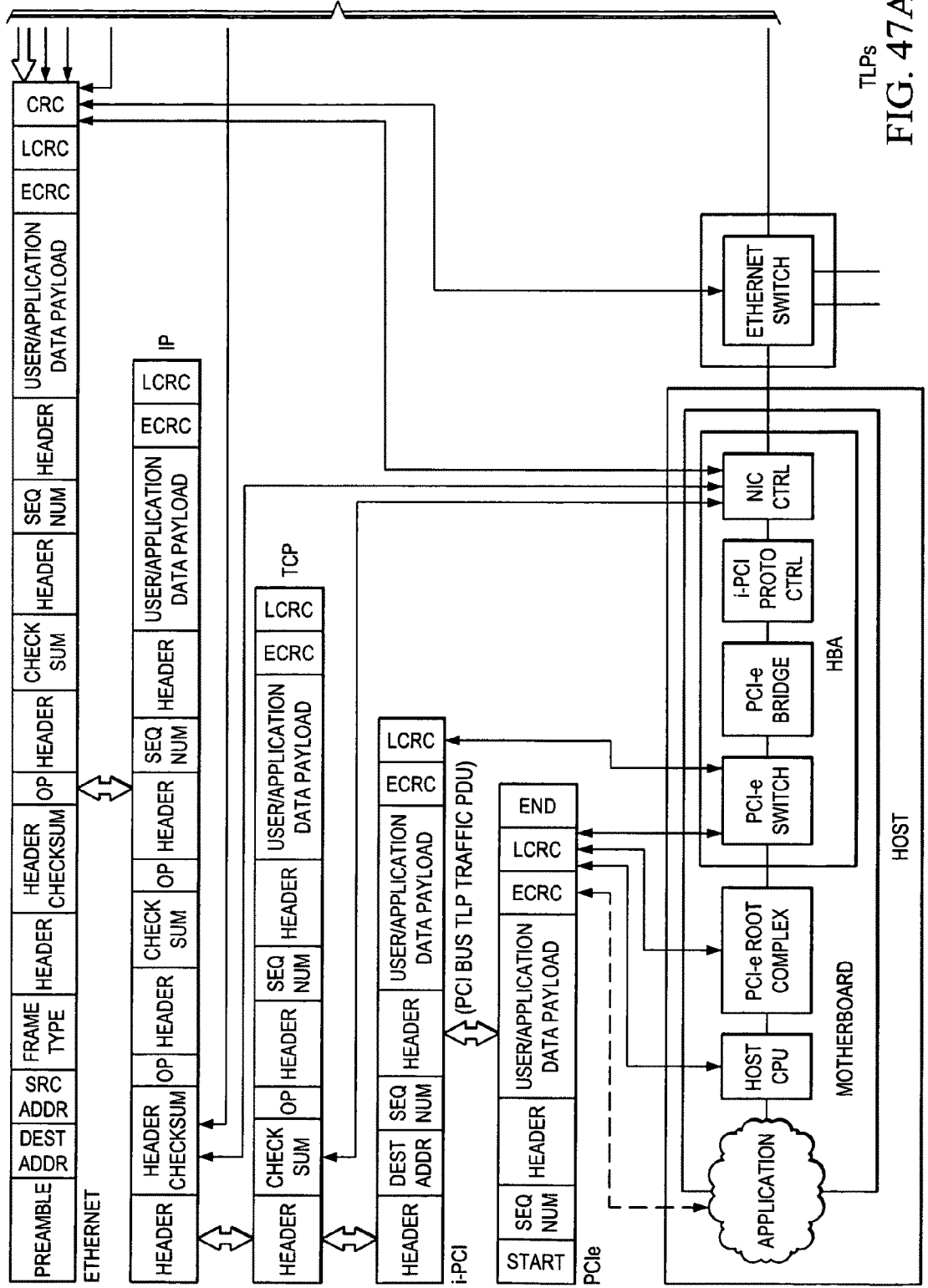
FIG. 47 depicts i(dc)-PCI Receiver Flow Control State Diagram.
Figure 47B:
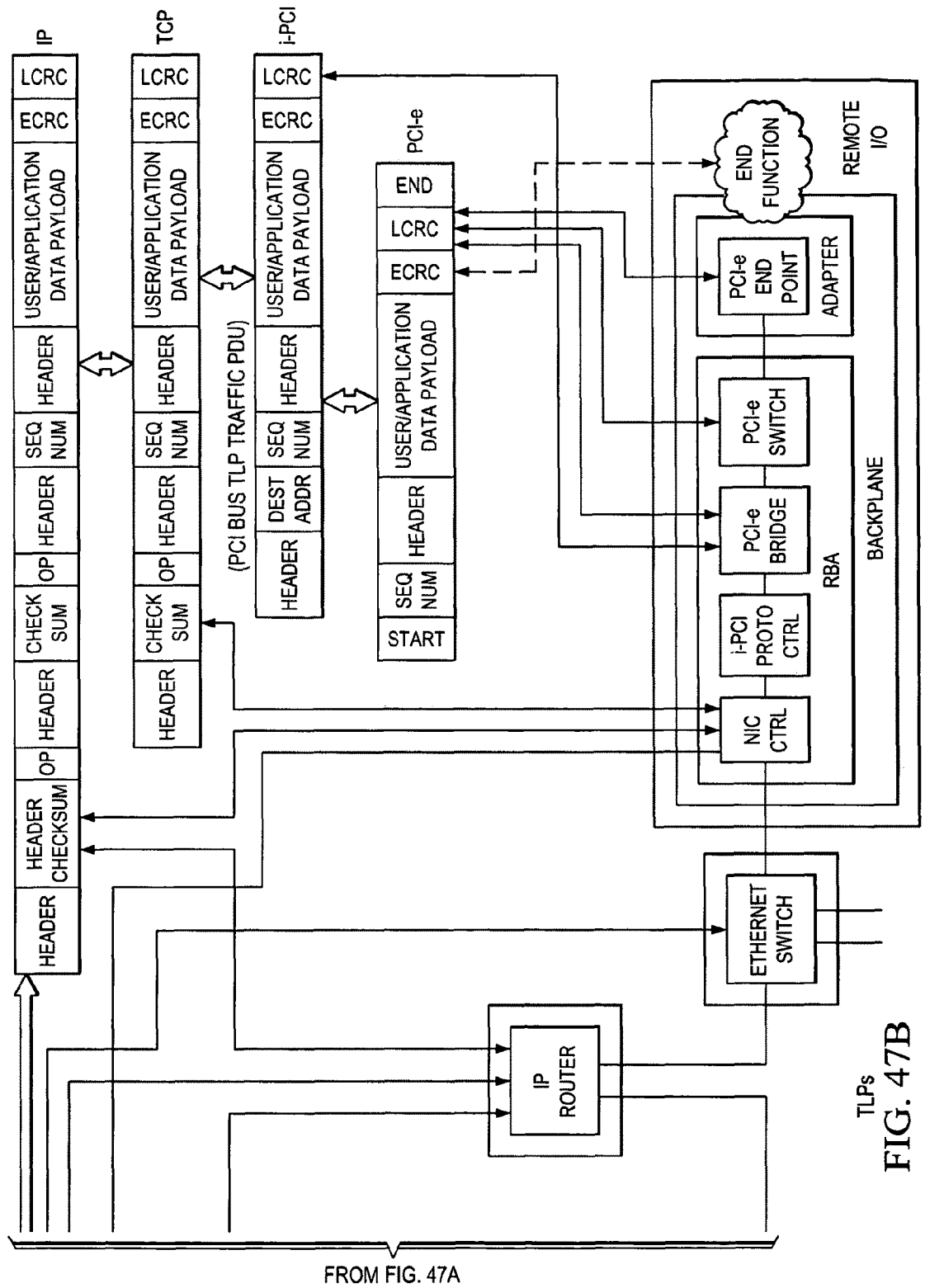
Figure 47D:
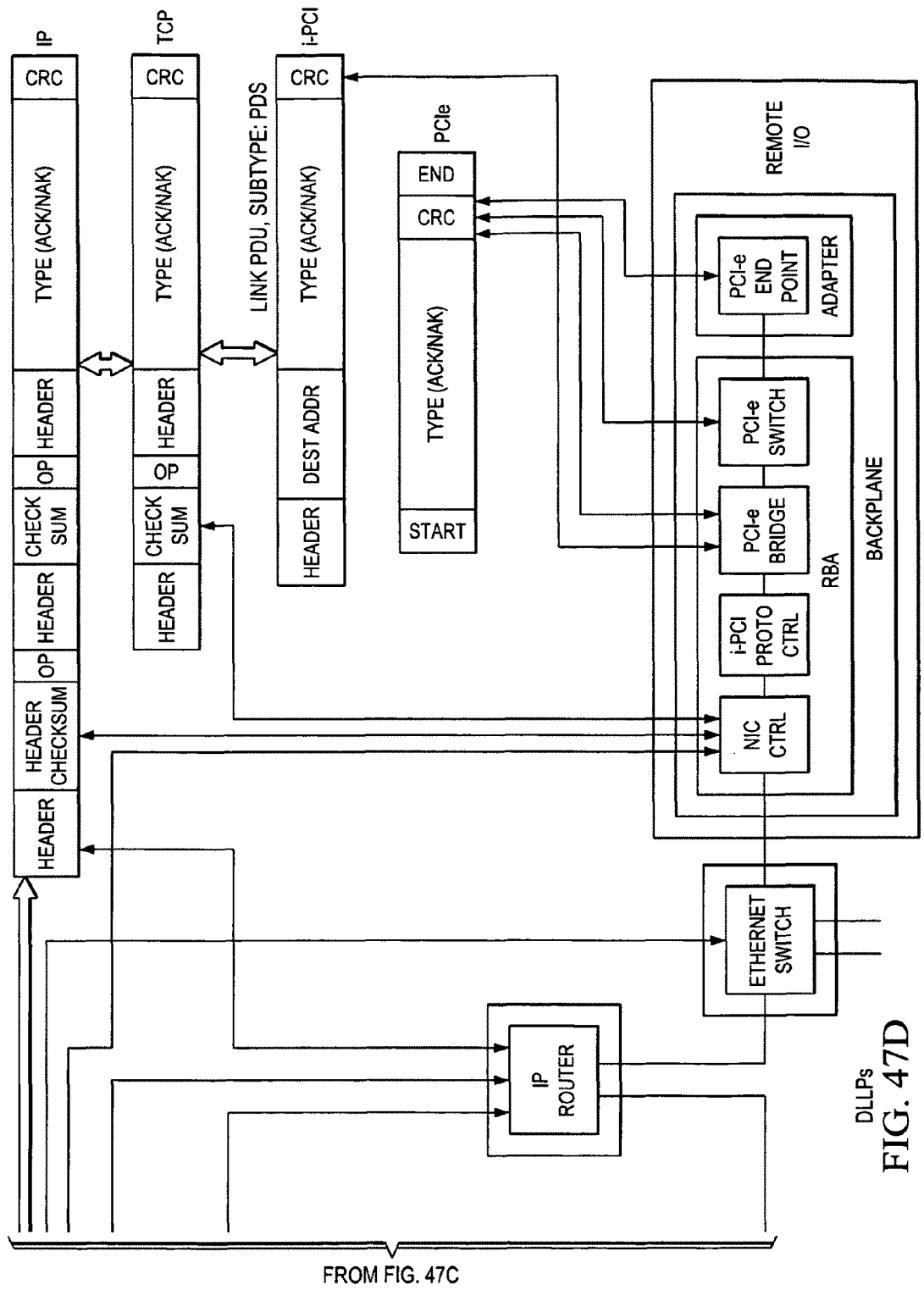

For Transmitter Flow Control see FIG. 46, i(dc)-PCI Transmitter Flow Control State Diagram and Table 32, i(dc)-PCI Transmitter Flow Control State Descriptions. For Receiver Flow Control see FIG. 47, i(dc)-PCI Receiver Flow Control State Diagram and Table 33, i(dc)-PCI Receiver Flow Control State Descriptions.

TABLE 32 i(dc)-PCI Transmitter Flow Control State Descriptions.

| State | Description |
|---|---|
| 0 | NIC idle. Wait for a local outgoing PDU received in the applicable dual port RAM (DPRAM) buffer for a given VC or a color change in local receiver buffer utilization. |
| 1 | NIC Forms a Link PDS PDU with the function field set to "Buffer Status" to notify source. |
| 2 | NIC checks to see if it is a Link PDU or a PCI Bus TLP Traffic PDU. |
| 3 | Check the current percent utilization status of the destination receive buffer. |
| 4 | Hold transmission pending receipt of a Link PDU from the destination indicating buffer utilization has fallen to a yellow or green condition. |
| 5 | Category: Yellow light. Delay per an algorithm, then Transmit PDU. The delay algorithm can be any that optimally balances buffer utilization versus performance. |
| 6 | Category: Green light. Transmit PDU. |
| 7 | The NIC checks the current state of the local receive VC buffer that corresponds to the outgoing VC. It sets the appropriate bits in the Buff Util register to reflect the space available. |

TABLE 33 i(dc)-PCI Receiver Flow Control State Descriptions.

| State | Description |
|---|---|
| 0 | NIC idle. Wait for a local incoming PDU received in the applicable dual port RAM (DPRAM) buffer for a given VC. |
| 1 | NIC checks to see if it is a Link PDU or a PCI Bus TLP Traffic PDU. |
| 2 | NIC inspects the PDU Buffer Status Field and updates the percent utilization status of the destination receive buffer. |
| 3 | NIC passes PDU on to the i-PCI Protocol Controller via the Protocol Bus. |

HBA AND RBA Data Buffer Memory i-PCI needs to provide the deep data buffering necessary to smooth data flow between the local PCIExpress link and the network link. The PCIe TLP Handler in the I-PCI Protocol Controller and the i-PCI/PCIe Router in the NIC implement the data buffering/queuing and flow control to bridge the links.

The data buffering also serves as a transaction ordering checkpoint. PCI Express imposes ordering rules based on three types of transactions:
  1. Posted
  2. Non-Posted
  3. Completions The transaction ordering rules guarantee that TLPs are routed in the correct order through the PCI system. i-PCI must provide the means to maintain this data ordering at the interface points to the local PCI Express bus. These interface points are on the HBA on the downstream side of the PCI Express switch and on the RBA just upstream of the PCI Express Switch.

Six buffers are implemented in SRAM for the default maximum 8 virtual channels. Thus a total of 6×8=48 buffers are set up at each end of the link. These six buffers are:
1. Posted Header
2. Posted Data
3. Non-posted Header
4. Non-posted Data
5. Non-posted Header Completion
6. Non-posted Data Completion Since the links are bi-directional, there is a set of 48 buffer required for transmit and a set of 48 buffers required for receive.

During initialization, the PCIe DLLP Handler, simply returns an "infinite" flow control credit value on all 8 virtual channels. This eliminates any FC_Update packet generation.
Robustness In terms of robustness, the goal of the PCI system and therefore i-PCI is to assure the integrity of user application data transfers to a high degree of certainty. Two key parts of a robust data transfer are:
1. Error Detection
2. Error Handling Error Detection Error detection tends to be computationally intensive, consuming processor cycles and resources, while adding latency. Therefore, for i-PCI it is desirable to minimize additional error detection and instead leverage the existing error detection already implemented as part of PCI Express, Ethernet, IP, and TCP. With leveraging the error detection of these protocols, only error detection for the Link PDU is unique to i-PCI. The end-to-end error detection architecture varies depending on the i-PCI Implementation. See FIG. 48, i-PCI Error Detection Overview, FIG. 49, i(e)-PCI Error Detection Overview and FIG. 50, i(dc)-PCI Error Detection Overview.

PCI Express Error Detection

There are two types of PCI Express packets that must be considered. Error detection is handled differently for each:

DLLPs: PCI Express DLLPs do not contain user application data and do not proceed past the endpoints of a given PCI Express link. For i-PCI, the primary concern is the ACK and NAK DLLPs. These are the only DLLPs that traverse the network link and only in the i-(e)-PCI and i(dc)-PCI implementations. Other DLLPs are terminated locally by the PCIe DLLP Handler in the i-PCI Protocol Controller.

DLLPs contain a 16-bit CRC in the last two byte positions. The CRC is computed on the DLLP by the transmitting data link layer per the PCI Express specified algorithm then passed down to the physical layer and transmitted.

The DLLP is received by the physical layer of the device at the other end of the link and passed up to the data link layer. The datalink layer applies the same CRC algorithm used by the transmitting device. The calculated value is compared to the received value contained in the CRC field of the DLLP.

☐ If the two values are equal, the DLLP is accepted and processed.

☐ If the two values are not equal, the DLLP is considered corrupt and discarded. There is no retry for DLLPs. An error is reported (Correctable Error).

TLLPs: PCI Express TLLPs contain user application data. Data integrity of TLPs is assured via two CRCs. The LCRC is a data link level CRC and is mandatory. The ECRC is an function level CRC and is optional, per the PCI Express Specification 1. LCRC: TLPs contain a 32-bit CRC in the last four byte positions.

TLP Header and Data are passed down from the transaction layer to the data link layer. The sequence number is added to the packet and the CRC is computed on the TLP per the PCI Express specified algorithm then passed down to the physical layer and transmitted.

The TLP is received by the physical layer of the device at the other end of the link and is passed up to the data link layer. The data link layer applies the same LCRC algorithm used by the transmitting device. The calculated value is compared to the received value contained in the CRC field of the TLP.

☐ If the two values are equal, the TLP is accepted, processed, and passed up to the transaction layer. An ACK DLLP is formed then passed down to the physical layer and transmitted.

☐ If the two values are not equal, the TLP is considered corrupt and discarded. The data link retry mechanism is triggered (refer to sections on Flow Control and the ACK/NAK Protocol). A NAK DLLP is formed then passed down to the physical layer and transmitted.

2. ECRC: In addition to the LCRC, TLPs can accommodate an optional 32-bit CRC End-to-End CRC (ECRC) placed in the TLP Digest field at the end of the Data field.

The ECRC serves as a function-level end-to-end CRC. The ECRC is calculated by the application or an end device function, per the PCI Express Specification. TLP Header and Data are added and passed down from the transaction layer to the data link layer. The sequence number is added to the packet and the LCRC is computed on the TLP per the PCI Express specified algorithm then passed down to the physical layer and transmitted.

The TLP is received by the physical layer of the device at the other end of the link and are passed up to the data link layer. The data link layer applies the same LCRC algorithm used by the transmitting device. The calculated value is compared to the received value contained in the LCRC field of the TLP.

☐ If the two LCRC values are equal, the TLP is accepted, processed, and passed up to the transaction layer. An ACK DLLP is formed then passed down to the physical layer and transmitted.

If the receiver is the ultimate end destination, the ECRC is calculated using the same CRC algorithm used by the originating device. The calculated value is compared to the received value. It is up to the end application to determine how to manage the end-to-end integrity check or resend protocol. i-PCI does not depend on this CRC being implemented for data integrity.

If the receiver is not the ultimate destination, the device may optionally check the ECRC and report any errors.

☐ If the two LCRC values are not equal, the TLP is considered corrupt and discarded. The data link retry mechanism is triggered (refer to sections on Flow Control and the ACK/NAK Protocol). A NAK DLLP is formed then passed down to the physical layer and transmitted.

Ethernet Error Detection

Ethernet error detection is applicable to all three implementations. Data integrity of packets associated with i-PCI traffic via an Ethernet data link is assured by the 32-bit CRC computed and placed in the Frame Check Sequence field of an Ethernet packet.

- The sending device takes data passed down from the network layer and forms an Ethernet packet at the data link layer. The 32-bit CRC is calculated and inserted in the Frame Check Sequence field. The packet is then passed down to the physical layer and transmitted.
- The Ethernet packet is received by the physical layer of a switch in transit and is passed up to the Ethernet data link layer. The data link layer applies the same CRC algorithm used by the transmitting device. The calculated value is compared to the received value contained in the Frame Check Sequence field of the Ethernet Header.
- If the two values are equal, the Ethernet packet is switched and then passed down to the physical layer and transmitted on.
- If the two values are not equal, the Ethernet packet is considered corrupt and discarded. The packet is lost.
- If not lost en-route, the Ethernet packet reaches the ultimate destination and is passed up to the Ethernet data link layer. The data link layer applies the same CRC algorithm used by the transmitting device. The calculated value is compared to the received value contained in the Frame Check Sequence field of the Ethernet Header.
- If the two values are equal, the Ethernet packet is accepted, processed, and passed up to the next layer.
- If the two values are not equal, the Ethernet packet is considered corrupt and discarded.

IP Error Detection

IP error detection is applicable to i-PCI but is not applicable for i(e)-PCI or i(dc)-PCI implementations. The IP header checksum just covers the IP header, not the data. The strategy with just covering the IP header rather than the whole datagram is that it reduces router complexity and speeds delivery.

- The sending device takes data from the TCP layer and passes it down to the IP layer. The IP layer calculates the IP checksum by treating the header as a series of 16-bit integers, adding them together using 1's compliment and then taking the 1's compliment of the result. Since the header includes the source and destination address, the critical routing data integrity is assured. The IP datagram is then passed down to the Ethernet Protocol. The Ethernet Protocol forms an Ethernet packet at the data link layer. The 32-bit CRC is calculated and inserted in the Frame Check Sequence field. The packet is then passed down to the physical layer and transmitted.
- The datagram is received by the physical layer of a router in transit and is passed up to the Ethernet data link layer. The data link layer applies the same Ethernet CRC algorithm used by the transmitting device. The calculated value is compared to the received value contained in the Frame Check Sequence field of the Ethernet Header.
- If the two values are equal, the Ethernet packet is passed up to the IP Network layer
- The IP layer applies the same checksum algorithm used by the transmitting device. The calculated value is compared to the received value contained in the checksum field of the IP Header.
- If the two values are equal, the IP datagram is accepted, processed, routed, and then passed down to the physical layer and transmitted on.
- If the two values are not equal, the IP datagram is considered corrupt and discarded. The datagram is lost.
- If the two values are not equal, the Ethernet packet is considered corrupt and discarded. The packet is lost.
- If not lost en-route, the datagram reaches the ultimate destination and is passed up to the Ethernet data link layer. The data link layer applies the same Ethernet CRC algorithm used by the transmitting device. The calculated value is compared to the received value contained in the Frame Check Sequence field of the Ethernet Header.
- If the two values are equal, the Ethernet packet is accepted, processed, and passed up to the IP protocol.
- The IP layer applies the same checksum algorithm used by the transmitting device. The calculated value is compared to the received value contained in the checksum field of the IP Header.
- If the two values are equal, the IP datagram is accepted, processed, and passed up the TCP protocol.
- If the two values are not equal, the IP datagram is considered corrupt and discarded. The datagram is lost.
- If the two values are not equal, the Ethernet packet is considered corrupt and discarded. The packet does not get passed up to the IP layer.

TCP Error Detection

TCP error detection is applicable to i-PCI but is not applicable for i(e)-PCI or i(dc)-PCI implementations. TCP provides end-to-end error detection from the original source to the ultimate destination across the Internet. The TCP header includes a field that contains the 16-bit checksum. The TCP checksum is considered relatively weak in comparison to the 32-bit CRC implemented by PCI Express. Ethernet's 32-bit CRC provides strong data link level assurance, but does not cover the data transfers that happen within switches and routers between the links; TCP's checksum does.

- The sending device's TCP software (i.e. the TOE in the HBA or RBA) on the transmitting end of the connection receives data from an application, calculates the checksum, and places it in the TCP segment checksum field. To compute the checksum, TCP software adds a pseudo header to the segment, adds enough zeros to pad the segment to a multiple of 16 bits, then performs a 16-bit checksum on the whole thing. The TCP segment is then passed down to the IP Protocol. The IP layer calculates the IP checksum. The IP datagram is then passed down to the Ethernet Protocol. The Ethernet Protocol forms an Ethernet packet at the data link layer. The 32-bit CRC is calculated and inserted in the Frame Check Sequence field. The packet is then passed down to the physical layer and transmitted.

If not lost en-route, the datagram reaches the ultimate destination and is passed up to the Ethernet data link layer. The data link layer applies the same Ethernet CRC algorithm used by the transmitting device. The calculated value is compared to the received value contained in the Frame Check Sequence field of the Ethernet Header.

If the two values are equal, the Ethernet packet is accepted, processed, and passed up to the IP protocol.

The IP layer applies the same IP checksum algorithm used by the transmitting device. The calculated value is compared to the received value contained in the checksum field of the IP Header.

If the two values are equal, the IP datagram is accepted, processed, and passed up the TCP protocol.

The TCP layer applies the same TCP checksum algorithm used by the transmitting device. The calculated value is compared to the received value contained in the checksum field of the TCP Header.

If the two values are equal, the TCP segment is accepted, processed and passed up to the application. The sequence number is noted and the TCP ACK protocol is informed.

If the two values are not equal, the segment is discarded.

If the two values are not equal, the IP datagram is considered corrupt and discarded.

If the two values are not equal, the Ethernet packet is considered corrupt and discarded. The packet does not get passed up to the IP layer.

Link PDU Error Detection

All Link PDUs are generated by the i-PCI Protocol Controller in the HBA and RBA. There are two types of Link PDUs and the error detection is different for each:

PDS PDU: The PDS PDU is a fixed length of 15 bytes or 17 bytes if the optional Header CRC is selected. PCI Express ACK and NAK protocol support is one of the primary functions handled by the PDS PDU. The PDS DLLP Field directly maps to the PCI Express DLLP ACK or NAK "Reserved", "AckNak_Seq_Num", and "16-bit CRC" fields. In the case of the ACK/NAK DLLP, the last 12 bits of the field contain the Sequence number for the last received good TLP. The sending and receiving bridges calculate the PCI Express 16-bit CRC field as part of the PCI Express Protocol.

Figure 48A:
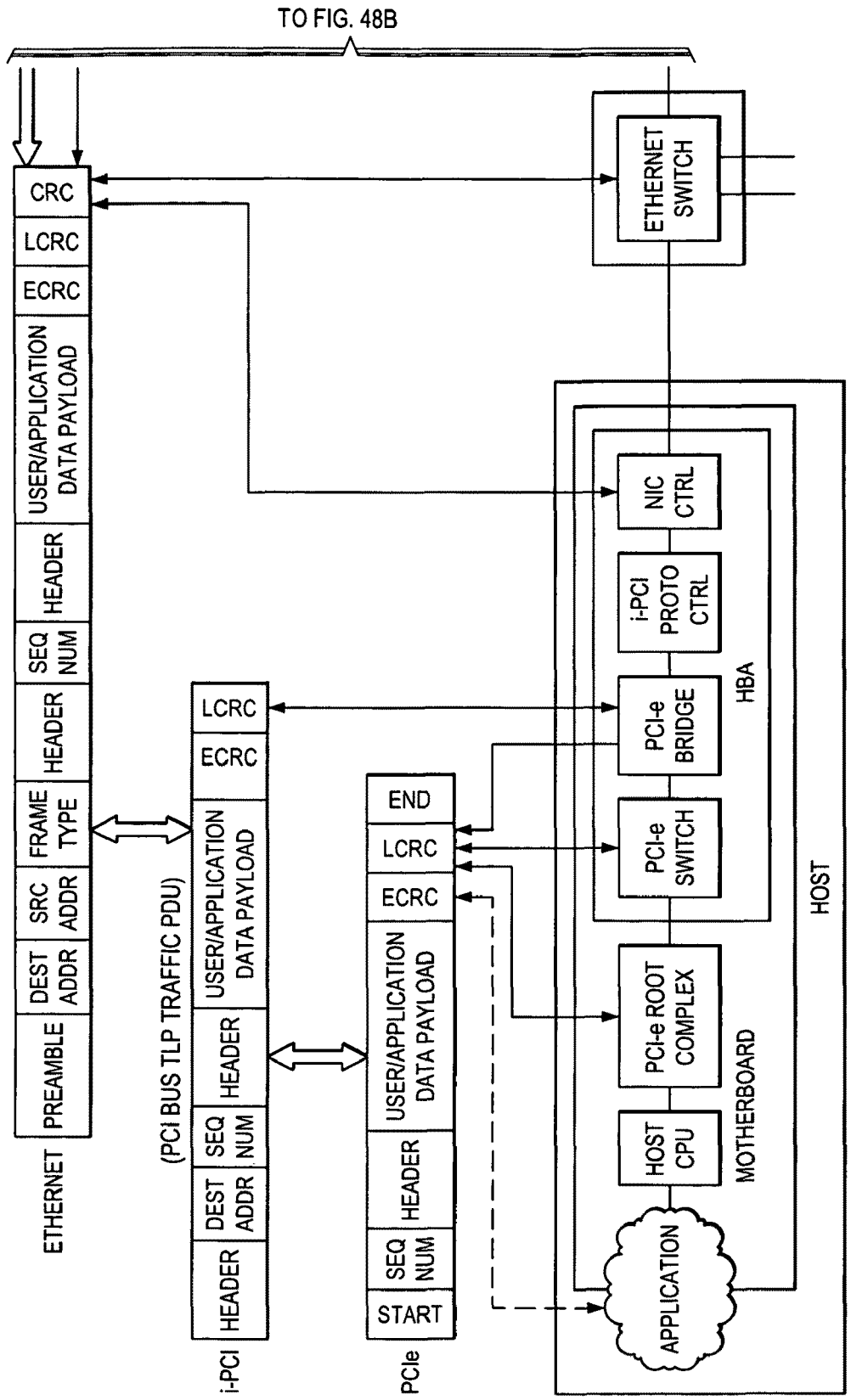
FIG. 48 depicts i-PCI Error Detection Overview.
Figure 48B:
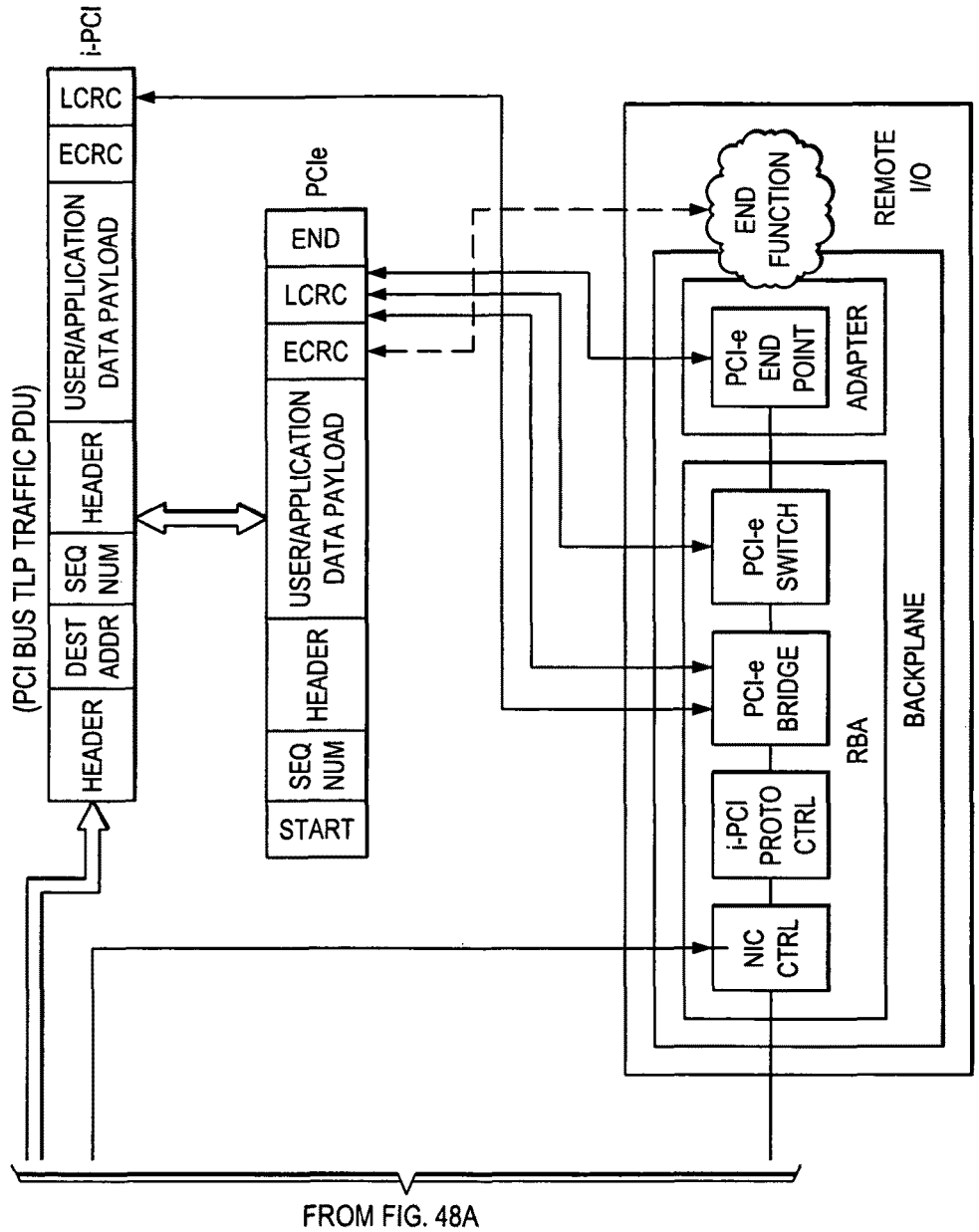
Figure 48C:
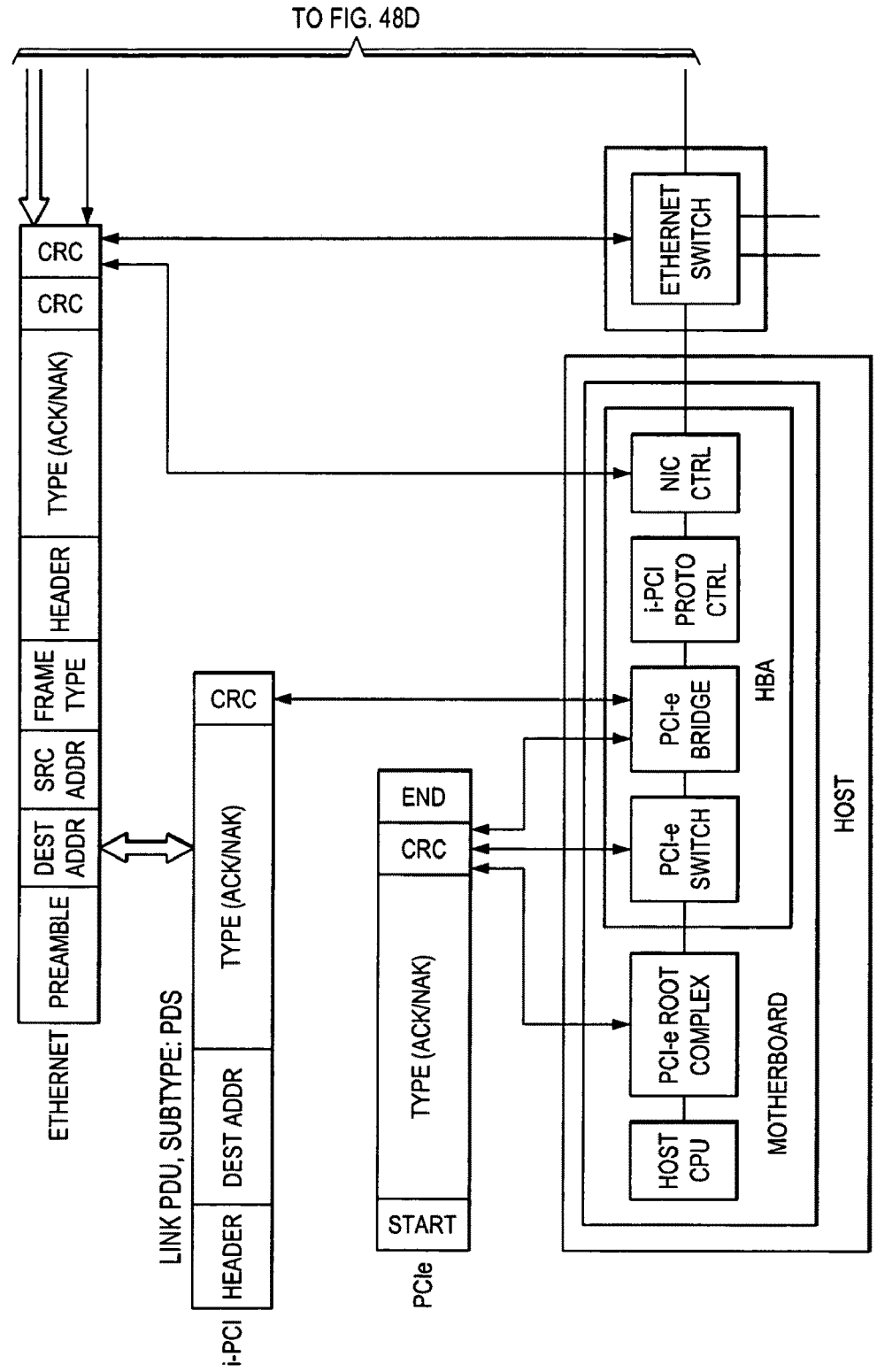
Figure 49A:
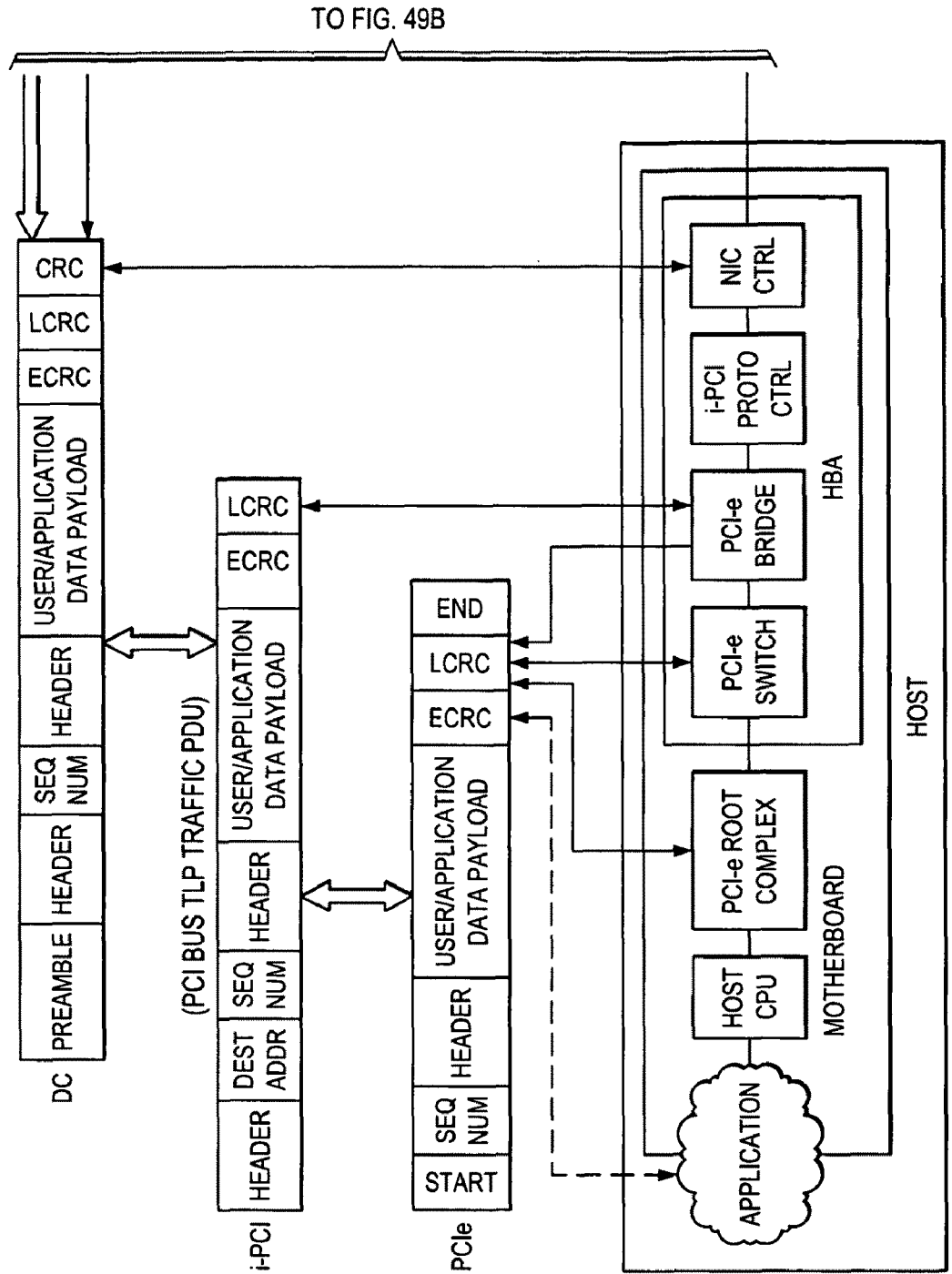
FIG. 49 depicts i(e)-PCI Error Detection Overview.
Figure 49B:
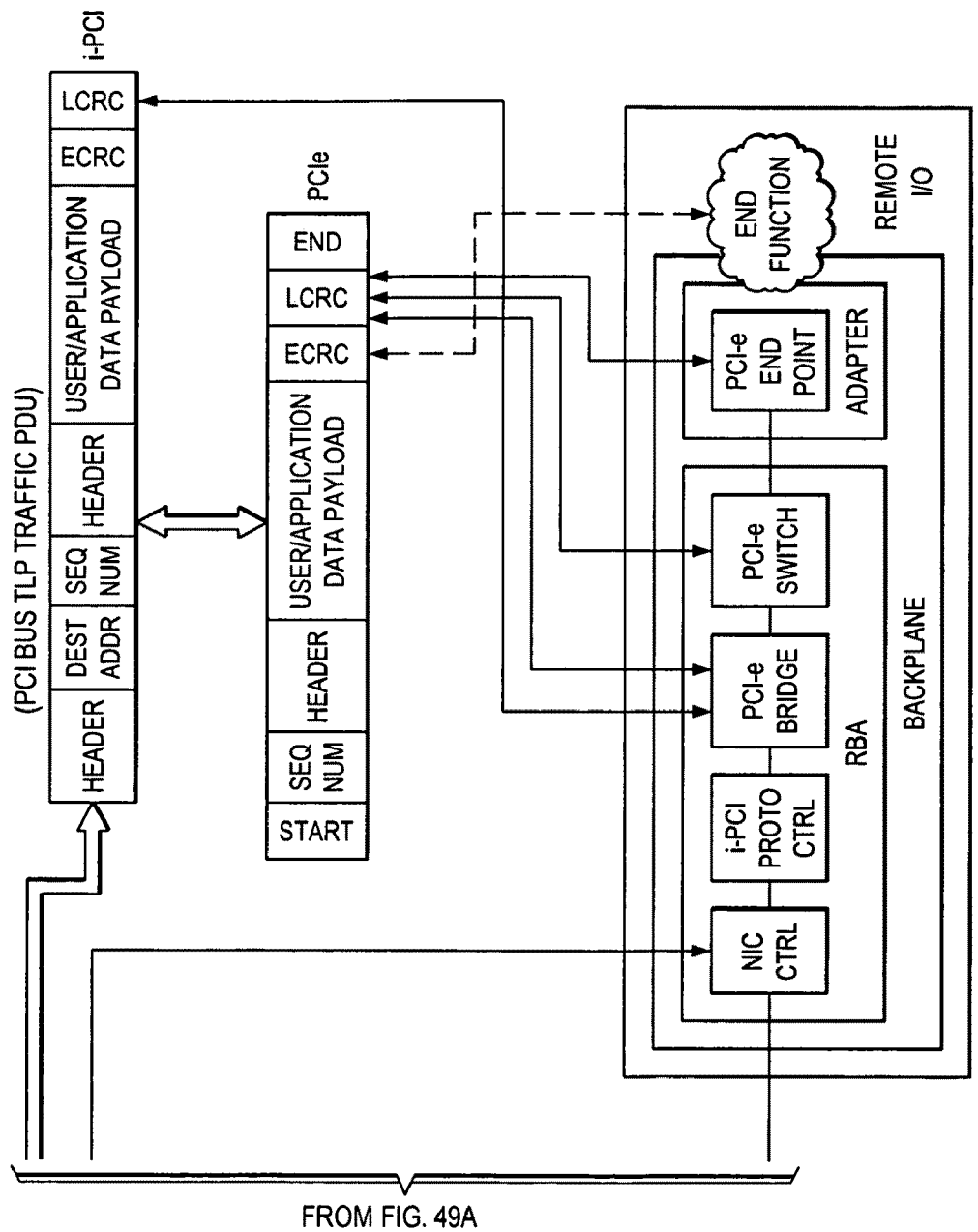
Figure 49C:
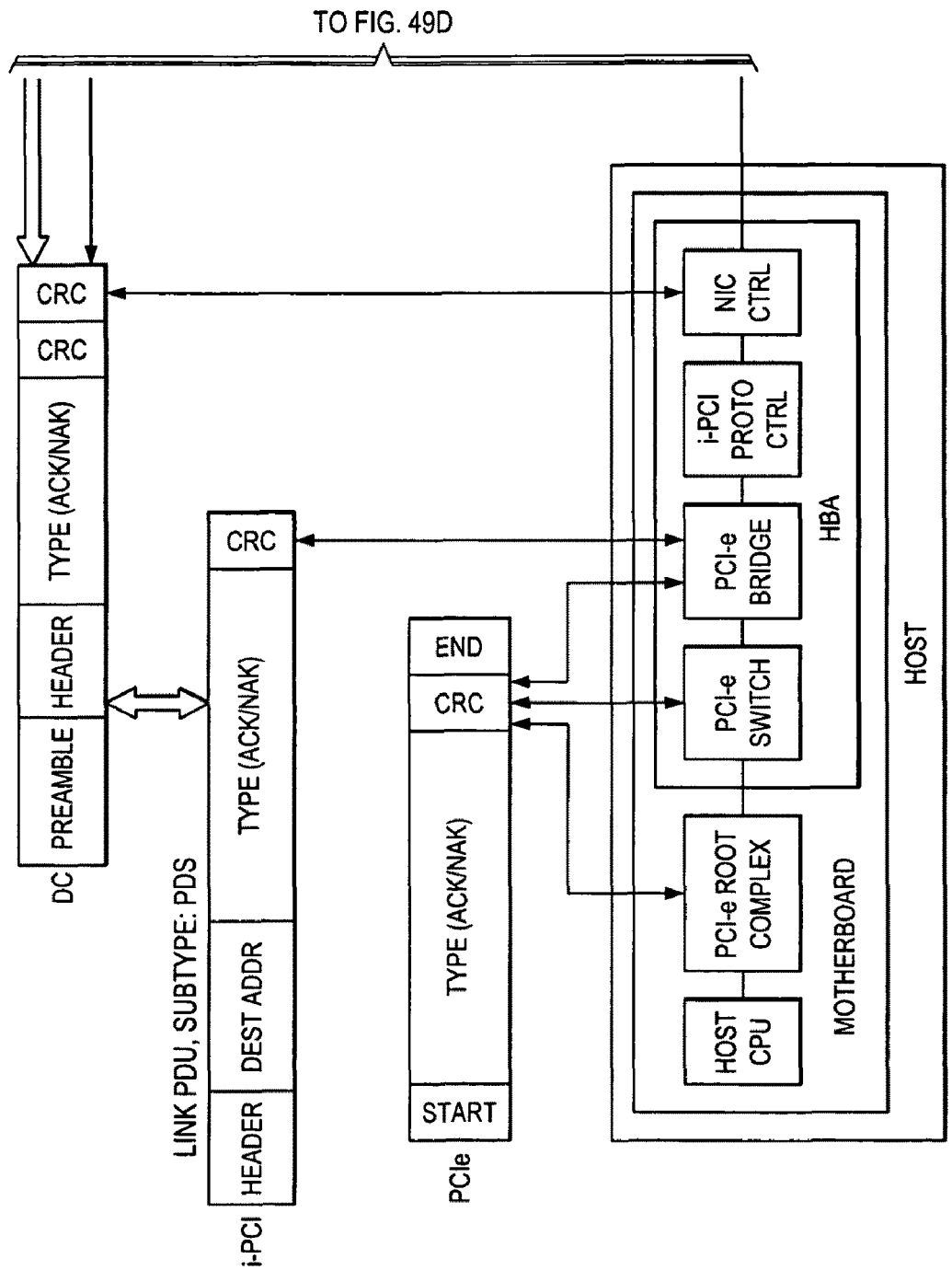
Figure 49D:
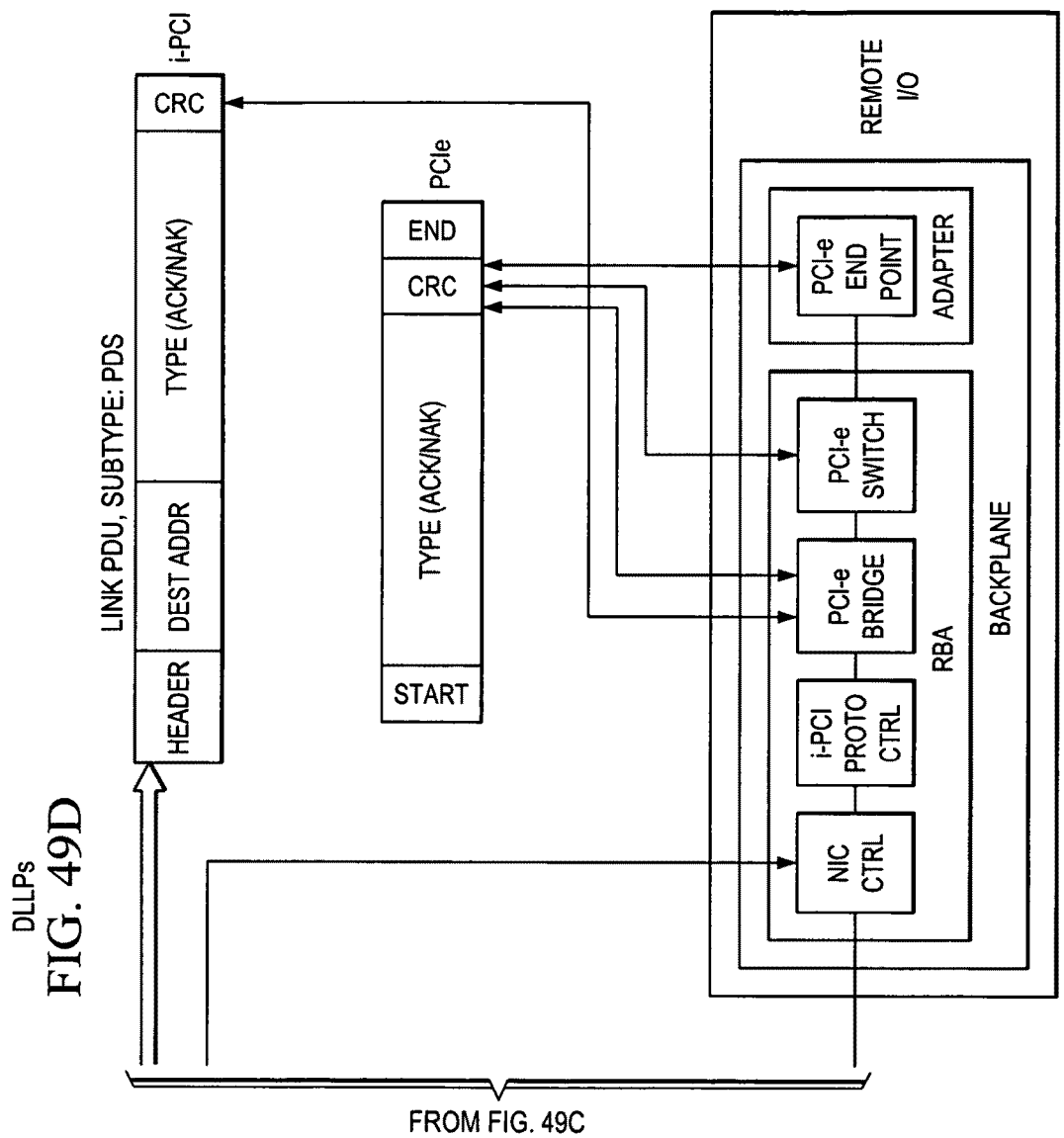
Figure 50A:
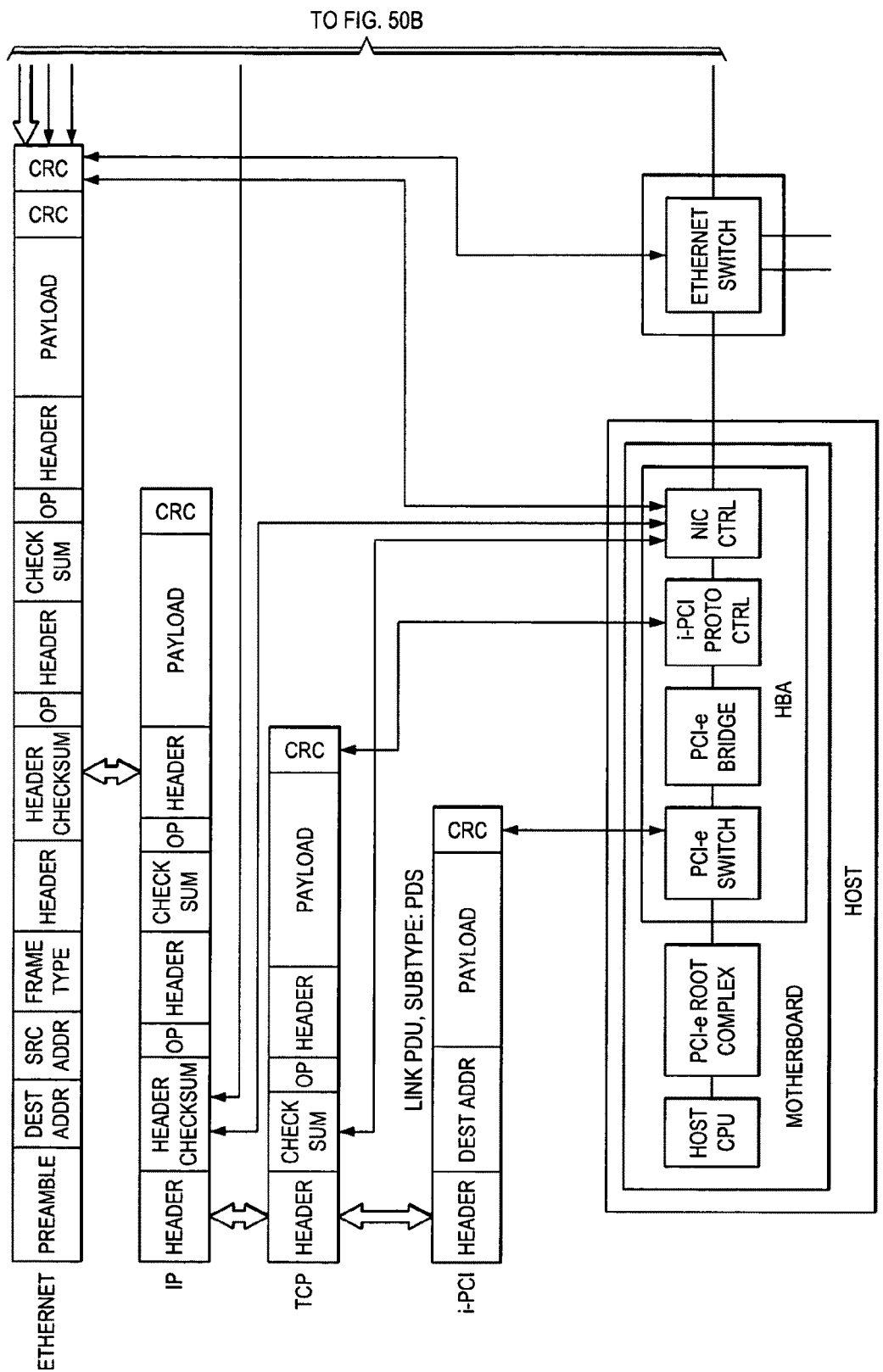
FIG. 50 depicts i(dc)-PCI Error Detection Overview.
Figure 50B:
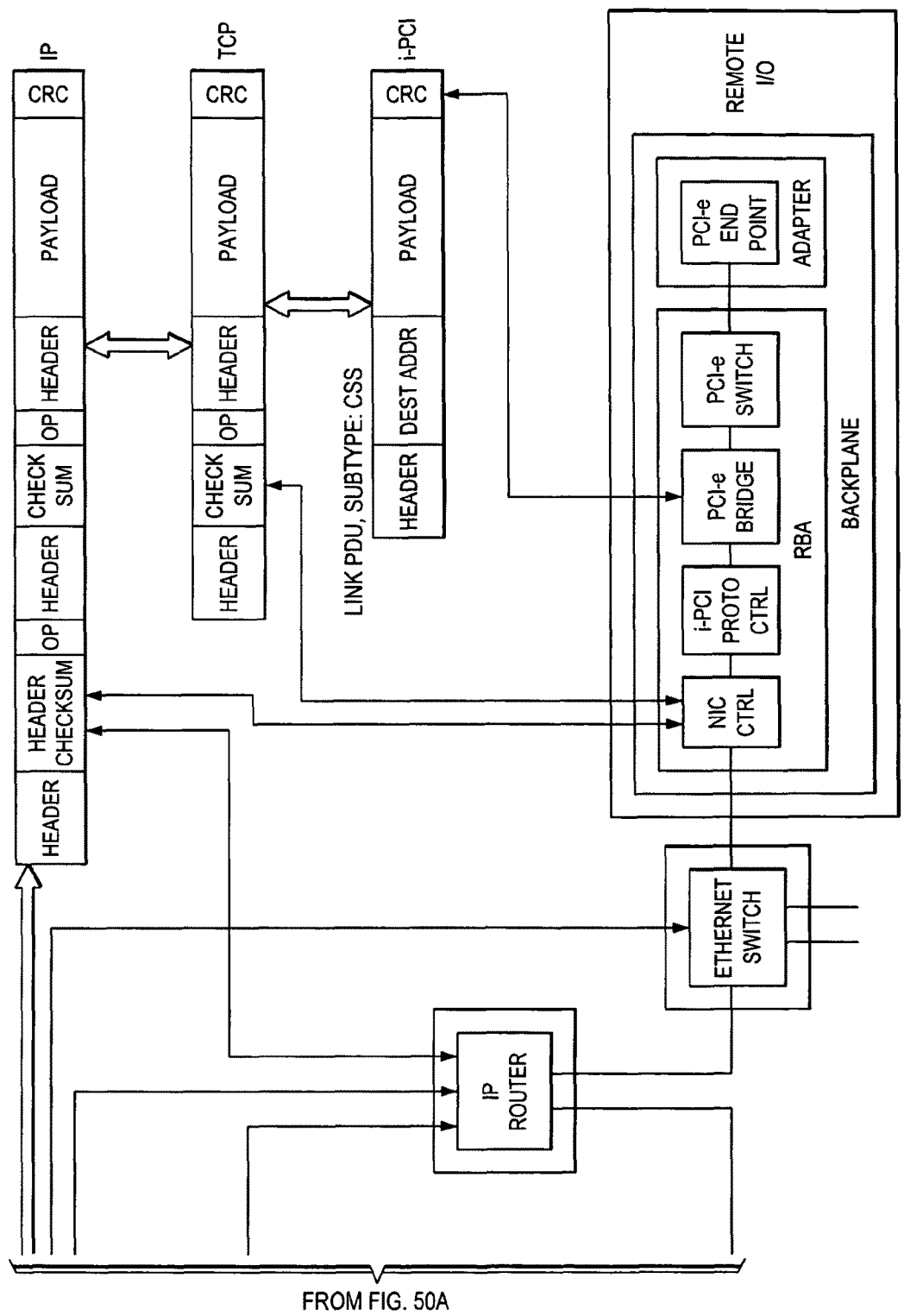
Figure 50C:
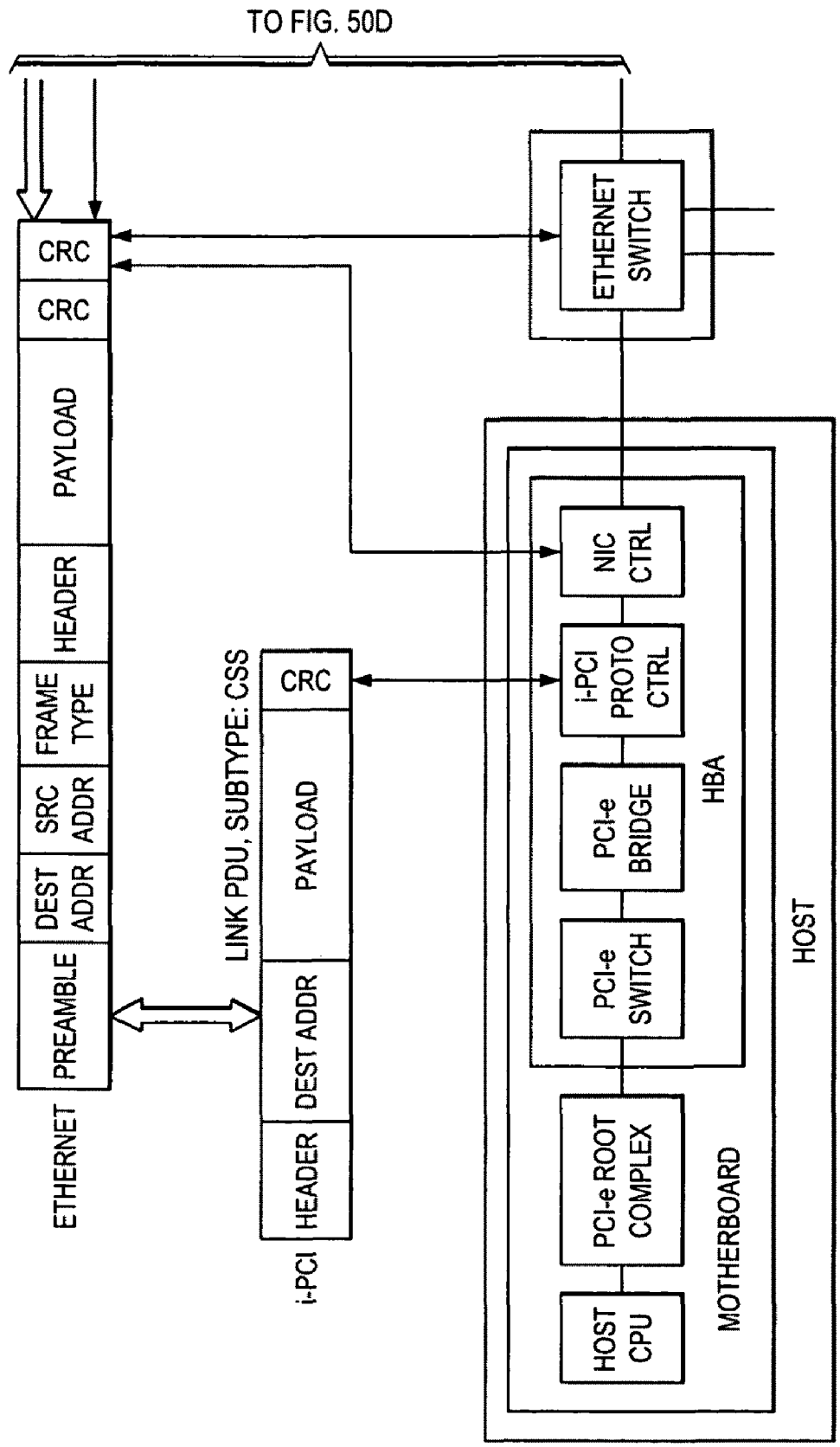
Figure 50D:
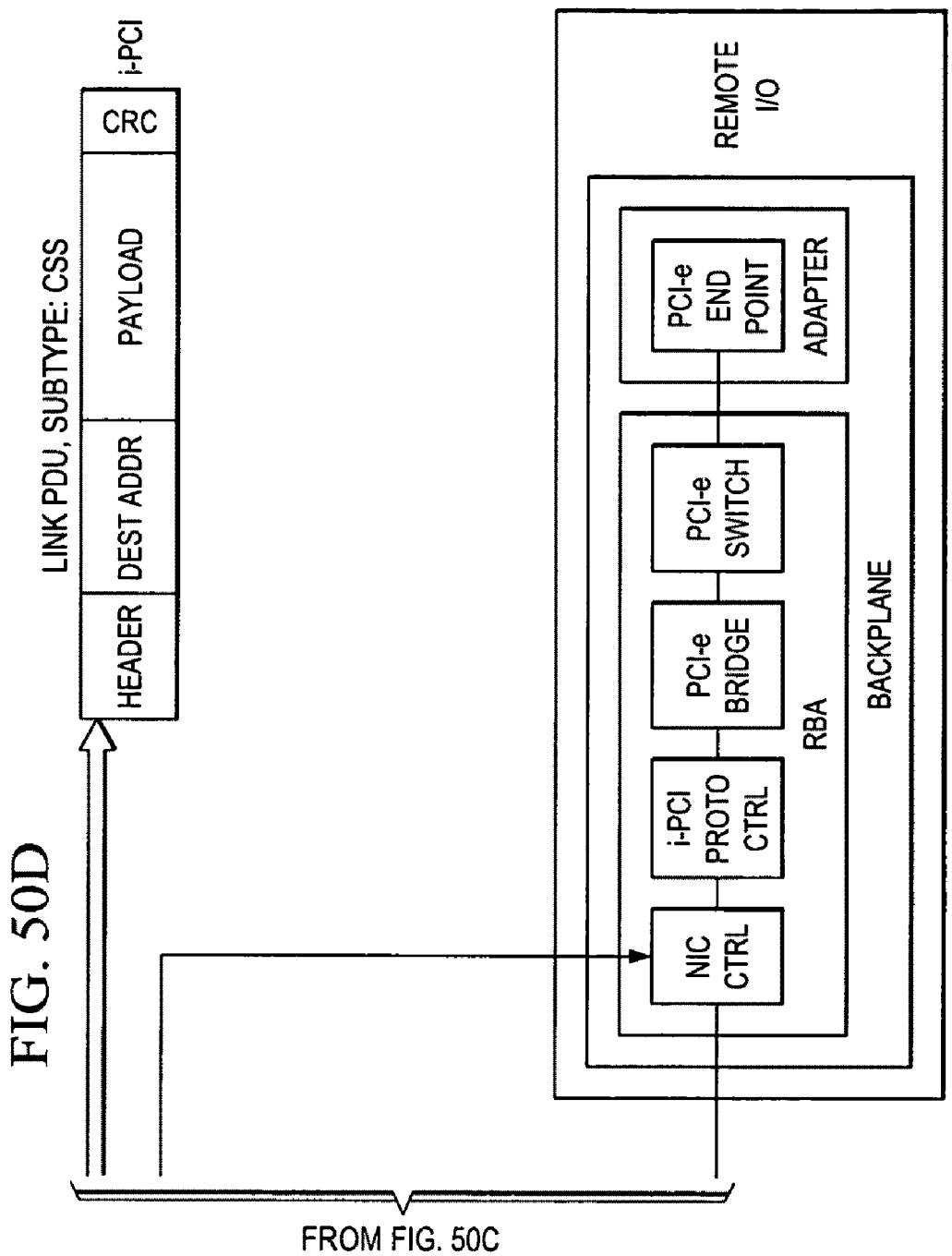
Figure 50E:
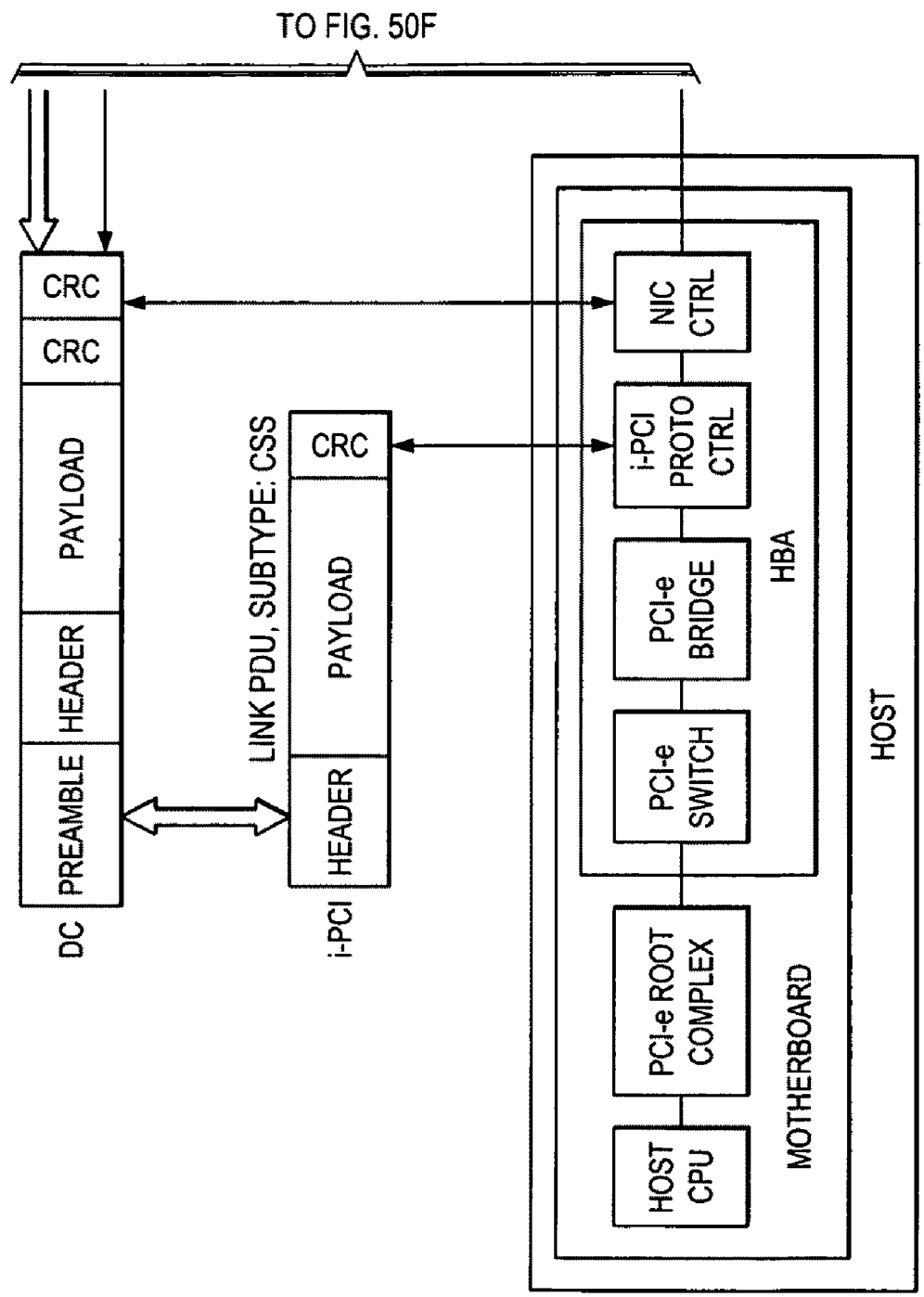
Figure 50F:
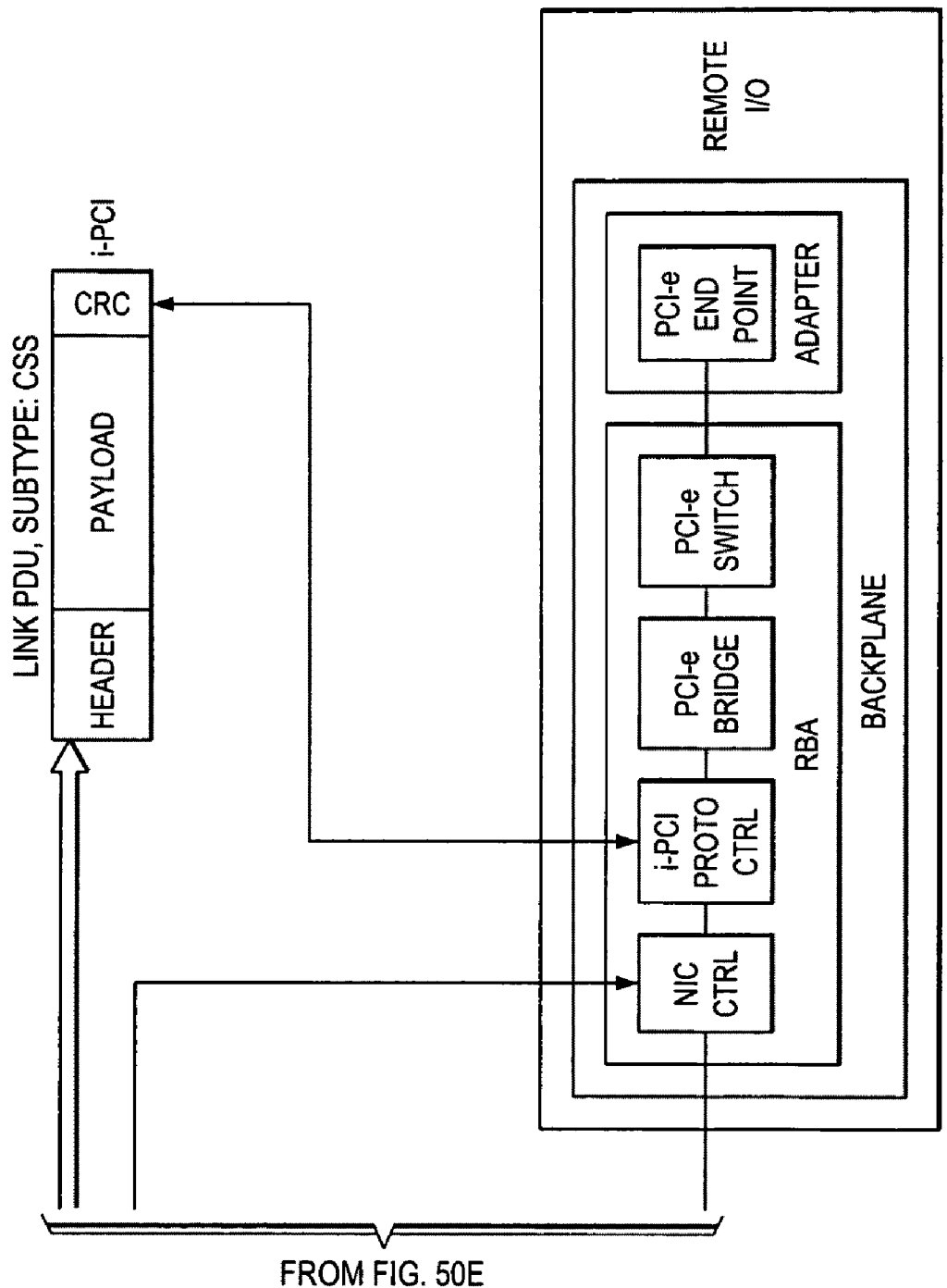
Figure 51:
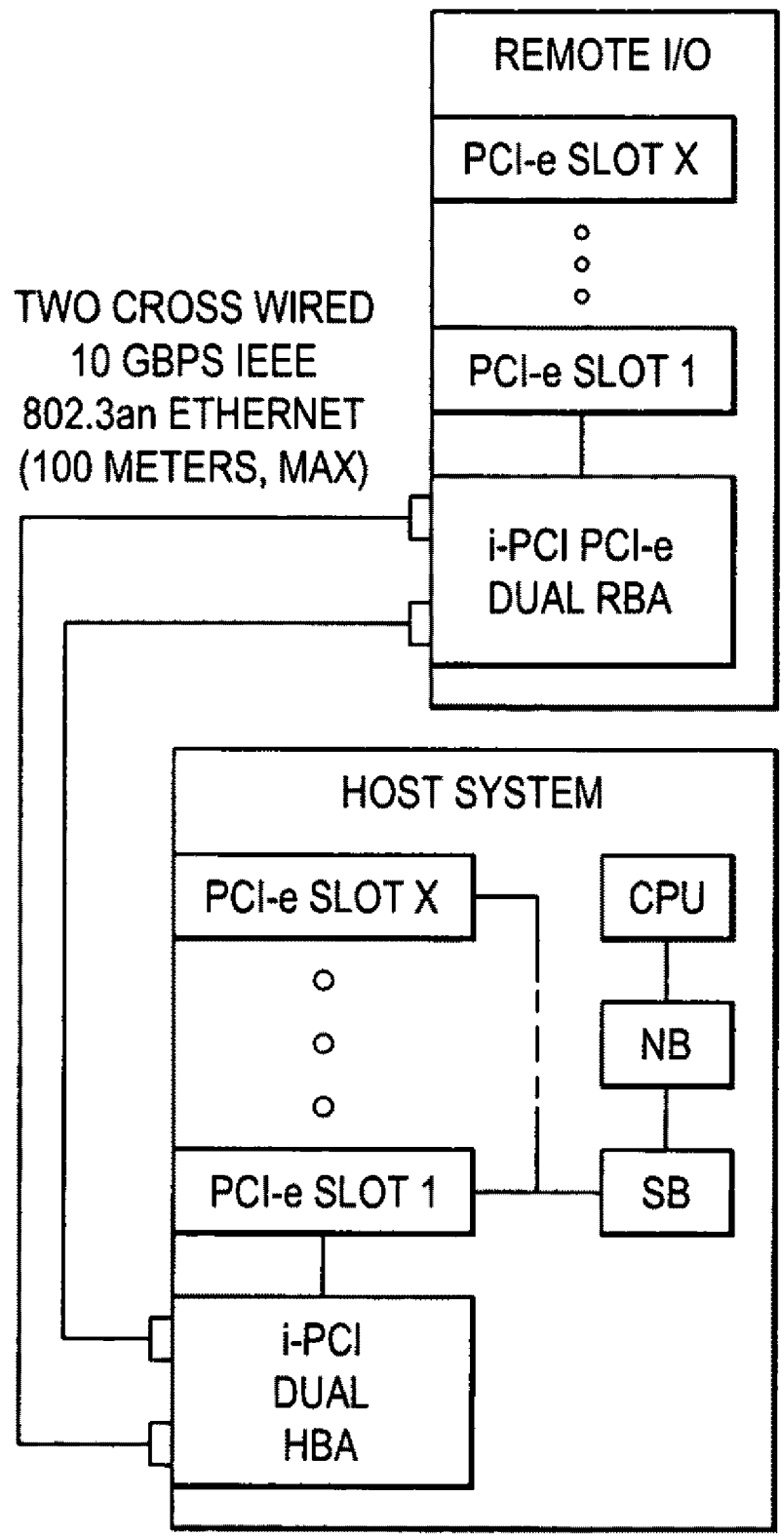
FIG. 51 depicts Link PDU, Subtype CSS Error Detection Overview.

CSS PDU: The i-PCI protocol requires the i-PCI Protocol Controller in the HBA to be able to contact the i-PCI Protocol Controller in each RBA for command & control and synchronization. The RSYNC application running on the i-PCI Protocol Controller accomplishes these tasks utilizing the Link PDU. The Link PDU "subtype" that provides this capability is referred to as the Command & Control/Synchronization (CCS) PDU. In contrast to the PDS PDU, the CCS PDU has a payload field that varies in length, depending on the CMD/RSP field. There is no length field as the length is defined specific to the Command or Response. A 32-bit CRC is calculated and added to the end of the CCS Link PDU to cover the entire PDU. See FIG. 51 Link PDU, Subtype CSS Error Detection Overview I-PCI PDU Header Optional CRC The 2-byte PCI Bus TLP Traffic PDU HK Header and the 2-byte PCI Express DLLP Support (PDS) PDU Header are covered by the Ethernet CRC calculation in all three implementations. However, this does not provide protection for the headers during internal processing and transfers within Ethernet switches and IP routers. Both headers are also covered in the TCP checksum calculation in the i-PCI implementation. However, the TCP checksum may be considered inadequate for high data integrity applications. Therefore, as an option, a separate 16-bit CRC, specific to i-PCI, may be calculated for the header and appended to the header if additional data integrity is desired. The option is specified during configuration and is indicated in the CRC field of the headers. An application is able to tradeoff data integrity versus reduced complexity and reduced latency through this option. The non-CRC option is illustrated in the Error Detection Overviews (FIGS. 48-50)

Error Handling i-PCI leverages two levels of error handling.

1. The first level is the inherent PCI Express error handling mechanism for TLPs. Each TLP has a sequence number added by the sender at the data link layer. The sender keeps the specific TLP, identified by sequence number, in a retry buffer until it gets an ACK DLP from the receiver at the other end of the link. If an error was detected by the receiver, an NAK DLP is sent and the sender resends the particular TLP from it's retry buffer.

Additional error checking is done by the end device/receiver, per the "Malformed TLP" mechanism. The receiver is required by the PCI Express protocol to check for discrepancies in the length field, max payload size, TD bit vs. the presence of a digest field, and memory requests that cross 4 k boundaries.

2. The second level is the inherent TCP error handling mechanism for TCP packets. As the PCI Express packet is encapsulated in a TCP packet, a sequence number is generated as part of the header. The sequence number corresponds to the first byte in the packet, with each subsequent byte in the packet indexed incrementally. The receiver returns an ACK with a sequence number that corresponds to "the-last-byte-it-received-without-error+1" (the next byte it needs from the sender). The sender then transmits (or retransmits) beginning with the last sequence number ACKed.

i(e)-PCI and i(dc)-PCI include the first level PCI Express error handling mechanisms for TLPs, but do not include the second level TCP error handling mechanism. The lack of the second level error handling is offset by the simpler (less error-prone) network topology associated with these implementations.

Data Coherency

It is important to ensure endpoints and applications always have the intended data (no less/no more) in the order it was intended, at the time it was intended.

System Timeouts

With an extended system, timeouts that are optimized for a localized use become problematic. This section addresses the different categories of timeouts and how the i-PCI protocol handles these timeout mechanisms.

PCI System Timeouts

The PCI Express Specification includes a timeout mechanism for split transaction completion. Any PCI Express device that issues requests requiring completions must implement the completion timeout mechanism. The requirements for this timer are:

Must not expire in less than 50 µs.
Should not expire in less than 10 ms.
Must expire if transaction is not completed within 50 ms.

If the timer expires, it results in the generation of an Uncorrectable, Non Fatal error.

Driver and Application Timeouts

I/O device drivers may be written to include intentional timeouts. Typically, these timeouts do not occur during initialization, but are seen from within an executing application that uses the driver. The main types of driver timeouts seen are:

1. Device query response time. If a device does not respond to a query within an expected time, the driver may report an error or go into a reset state.

2. Data transfer time. If a device does not return the amount of data required within the expected time, a driver may experience data starvation. The driver may report an error, request a resend, or go into a reset state.

I/O device drivers may be written in a way that unintentional timeouts are included in the code. Device driver developers often don't validate and verify their code other than with the intended device inserted in an upper tree bus, (i.e. bus 1). There may be a lack of driver robustness in handling extended latencies, even though longer latencies may not adversely impact the use of the device. The results of the unintentional timeouts can be unpredictable. If the driver is particularly poorly written, an unexpected termination, system destabilization, or a system crash results.

Applications may be written to include intentional timeouts. The main types of application timeouts seen are:

1. Driver response time. If a device driver is unable to deliver the results of a device transaction within an expected time, the application may erroneously assume the device is not present or it may indicate the device is not working properly or that the device driver is corrupted or malfunctioning.

2. Data transfer time. If a device driver does not deliver the amount of data required within the expected time, the application may experience data starvation. The application may struggle, lurch, and perform at a reduced functionality, it may stop execution and indicate the device is not working properly, it may indicate the device has been unintentionally removed, or indicate the device driver is corrupted or malfunctioning.

Applications may be written in a way that unintentional timeouts are included in the code. Applications developers often don't validate and verify their code other than with the intended device inserted in an upper tree bus, (i.e. bus 1). There may be a lack of application robustness in handling extended latencies, even though longer latencies may not adversely impact the use of the device. The results of the unintentional timeouts can be unpredictable. If an application is particularly poorly written, an application may freeze or terminate and exit without explanation.

It can be concluded that i-PCI must include mitigation for driver and application timeouts.

Timeout Mitigation and Handling:

i-PCI must handle the three categories of timeout mechanisms:

1. PCI System Timeouts
2. Driver Timeouts
 a. Intentional
 b. Unintentional
3. Application Timeouts
 a. Intentional
 b. Unintentional i-PCI timeout mitigation and handling is implemented in the HBA. The HBA includes a remote device resource cache reflector/mapper (RCR/M) and buffer memory. The RCR/M—and the associated response behavior for different types of transactions—are enabled or disabled by the System Data Transfer Optimization Utility.

Configuration Registers Mirror enabled. The HBA will respond to configuration address space transactions for remote I/O devices and bridges.

The HBA configuration registers mirror is constantly updated and kept in sync via regular i-PCI packet exchanges with the RBAs.

Following a configuration response, the HBA will re-sync with the affected RBA device configuration register.

Data Transfer Response enabled.

The HBA is enabled to respond with a replay (duplicate data) cached in the case of a read or accept data on behalf of the RBA in the case of a write. The HBA passes the data transfer transaction to the RBA.

This approach is likely to find use in applications involving real-time low latency non-data critical applications such as video streaming and processing.

PCI System Timeout handler enabled.

The HBA keeps a table of latency measurements, updated regularly via i-PCI packet exchanges with the RBAs.

The table of latency measurements is initialized by the System Data Transfer Optimization Utility and accessed by the System Data Transfer filter driver during system initialization.

Table of latency lists measurements are indexed by RBA, bridge, and by device so that latency variations can be accounted for.

If the latency measurements indicate that the PCI System Completion Timer is likely to expire in a device, bridge or root complex when posting transactions to an RBA, the completion timeout mask in the root port is set to prevent reporting this error to the system. Thus the error is disabled.

Dynamic Resource Add and Removal

PCI Express includes native support for "non-surprise hot-plug". i-PCI preserves this capability for the host operating system to re-enumerate the PCI system and re-allocate/reassign resources during runtime. An example of this for i-PCI is if a user hot-swaps (a hot-remove followed by a hot-plug) an expansion card in one of the Remote I/O units. Support of this scenario is an important requirement for high reliability/high availability or non-stop applications. The hot swap function is defined by the following steps:

1. User-initiated notification of hot swap intent.
2. Physical ability to access and remove/replace a failing expansion card
3. Shutdown of the associated applications and drivers and shutdown of power to the slot.
4. Ensuring the Operating System and unrelated applications remain running and unaffected while hot-swap is occurring.
5. User-initiated notification of hot swap completion.
6. Reapplication of power to the slot and restart/reload of the associated applications and drivers.
7. Resumption of tasks.

The HBA includes the ability to detect and snoop the PCI Express hot swap packet traffic. The HBA then updates the PCI System mirror (resource cache reflector/mapper or "RCR/M") for all changes (if there were any net changes) that occurred as a result of the dynamic add/removal of resources.

System Performance
I-PCI HBA Spoof Implementation Performance

PCI Express can be classified as a high bandwidth, low overhead, low latency interconnect. In order to serve as a viable transport, i-PCI must retain or mitigate these basic performance characteristics. 10 G Ethernet provides the raw bandwidth necessary to preserve the high bandwidth characteristic and in fact is what makes i-PCI possible. With the basic bandwidth requirements addressed, the low overhead and low latency characteristics remain the primary performance challenges for i-PCI.

Performance Classes:

Application software, Operating System, and I/O driver driver transparency—all goals of i-PCI—does not mean that performance is expected to be identical to the default native PCI bus or PCI Express implementation. In the majority of applications, there will be some notable difference when comparing the performance in an i-PCI implementation to the default native PCI bus or PCI Express implementation. It is useful to define a class system to categorize this relative difference. The class system helps avoid the tendency to categorize an application as "it works over i-PCI or it doesn't work over i-PCI" or that it "works, but . . . just sort of". A class system provides common definitions for considering and discussing the suitability of an application for i-PCI. With this background in mind, a class system for i-PCI performance is defined:

Class I: Class I performance: There is no measurable difference, at the application level, when comparing the performance in a given i-PCI implementation to the default native PCI bus or PCI Express implementation on the same host system.

Class II: Class II performance: There is a measurable difference, at the application level, when comparing the performance in a given i-PCI implementation to the default native PCI bus or PCI Express implementation on the same host system. However, the application runs within an acceptable performance range as specified by the supplier.

Class III: Class III performance: There is a significant measurable difference, at the application level, when comparing the performance in a given i-PCI implementation to the default native PCI bus or PCI Express implementation on the same host system. The application runs without error, but with limited or reduced capability and effectiveness.

Class IV: Class IV performance: There is a major measurable difference, at the application level, when comparing the performance in a given i-PCI implementation to the default native PCI bus or PCI Express implementation on the same host system. The application loads and runs, but is prone to occasional errors or unexpected termination.

System Data Transfer Optimization Utility and Driver:

In consideration of a given system, there are many variables that affect application performance. To achieve maximum performance, the entire data pipeline must be considered and bottlenecks identified and mitigated. To maximize performance, the host motherboard design, the chipset register settings, the PCI bridge and switch configurations, the I/O driver code data transfer methods, bus traffic interactions, must all be considered and configured to work together. Typically, no two systems are identical. To achieve maximum performance, each system must be tuned specifically for a given configuration. Most users lack the systems analysis ability to identify where a bottleneck is in a data pipeline. It is difficult to optimize systems even with a basic PCI system. With i-PCI, the number of variables in play becomes even more challenging, necessitating a different approach. The System Data Transfer Optimization Utility and Driver are tools to address this challenge.

The System Data Transfer Optimization Utility is a boot-disk user-launched program that runs following the BIOS scan and configuration of the PCI System. The utility takes user input information regarding the system configuration and optimization goals, scans the system, initializes the HBA Remote Device Resource Cache Reflector/Mapper (RCR/M), tunes the data pipeline according to a desired performance emphasis, and displays the configuration results.

Creation of the PCI ☐ ☐ IP Address Mapping Table is accomplished by the System Data Transfer Optimization Utility.

Additional Utility Options include:
Enable/Disable HBA RCR/M.
Maximize Data Transfer Performance
Minimize Latency
Balance Data Transfer Performance and Latency
Manual Adjustment of Settings
Monitor Application
The System Data Transfer Driver is a filter driver that can be loaded to run automatically during the Operating System enumeration of the PCI System. It automatically verifies and adjusts settings according to a referenced table previously defined by the System Data Transfer Optimization Utility.
The Driver can be selected to run or not to run via a setup menu option in the System Data Transfer Optimization Utility.

HBA Transaction Logging and Optimization Algorithm:

In a long term stable system implementation, where there are few changes in the configuration and tasks being performed are repetitive, data transfers settle into repeatable and predictable patterns. Certain data transfer types emerge as prevalent is association with a particular I/O. It is possible to optimize I/O performance over time, by monitoring these data transfers and making dynamic adjustment to the transfer pipeline configuration to tailor the pipeline to the prevalent data transfer type. The HBA transaction logging and optimization (TLO) algorithm performs this function for i-PCI.

TLO runs on the HBA i-PCI ☐ ☐ PCIe Controller. This algorithm is a learning algorithm that focuses on optimizing the i-PCI ☐ ☐ PCIe protocol section of the data pipeline.

The HBA transaction logging and optimization algorithm can be engaged or disengaged via a setup menu option in the System Data Transfer Optimization Utility.

Data Transfer Rates

As a baseline in considering i-PCI data transfer rates, it is useful to have as a reference, the theoretical performance vs. typical performance achievable for PCI, and PCIExpress. Refer to Table 34, PCI and PCI Express data transfer rates.

Figure 52:
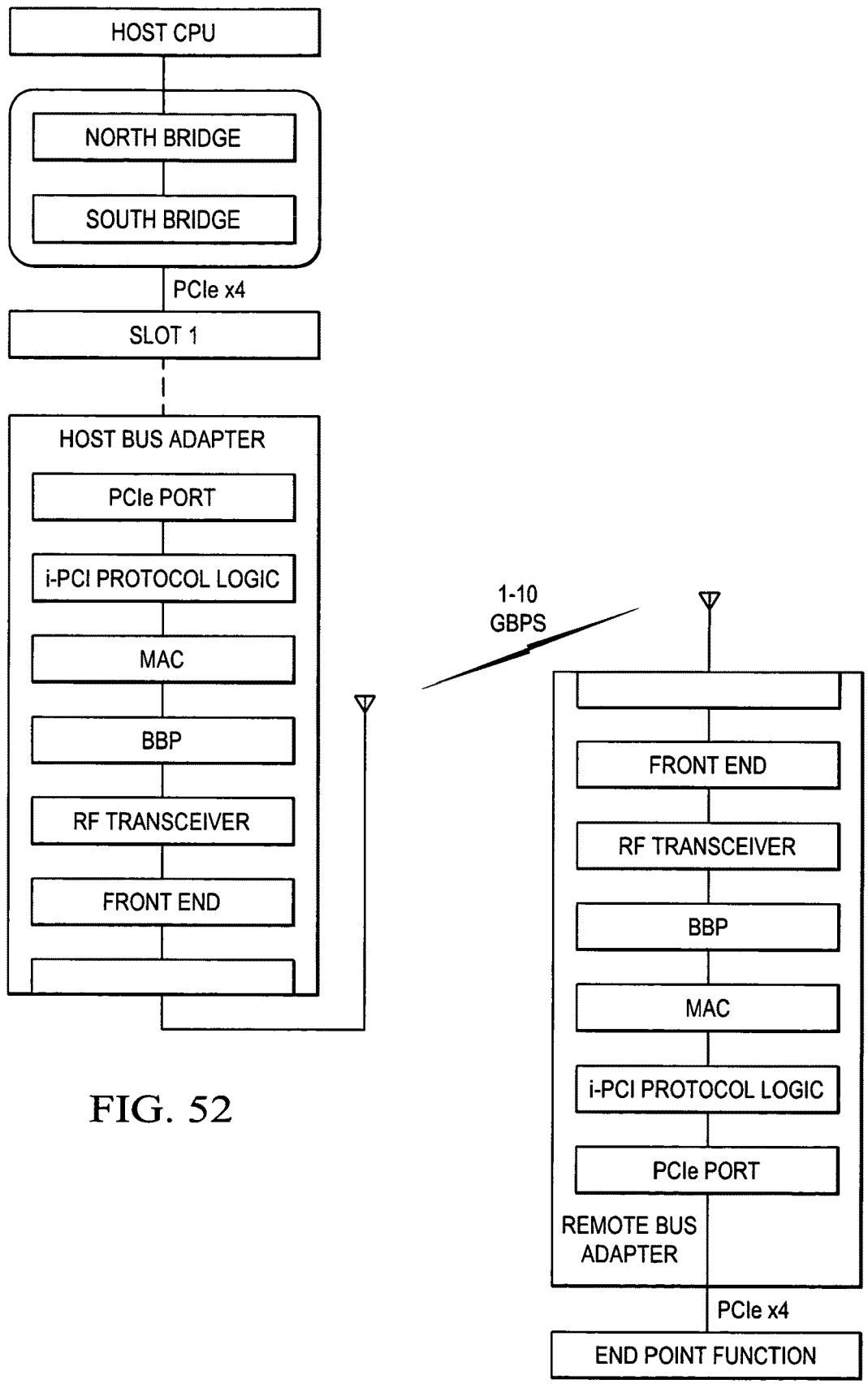
FIG. 52 depicts Example Paralleled Architecture.
Figure 53A:
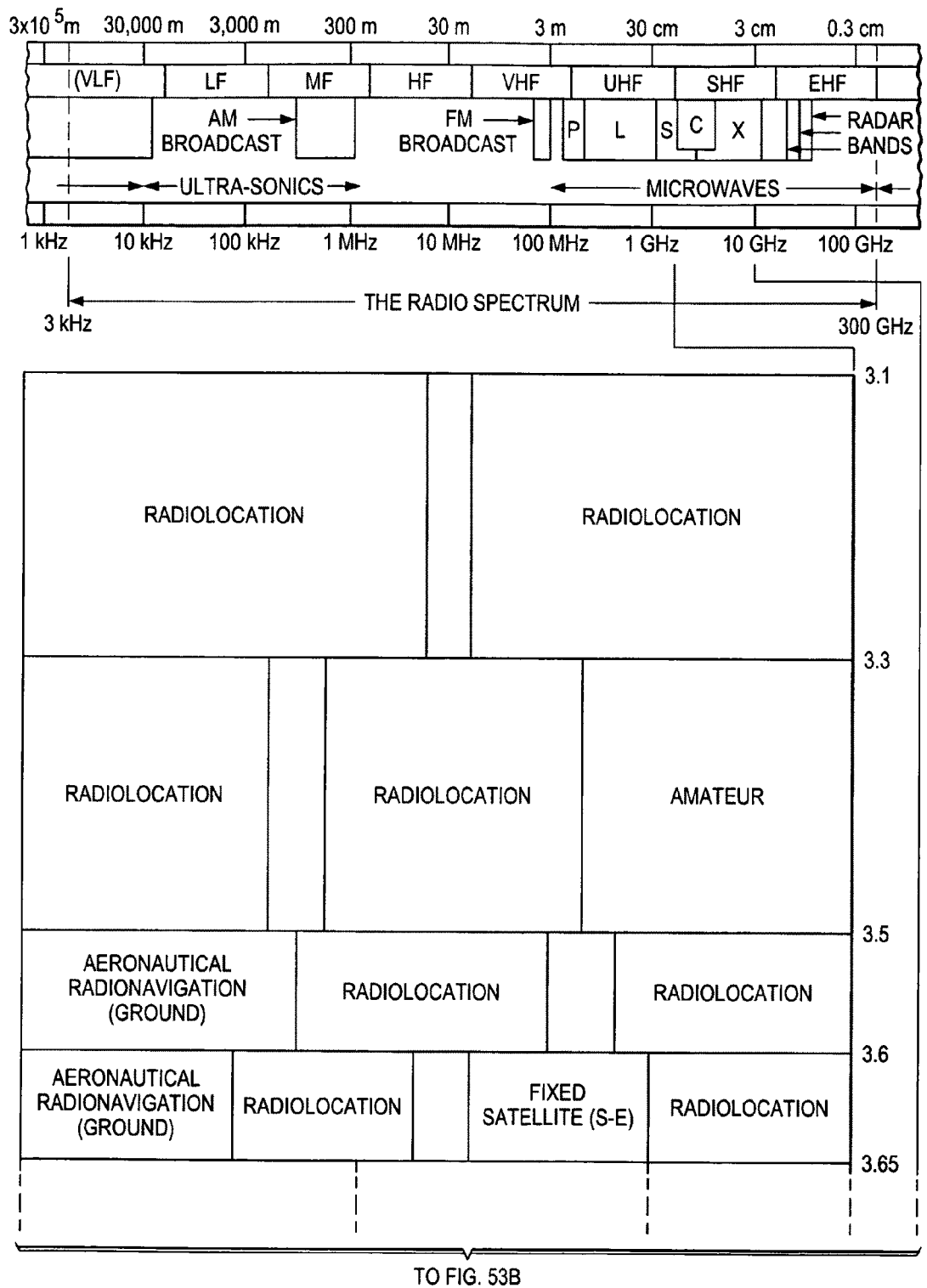
FIG. 53 depicts i-PCI (WPAN) Data Link.
Figure 53B:
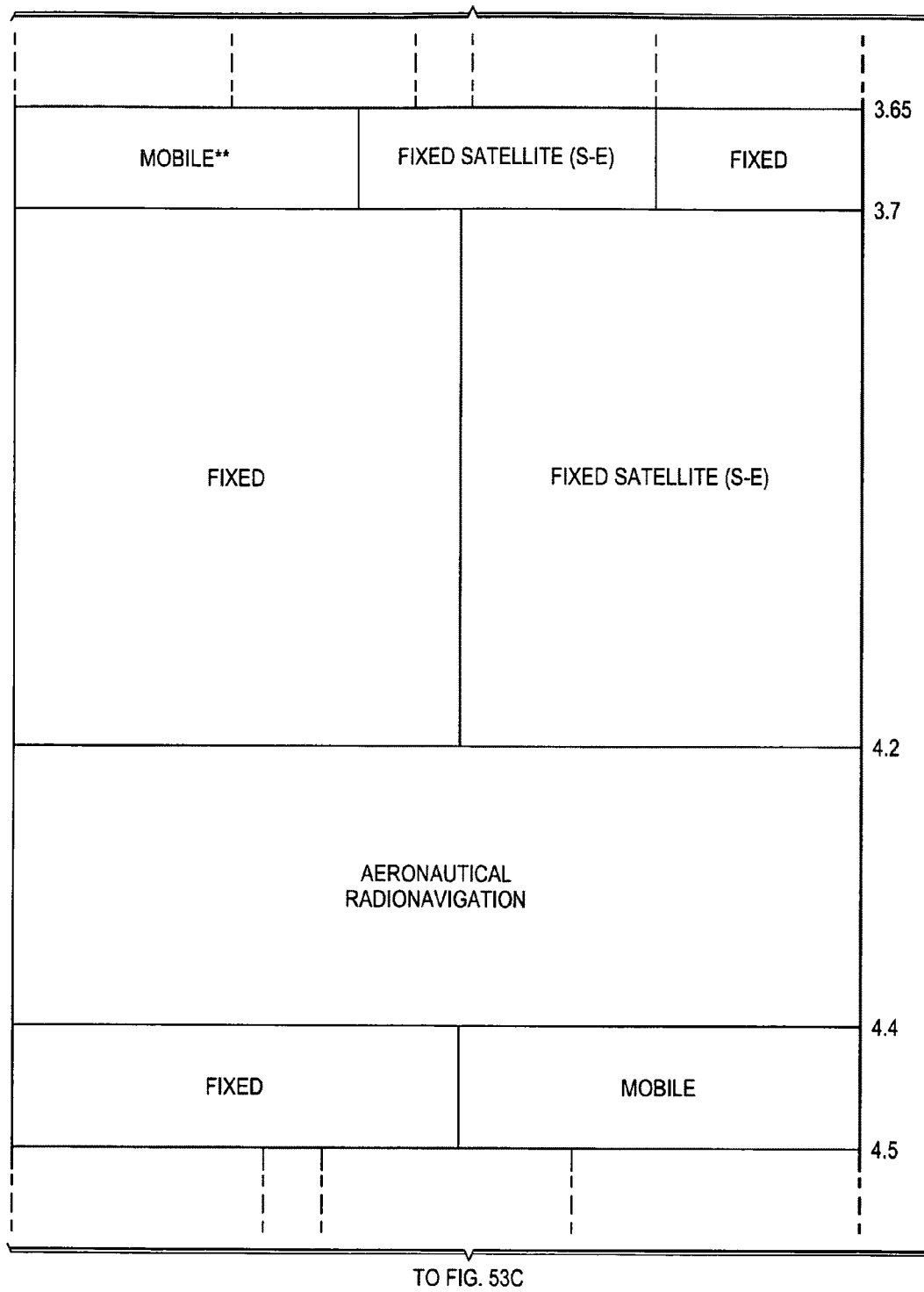
Figure 53C:
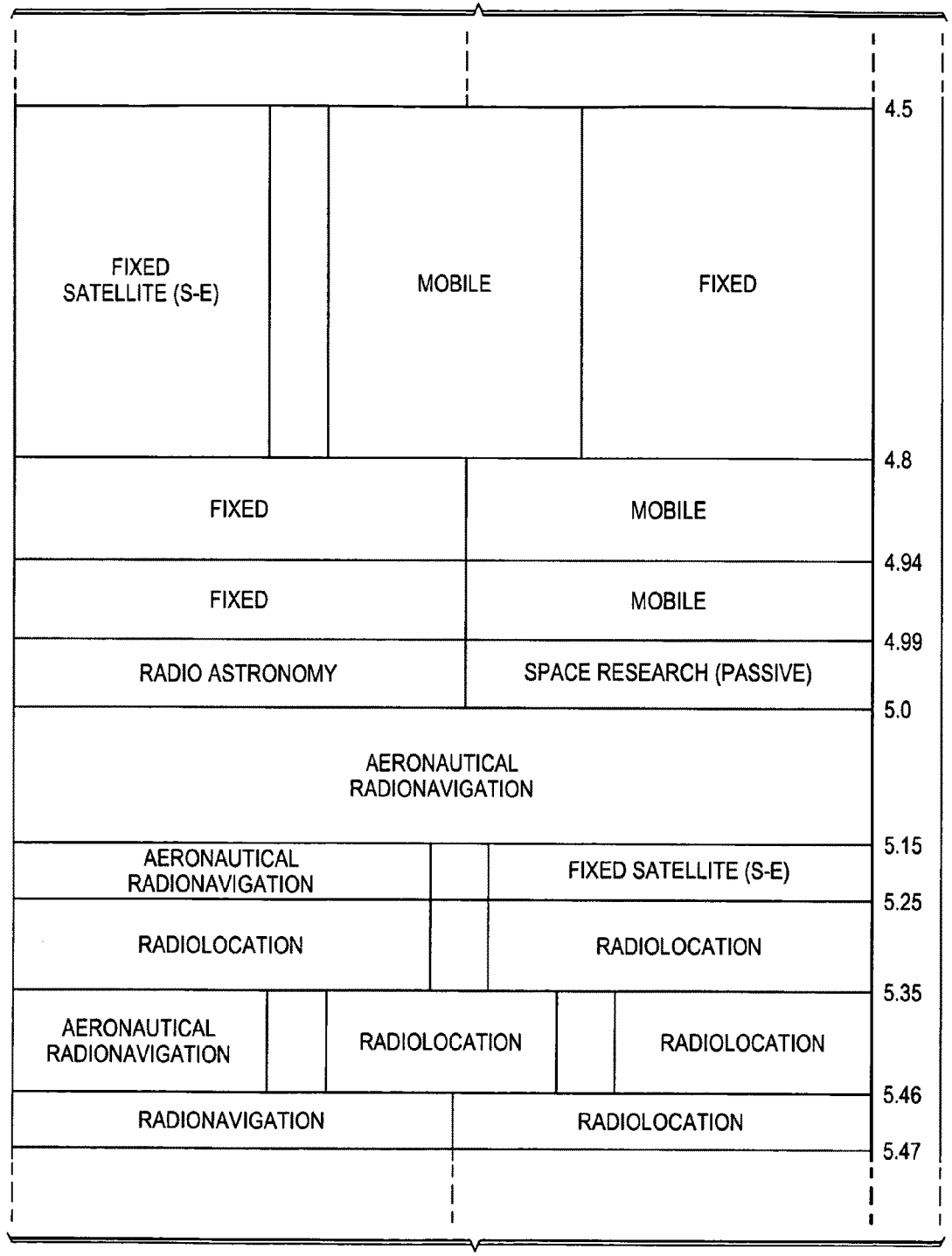
Figure 53F:
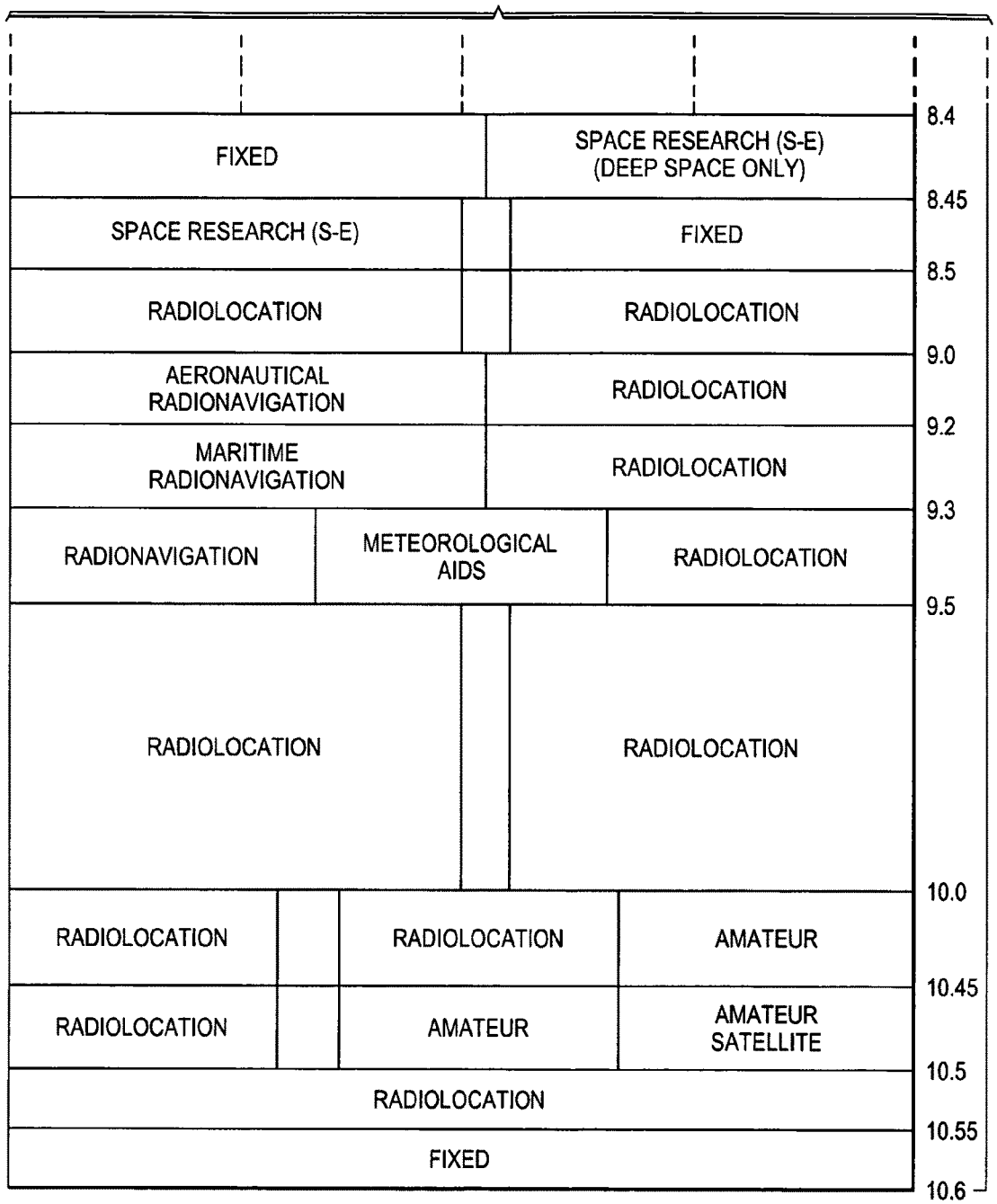

The expected data transfer rates for various transactions is shown in Table 35, i-PCI Data Transfer Rates for the 3 basic implementations of the i-PCI HBA Spoof:
  i-PCI IP-based Network Implementation
  i(e)-PCI MAC-Address Switched LAN Implementation
  i(dc)-PCI Direct Connected Implementation From the Data Transfer Rate tables, it can be concluded that the i-PCI HBA Spoof over 10 Gbps 802.3an has more than adequate bandwidth to handle conventional PCI, adequate bandwidth to match up with x1 dual simplex PCI Express, and borderline adequate (implementation dependent) bandwidth to handle x4 single direction PCI Express. Applications that require PCI Express x4 dual simplex simultaneous data transfers will have impacted performance.

i-PCI data transfer rates could be scaled up to meet the needs of demanding PCI Express applications by implementing multiple (x2, x3 . . . ) 10 Gbs physical connections. This is the same approach used for the LE(dc) variation involvingTriple link aggregation 1 Gbps Ethernet (802.3ab) for mapping to 1-Lane 2.5 Gbps. Except in this case, it is focused on the high end with multiple 802.3an links. Refer to FIG. 52, Example Paralleled Architecture.

Overhead

As a baseline in considering i-PCI data transfer rates, it is useful to have as a reference, the overhead for various PCI, and PCI Express data transactions. Refer to Table 36, PCI and PCI Express Overhead.

TABLE 34

PCI and PCI Express Data Transfer Rates.

| Bus Type | Category | Theoretical Peak Data Transfer Rate | Data Payload | Transaction Type | Typical Performance (Host Motherboard) Data Transfer Rate Peak | Typical |
|---|---|---|---|---|---|---|
| PCI Express | 2.5 Gbps, x1 | ←→ 4 Gbps | 240 DW | MEM READ | 2.4 Gbps | 2.0 Gbps |
|  |  |  |  | MEM WRITE | 2.6 Gbps | 2.2 Gbps |
|  |  | → 2 Gbps | 240 DW | MEM READ | 1.2 Gbps | 1.0 Gbps |
|  |  |  |  | MEM WRITE | 1.3 Gbps | 1.1 Gbps |
|  | 2.5 Gbps, x4 | ←→ 16 Gbps | 240 DW | MEM READ | 13 Gbps | 12 Gbps |
|  |  |  |  | MEM WRITE | 14 Gbps | 13 Gbps |
|  |  | → 8 Gbps | 240 DW | MEM READ | 6.5 Gbps | 6 Gbps |
|  |  |  |  | MEM WRITE | 7 Gbps | 6.5 Gbps |
| PCI | 32-bit 33 MHz | 1 Gbps | 240 DW | MEM READ | 640 Mbps | 520 Mbps |
|  |  |  |  | MEM WRITE | 720 Mbps | 640 Mbps |

The data transfer rates listed are considered preliminary estimates and are useful for relative comparison purposes. Actual data transfer rates will vary considerably depending the particular system. Table 35 will be validated and updated with actual results from the proof-of-concept effort.

The expected overhead for these same transactions is shown in Table 37, i-PCI Overhead for the 3 basic implementations of the i-PCI HBA Spoof:
  i-PCI IP-based Network Implementation
  i(e)-PCI MAC-Address Switched LAN Implementation
  i(dc)-PCI Direct Connected Implementation

TABLE 35 i-PCI Data Transfer Rates.

| HBA Spoof Implementation | Theoretical Peak Data Transfer Rate (10 Gbps 802.3an) | Data Payload Transaction Type | Expected Typical Performance Data Transfer Rate Peak | Typical |
|---|---|---|---|---|
| i-PCI | 10 Gbps | 240 DW | 6.5 Gbps | 4 Gbps |
| i(e)-PCI | 10 Gbps | 240 DW | 7 Gbps | 5 Gbps |
| i(dc)-PCI | 10 Gbps | 240 DW | 8 Gbps | 6.5 Gbps |

TABLE 36

PCI and PCI Express Overhead

| Protocol | Type of Transfer | Header + Trailer (bytes) | Payload (bytes) | Total Frame/Transaction (bytes) | Efficiency |
|---|---|---|---|---|---|
| PCI | Single Byte Data Write | N/A | 1 byte** | Addr + Data = 8 bytes | 12.5% |
|  | Memory Write Multiple (240 DW) | N/A | 960 bytes | Addr + Data = 964 bytes | 99.6% |
| PCI Express* | TLP Single Byte Write Request | 24 | 1 byte** | 28 bytes | 3.6% |
|  | Memory Write Request (240 DW) | 24 | 960 bytes | 984 bytes | 97.6% |

*PCI Express TLP = 1B + 2B + 3DW + 1DW + 1DW + 1B = 24 bytes
**Minimum payload size is 1 DW Overhead becomes especially critical for small frequent data transfers with little or no payload, such as Read requests, Message requests, and other brief syncing, polling, and handshaking transactions. This "small packet" traffic should be minimized in i-PCI implementations.

In review of Tables 36,37 it can be seen that the impact of encapsulation of PCI Express via the i-PCI results in an efficiency hit of approximately 2-6% for bulk transfers and roughly a halving in the efficiency for the smallest transactions. The very poor efficiency for small transactions inherent

TABLE 37 i-PCI Overhead

| Protocol | Type of Transfer | Header + Trailer (bytes) | Payload (bytes) | Total Frame/Transaction (bytes) | Efficiency |
|---|---|---|---|---|---|
| i-PCI* | Single Byte Data Write | 91 bytes | 1 byte** | 95 bytes | 1.1% |
|  | Memory Write Multiple (240 DW) | 91 bytes | 960 bytes | 1051 bytes | 91.3% |
| i(e)-PCI*** | Single Byte Data Write | 51 bytes | 1 byte** | 55 bytes | 1.8% |
|  | Memory Write Multiple (240 DW) | 51 bytes | 960 bytes | 1011 bytes | 95.0% |
| i(dc)-PCI**** | Single Byte Data Write | 47 bytes | 1 byte** | 51 bytes | 2.0% |
|  | Memory Write Multiple (240 DW) | 47 bytes | 960 bytes | 1007 bytes | 95.3% |

*i-PCI header = PCI Express + i-PCI + TCP + IP + Ethernet preamble + header + CRC = 24 B + 1 B + 20 B + 20 B + 26 B = 91 bytes
**Minimum payload size is 1 DW
***i(e)-PCI header = PCI Express + i-PCI + Ethernet preamble + header + CRC = 24 B + 1 B + 26 B = 51 bytes
****i(dc)-PCI header = PCI Express + i-PCI + Ethernet preamble + CRC = 24 B + 1 B + 22 B padding for min Ethernet payload of 46 bytes) = 47 bytes to PCI Express is carried forward into i-PCI and further exacerbated.

Latency

Latency is a big performance challenge for i-PCI. It is expected that latency will surface as a problem for certain applications, thus a big factor in establishing a performance Class system for applications running i-PCI. As a baseline in considering i-PCI latency, it is useful to have as a reference, the typical latency observed for PCI, and PCI Express. Refer to Table 38, Typical PCI and PCI Express Latency.

TABLE 38

Typical PCI and PCI Express Latency.

| Protocol | Data Path | Latency per bus segment object (μS) | One-way data path latency (μS)** |
|---|---|---|---|
| PCI | Bus 0 | North Bridge, Bus 0 = 0<br>End Device Latency* = .400 | .400 |
|  | Bus 0 to Bus 6 | North Bridge, Bus 0 = 0<br>Bridge 1, Bus 2 = .150<br>Bridge 2, Bus 3 = .150<br>Bridge 3, Bus 4 = .150<br>Bridge 4, Bus 5 = .150<br>Bridge 5, Bus 6 = .150<br>End Device Latency* = .400 | 1.15 |
| PCI Express | Bus 1 | Root Complex, Bus 0 = 0<br>End Device Latency* = .400 | .400 |
|  | Bus 0 to Bus 6 | Root Complex, Bus 0 = 0<br>Switch 1 (PCI/PCI Bridge, Bus 1, PCI/PCI Bridge) Bus 2 = .700<br>Switch 2 (PCI/PCI Bridge, Bus 3, PCI/PCI Bridge) Bus 4 = .700<br>Switch 3 (PCI/PCI Bridge, Bus 5, PCI/PCI Bridge) Bus 6 = .700<br>End Device Latency* = .400 | 2.5 |
|  | Bus 0 to Bus 6 With switch mode set to "cut-through" | Root Complex, Bus 0 = 0<br>Switch 1 (PCI/PCI Bridge, Bus 1, PCI/PCI Bridge) Bus 2 = .300<br>Switch 2 (PCI/PCI Bridge, Bus 3, PCI/PCI Bridge) Bus 4 = .300<br>Switch 3 (PCI/PCI Bridge, Bus 5, PCI/PCI Bridge) Bus 6 = .300<br>End Device Latency* = .400 | 1.3 |

*baseline end device=
**x2 for roundtrip latency

Refer to Table 39, i-PCI Latency for the latency anticipated for the 3 basic implementations of the i-PCI HBA Spoof:
1. i-PCI IP-based Network Implementation
2. i(e)-PCI MAC-Address Switched LAN Implementation
3. i(dc)-PCI Direct Connected Implementation

TABLE 39 i-PCI Latency.

| Protocol | Data Path | Latency per bus segment object (uS) | One-way data path latency (uS)** |
|---|---|---|---|
| i-PCI | Bus 0 to HBA to RBA via Internet (Gateway Router) | Root Complex (Bus 0, Root port 1) Bus 1 = 0<br>HBA: PCIe Switch (PCI/PCI Bridge, Bus 2, PCI/PCI Bridge) Bus 3 = .700<br>HBA: FPGA PCI Bridge (PCI/PCI Bridge) Bus 8 = .150<br>HBA: FPGA Packet Processing = .500<br>HBA: FPGA transfer to NIC = .400<br>HBA: NIC: Packet Processing = .500<br>LAN Ethernet Switch = 60<br>Internet = 150000 (150 mS)<br>LAN Ethernet Switch = 60<br>RBA: NIC: Packet Processing = .500<br>RBA: NIC transfer to FPGA = .400<br>RBA: FPGA Packet Processing = .500<br>RBA: FPGA PCI Bridge (PCI/PCI Bridge) Bus 9 = .150<br>***RBA: Switch 1 (PCI/PCI Bridge, Bus 10, PCI/PCI Bridge) Bus 11 = .700<br>End Device Latency* = .400 | 150,125 (150.125 mS) |
|  | Bus 0 to HBA to RBA via Campus Area Network (CAN) | Root Complex (Bus 0, Root port 1) Bus 1 = 0<br>HBA: PCIe Switch (PCI/PCI Bridge, Bus 2, PCI/PCI Bridge) Bus 3 = .700<br>HBA: FPGA PCI Bridge (PCI/PCI Bridge) Bus 8 = .150<br>HBA: FPGA Packet Processing = .500<br>HBA: FPGA transfer to NIC = .400<br>HBA: NIC: Packet Processing = .500<br>LAN Ethernet Switch = 60<br>Campus Network (includes Core Routers) = 1500 (1.5 mS)<br>LAN Ethernet Switch = 60<br>RBA: NIC: Packet Processing = .500<br>RBA: NIC transfer to FPGA = .400<br>RBA: FPGA Packet Processing = .500 | 1625 (1.625 ms) |

TABLE 39-continued i-PCI Latency.

| Protocol | Data Path | Latency per bus segment object (uS) | One-way data path latency (uS)** |
|---|---|---|---|
| i(e)-PCI | Bus 0 to HBA to RBA via Local Area Network (LAN) | RBA: FPGA PCI Bridge (PCI/PCI Bridge) Bus 9 = .150<br>***RBA: Switch 1 (PCI/PCI Bridge, Bus 10, PCI/PCI Bridge) Bus 11 = .700<br>End Device Latency* = .400<br>Root Complex (Bus 0, Root port 1) Bus 1 = 0<br>HBA: PCIe Switch (PCI/PCI Bridge, Bus 2, PCI/PCI Bridge) Bus 3 = .700<br>HBA: FPGA PCI Bridge (PCI/PCI Bridge) Bus 8 = .150<br>HBA: FPGA Packet Processing = .500<br>HBA: FPGA transfer to NIC = .400<br>HBA: NIC: Packet Processing = .500<br>LAN Ethernet Switch = 60<br>RBA: NIC: Packet Processing = .500<br>RBA: NIC transfer to FPGA = .400<br>RBA: FPGA Packet Processing = .500<br>RBA: FPGA PCI Bridge (PCI/PCI Bridge) Bus 9 = .150<br>***RBA: Switch 1 (PCI/PCI Bridge, Bus 10, PCI/PCI Bridge) Bus 11 = .700<br>End Device Latency* = .400 | 65 |
|  | Bus 0 to HBA to RBA With LAN Ethernet switch set to "cut-through" mode. | Root Complex (Bus 0, Root port 1) Bus 1 = 0<br>HBA: PCIe Switch (PCI/PCI Bridge, Bus 2, PCI/PCI Bridge) Bus 3 = .700<br>HBA: FPGA PCI Bridge (PCI/PCI Bridge) Bus 8 = .150<br>HBA: FPGA Packet Processing = .500<br>HBA: FPGA transfer to NIC = .400<br>HBA: NIC: Packet Processing = .500<br>LAN Ethernet Switch = 2.7<br>RBA: NIC: Packet Processing = .500<br>RBA: NIC transfer to FPGA = .400<br>RBA: FPGA Packet Processing = .500<br>RBA: FPGA PCI Bridge (PCI/PCI Bridge) Bus 9 = .150<br>***RBA: Switch 1 (PCI/PCI Bridge, Bus 10, PCI/PCI Bridge) Bus 11 = .700<br>End Device Latency* = .400 | 7.6 |
| i(dc)-PCI | Bus 0 to HBA to RBA | Root Complex (Bus 0, Root port 1) Bus 1 = 0<br>HBA: PCIe Switch (PCI/PCI Bridge, Bus 2, PCI/PCI Bridge) Bus 3 = .700<br>HBA: FPGA PCI Bridge (PCI/PCI Bridge) Bus 8 = .150<br>HBA: FPGA Packet Processing = .500<br>HBA: FPGA transfer to NIC = .400<br>HBA: NIC: Packet Processing = .500<br>RBA: NIC: Packet Processing = .500<br>RBA: NIC transfer to FPGA = .400<br>RBA: FPGA Packet Processing = .500<br>RBA: FPGA PCI Bridge (PCI/PCI Bridge) Bus 9 = .150<br>***RBA: Switch 1 (PCI/PCI Bridge, Bus 10, PCI/PCI Bridge) Bus 11 = .700<br>End Device Latency* = .400 | 4.9 |

*typical end device.
**x2 for roundtrip latency.
***not necessary if RBA is conventional PCI.

The latencies listed are considered preliminary estimates and are useful for relative comparison purposes only. Actual latency will vary considerably depending on the particular system. Table 39 will be validated and updated with actual results following the proof-of-concept effort.

It is anticipated that the latencies introduced by the i(dc)-PCI and i(e)-PCI will not adversely impact most PCI System applications as latencies remain in the sub 100 μs range. It is expected that the latencies introduced by the i-PCI implementation will require mitigation measures such as mirror and cache to reflect the remote I/O resources.

i-PCI HBA Cut-Through Mode:

The RCR/M may be totally disabled, so that all PCI transactions are simply passed through to the RBA. This may be satisfactory for i(dc)-PCI or i(e)-PCI implementations where there is little additional latency introduced and a simplified approach is a viable solution.

With the eventual acceptance and adoption of i-PCI, the PCI Express Standard, Operating System PCI bus drivers, PCI device drivers, and applications will be written, validated, and verified for i-PCI implementations. This acceptance should reduce the incidence of unintentional timeouts and improve code robustness at all levels, thus reducing the need for timeout mitigation. The class system defined by i-PCI should allow developers to establish various levels of operability or features for applications. This flexible as opposed to the rigid "all or nothing" approach in regards to functionality should result in improved user experience.

i-PCI System Timing Diagrams:
I-PCI (WPAN)

The i-PCI baseline protocol addresses three hardwired implementations, i-PCI, i(e)-PCI and i(dc)-PCI. However, it is desirable to include wireless implementation options as well. Therefore, the i-PCI protocol may be extended to encompass three additional implementations in the wireless category: 1) i-PCI for wireless metropolitan area networks, 2) i-PCI for wireless local area networks and 3) i-PCI for wireless personal area networks.

One important implication for wireless implementations, is that i-PCI enables a very simple low-cost low-power handheld host such that it may consist of just a CPU/display/user inputs, yet via i-PCI the rest of the host system is located remote on a network. The end result is a simple low-cost PC compatible portable handheld that appears to the user as a fully expandable PC, as the rest of the PC is physically left behind on the network.

Basic data transfer performance-matching requirements for PCI and PCI express suggest a data rate >=1 Gbps is the low-end performance threshold for i-PCI. This is based on the fact that the legacy PCI bus is based on 32 bits/33 MHz=1056 kbps data transfer capability.

To date, wireless capability has been limited to a maximum of approximately 500 Mbps, so a satisfactory wireless i-PCI solution was not feasible. However, there has been significant recent progress in the development of high data rate wireless technologies, particularly in the area of Wireless Personal Area Networks (WPAN).

Therefore, at this time we are able to proceed with the preliminary definition of a WPAN implementation for i-PCI, designated i-PCI(WPAN). WLAN and WMAN implementations will be defined at the point that adequate data performance is developed in those respective wireless categories.

It is desirable to define the WPAN implementation as a subset of the base or "umbrella" i-PCI protocol. This is the same approach taken with the hardwired variations, i(e)-PCI and i(dc)-PCI. Thus, the i-PCI WPAN implementation definition is limited to a variation in the definition of the Data link and Physical layers of the base i-PCI protocol. Essentially, this means that a wireless version of the network link is defined. Instead of a hardwired Ethernet link, a wireless link is substituted. In a physical realization, this amounts to a wireless version of the host bus adapter and remote bus adapter.

In a wireless version of the host bus adapter and remote bus adapter, a Baseband Processor (BBP), transceiver, Front End (FE), and antenna is substituted for the 10 GBASE-T PHY. See FIG. 53, i-PCI (WPAN) Data Link.

The next concern to be addressed is that of available radio spectrum. Two unlicensed radio spectrum bands are the current focus of WPAN research and development efforts: 1) 57-66 GHz. and 2) and 3.1-10.6 GHz. Both bands have the basic raw bandwidth necessary to meet the minimum low-end performance threshold for i-PCI. Therefore both will be reviewed to arrive at the best option for i-PCI.

The 57-66 GHz band is commonly referred to as the mmWave band [19][20]. The specific band limits for the mmWave band vary throughout the world, but a continuous 5 GHz of bandwidth, from 59-64 GHz, is available in common in the major economic markets. See Table 40, mmWave bands.

The 3.1-10.6 GHz band is commonly referred to as "Ultra Wide Band" or simply UWB [21][22][23]. The specific band limits for UWB vary significantly throughout the world. See Table 41, UWB bands. Note that only the available continuous unrestricted bands are listed. From Table 41, it can be seen that although there is 7.5 GHz available in the USA and Canada, only a continuous 1.6 GHz of bandwidth, from 7.4-9 GHz is available in common for the major economic markets.

TABLE 40 mmWave Bands

| Maj Markets | Available bands | Net BW |
|---|---|---|
| USA & Canada | 57-64 GHz | 7 GHz |
| Japan | 59-66 GHz | 7 GHz |
| Europe | 57-66 GHz | 9 GHz |

TABLE 41

UWB Bands

| Maj Markets | Available bands | Net BW |
|---|---|---|
| USA & Canada | 57-64 GHz | 7 GHz |
| Japan | 59-66 GHz | 7 GHz |
| Europe | 57-66 GHz | 9 GHz |

Utilization is an important consideration, as a highly utilized spectrum is an indication that interference is likely to be an issue if i-PCI were to utilize the band.

Figure 54:
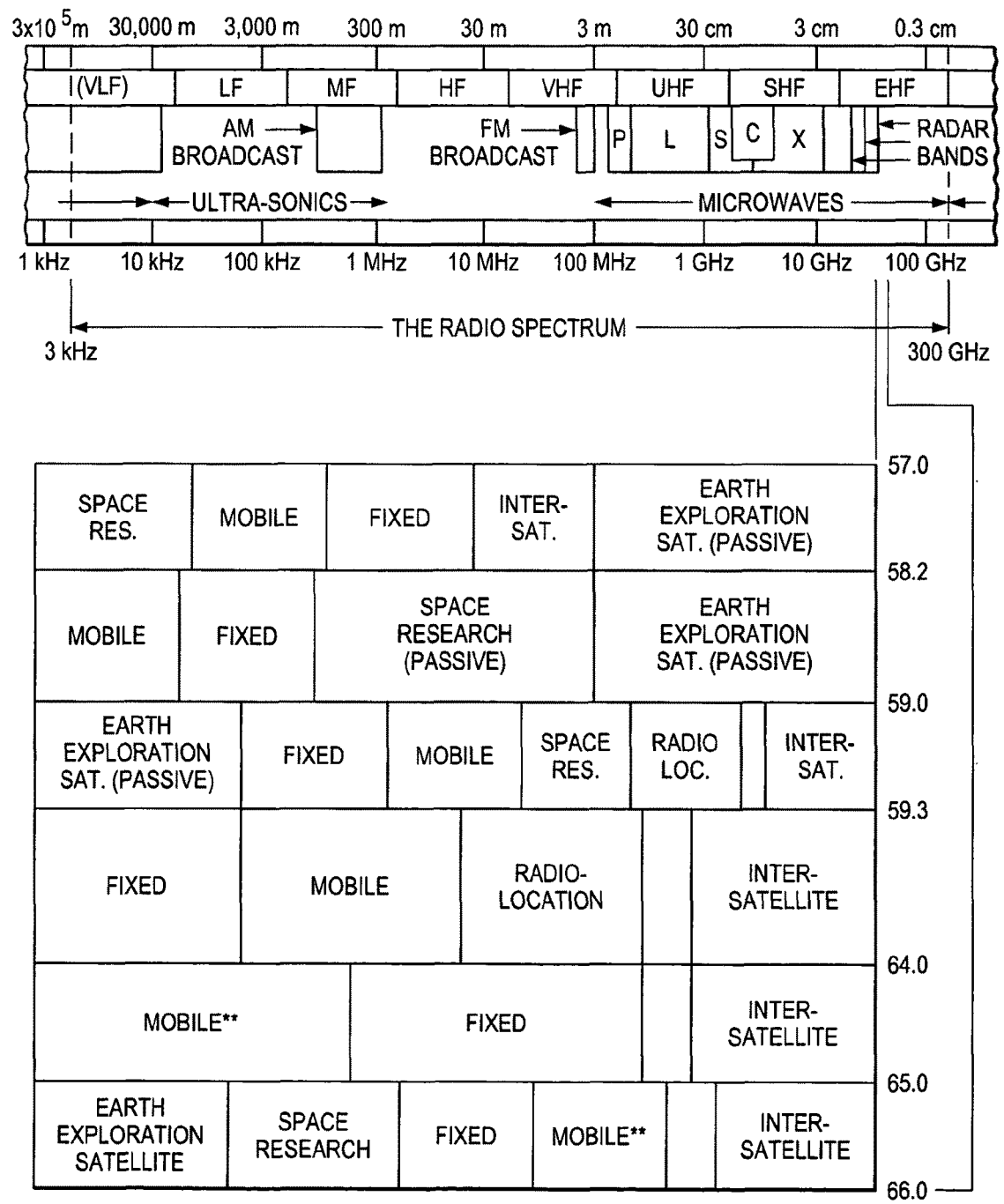
FIG. 54 depicts 3.1-10.6 GHz WPAN Radio Spectrum.
Figure 55:
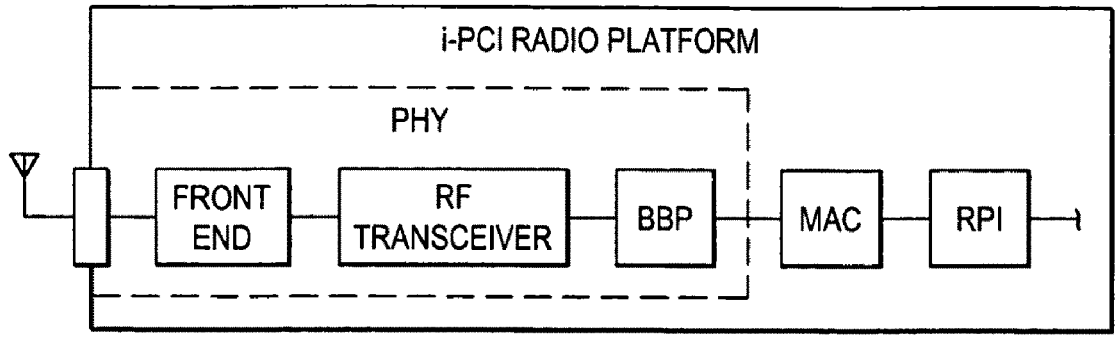
FIG. 55 depicts 57-66 GHz WPAN Radio Spectrum.

UWB shares the frequency range with many other licensed and unlicensed applications, notably 802.11a. Thus, WPAN protocols are severely power-limited to keep from interfering with the licensed applications and to minimize interference with other unlicensed applications. See FIG. 54, 3.1-10.6 GHz WPAN Radio Spectrum.

The mmWave band, is largely under-utilized. See FIG. 15, 57-66 GHz WPAN Radio Spectrum. This is attributable to two primary factors. First, this frequency range falls in the 02 absorption band. The resulting signal attenuation limits applications. Second, the relatively high frequency is at the upper limit of CMOS integrated circuit fabrication processes, so circuit fabrication is costly compared to lower frequencies.

Given a cursory inspection of the two figures, it is obvious the 3.1-10.6 GHz spectrum is a much heavier utilized than the 57-66 GHz spectrum.

Another consideration is the allowable transmit power. The FCC limits the WPAN applications in the 3.1-10.6 GHz spectrum to UWB technologies, where the 10 dB BW is >500 MHz and the RMS power is <−41.3 dBm (1mW) EIRP. This severe power limitation creates a significant challenge for realizing the high data rates required for i-PCI. On the other hand, the FCC limits the WPAN applications in the 57-66 GHz band to 27 dBm (500 mW) and EIRP is not specified. Since EIRP is not specified, the directional concentration of transmit power can easily approach 8000 mW, enabling a healthy S/N ratio that could facilitate high data rates.

Channel propagation characteristics are a concern for both unlicensed bands. Channel modeling and measurements for the 57-66 GHz spectrum indicate that aside from the mentioned 02 absorption, serious attenuation scattering and signal blockage is to be expected.

Other decision parameters may be categorized as "enabler" or "synergy". By enablers what is meant is are there technologies in development, for instance suitable radio platforms, which may be leveraged and adapted for use by i-PCI (WPAN)? By synergy, what is meant is are there ongoing industry research efforts, such as standards efforts, that are complimentary in nature to the goals of i-PCI (WPAN)? Table 42, i-PCI (WPAN) Tradeoffs, summarizes the issues.

TABLE 42 i-PCI (WPAN) Tradeoffs

| Category | Consideration | UWB | mmWave |
|---|---|---|---|
| Perform | BW | 1.6 GHz | 5 GHz |
| | Interference | Significant | Minimal |
| | Max | <−41/3 dBm | 27 dBm |
| | Xmit Power | (1 mW) EIRP | (500 mw) EIRP not specified |
| Channel | FSpace Loss Blockage, Reflection | << mmWave | $O_2$, people, Objects, furniture, etc |
| Enabler | Applicable Radio Platform | ECMA-368, 369 | 802.15.3b, c |
| Synergy | Applicable Stds Efforts | 802.11 VT (3-5 Gbps) | 802.15.3c (2-6 Gbps) |

In weighing all the various factors, parameters, and issues, it may be argued that the 59-64 GHz "mmWave" band offers the best opportunity for i-PCI.

As a starting point, it is useful to establish the theoretical capacity of the mmWave band. For these preliminary calculations, the continuous 5 GHz of bandwidth (BW), from 59-64 GHz (available in common in the major economic markets) is assumed as the band of potential operation for i-PCI. 16-QAM is assumed as a reasonable modulation scheme and a SNR of 15 dB is assumed to be a nominal value.

BW=$5 \cdot 10^9$
Max Baud Rate: $2 \cdot BW = 10 \cdot 10^9$ sps
Bits per Symbol: 4 (i.e. 16-QAM)
Nyquist Limit: $C = 2 \cdot BW \cdot Log_2(M) = 40 \cdot 10^9$ bps
Shannon Capacity:
    S=500 mW and N=16 mW (SNR=15 dB)

$$C = BW \cdot \frac{\ln\left(1 + \frac{S}{N}\right)}{\ln(2)} = 25.144 \cdot 10^9 bps$$

These preliminary calculations verify that in theory there is adequate bandwidth to accommodate the data rates required for i-PCI. Indeed the calculations indicate that 25 Gbps is feasible if the entire 5 GHz bandwidth could be utilized by i-PCI.

The i-PCI WPAN implementation is positioned as a subset of the base or "umbrella" i-PCI protocol, defining a wireless version of the data link and physical layers. The data link and physical layers encompass what will be referred to collectively as the "i-PCI radio platform".

In consideration of where to start in defining the radio platform one approach is to look at the enablers and synergies that exist in the solution space. It is good practice and just common sense to leverage industry standard efforts wherever possible to avoid re-solving problems that have already been addressed. In the mmWave space, this means considering the current activities of the IEEE 802.15™ Working Group.

The IEEE 802.15™ Working Group has defined a wireless ad hoc "piconet" data communications system designed to enable wireless connectivity of high-speed, low-power, low-cost multimedia-capable devices. A piconet is defined as a wireless ad hoc network covering a relatively small range (<10 m radius). The base standard for this ad hoc piconet communications system is 802.15.3-2003. This base standard was originally written for the 2.4 GHz band.

The IEEE 802.15 Working Group has also defined an amendment to the base standard MAC layer for WPAN via standard 802.15.3b-2005.

In 2005, the IEEE 802.15™ Working Group formed a task group, referred to as Task Group 3c (TG3c) to focus on extending the base standard to include the mmWave band.

Task Group 3c has settled on a channel plan that divides the mmWave Spectrum into four channels of 2.160 GHz each. The middle two channels (Channel 2, 3) cover the aforementioned continuous 5 GHz of bandwidth, from 59-64 GHz that is in common in the major world economic markets. See Table 43, mmWave Channel Plan.

TABLE 43 mmWave Channel Plan

| Channel Number | Start Frequency | Center Frequency | Stop Frequency |
|---|---|---|---|
| 1 | 57.240 GHz | 58.320 GHz | 59.400 GHz |
| 2 | 59.400 GHz | 60.480 GHz | 61.560 GHz |
| 3 | 61.560 GHz | 62.640 GHz | 63.720 GHz |
| 4 | 63.720 GHz | 64.800 GHz | 65.880 GHz |

Figure 56:
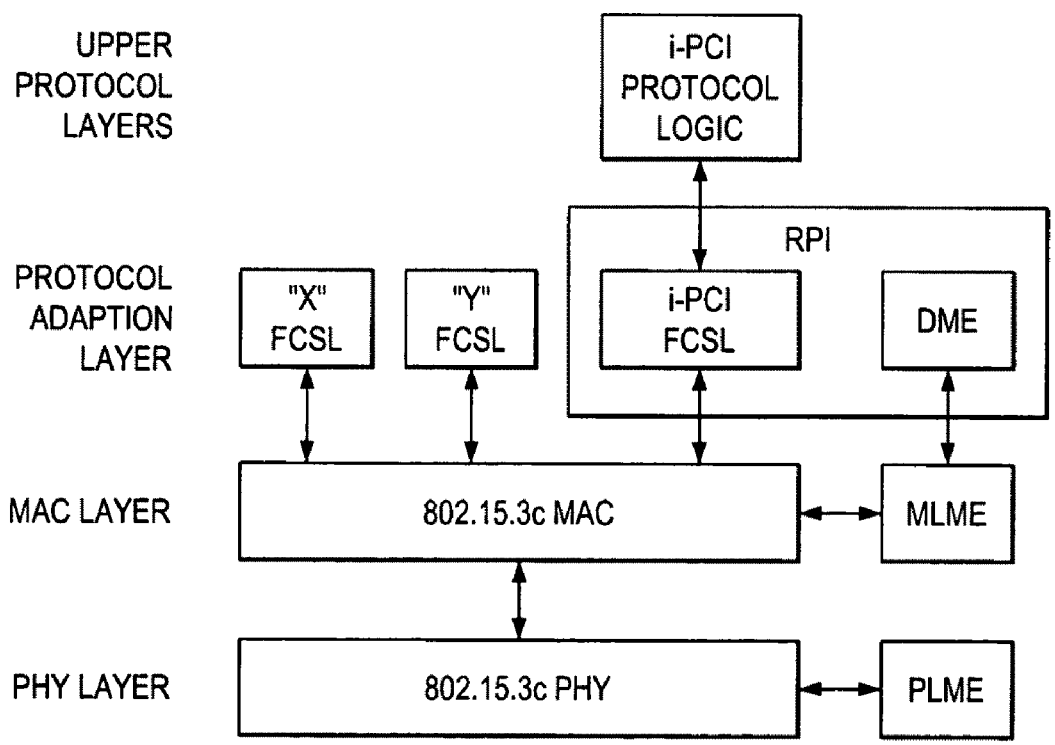
FIG. 56 depicts i-PCI Radio Platform Block Diagram.
Figure 57:
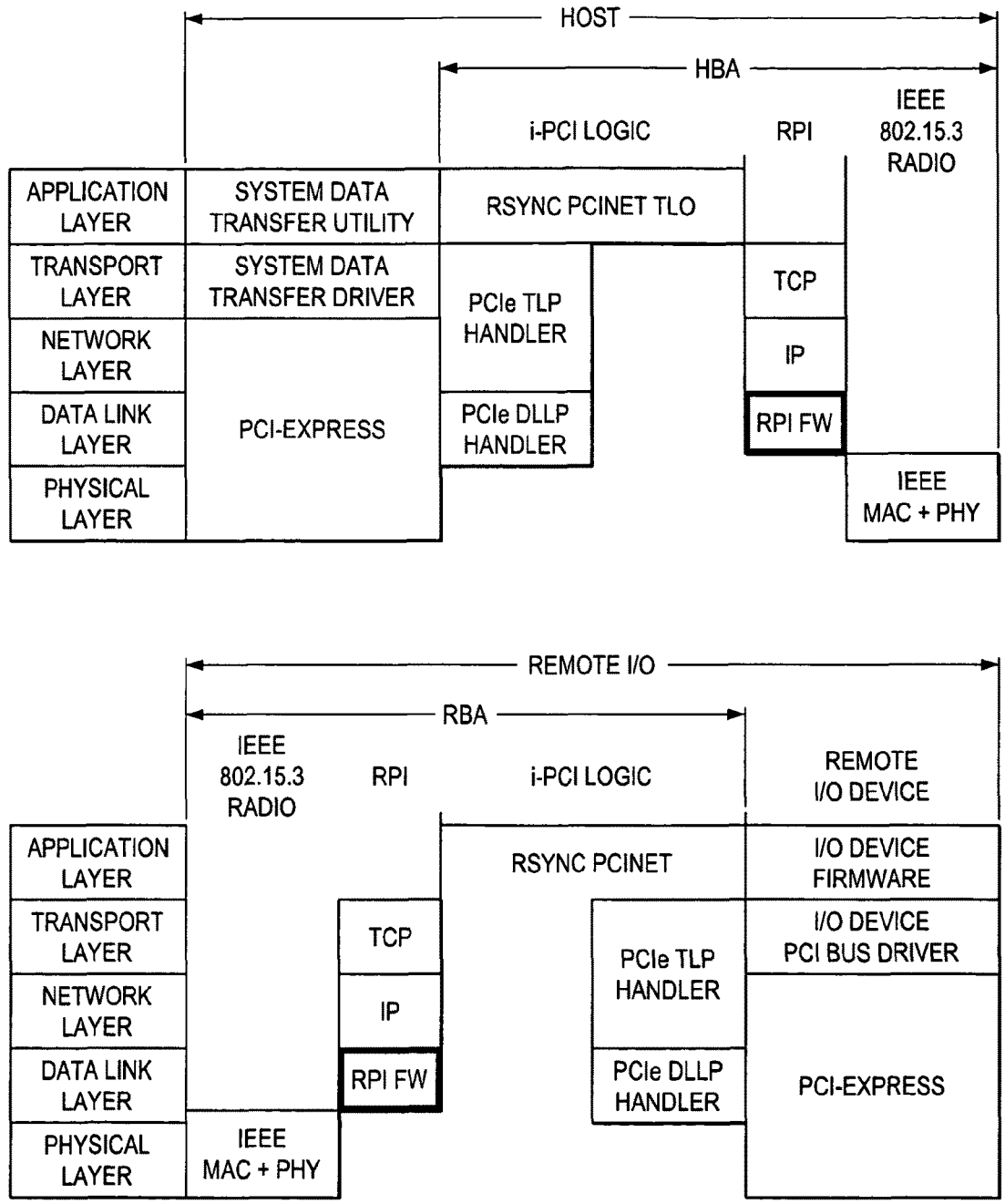
FIG. 57 depicts Layer Model.
Figure 59:
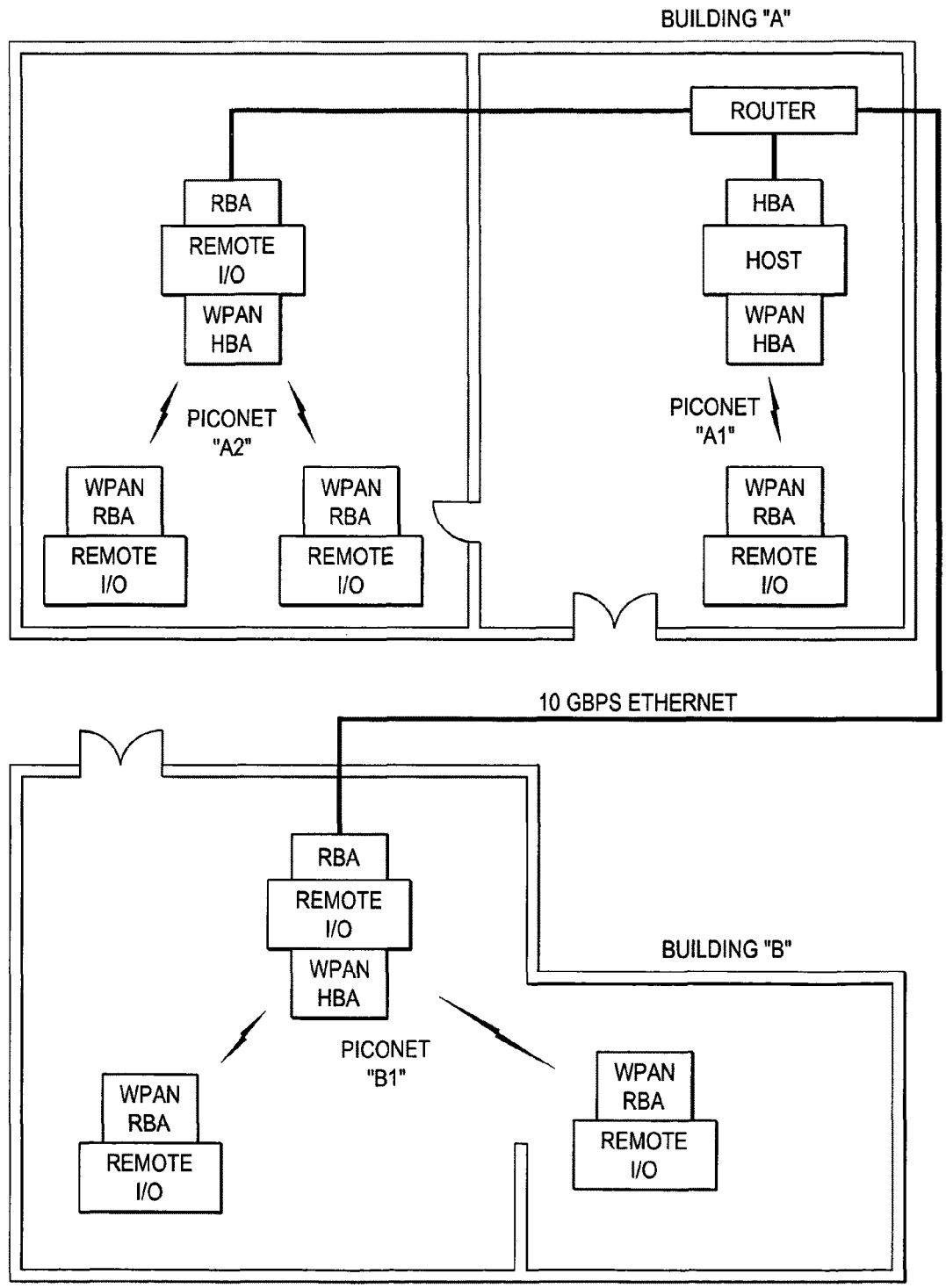
FIG. 59 depicts i-PCI Encapsulation.
Figure 61:
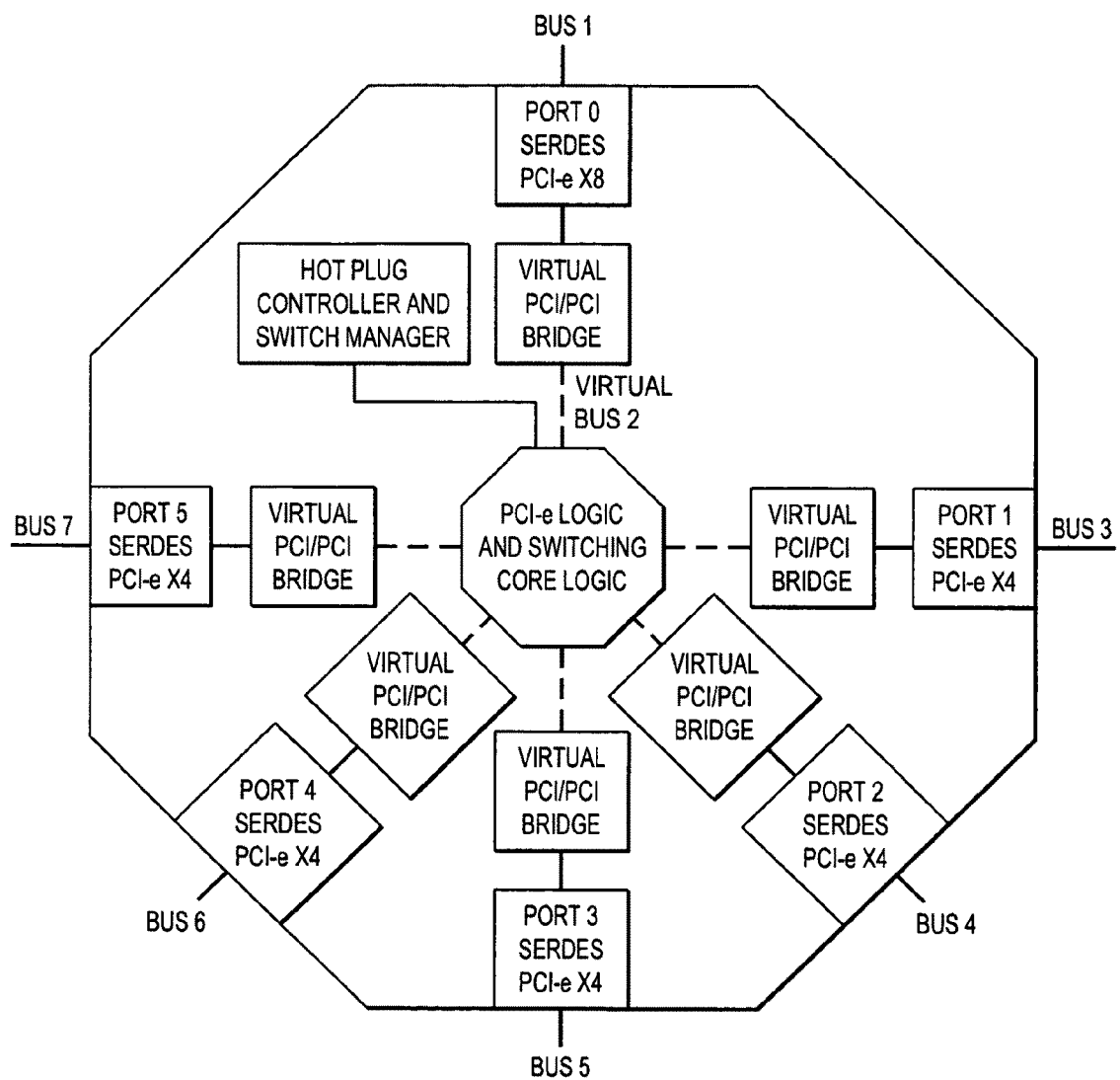
FIG. 61 depicts PCI Express Payload Throughput.

The IEEE 802.15 Task Group 3c is nearing final definition of an alternative PHY layer to enable transmission in the mmWave band. and associated enhancements to the .3b MAC layer. The Task Group 3c definitions of the PHY and MAC layers for the mmWave band may be leveraged to define the i-PCI Radio Platform. All that is needed in addition to these base standards is a Radio Platform Interface (RPI) between the i-PCI Protocol Logic and the IEEE 802.15.3b MAC. See FIG. 56, i-PCI Radio Platform Block Diagram.

The RPI contains the Device Management Entity (DME) function and Frame Convergence Sub-layer (FCSL) as defined by the 802.15.3b standard as well as other HBA/RBA management functions. The 802.15.3b standard refers to the DME/Convergence combination as the Protocol Adaptation Layer. See FIG. 57, Layer Model.

The DME serves as the interface to the MAC and PHY sub-layer management entities (MLME and PLME respectively) and provides high-level configuration and status reporting capability. The FCSL is specific for i-PCI(WPAN) and provides the i-PCI TLP PDU translation between the i-PCI Protocol logic and the 802.15.3b MAC.

Figure 58:
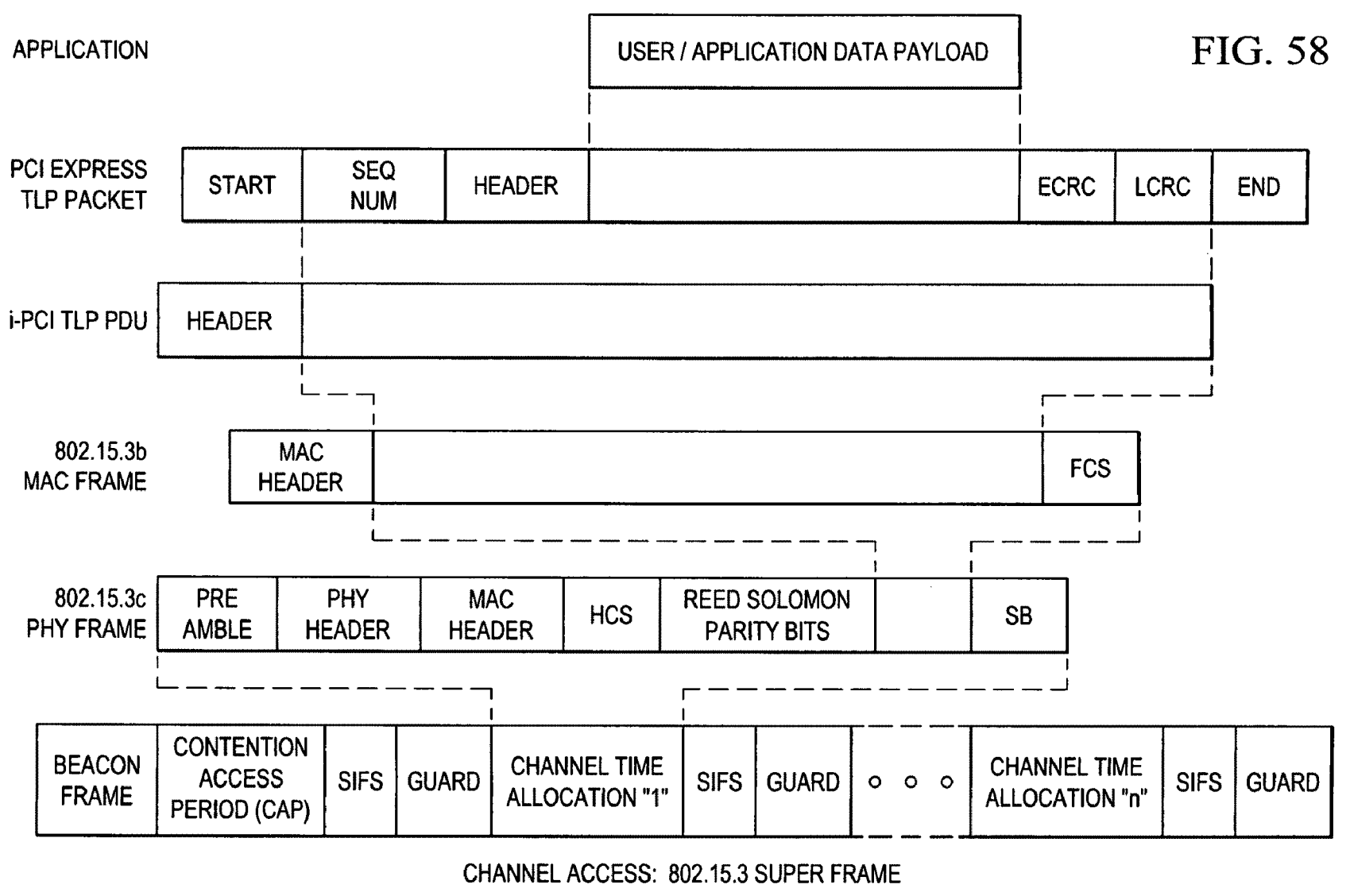

The impact on the i-PCI Protocol Suite is illustrated in FIG. 58, i-PCI (WPAN) Protocol Suite, with the RPI firmware (RFP FW) block highlighted bold. Note that for direct expansion of a host system via a mmWave link, TCP and IP would not be implemented Packet formation for i-PCI(WPAN) begins with encapsulation of PCI Express Transaction Layer packets, in conceptually the same approach as with the other i-PCI implementations. However, the encapsulation at the data link and physical layers is different for i-PCI(WPAN). See FIG. 59, i-PCI Encapsulation.

At the datalink layer, the timing and framing defined for the 802.15.3 come into play. Encapsulation of the i-PCI PDU is within the 802.15.3b MAC frame and the 802.15.3c PHY frame.

The MAC frame includes the MAC header, payload (the i-PCI PDU), and a Frame Check Sequence (FCS). The MAC header is 80 bits (10 octets) in length. The payload can range in size from 0 to 2044 octets. The FCS is a 32-bit (4 octets) CRC and is calculated over the entire payload.

The PHY frame includes a Preamble, PHY Header, MAC Header, Header Check Sequence (HCS), Reed Solomon parity bits, payload (the i-PCI PDU), and Stuff bits (as necessary). Multiple transmission modes are defined for the mmWave PHY layer so the details of the packet formation and the definition of the PHY Frame fields vary, but the basic encapsulation remains the same.

The preamble accomplishes synchronization and channel estimation. The preamble length and structure varies depending on the PHY mode.

The PHY header is 80 bits (10 octets) in length. The HCS is 16 bits (2 octets) in length and covers both the PHY and MAC headers. The Reed Solomon parity bit field is 16-bits (2 octets) in length and provides the forward error correction capability (239,255) for the MAC and PHY headers.

Once the PHY frame is formed, a Channel Time Allocation (CTA) is assigned within what is referred to as a "Superframe" in a TDMA channel access scheme. A device may transmit multiple frames within one CTA and a device may request multiple CTA within one superframe to reserve the bandwidth necessary to achieve the desired data transfer rate. The duration of a superframe is configurable up to 65,535 μsec (15.259 Hz). The piconet TDMA scheme can be configured for many CTAs per superframe or a single CTA may take up an entire superframe. The CAP allocation within the superframe is optional.

With the basic implementation defined, we move on to discussion of the installation. Two i-PCI WPAN installations are envisioned. The most basic installation utilizes a mmWave link for direct expansion of a host system via a mmWave piconet. This concept was depicted in FIG. 53, i-PCI(WPAN) Data Link, although it should be noted that more than the one remote I/O interface may be present on a mmWave piconet.

A second installation utilizes a hardwired 10 Gbps Ethernet network for a backbone with Remote I/O configured as i-PCI wireless access points. The access points would include both a regular i-PCI RBA function for interfacing to the 10 Gbps Ethernet backbone and an i-PCI (WPAN) HBA function for wireless expansion via an 802.12.3 mmWave piconet. The access point serves as the piconet coordinator, providing the basic timing and beacon for the piconet per 802.15.3c. See FIG. 60, i-PCI(WPAN) Backbone Installation.

Note that all the remote resources, regardless of physical location, would appear to the host system and host software as native system memory or I/O address mapped local resources.

Merged proposal IEEE 802.15-07-0934-01-003c and IEEE 802.15-07/942r2 [19][20] include definition of three transmission modes which can be utilized by i-PCI: 1) Single Carrier (SC) mode 2) OFDM mode, and 3) AV OFDM. All three modes include definition of multi-Gbps data rate sub-modes. Each mode has advantages and disadvantages and therefore i-PCI(WPAN) protocol may allow any of the three to be implemented. Dual-mode or tri-mode HBA and RBA designs are also possible.

SC mode works well for line-of-sight applications. SC mode requires the least circuit complexity resulting in low power, small footprint, and low cost designs.

The OFDM mode is better suited for non line-of-sight applications and has better potential to scale to higher data rates in the future than SC mode. Two FEC schemes are specified: 1) Reed Solomon (RS)+LPDC 2) RS+Convolution Coding (CC). The FEC result in different net data rates.

The AV OFDM mode is focused on Audio Video (AV) applications, specifically optimized for streaming uncompressed audio and high definition video such as HDMI. Although this mode is specifically optimized for AV, it may also be considered for use by i-PCI, particularly if audio or HDMI video data is utilized by an application or peripheral that is included in the virtualization scheme.

Each of the three modes includes a number of the sub-modes with varying resulting data rates. Table 44, OFDM Sub-mode (>2 Gbps) Comparison, Table 45, SC Sub-mode (>2 Gbps) Comparison, and Table 46, AV OFDM Sub-mode (>2 Gbps) shows the modulation and coding schemes employed and resulting data rates.

TABLE 44

OFDM Sub-mode (>2 Gbps) Comparison

| Sub-mode | FEC Rate | Modulation | Data Rate Mbps |
|---|---|---|---|
| RS + CC2 | ⅔ | QPSK | 2000 |
| RS + LDPC1 | .694 | QPSK | 2100 |
| RS + LDPC1 | .810 | QPSK | 2450 |
| RS + LDPC1 | .463 | 16QAM | 2800 |
| RS + CC3 | ½ | 16QAM | 3000 |
| RS + CC4 | ⅔ | 16QAM | 4000 |
| RS + LDPC1 | .694 | 16QAM | 4200 |
| RS + CC5 | ½ | 64QAM | 4500 |
| RS + LDPC1 | .810 | 16QAM | 4900 |
| RS + CC6 | ⅔ | 64QAM | 6000 |
| RS + LDPC1 | .694 | 64QAM | 6300 |
| RS + LDPC1 | .810 | 64QAM | 7350 |

Note that only those sub-modes with data rate capability in excess of 2 Gbps are listed.

As an illustration of the feasibility of i-PCI(WPAN) an example calculation of the net PCI Express TLP throughput is conducted. For the example, the SC Sub-mode HR15 is assessed, which according to Table 7, has a datarate of 6.026 Gbps.

HR15 implements RS(255,239) Forward Error Correction for a FEC rate of 0.937. The symbol rate is set for 1728 symbols/sec. The Spreading factor is 1 (no coding gain) and the modulation is π/2-16QAM resulting in 4 bits/symbol.

Net PCI Express throughput calculations assume the following: 1) A mmWave link is used for direct expansion of a host system to a single remote I/O via a mmWave piconet. 2) The channel access is configured for a superframe consisting of a beacon frame, no CAP, and two CTAs. One CTA is allocated for host-to-remote transmission and the second CTA is allocated for remote-to-host transmission. The period of the CTA is set to accommodate the maximum PHY frame size given the maximum i-PCI PDU size so that no fragmentation occurs. See FIG. 61, PCI Express Payload Throughput.

TABLE 45

SC Sub-mode (>2 Gbps) Comparison

| Sub-mode | FEC Rate | Modulation | Data Rate Mbps |
|---|---|---|---|
| MR1 | .667 | QPSK | 2143.3 |
| MR2 | .750 | QPSK | 2411.2 |
| MR3 | .582 | 8QAM | 2806.6 |
| MR4 | .875 | QPSK | 2813.0 |
| HR1 | .933 | QPSK | 3000.6 |
| HR2 | .937 | QPSK | 3013.2 |
| HR3 | .937 | Dual Rail Bipolar | 3013.2 |
| HR4 | .667 | π/2-NS8QAM | 3214.9 |
| HR5 | 1.000 | Dual Rail Bipolar | 3214.9 |
| HR6 | .750 | 8PSK | 3616.7 |
| HR7 | .873 | π/2-star 8QAM | 4210.0 |
| HR8 | .875 | 8PSK | 4219.5 |
| HR9 | .933 | 8PSK | 4500.8 |

TABLE 45-continued

SC Sub-mode (>2 Gbps) Comparison

| Sub-mode | FEC Rate | Modulation | Data Rate Mbps |
|---|---|---|---|
| HR10 | .937 | 8PSK | 4519.7 |
| HR11 | .937 | NS8QAM | 4519.7 |
| HR12 | .750 | 16QAM | 4822.3 |
| HR13 | .750 | 16QAM | 4822.3 |
| HR14 | .875 | 16QAM | 5626.0 |
| HR15 | .937 | 16QAM | 6026.3 |

TABLE 46

AV Sub-mode (>2 Gbps)

| Sub-mode | FEC Rate | Modulation | Data Rate Mbps |
|---|---|---|---|
| HRP 2, 4 | 2/3 | QPSK | 3810 |

The results show that 600 Mbps throughput (each direction) or 1.2 Gbps total is the level of performance that might be expected for HR15. Note that this throughput estimate is for the particular scenario as described. There may be other configurations and CTA assignments that result in better performance. The level of performance is just above the previously stated suggested threshold for i-PCI(WPAN): >1056 Mbps.

Future Capability

Information Assurance: Authentication and Secure communications (encryption) will need to be added to the protocol. iSCSI lessons-learned will need to be applied for i-PCI.

i-PCI Virtual PCI Spoof: This implementation option is a software-only CPU-intensive virtual extension of the PCI System and topology. The CPU, utilizing the system memory, handles the protocol-processing load. This approach is targeted for use in closed or restricted systems where it is difficult or impossible to access the PCI Express bus or where there is a desire to minimize the cost of implementation. This will be a significant software effort.

Eliminating the need for an adapter card with a software only implementation will be a better fit for computing machine virtualization solutions such as VMWare.

i-PCI-over-Infiniband for localized server expansion is an envisioned application. This would enable high performance (no TCP/IP stack) close proximity expansion to PCI-X-based I/O chassis from blade servers without external PCI system expansion access.

Simultaneous sharing of I/O functions by multiple hosts or computing machines needs to be developed. The scope of the initial version of i-PCI is exclusive memory mapping of I/O to a single host.

i-PCI(w): Wireless PCI implementations expanded to include:

i-PCI (WLAN): This would cover virtualization of the local computer bus over a wireless link in the 802.11n solution space.

i-PCI (WMAN): This would cover virtualization of the local computer bus over a wireless link in the 802.16 solution space.

In the wireless space, the "Ether" in Ethernet certainly applies. Otherwise, the same QOS concerns that are the focus of and addressed by i-PCI in the 802.3 solution space apply. BW availability that at best will approach 1 Gbps means BW conservation solutions will need to be vigorously applied. Loss-less data compression, techniques for multiplexing multiple data transactions onto a single i-PCI PDU, and ACK coalescing will likely figure into the solution set. Here the legacy system support for 32-bit/33 MHz PCI (BW=1 Gbps) will be an enabler. So, experience mapping 1 Gbps Ethernet (802.3ab) to a legacy 32-bit/33MHz PCI bus should be applicable.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A computing system, comprising:
   a computing module having a host system bus configured to process data and configured to handle the data on the host system bus;
   at least one native I/O module operably coupled to, but physically remote from, the computing module and including an interface adapted to exchange the data between the host system bus and at least one remote peripheral device having a peripheral bus in a message format according to a standardized motherboard architecture; and
   an encapsulation module configured to encapsulate the data available to the remote native I/O module interface according to the standardized motherboard architecture into a data message according to a first transport architecture, and further configured to compensate for any introduced latency of the data exchanged between the computing module and the at least one native I/O module.

2. A computing system as specified in claim 1 wherein the encapsulation module is configured to exchange the data message according to the first transport architecture with the at least one remote peripheral device.

3. A computing system as specified in claim 2 wherein the data message according to the standardized motherboard architecture is mapped into the data message according to the first transport architecture.

4. A computing system as specified in claim 1 wherein the encapsulation module is transparent to the computing module.

5. A computing system as specified in claim 4 wherein the encapsulation module is transparent to the remote peripheral device.

6. A computing system as specified in claim 1 wherein the interface includes a slot.

7. A computing system as specified in claim 1 comprising a plurality of the native I/O modules operatively coupled to the computing module.

8. A computing system as specified in claim 1 wherein the encapsulation module comprises a controller, wherein the controller includes a protocol converter, memory, and buffering.

9. A computing system as specified in claim 8 wherein the encapsulation module includes both firmware and software components cooperating at a plurality of networking layers to reduce latency during encapsulation.

10. A computing system as specified in claim 1 wherein a device native to a computer system architecture comprises the at least one remote peripheral device.

11. A computing system as specified in claim 1 wherein the first transport architecture is a hardwired protocol.

12. A computing system as specified in claim 1 wherein the first transport architecture is based on TCP/IP.

13. A computing system as specified in claim 1 wherein the first transport architecture is based on a LAN protocol.

14. A computing system as specified in claim 1 wherein the first transport architecture is based on an Ethernet protocol.

15. A computing system as specified in claim 1 wherein the first transport architecture is a wireless protocol.

16. A computing system as specified in claim 1 wherein the computing module and the at least one native I/O module are remote from one another and are configured to virtualize the native I/O module with respect to the computing module.

17. A computing system as specified in claim 16 wherein the at least one remote device is a native system memory-mapped or I/O address mapped resource.

18. A computing system as specified in claim 17 wherein the native I/O module is selected from the group of a bridge, an I/O controller, an I/O device, and memory.

19. A computing system as specified in claim 17 wherein the motherboard architecture is selected from the group of PCI, and PCI Express and PCI-X.

20. A computing system, comprising:
a computing module having a host system bus configured to process data and configured to handle the data on the host system bus:
at least one native I/O module operably coupled to, but physically remote from, the computing module and including an interface adapted to exchange the data between the host system bus and at least one remote peripheral device having a peripheral bus in a message format according to a standardized motherboard architecture; and
an encapsulation module configured to encapsulate the data available to the remote native I/O module interface according to the standardized motherboard architecture into a data message according to a first transport architecture, and further configured to compensate for any latency of the data exchanged between the computing module and the at least one native I/O module, wherein the computing module and the at least one native I/O module are remote from one another and are configured to virtualize the native I/O module with respect to the computing module, wherein the at least one remote device is a native system memory-mapped or I/O address mapped resource,
wherein the computing system is a minimal host system configured and optimized for portability, and a substantial portion of the standardized motherboard architecture is located remotely from the computing system on a network.

21. An interface operable with a computing module having a host system bus configured to process and handle data on the host system bus, comprising:
an interface module configured to exchange the host system bus data with a native I/O module operably coupled to, but physically remote from, the computing module, the I/O module configured to exchange the data with a remote peripheral device having a peripheral bus in a message format according to a standardized motherboard architecture, the interface module configured to encapsulate the data available to a remote native I/O module interface into a data message according to a first transport architecture, and further configured to compensate for any introduced latency of the data exchanged between the computing module and the native I/O module.

22. The interface as specified in claim 21 wherein the interface module is transparent to the computing module.

23. A computing system as specified in claim 21 wherein the motherboard architecture is selected from the group of PCI, and PCI Express and PCI-X.

24. A computing system as specified in claim 21 wherein the first transport architecture is a hardwired protocol.

25. A computing system as specified in claim 21 wherein the first transport architecture is based on TCP/IP.

26. A computing system as specified in claim 21 wherein the first transport architecture is based on a LAN protocol.

27. A computing system as specified in claim 21 wherein the first transport architecture is based on an Ethernet protocol.

28. A computing system as specified in claim 21 wherein the first transport architecture is a wireless protocol.

29. An interface operable with a native I/O module configured to exchange data with a remote peripheral device having a peripheral bus in a message format according to a standardized motherboard architecture, comprising:
an interface module configured to exchange the data with a computing module having a host system bus configured to process and handle the data on the host system bus, the native I/O module operably coupled to, but physically remote from, the computing module, the interface module configured to encapsulate the data available to a remote native I/O module into a data message according, to a first transport architecture, and further configured to compensate for any introduced latency of the data exchanged between the native I/O module and the computing module.

30. The interface as specified in claim 29 wherein the interface module is transparent to the native I/O module.

31. A computing system as specified in claim 29 wherein the motherboard architecture is selected from the group of PCI, and PCI Express and PCI-X.

32. A computing system as specified in claim 29 wherein the first transport architecture is a hardwired protocol.

33. A computing system as specified in claim 29 wherein the first transport architecture is based on TCP/IP.

34. A computing system as specified in claim 29 wherein the first transport architecture is based on a LAN protocol.

35. A computing system as specified in claim 29 wherein the first transport architecture is based on an Ethernet protocol.

36. A computing system as specified in claim 29 wherein the first transport architecture is a wireless protocol.

* * * * *